(12) United States Patent
Kamibayashi et al.

(10) Patent No.: US 8,049,390 B2
(45) Date of Patent: Nov. 1, 2011

(54) LINEAR MATERIAL AND STATOR STRUCTURE

(75) Inventors: Hiroyuki Kamibayashi, Arida (JP); Yasunori Kashima, Arida (JP); Takafumi Tanabe, Arida (JP); Takeshi Ikeda, Arida (JP); Yasushi Kawakami, Arida (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 13/047,161

(22) Filed: Mar. 14, 2011

(65) Prior Publication Data

US 2011/0174042 A1    Jul. 21, 2011

Related U.S. Application Data

(62) Division of application No. 12/298,524, filed as application No. PCT/JP2007/058673 on Apr. 20, 2007, now Pat. No. 7,928,626.

(30) Foreign Application Priority Data

| Apr. 28, 2006 | (JP) | 2006-124581 |
| Jul. 5, 2006 | (JP) | 2006-185790 |
| Jul. 26, 2006 | (JP) | 2006-203743 |
| Jan. 16, 2007 | (JP) | 2007-006755 |
| Jan. 16, 2007 | (JP) | 2007-006756 |
| Jan. 19, 2007 | (JP) | 2007-009754 |
| Jan. 30, 2007 | (JP) | 2007-018974 |
| Feb. 28, 2007 | (JP) | 2007-050002 |

(51) Int. Cl.
*H02K 3/04* (2006.01)

(52) U.S. Cl. ........................................ 310/208; 310/201
(58) Field of Classification Search .................. 310/201, 310/208, 179, 180, 184; 29/596, 598, 605–606
See application file for complete search history.

(56) References Cited

U.S. PATENT DOCUMENTS 3,775,628 A    11/1973    Andersson et al.
(Continued)

FOREIGN PATENT DOCUMENTS

JP    62-287515 A    12/1987
(Continued)

OTHER PUBLICATIONS

International Search Report for PCT/JP2007/058673 mailed Jun. 26, 2007.

*Primary Examiner* — Thanh Lam
(74) *Attorney, Agent, or Firm* — Roberts Mlotkowski Safran & Cole, P.C.

(57) ABSTRACT

A stator structure includes: a stator core (104) having a large number of concave slots (105) and a large number of convex magnetic poles (106) circumferentially alternately arranged; and magnet wires (101) of rectangular cross section in each of which an insulating coating (103) is formed on the outer surface of a metal wire (102), wherein each of the slots (105) is formed so that the distance (W2) between both the side surfaces (109, 109) of the slot (105) gradually decreases from the bottom (107) to a distal opening (108) of the slot (105), each of the magnet wires (101) is wound around the associated magnetic pole (106) and inserted in tiers in the associated slot (105), and the magnet wire (101) is placed in the slot (105) so that the width (W1) thereof continuously or stepwise decreases from the bottom (107) to the distal opening (108) of the slot (105).

10 Claims, 77 Drawing Sheets

U.S. PATENT DOCUMENTS

| | | | |
|---|---|---|---|
| 3,860,744 | A | 1/1975 | Schuler |
| 6,515,394 | B2 * | 2/2003 | Ueda et al. .................... 310/208 |
| 7,337,525 | B2 | 3/2008 | Ueda et al. |
| 7,462,971 | B2 * | 12/2008 | Koide et al. .................... 310/201 |
| 2002/0057031 | A1 * | 5/2002 | Ueda et al. .................... 310/208 |
| 2002/0121829 | A1 * | 9/2002 | Konig ........................ 310/208 |
| 2004/0237300 | A1 | 12/2004 | Gerth |
| 2005/0076505 | A1 | 4/2005 | Marino, Jr. |
| 2005/0162032 | A1 | 7/2005 | El-Gabry et al. |
| 2006/0283004 | A1 | 12/2006 | Ooiwa |
| 2007/0033800 | A1 | 2/2007 | Bierbaum |
| 2007/0079494 | A1 | 4/2007 | Serrano |
| 2007/0209194 | A1 | 9/2007 | Bradfield |
| 2008/0007133 | A1 * | 1/2008 | Onimaru et al. ............... 310/208 |
| 2009/0195106 | A1 * | 8/2009 | Iki et al. ........................ 310/208 |

FOREIGN PATENT DOCUMENTS

| | | |
|---|---|---|
| JP | 2003-317547 | 11/2003 |
| JP | 2003-332134 A | 11/2003 |
| JP | 2003317547 A | 11/2003 |
| JP | 2004-80860 A | 3/2004 |
| JP | 2004-80861 A | 3/2004 |
| JP | 2004-122165 A | 4/2004 |
| JP | 2004-180396 A | 6/2004 |
| JP | 2005-64044 A | 3/2005 |
| JP | 2005-174561 A | 6/2005 |
| JP | 2006-14530 A | 1/2006 |
| JP | 2006-99995 A | 4/2006 |
| JP | 2006-100039 A | 4/2006 |

* cited by examiner

LINEAR MATERIAL AND STATOR STRUCTURE

CROSS REFERENCE TO RELATED APPLICATIONS

This application is a divisional of U.S. patent application Ser. No. 12/298,524 filed Oct. 24, 2008, now U.S. Pat. No. 7,928,626, which is a national phase of PCT/JP2007/058673 filed Apr. 20, 2007, which claims benefit of Japanese Application No. 2006-124581, filed Apr. 28, 2006, Japanese Application No. 2006-185790 filed Jul. 5, 2006; Japanese Application No. 2006-203743 filed Jul. 26, 2006, Japanese Application No. 2007-006755 filed Jan. 16, 2007; Japanese Application 2007-006756 filed Jan. 16, 2007; Japanese Application No. 2007-009754 filed Jan. 19, 2007; Japanese Application 2007-018974 filed Jan. 30, 2007; Japanese Application 2007-050002 filed Feb. 28, 2007; all of which are incorporated herein by reference.

TECHNICAL FIELD

This invention relates to linear materials and stator structures in which magnet wires (linear materials) are fitted on a stator core.

BACKGROUND ART

In motors, a short cylindrical stator core made of a magnetic material has a large number of concave slots and a large number of convex magnetic poles (circumferentially) alternately arranged at the inner periphery and magnet wires are wound around the magnetic poles and concurrently inserted in tiers in the slots, whereby a stator for generating a magnetic field is formed.

To efficiently obtain large rotational torque, the motors must have a high space factor of magnet wire (volume ratio of magnet wire) in each slot (space). Magnet wires are conventionally known that have a rectangular cross section in order to reduce the clearance between turns of the magnet wire placed in each slot (see, for example, Patent Document 1).
Patent Document 1: Published Japanese Patent Application No. 2005-174561

DISCLOSURE OF THE INVENTION

Problem to Be Solved by the Invention

However, as for example in a stator core 104 shown in FIG. 25, when each slot 105 is tapered so that the distance $W_2$ between both the side surfaces 109, 109 of the slot 105 gradually decreases with approach from the bottom 107 to the distal opening 108 of the slot 105, a magnet wire 141 having a constant width $W_1$ over the length thereof produces large gaps S from both the side surfaces 109, 109 particularly in the vicinity of the bottom 107 of the slot 105. Therefore, the magnet wire 141 cannot be placed in the slot 105 so that it can attain a high space factor.

In view of the above, an object of the present invention is to provide a linear material suitable as a magnet wire attaining a high space factor in each slot of a stator core. Furthermore, another object of the present invention is to provide a stator structure in which such linear materials are applied as magnet wires and fitted on a stator core.

Means to Solve the Problem

To attain the above objects, a linear material according to the present invention is a linear material of rectangular cross section in which an insulating coating is formed on the outer surface of a metal wire, the linear material changing the width continuously or stepwise over the length thereof.

The linear material may be formed so that the transverse cross-sectional area of the metal wire is constant over the length thereof.

A stator structure according to the present invention includes: a stator core having a large number of concave slots and a large number of convex magnetic poles circumferentially alternately arranged; and magnet wires of rectangular cross section in each of which an insulating coating is formed on the outer surface of a metal wire, wherein each of the slots is formed so that the distance between both the side surfaces of the slot gradually decreases from the bottom to a distal opening of the slot, each of the magnet wires is wound around the associated magnetic pole and inserted in tiers in the associated slot, and the magnet wire is placed in the slot so that the width thereof continuously or stepwise decreases from the bottom to the distal opening of the slot.

The magnet wire may be formed so that the transverse cross-sectional area of the metal wire is constant over the length of the metal wire.

Effects of the Invention

The present invention exhibits the following significant effects.

According to a linear material (magnet wire) and a stator structure according to the present invention, the width of the magnet wire to be inserted in tiers in each slot (concave groove) of a stator core of a motor can be configured according to the width of the slot. Thus, the magnet wire can be placed in the slot with little gap left in the slot, thereby significantly increasing the space factor of the magnet wire in the slot. This enables the production of a motor that can efficiently obtain large rotational torque. In other words, a motor with a small size can attain equivalent torque to that of conventional motors. This provides a motor reduced in size and weight and in turn attains energy saving.

BRIEF DESCRIPTION OF DRAWINGS

FIGS. 19(I) and 19(II) are perspective views illustrating method how an intermediate wire material M is rolled into a final metal wire product.

FIGS. 40(I) and 40(II) are perspective views illustrating how an intermediate wire material M is rolled into a final metal wire product.

Figure 1:
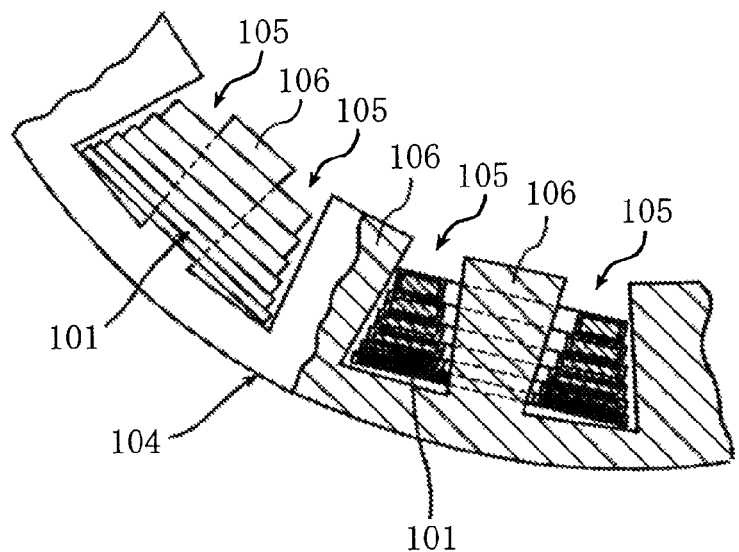
FIG. 1 is a partially cross-sectional front view showing an embodiment of a stator structure according to the present invention.

LIST OF REFERENCE CHARACTERS 101 linear material (magnet wire)
102 metal wire (conducting wire)
103 insulating coating
104 stator core
105 slot
106 magnetic pole
107 bottom
108 distal opening
109 side surface
201 first rolling roll
202 second rolling roll
226 portion of large cross-sectional area
227 portion of small cross-sectional area
230 portion of large final thickness
231 portion of small final thickness
250 transition part
261 first step
262 second step
401 upstream roll
401 final roll
403 thickness measuring instrument
404 width measuring instrument
405 first roll control means
406 second roll control means
407 cooler
419 heater
501 conductor
502 outer surface
503 electric insulated wire
504 chamfered part (roll-off part)
505 insulating layer
507 conductor exposed part
508 electrodeposition bath
511 one side
515 electrodeposition layer
522 movable masking member
542 sliding masking member
601 conductor
602 outer surface
603 electric insulated wire
605 insulating layer
607 conductor exposed part
608 electrodeposition bath
612 electrodeposition liquid
615 electrodeposition layer
616 baking oven
617 conductor exposed part forming device
622 movable masking member
642 sliding masking member
670 removed part
672 electrodeposition layer non-formed part
A first rolling roll
B second rolling roll
C flat-type wire (product)
D metal wire (conducting wire, parent material)
G passing direction
H injected fluid
$L_1$ length
M intermediate wire material
$R_1$ roll diameter
$R_2$ roll diameter
$S_0$ optimum cross-sectional area
$S_2$ second thickness measuring instrument (intermediate wire material thickness measuring instrument)
$S_3$, width measuring instrument $S_4$, $S_5$ traveling speed measuring instrument
T thickness (final thickness)
$T_0$ target thickness
$T_1$ final thickness
$T_2$, $T_{20}$ final thickness
Va, Vb distance change speed (traveling speed)
Vc, Vm traveling speed (feeding speed)
W0 target width
$W_1$ width (final width)
$W_2$ distance
$X_1$, $X_2$ roll distance
Z, $Z_1$, $Z_{10}$ cross-sectional area

BEST MODE FOR CARRYING OUT THE INVENTION

The present invention will be described below in detail with reference to the drawings showing embodiments.

Figure 3:
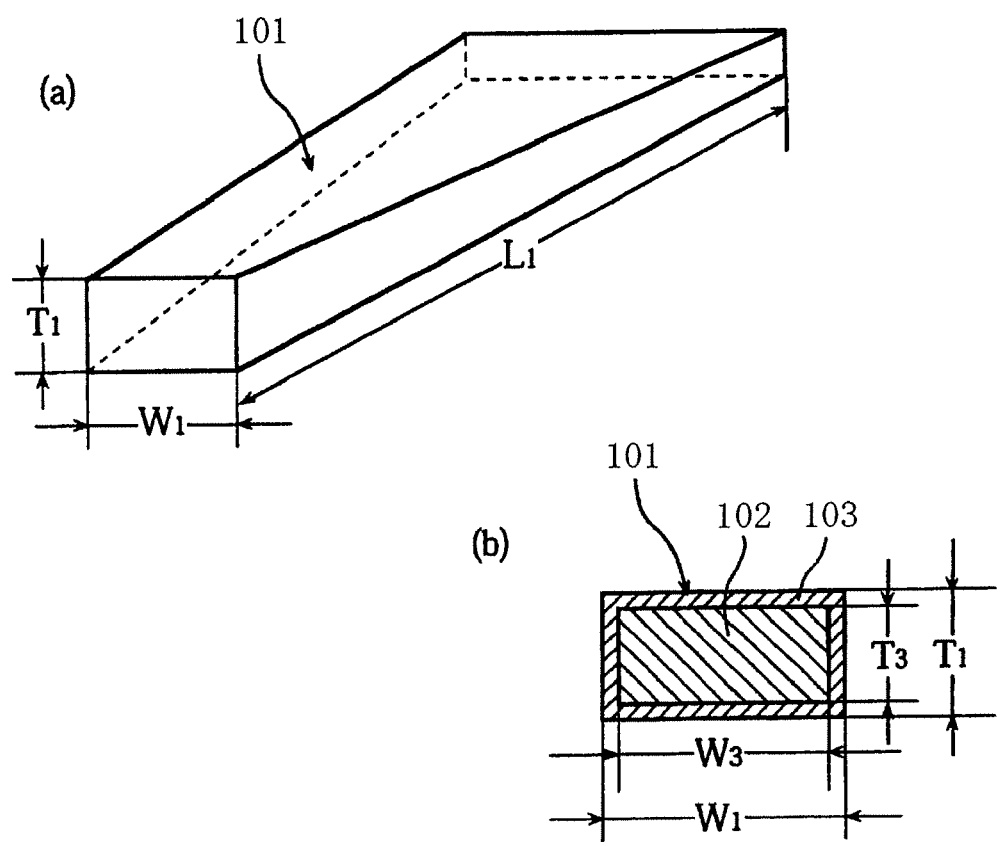
FIG. 3 is an explanatory view showing a first embodiment of a magnet wire according to the present invention, wherein 3(a) is a perspective explanatory view and 3(b) is a transverse cross-sectional explanatory view.
Figure 4:
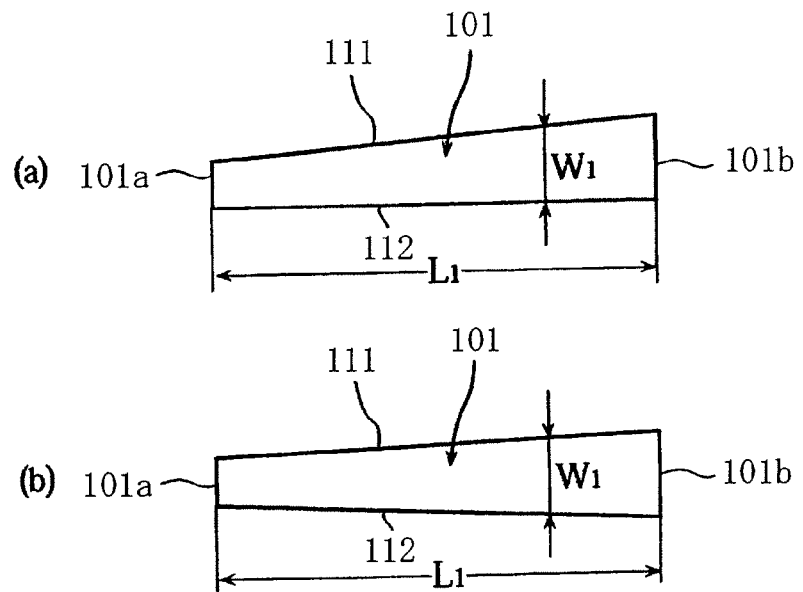
FIG. 4 is plan views of the magnet wire of the present invention, wherein 4(a) is a plan view showing a first embodiment and 4(b) is a plan view showing a second embodiment.

FIG. 3(a) is a perspective explanatory view showing a first embodiment of a linear material according to the present invention, FIG. 3(b) is a transverse cross-sectional explanatory view showing it, FIG. 4(a) is a plan view showing the first embodiment of the present invention and FIG. 4(b) is a plan view showing a second embodiment of the present invention. A linear material 101 according to the present invention is suitable as a magnet wire and, therefore, is hereinafter referred to also as a magnet wire 101 with the same reference numeral.

As shown in FIG. 3(b), the linear material 101 (magnet wire 101) includes a highly conductive metal wire (conducting wire) 102 made such as of copper and an insulating coating 103 formed by coating the outer surface of the metal wire 102 with an insulating material, such as an insulating resin. The insulating coating 103 is formed with a uniform thickness on the outer surface of the metal wire 102 having a rectangular (oblong or square) cross section, thereby forming a magnet wire 101 of rectangular (oblong or square) cross section.

The width $W_1$ of the magnet wire 101 is configured to continuously increase over the length of the magnet wire 101 (from the left towards the right in the figure). Specifically, as shown in FIG. 4(a), the width $W_1$ between a first long side 111 and a second long side 112 both located to extend in the longitudinal direction of the magnet wire 101 continuously (gradually) increases from one short side 101a towards the other short side 101b of the magnet wire 101. In the case of FIG. 4(a), the second long side 112 is located at right angles with both the short sides 101a and 101b and the first long side 111 is located at an angle with the second long side 112 to form a one-side gradient. Alternatively, as shown in FIG. 4(b), both the first long side 111 and the second long side 112 may be located to have gradients.

The width $W_3$ (see FIG. 3(b)) of the metal wire 102 is also configured, like the magnet wire 101, to continuously increase over the length thereof.

In FIGS. 3(a), 4(a) and 4(b), $L_1$ denotes the length (per pitch) of the magnet wire 101.

Furthermore, the metal wire 102 is configured so that its transverse cross-sectional area is constant over the length thereof. In other words, the metal wire 102 is configured so that as its width $W_3$ increases over the length, its thickness $T_3$ contrariwise decreases.

Furthermore, as shown in FIG. 3(a), the magnet wire 101 is also configured so that as its width $W_1$ increases over the length, its thickness $T_1$ contrariwise decreases.

Figure 2:
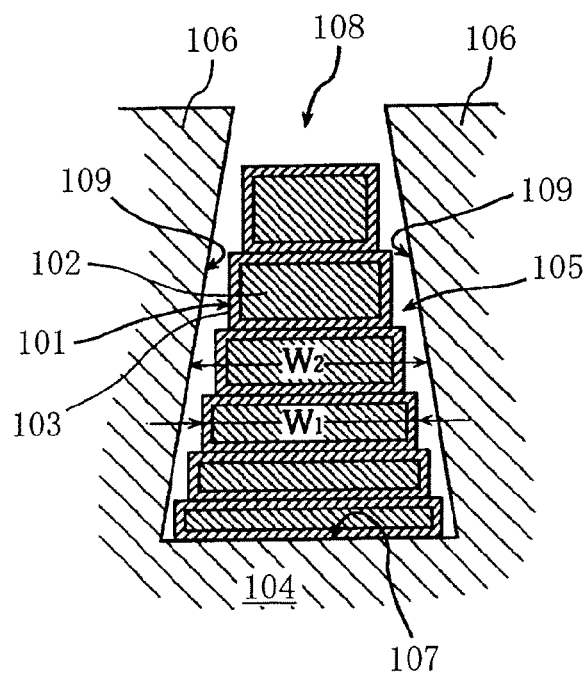
FIG. 2 is an enlarged cross-sectional view of an essential part of the above embodiment.

FIG. 1 is a partially cross-sectional front view of a stator structure in which the magnet wires according to the present invention are fitted on a stator core, and FIG. 2 is an enlarged cross-sectional view of an essential part of the stator structure.

In FIG. 1, 104 denotes a short cylindrical stator core made of a magnetic material. The stator core 104 has a large number of concave slots 105 and a large number of convex magnetic poles 106 circumferentially alternately arranged at the inner periphery. The above-stated magnet wires 101 of the present invention are wound around the associated magnetic poles 106 of the stator core 104 and concurrently inserted in tiers in the slots 105.

Referring to FIG. 2, each slot 105 is configured (in a tapered form) so that its distance $W_2$ between both the side surfaces 109 and 109 thereof decreases from its bottom 107 towards its distal opening 108 and one magnet wire 101 is placed in the slot 105 so that its width $W_1$ continuously decreases from the bottom 107 towards the distal opening 108 of the slot 105. Thus, as shown in FIG. 2, the magnet wire 101 placed (inserted) in the slot 105 is piled in tiers so that its width $W_1$ decreases tier by tier from the bottom 107 towards the distal opening 108 (along both the side surfaces 109 and 109).

FIGS. 6(a) to 6(e) are plan views showing third to seventh embodiments of the magnet wire 101 according to the present invention.

In FIG. 6(a), the magnet wire 101 is configured so that its width $W_1$ stepwise increases over the length thereof (from the left towards the right in the figure). Specifically, a first long side 111 and a second long side 112 of the magnet wire 101 both extending in the longitudinal direction are formed to expand stepwise (away from each other) from the left towards the right and located axisymmetrical to each other with respect to an (unshown) longitudinal center line as an axis of symmetry.

Figure 5:
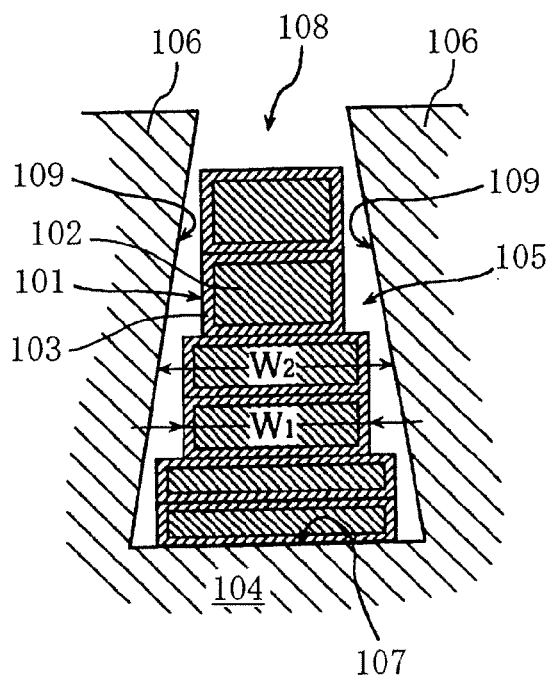
FIG. 5 is an enlarged cross-sectional view showing an essential part of another embodiment of the stator structure according to the present invention.

For example, when the magnet wire 101 shown in FIG. 6(a) (or that further extended in the longitudinal direction) is fitted on the stator core 104 shown in FIG. 1, it comes into a state as shown in FIG. 5. Since the magnet wire 101 inserted in tiers in the slot 105 is placed to decrease its width $W_1$ stepwise from the bottom 107 towards the distal opening 108 of the slot 105, it is tiered, as shown in the enlarged cross-sectional view of an essential part in FIG. 5, so that the width $W_1$ decreases in every two tiers from the bottom 107 towards the distal opening 108.

A magnet wire 101 shown in FIG. 6(b) is configured so that its width $W_1$ continuously decreases along its length and then continuously increases from halfway along its length (from the midpoint). Specifically, the magnet wire 101 includes a first long side 111 bent at the midpoint and a straight second long side 112. The first long side 111 is configured to gradually come close to the second long side 112 from one end towards the midpoint and come away from the second long side 112 from the midpoint towards the other end. In other words, the above magnet wire has a configuration in which two magnet wires 101 shown in FIG. 4(a) are joined axisymmetrically with respect to their one short sides 101a as the axis of symmetry.

Shown in FIG. 6(c) is a magnet wire 101 configured so that its width $W_1$ stepwise decreases along its length and then stepwise increases from halfway along its length (from the midpoint). Its first long side 111 and its second long side 112 are configured to stepwise come close to each other from their one ends towards the midpoint and then stepwise come away from each other from the midpoint towards their other ends. In other words, the above magnet wire has a configuration in which two magnet wires 101 shown in FIG. 6(a) are joined axisymmetrically.

FIG. 6(d) shows a magnet wire 101 whose width $W_1$ abruptly increases at two points halfway along the length. In this case, its first long side 111 and its second long side 112 abruptly come away from and close to each other at two points halfway along the length of the magnet wire 101, whereby the magnet wire 101 forms two widened parts.

FIG. 6(e) also shows a magnet wire 101 whose width $W_1$ abruptly increases at two points halfway along the length. In this case, its first long side 111 abruptly comes away from and close to its straight second long side 112 at two points halfway along the length, whereby the magnet wire 101 forms two widened parts.

Although in FIGS. 4(a), 4(b) and 6(b) each of the first long side 111 and the second long side 112 is formed of a linear line or a kinked line obtained by bending a linear line at one point, the first long side 111 and/or the second long side 112 may be formed of convex curves 132 as shown in the dash-double-dot lines in FIGS. 24(a) and 24(b) or may be formed of concave curves 133 as shown in the dash-single dot lines in FIGS. 24(a) and 24(b). In these manners, the magnet wire 101 continuously changes its width $W_1$ over the length in the form of linear lines, curves or a combination of a linear line and a curve.

In FIGS. 6(a) and 6(c) to 6(e) in which the width $W_1$ of the magnet wire 101 stepwise changes over the length, the magnet wire 101 has corners formed at right angles. However, the "stepwise change" of the width in these cases is defined as including the formation of corners not at right angles but in smooth arcuate form.

Furthermore, the configuration of the stator core 104 is not limited to that in the above embodiment (shown in FIGS. 1 and 2). For example, slots 105 may be formed in the outer periphery of the stator core 104, the stator core 104 may be configured to stepwise change the distance $W_2$ between both the side surfaces 109 and 109 of the slot 105, may be configured to gradually increase the distance $W_2$ from the bottom 107 towards the distal opening 108 or may have other configurations.

Figure 6:
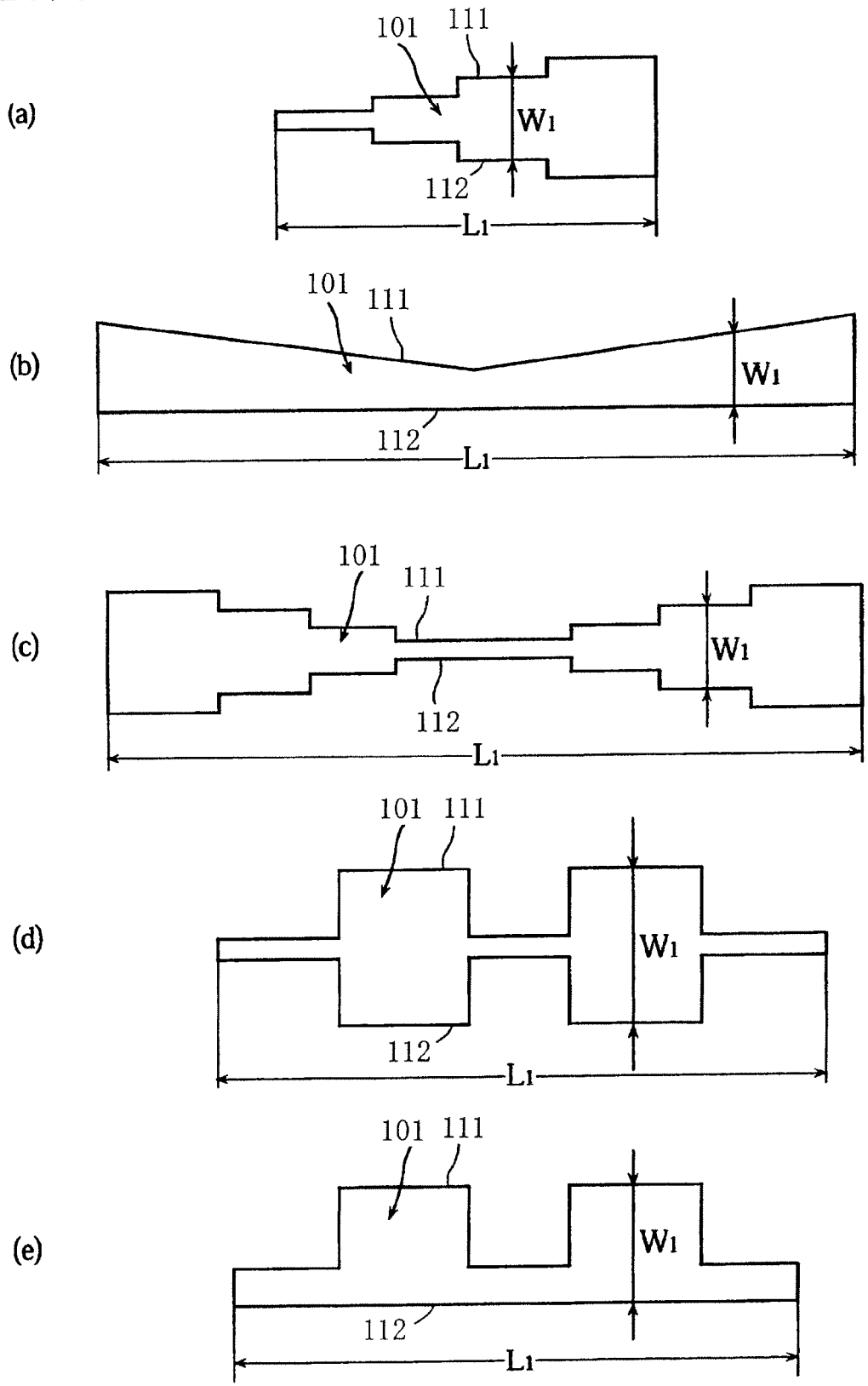
FIG. 6 is plan views of the magnet wire of the present invention, wherein 6(a) is a plan view showing a third embodiment, 6(b) is a plan view showing a fourth embodiment, 6(c) is a plan view showing a fifth embodiment, 6(d) is a plan view showing a sixth embodiment and 6(e) is a plan view showing a seventh embodiment.
Figure 7:
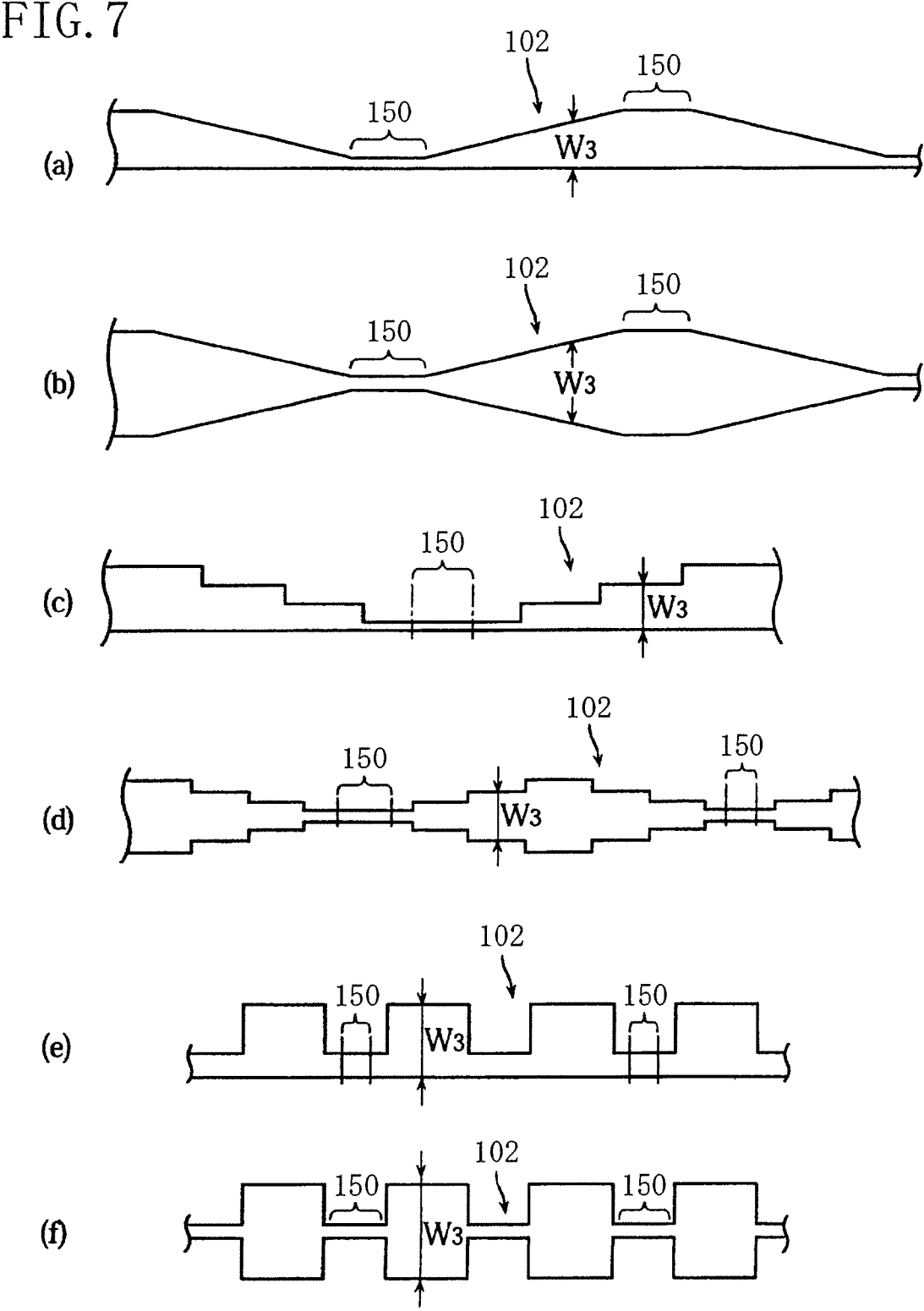
FIGS. 7(a)-7(f) is are plan views showing other embodiments of the invention, illustrating how the changes in the width of the wire material may be either gradual or step-wise.
Figure 24:
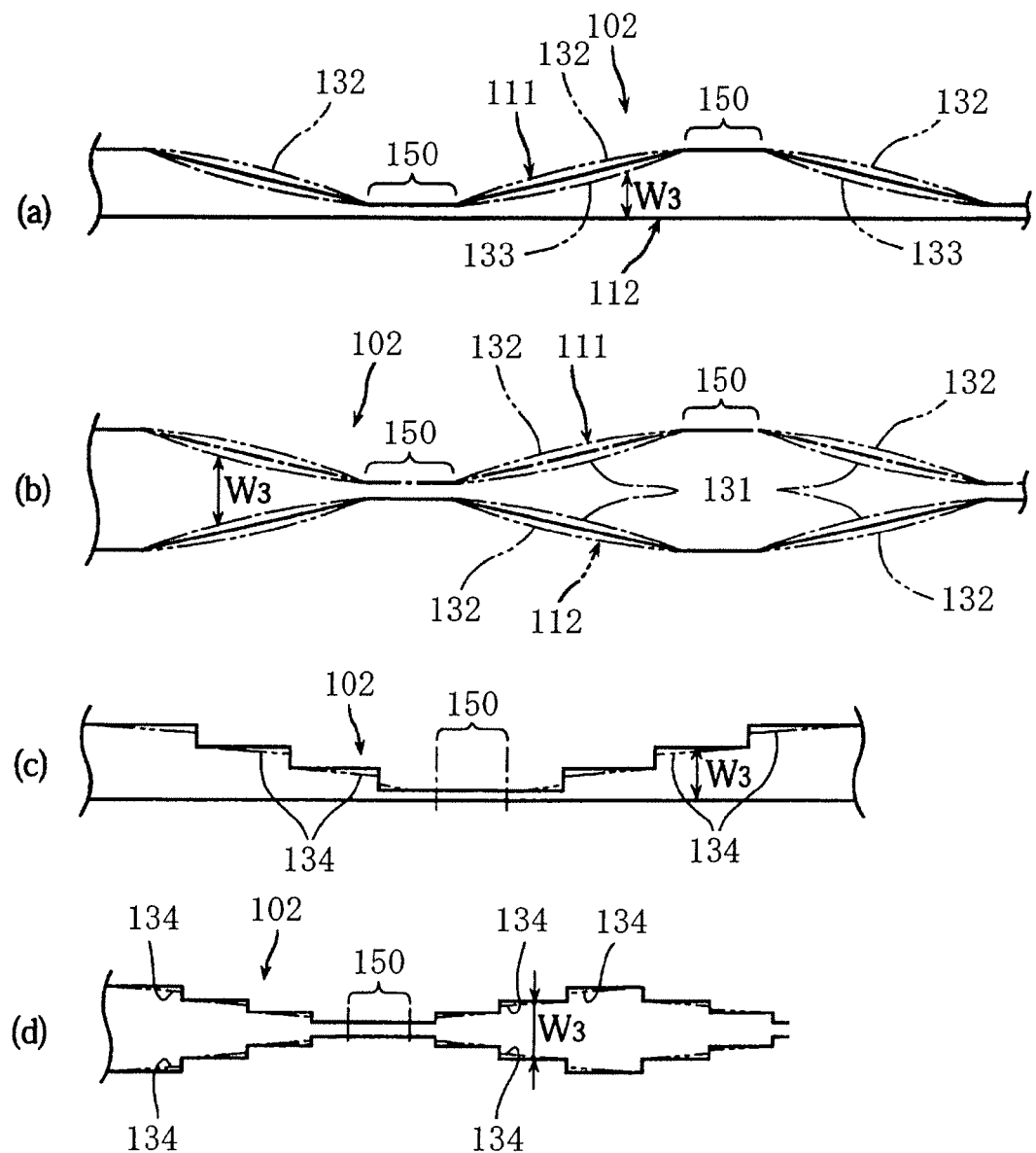
FIGS. 24(a)-24(d) are plan explanatory views showing other modifications of the invention, illustrating how the changes in the width of the wire material may be either gradual, concave or convex curves or step-wise transitions or a combination of both.
Figure 25:
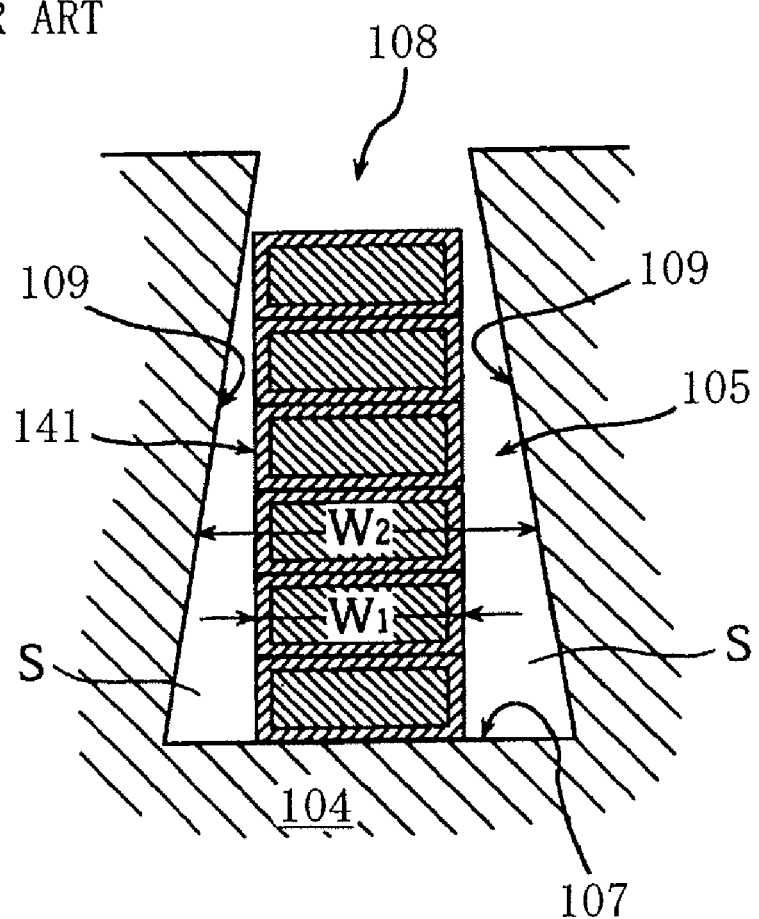
FIG. 25 is an enlarged cross-sectional view showing a conventional magnet wire and an essential part of a stator structure in which the magnet wire is fitted.

The magnet wire 101 according to the present invention can change the width $W_1$ continuously or stepwise according to the configuration of the stator core 104 (slot 105) or the way to wind it on the stator core 104 (not shown). In addition to the configurations shown in FIGS. 4(a), 4(b) and 6(a) to 6(e), for example, it is also preferable to change the width $W_1$ in convex curves 132 or concave curves 133 as shown in FIGS. 24 (a) and 24(b) or combine stepwise changes and continuous (gradual) changes as shown in dash-double-dot-lines 134 in FIGS. 24(c) and 24(d). In FIGS. 7 and 24, reference numeral 150 denotes a "transition part". The "transition part" 150 is a part not used in a (final) product but necessary for the manufacture of the magnet wire 101. The transition part 150 is used, for example, as a holding region in winding a long linear material (magnet wire) 101 or as an extra region for length adjustment. For more detail, when a long linear material 101 several times longer than each cut magnet wire of a given length $L_1$ is manufactured (according to the below-described manufacturing method) and is then cut into given lengths $L_1$, the linear material 101 can be cut at the transition parts 150 to adjust the length of the magnet wires at the transition parts 150 or use the transition parts 150 as holding regions of tools (jigs).

In order to further increase the space factor of the magnet wire 101 in the slot 105, the transverse cross section of the magnet wire 101 (metal wire 102) may be formed in a trapezium. Specifically, if in FIG. 2 the side surfaces of the magnet wire 101 opposed to the side surfaces 109, 109 of the slot 105 are arranged inclined at the same angles as those of the side surfaces 109, 109 of the slot 105, the magnet wire 101 can be inserted in the slot 105 with a high density (at a high space factor).

The magnet wires 101 shown in FIGS. 6(a) to 6(e) have the same configuration as the magnet wires 101 shown in FIGS. 4(a) and 4(b) except for the above-stated differences and, therefore, a further description thereof is not given.

The insulating coating 103 may be formed to change its thickness over the length of the magnet wire 101, for example, according to the configuration of the magnet wire 101 or the way to wind the magnet wire 101 on the stator core 104.

Next, a description is given of a method (steps) for manufacturing a magnet wire according to the present invention.

Figure 8:
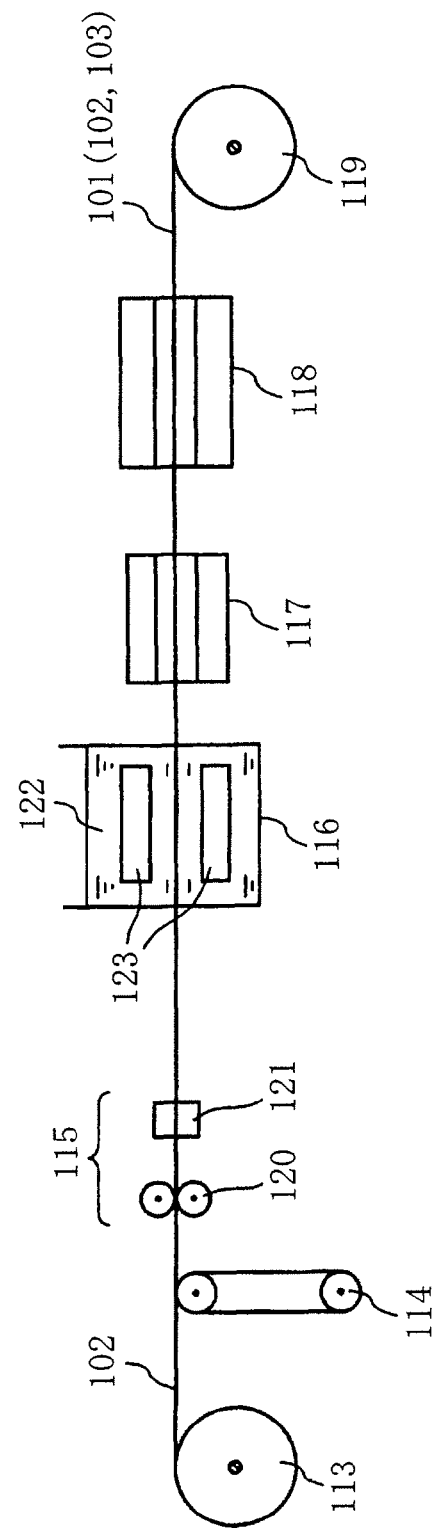
FIG. 8 is a general schematic diagram showing a manufacturing process of the magnet wire of the present invention.

FIG. 8 is a general schematic diagram showing steps for manufacturing a magnet wire according to the present invention, wherein 113 denotes a feed drum, 114 denotes a tension controller, 115 denotes a rolling machine, 116 denotes an electrodeposition bath, 117 denotes a dryer, 118 denotes a baking oven and 119 denotes a take-up drum.

Figure 9:
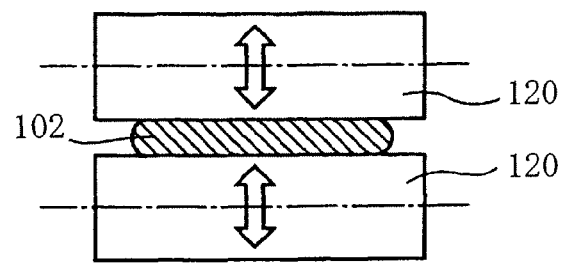
FIG. 9 is a front view showing vertical pressure rolls.
Figure 10:
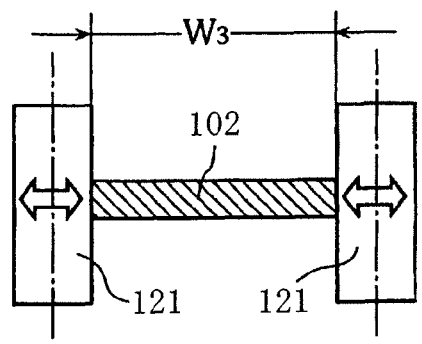
FIG. 10 is a front view showing lateral pressure rolls.

A metal wire 102 of circular cross section is fed out of the feed drum 113 around which the metal wire 102 is wound, and is then fed to the rolling machine 115. The rolling machine 115 is a machine for forming the metal wire 102 of circular cross section fed from the feed drum 113 into a rectangular cross section while adjusting it to a desired width $W_3$ and a desired thickness $T_3$. The rolling machine 115 includes a pair of rotatable vertical pressure rolls 120, 120 (see FIG. 9). The vertical pressure rolls 120, 120 are provided with a mechanism for (periodically) changing the roll distance between them. Alternatively, the rolling machine 115 may be composed of a pair of lateral pressure rolls 121, 121 (see FIG. 10). Alternatively, the rolling machine 115 may include a pair of vertical pressure rolls 120, 120 and a pair of lateral pressure rolls 121, 121 with the two pairs arranged in series.

The metal wire 102 is first pressed from above and below by the vertical pressure rolls 120, 120 to form flat top and bottom surfaces and is adjusted to the desired width $W_3$ and thickness $T_3$ (see FIG. 3(b)). The roll distance between the vertical pressure rolls 120, 120 is (periodically) changed by an unshown controller, whereby the metal wire 102 continuously passing through between them is formed so that its width $W_3$ and thickness $T_3$ continuously or stepwise change over the length. To keep the cross-sectional area of the metal wire 102 uniform over the length, the tension applied to the metal wire 102 is controlled according to the roll distance between the pressure rolls 120, 120 by the tension controller 114 to change the amount of elongation (the cross-sectional area) of the metal wire 102.

The metal wire 102 processed by the rolling machine 115 is fed to the electrodeposition bath 116. The electrodeposition bath 116 contains an electrodeposition liquid (varnish) made of an insulating material, such as an insulating resin, and cathode tubes 123. When the metal wire 102 is passed in the electrodeposition liquid 112 while being connected to the anode of an alternator, the insulating material is uniformly deposited (electrodeposited) on the outer surface of the metal wire 102.

Figure 11:
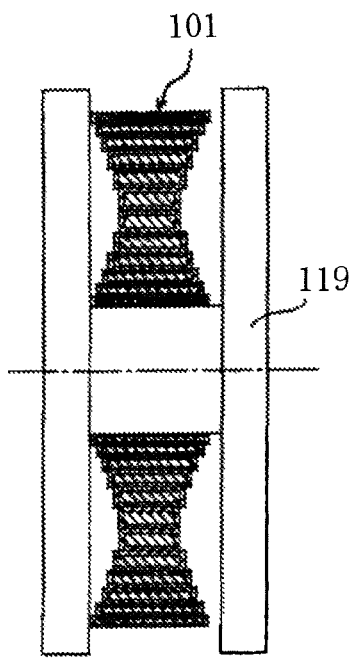
FIG. 11 is a front view showing a state that the magnet wire of the present invention is taken up on a take-up drum.

Then, the metal wire 102 on which the insulating material is deposited is passed through the dryer 117 and then baked in the baking oven 118 to form an insulating coating 103 on the outer surface of the metal wire 102, thereby forming a magnet wire 101. As shown in FIG. 11, the magnet wire 101 is taken up by the take-up drum 119 so that it is wound (in the form of a Baumkuchen) around the take-up drum 119 with the vertical center line of its transverse cross section generally matching over all the turns. The reason for this is that since the magnet wire 101 according to the present invention changes its width $W_1$ over the length, it may cause an irregular winding if it is taken up transversely. However, if the amount of change in the width $W_1$ of the magnet wire 101 is small, the magnet wire 101 may be wound transversely.

Figure 12:
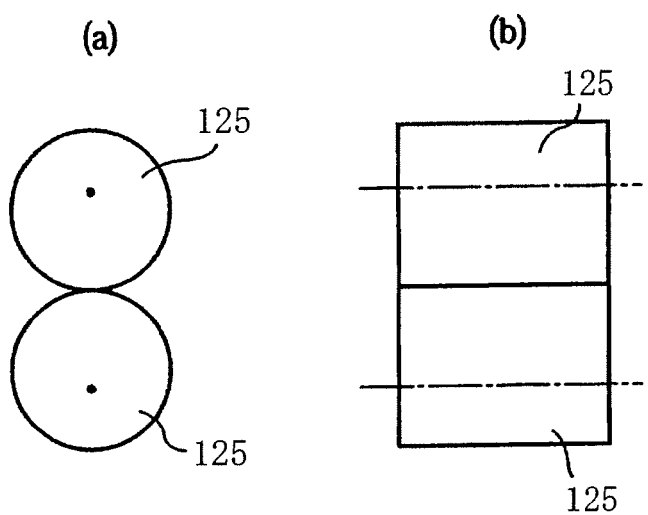
FIG. 12 is explanatory views showing eccentric rolls, wherein 12(a) is a side explanatory view and 12(b) is a front explanatory view.

Eccentric rolls 125 as shown in FIG. 12 may be used as the rolling device 115. Each of the pair of eccentric rolls 125, 125 is formed to have a peripheral length equal to the length (per pitch) $L_1$ of a magnet wire 101 to be manufactured. The pair of eccentric rolls 125, 125 periodically change the roll distance while rotating, whereby the metal wire 102 passing through between the eccentric rolls 125, 125 is formed to continuously change its width $W_3$ and thickness $T_3$.

Figure 13:
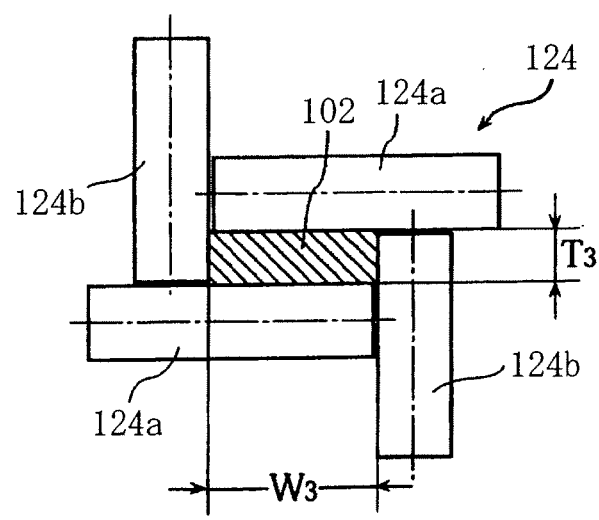
FIG. 13 is a front view showing a fylfot-arranged roll assembly.
Figure 14:
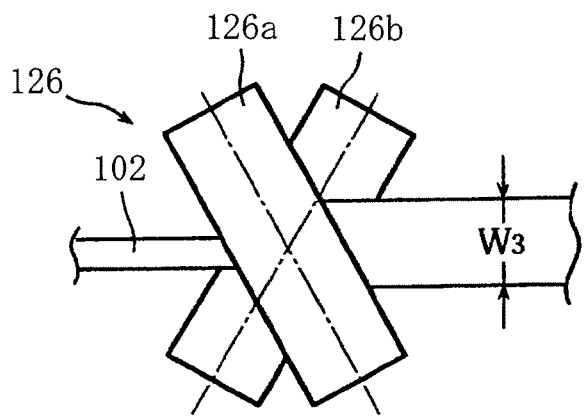
FIG. 14 is a plan view showing a cross-arranged rolling roll assembly.
Figure 15:
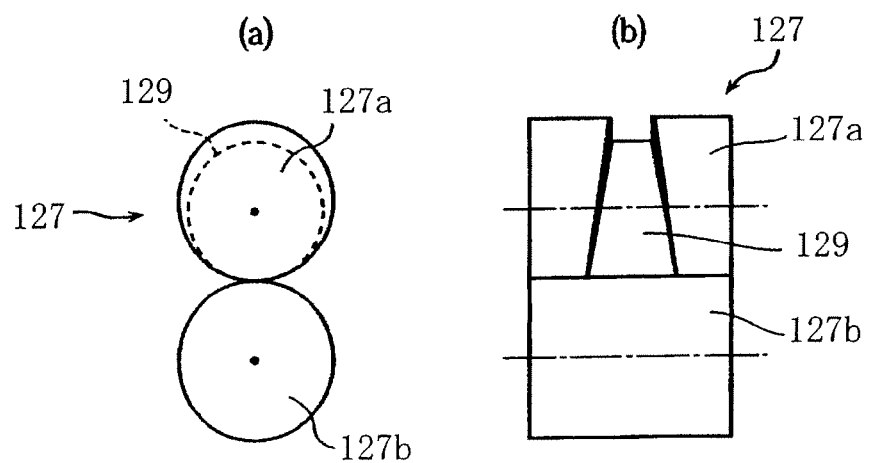
FIG. 15 is explanatory views showing a grooved rolling roll assembly, wherein 15(a) is a side explanatory view and 15(b) is a front explanatory view.
Figure 16:
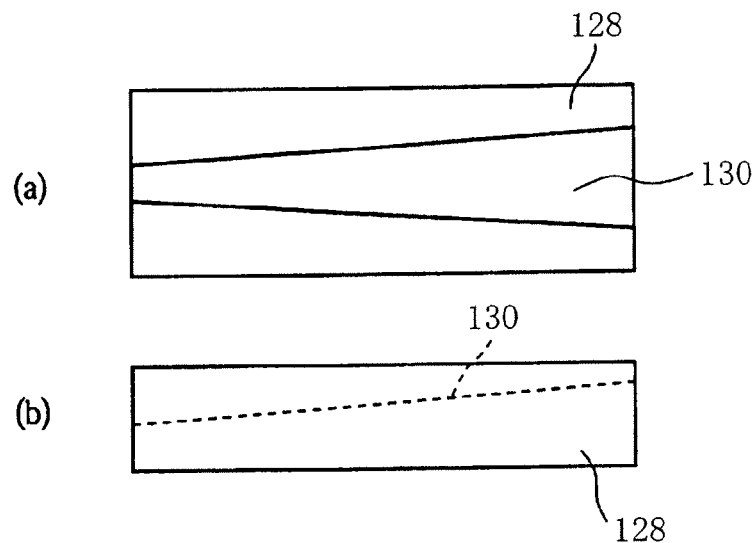
FIG. 16 is explanatory views showing a die, wherein 16(a) is a plan explanatory view and 16(b) is a side explanatory view.

A fylfot-arranged roll assembly 124 for concurrently pressing the metal wire horizontally and vertically as shown in FIG. 13, a cross-arranged rolling roll assembly 126 as shown in FIG. 14, a grooved rolling roll assembly 127 as shown in FIG. 15 or a die 128 as shown in FIG. 16 may be used as the rolling device 115 that can form the metal wire to have a uniform cross-sectional area over the length.

Referring to FIG. 13, the fylfot-arranged roll assembly 124 is configured to pass the metal wire 102 (of circular cross section) through a rectangular space surrounded by upper and lower rolls 124a and 124a and lateral rolls 124b and 124b to process (deform) it. The fylfot-arranged roll assembly 124 changes the vertical dimension and horizontal dimension of the rectangular space, thereby changing the width $W_3$ and thickness $T_3$ of the metal wire 102 continuously or stepwise over the length.

Referring to FIG. 14 in which the cross-arranged rolling roll assembly 126 is shown in plan view, the cross-arranged rolling roll assembly 126 includes upper and lower pressure rolls 126a and 126b arranged crosswise at an angle with each other (between their axes). The cross-arranged rolling roll assembly 126 is suitable in the case where a magnet wire 101 having a large width $W_3$ is manufactured. The roll distance between the upper and lower pressure rolls 126a and 126b is (periodically) changed by a controller, whereby the metal wire 102 continuously passing through between them changes its width $W_3$ and thickness $T_3$ continuously or stepwise over its length.

Referring to FIG. 15, the grooved rolling roll assembly 127 includes upper and lower pressure rolls 127a and 127b and one pressure roll 127a of them has a groove 129 formed to change the width and depth over the circumference of the pressure roll. The other pressure roll 127b has no groove 129 formed therein. Furthermore, each of the upper and lower pressure rolls 127a and 127b is formed to have a peripheral length equal to or twice larger than the length (per pitch) $L_1$ of a magnet wire 101 to be manufactured: The metal wire 102 (of circular cross section) is processed (deformed) by passing through a rectangular space surrounded by the groove 129 of the (upper) pressure roll 127a and the outer periphery of the (lower) pressure roll 127b, thereby changing the width $W_3$ and thickness $T_3$ of the metal wire 102 continuously or stepwise over the length.

The die 128 shown in FIG. 16 has a groove 130 changing its width and depth over the length. The metal wire 102 is put on the groove 130 and then pressed from above by a pressing machine. In this case, magnet wires can be manufactured in batch production.

An insulation protection film may be formed to cover the insulating coating 103. The method of forming the insulation protection film is implemented, for example, by immersing a metal wire 102, on which an insulating material, such as an insulating resin, has been deposited, in a bath of an insulating paint to deposit the insulating paint thereon, thinning the deposited insulating paint by means of a felt and then baking the metal wire 102. Alternatively, after the electrodeposition, the metal wire is baked, the insulating paint is deposited on the metal wire and the insulating paint is then baked again. Since the metal wire 102 is processed to change its width $W_1$ over the length, the felt is preferably given resiliency by a spring so that the felt can follow the shape of the metal wire 102.

A magnet wire 101 marked at predetermined pitches can be manufactured. Specifically, before an insulating material is electrodeposited on the metal wire 102, an insulating material (different in color from the insulating material for electrodeposition) may be put on the metal wire 102 at predetermined pitches or dents may be given to the metal wire 102 at predetermined pitches. Thus, the insulating material is not electrodeposited on the points having such marks even after being subjected to the electrodeposition step and, therefore, the predetermined pitch can be seen at a glance.

Figure 18:
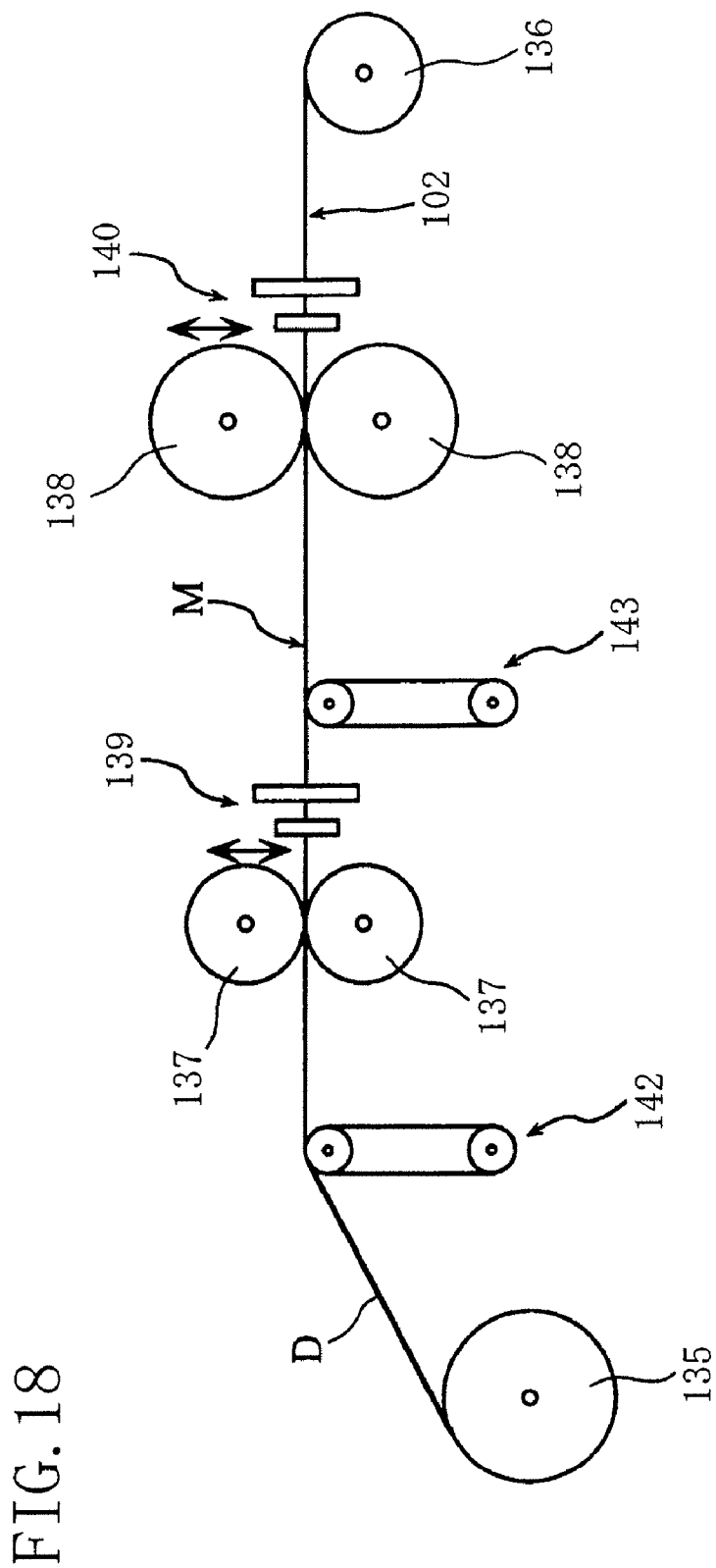
FIG. 18 is a general explanatory view showing still another embodiment of a metal wire manufacturing method.
Figure 19:
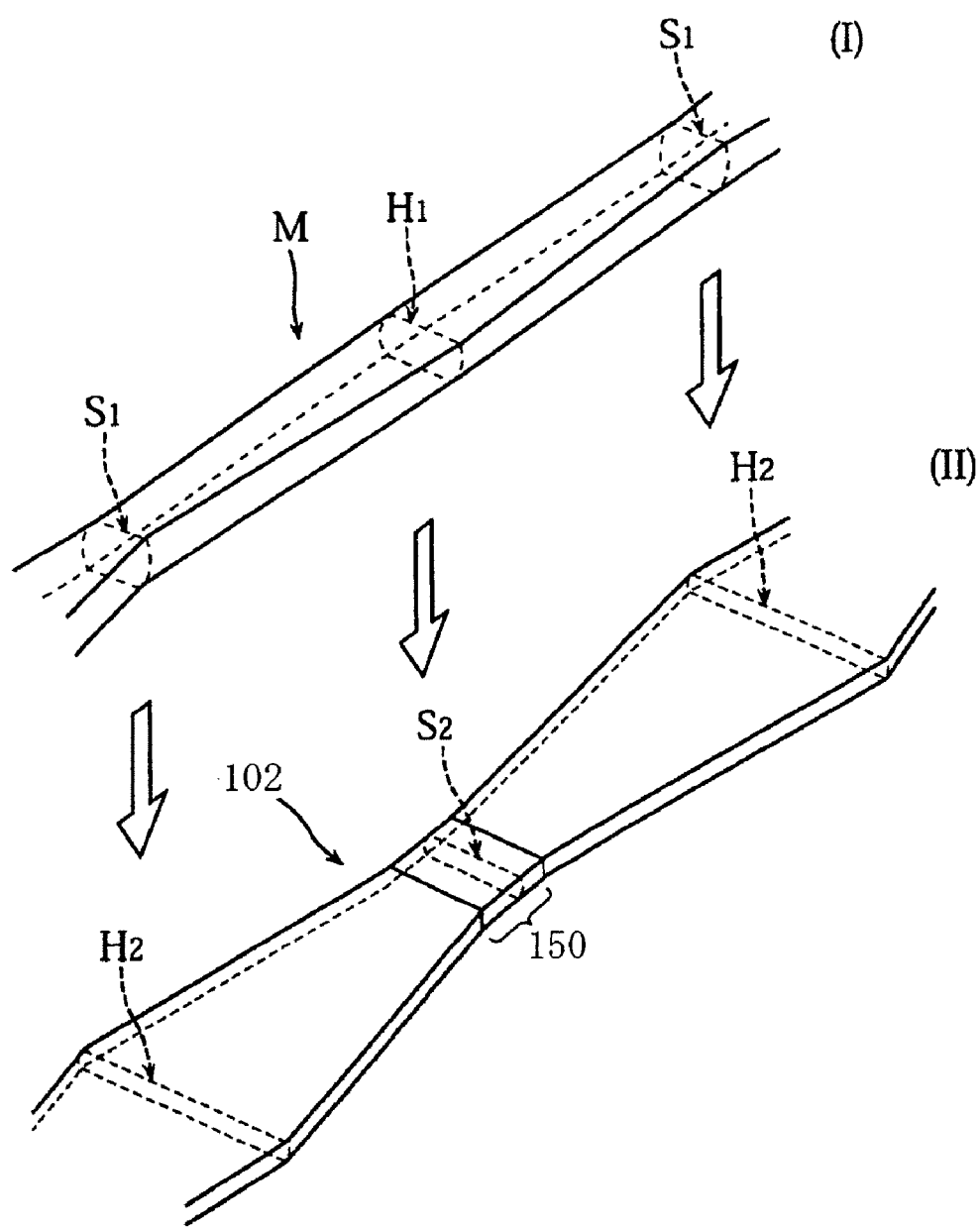
Figure 20:
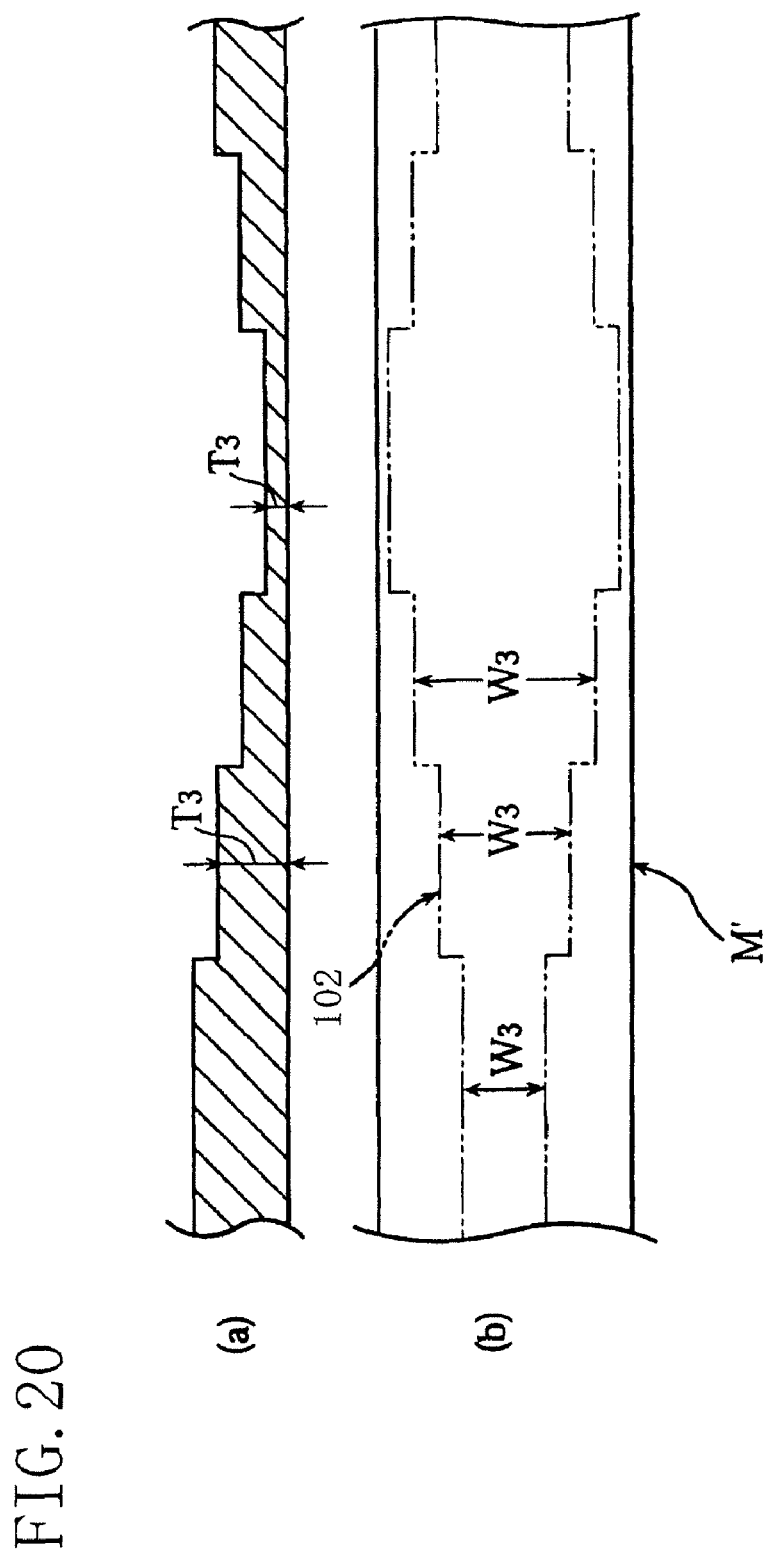
FIG. 20 is explanatory views of another manufacturing method, wherein 20(a) is a cross-sectional side explanatory view and 20(b) is a plan explanatory view.
Figure 21:
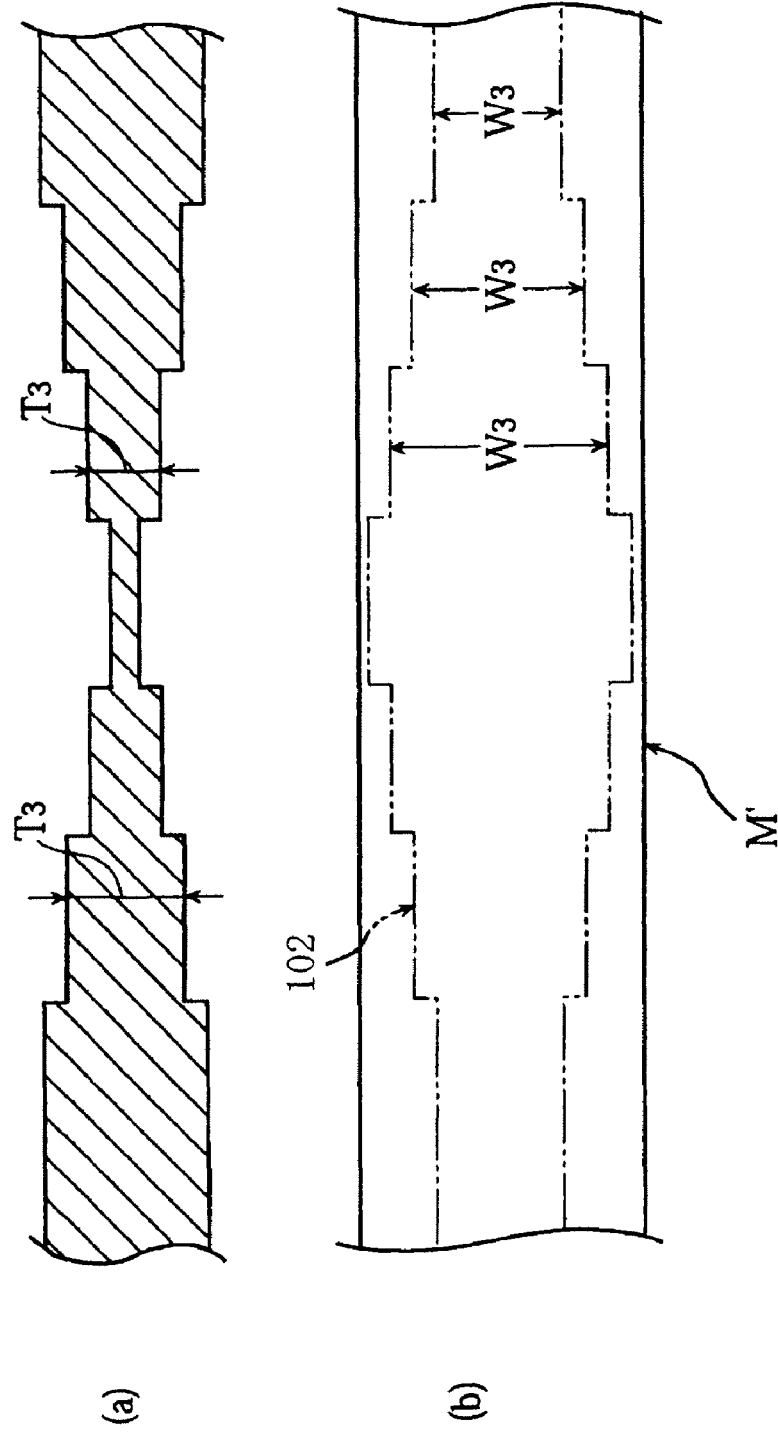
FIG. 21 is explanatory views of another manufacturing method, wherein 21(a) is a cross-sectional side explanatory view and 21(b) is a plan explanatory view.

Next, FIGS. 18 and 19 show another embodiment of the manufacturing method different from the embodiment thereof described with reference to FIGS. 9, 10 and 12 to 16. Referring to FIG. 18, a metal material D of circular cross section (or rectangular or another cross section) is fed out of a feed drum 135 and, finally, a sufficiently long metal wire 102 as shown in FIGS. 7(a) to 7(f) or FIG. 24 is taken up on a take-up drum 136 at the right end in FIG. 18. The metal material D (metal wire 102) is fed from the left side of FIG. 18 to the right side thereof in this manner. On the way to the take-up drum 136, first rolling rolls 137, 137 and second rolling rolls 138, 138 are sequentially disposed. The vertical distances and the distance change speeds of the two pairs of rolls 137, 137 and 138, 138 are controlled by their respective controllers 139 and 140. In addition, devices 142 and 143 for tension control (or speed control) are also provided.

When a metal material D of given cross section (such as circular cross section) is fed out of the feed drum 135 and is rolled by passing through the pair of first rolling rolls 137, 137 controlled to relatively come close to and away from each other, an intermediate wire material M changing its thickness and width continuously (and/or stepwise) as shown in (I) of FIG. 19 is formed. Next, the intermediate wire material M is fed to the pair of second rolling rolls 138, 138. At the time, the pair of second rolling rolls 138, 138 are controlled to relatively come close to and away from each other so that the magnitude of its roll distance becomes inverse to the magnitude of thickness of portion of the intermediate wire material M to be fed continuously. While being controlled in this manner, the second rolling rolls 138, 138 roll the intermediate wire material M to form a metal wire 102 (of flat type) changing its thickness and width over the length as shown in (II) of FIG. 19. Then, the metal wire 102 is taken up on the take-up drum 136.

More specifically, the intermediate wire material M is rolled by the second rolling rolls 138, 138 so that thicker portions thereof becomes thinner. Thus, as shown in (I) and (II) of FIG. 19, the magnitudes of thickness and width of the metal wire 102 become inverse to (or are in inverse proportion to) those of the intermediate wire material M.

As shown in FIG. 19, the intermediate wire material M has preliminary narrow parts $S_1$ of large thickness and small width and preliminary wide parts $H_1$ of small thickness and large width formed alternately, while the metal wire 102 has final wide parts $H_2$ of small thickness and large width and final narrow parts $S_2$ of large thickness and small width formed alternately. Furthermore, (as seen from FIG. 19) the preliminary narrow parts $S_1$ become the final wide parts $H_2$ and the preliminary wide parts $H_1$ become the final narrow parts $S_2$. FIG. 19 illustrates an example in which the final narrow parts $S_2$ are formed into transition parts 150 (having a constant width over a given distance in the longitudinal direction). By cutting a long metal wire 102, manufactured in the manner shown in FIGS. 19 and 18, at the transition parts 150, a metal wire of give length for a magnet wire 101 is obtained. Furthermore, the metal wire 102 obtained by the manufacturing method of FIG. 18 is desirable because it has a constant cross-sectional area over the length. This applies the principle that as the rolling magnification (amount of compression) is larger, the cross-sectional area of the metal wire after being rolled becomes smaller. As can be seen from the above, the manufacturing method using the two-step rolling shown in FIG. 18 has an advantage that a metal wire 102 of given length for a magnet wire 101 (as shown in FIG. 6) can be manufactured efficiently and inexpensively by first obtaining a sufficiently long metal wire and then cutting it into lengths (at the transition parts 150).

The plan view of the continuous (sufficiently long) metal wire 102 obtained by the method of FIG. 18 presents one of the shapes illustrated in FIGS. 7(a) to 7(f) and in the dash-double-dot-lines and dash-single-dot-lines in FIGS. 24(a) to 24(d).

Next, FIGS. 20 to 23 illustrate still another manufacturing method and show different embodiments. In each of FIGS. 20 to 23, (a) shows a cross-sectional side view in which the thickness $T_3$ is shown and (b) shows a plan view. In each of FIGS. 20(b), 21(b), 22(b) and 23(b), the solid lines show a partly finished product M', the dash-double-dot-lines show a metal wire 102 as a finished product and the width $W_3$ is shown.

Figure 22:
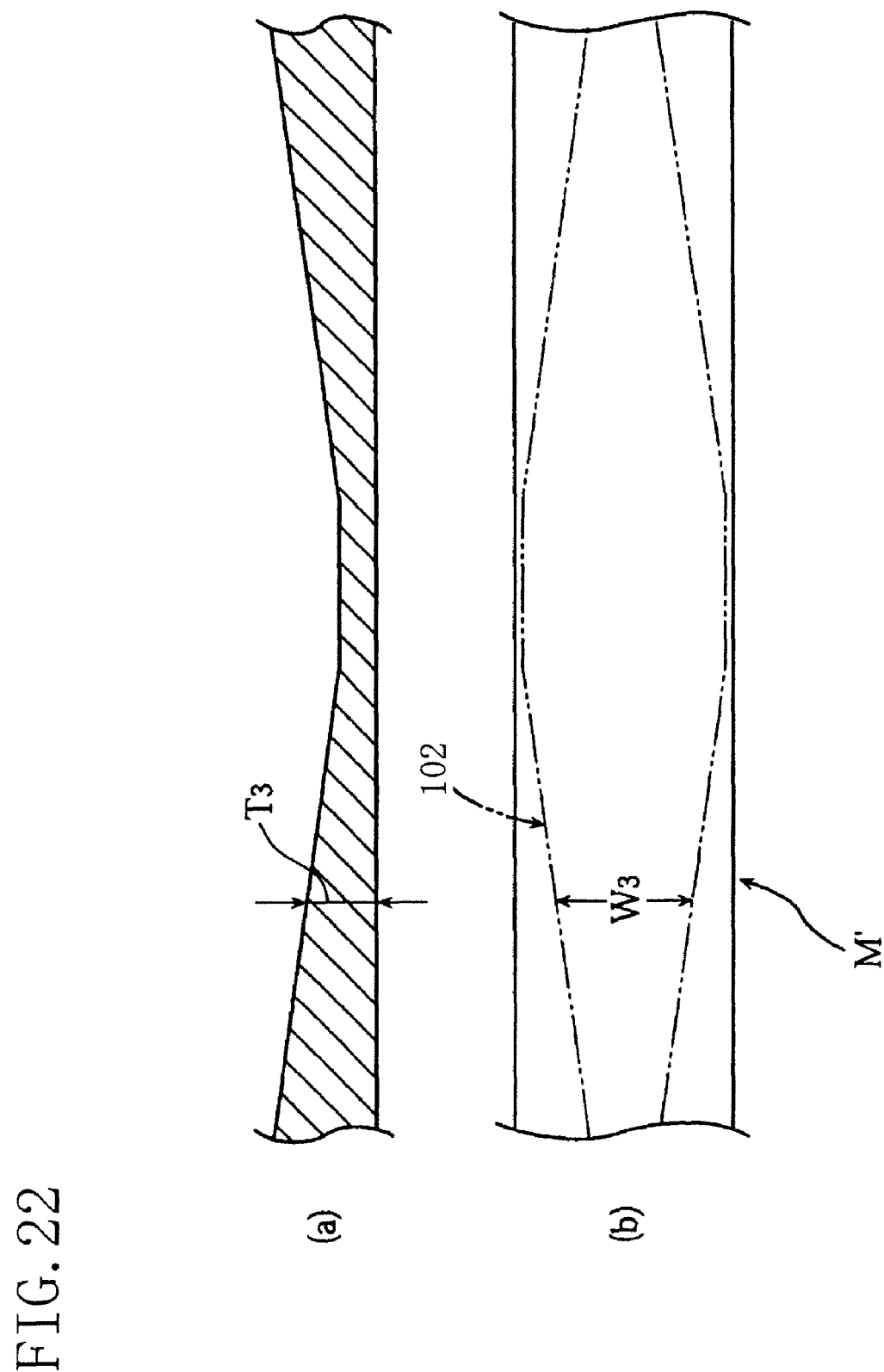
FIG. 22 is explanatory views of still another manufacturing method, wherein 22(a) is a cross-sectional side explanatory view and 22(b) is a plan explanatory view.
Figure 23:
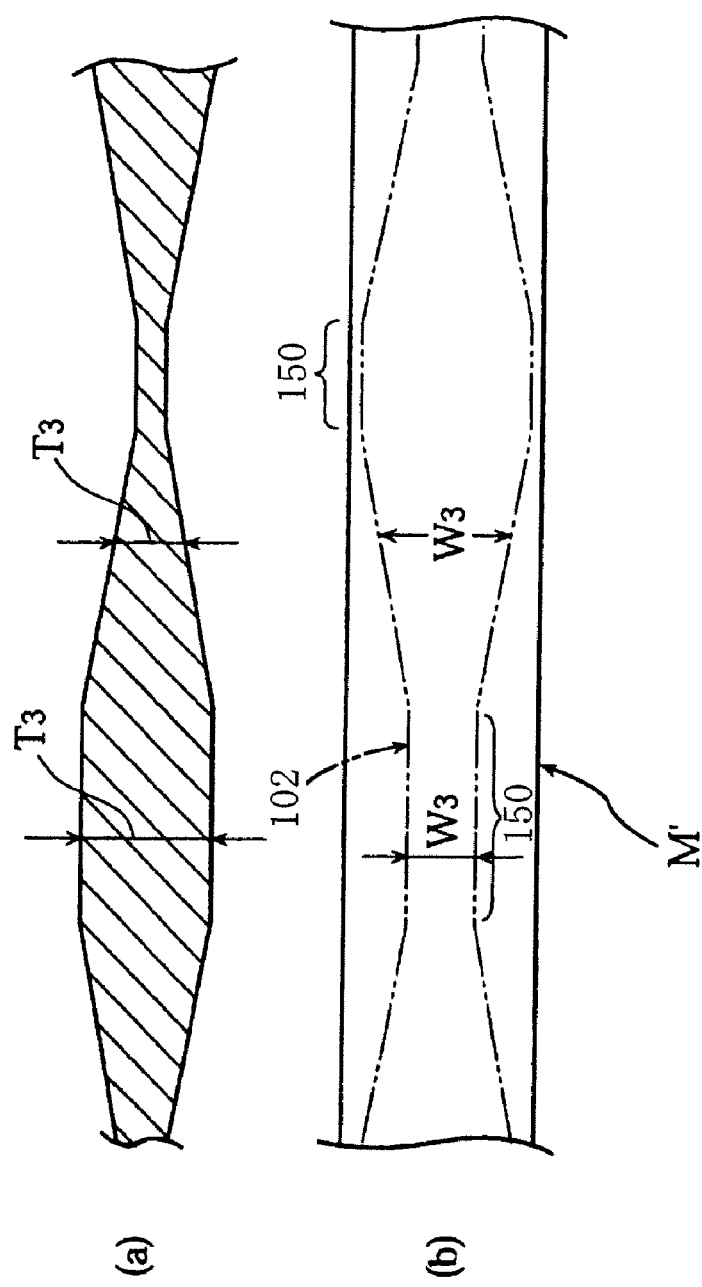
FIG. 23 is explanatory views of still another manufacturing method, wherein 23(a) is a cross-sectional side explanatory view and 23(b) is a plan explanatory view.

An unshown metal material (whose original cross section is not specified, for example, a rectangular shape or the shape of a minus sign) is plastically deformed such as by press working or rolling so that its thickness $T_3$ stepwise changes (see FIGS. 20 and 21) or continuously changes (see FIGS. 22 and 23). As a result, the thickness $T_3$ becomes its desired value but the width is far from its desired value. Therefore, the partly finished product shown in the solid lines in each of FIGS. 20(b), 21(b), 22(b) and 23(b) is cut as shown in the dash-double-dot-lines by mechanical cutting or laser cutting. In this cutting method, the partly finished product is cut so that portions of large thicknesses $T_3$ have small widths $W_3$ and, by contrast, portions of small thicknesses $T_3$ are cut to have large widths $W_3$.

In this manner, the transverse cross-sectional area of the metal wire can be constant over the length thereof. FIG. 23 shows that transition parts 150 are preferably formed.

Also encompassed within the scope of the metal wire 102 of the present invention is a tape-shaped metal wire having the cross sectional shape of a minus sign. The metal wire 102 of the present invention can be applied to other than magnet wires.

A description is given of the method for fitting the magnet wire 101 onto the stator core 104 in the embodiment of the present invention shown in FIGS. 1 and 2.

Figure 17:
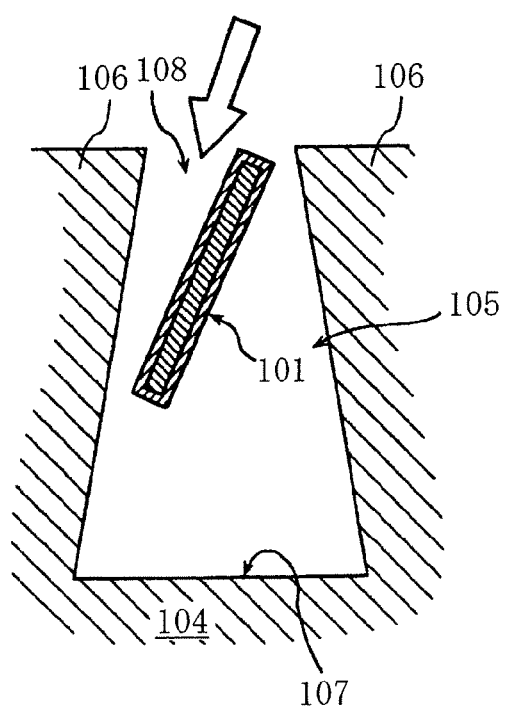
FIG. 17 is an explanatory view showing how to fit the magnet wire of the present invention onto the stator core.

First, as shown in FIG. 17, one end of the magnet wire 101 having a large width $W_1$ is inserted in an inclined position into one of the two slots 105, 105 (where the magnet wire 101 is to be inserted) from the distal opening 108 of the slot 105 and put on the bottom 107 in parallel with it. Then, the magnet wire 101 is inserted alternately into one of the two slots 105, 105 and the other and wound around the magnetic pole 106 between both the slots 105, 105 (in order from one end of the magnet wire 101 having a large width $W_1$ to the other end having a small width $W_1$). Thus, the magnet wire 101 is inserted in tiers from the bottoms 107 of both the slots 105, 105 towards the distal openings 108.

In FIG. 2, a slight gap is produced between the magnet wire 101 and each of the side surfaces 109, 109 of the slot 105. However, in order to further increase the space factor of the magnet wire 101 in the slot 105, the magnet wire 101 is preferably placed close to both the side surfaces 109, 109 to produce little gap with both the side surfaces 109, 109.

As described so far, the present invention is directed to a linear material of rectangular cross section in which an insulating coating 103 is formed on the outer surface of a metal wire 102, wherein the linear material changes the width $W_1$ continuously or stepwise over the length thereof. Therefore, the linear material is suitable as a magnet wire for a motor and the width $W_1$ of the magnet wire inserted in tiers in a slot (concave groove), such as in a stator core of a motor, can be configured according to the width of the slot. Thus, the magnet wire can be placed in the slot with little gap left in the slot, thereby significantly increasing the space factor of the magnet wire in the slot. This enables the production of a motor that can efficiently obtain large rotational torque. In other words, a motor with a small size can attain equivalent torque to that of conventional motors. This provides a motor reduced in size and weight and in turn attains energy saving.

Furthermore, since the transverse cross-sectional area of the metal wire 102 is configured to be constant over the length of the metal wire 102, the electric resistance of the entire length of the magnet wire can be reduced to a low value. Furthermore, the electric resistance and inductance of the metal wire 102 can be kept constant over the length, which is preferable.

The stator structure of the present invention includes: a stator core 104 having a large number of concave slots 105 and a large number of convex magnetic poles 106 circumferentially alternately arranged; and magnet wires 101 of rectangular cross section in each of which an insulating coating 103 is formed on the outer surface of a metal wire 102, wherein each of the slots 105 is formed so that the distance $W_2$ between both the side surfaces 109, 109 of the slot 105 gradually decreases from the bottom 107 of the slot 105 towards the distal opening 108 thereof, each magnet wire 101 is wound around the associated magnetic pole 106 and inserted in tiers in the associated slot 105, and each magnet wire 101 is placed in the slot 105 so that the width $W_1$ thereof continuously or stepwise decreases from the bottom 107 of the slot 105 towards the distal opening 108 thereof. Thus, the magnet wire 101 can be placed in the slot 105 with little gap left in the slot, thereby significantly increasing the space factor of the magnet wire 101 in the slot 105. This enables the production of a motor that can efficiently obtain large rotational torque. In other words, a motor with a small size can attain equivalent torque to that of conventional motors. This provides a motor reduced in size and weight and in turn attains energy saving.

Furthermore, since the transverse cross-sectional area of the metal wire 102 for the magnet wire 101 is configured to be constant over the length of the metal wire 102, the electric resistance of the entire length of the magnet wire 101 can be reduced to a low value. Furthermore, the electric resistance and inductance of the metal wire 102 can be kept constant over the length, which is preferable.

Next, a description is given of another embodiment of the method for manufacturing a flat-type wire.

Figure 39:
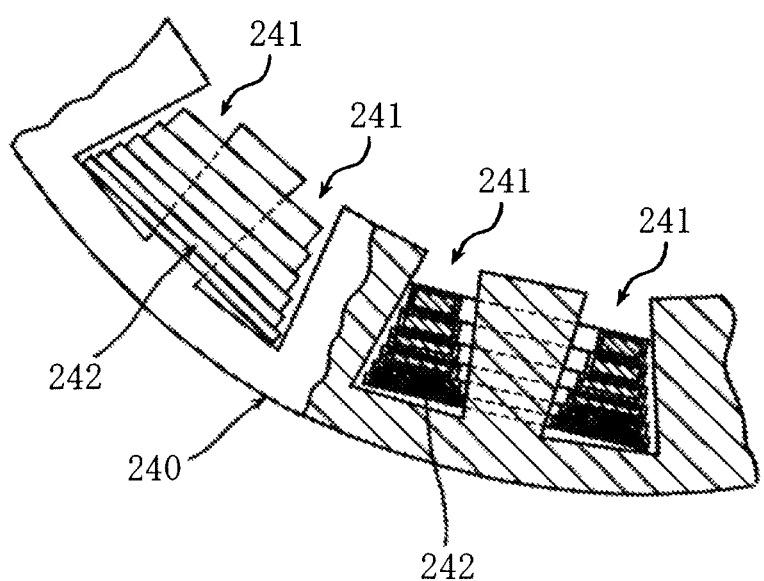
FIG. 39 is a partially cross-sectional front view showing a stator structure in which a flat-type wire is wound in a stator core.

For a stator core 240 having a large number of slots 241 opening at the inner periphery thereof as shown in FIG. 39, the width of the slot 241 tapers from the slot bottom to the distal opening. Therefore, in order to densely wind a magnet wire on the stator core 240, it is necessary to form the magnet wire so that its width changes over the length.

Figure 38:
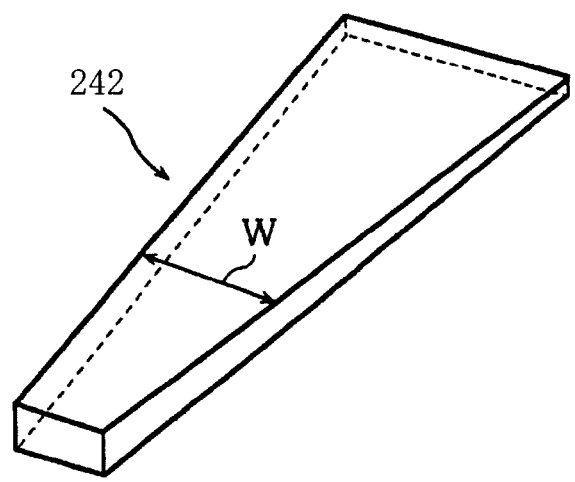
FIG. 38 is a perspective view of a flat-type wire.

Specifically, as shown in FIG. 38, a flat-type wire 242 continuously increasing (or decreasing) its width W over the length is prepared. Then, as shown in FIG. 39, the flat-type wire 242 is fitted on the stator core by placing the wide part of the flat-type wire 242 on the bottom of the slot 241 and spirally winding the flat-type wire 242 towards the distal opening thereof.

Such a flat-type wire changing its width over the length can be manufactured by increasing or decreasing the roll distance between a pair of rolling rolls of a conventional manufacturing system for forming a round wire into a flat-type wire (see, for example, Published Japanese Patent Application No. 2004-122165).

Furthermore, for such a flat-type wire changing its width, in order to keep the electric resistance uniform, it is desired to form it so that its cross-sectional area is constant over the length.

However, the above method for manufacturing a flat-type wire has a problem that the cross-sectional area of the flat-type wire varies depending on the rolling magnification. Data demonstrating this are shown in the following Tables 1 and 2.

TABLE 1

| Rolling magnification | 2 mm$^2$ (specified cross-sectional area) |
|---|---|
| 8 | 2.005 mm$^2$ (100.2%) |
| 11.8 | 1.887 mm$^2$ (94.3%) |
| 14.9 | 1.817 mm$^2$ (90.8%) |

TABLE 2

| Rolling magnification | 3 mm$^2$ (specified cross-sectional area) |
|---|---|
| 5.3 | 2.972 mm$^2$ (99%) |
| 10.2 | 2.742 mm$^2$ (91.4%) |

Shown in Table 1 are data when a round wire having a constant cross-sectional area over the length is rolled into a flat-type wire. In Table 1, portions rolled at rolling magnifications of 8, 11.8 and 14.9 have cross-sectional areas of 2.005 mm$^2$, 1.887 mm$^2$ and 1.817 mm$^2$, respectively. Particularly, the portions rolled at rolling magnifications of 11.8 and 14.9 have cross-sectional areas reduced by approximately 10% with respect to the specified cross-sectional area of 2 mm$^2$.

Also shown in Table 2 are data when a round wire is rolled into a flat-type wire. Portions rolled at rolling magnifications of 5.3 and 10.2 have cross-sectional areas of 2.972 mm$^2$ and 2.742 mm$^2$, respectively. Particularly, the portion rolled at a rolling magnification of 10.2 have a cross-sectional area reduced by approximately 10% as compared to the specified cross-sectional area of 3 mm$^2$.

In Tables 1 and 2, the percentage in parentheses indicates the proportion of the cross-sectional area of the flat-type wire to the specified (desired) cross-sectional area thereof and the rolling magnification is a value calculated by dividing the width of the manufactured flat-type wire by the thickness thereof.

As seen from Tables 1 and 2, as the rolling magnification increases (the portion is rolled more), the cross-sectional area of that portion becomes smaller. According to the above method, the wire cannot be formed to have a constant cross-sectional area over the length.

Figure 26:
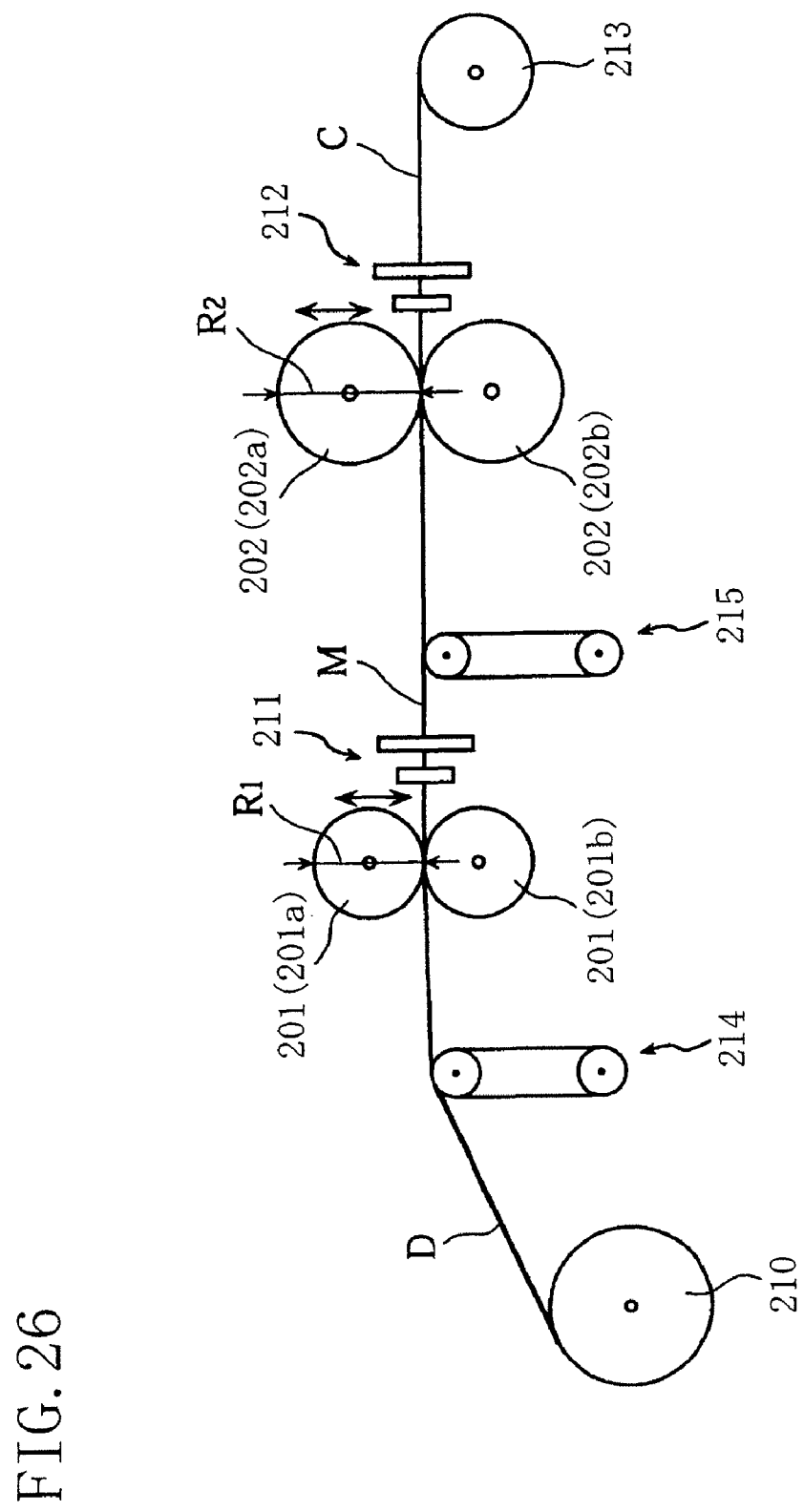
FIG. 26 is a general schematic view showing a manufacturing system for carrying out a method for manufacturing a flat-type wire according to the present invention.

FIG. 26 is a general schematic view showing a manufacturing system for carrying out a method for manufacturing a flat-type wire according to the present invention.

In the figure, 210 at the left end denotes a feed drum around which a metal wire D of circular, square, rectangular or another cross section made such as of copper is wound, and 213 at the right end denotes a take-up drum on which a manufactured flat-type wire is taken up. The metal wire D is fed from the left to the right in the figure. On the way from the feed drum 210 to the take-up drum 213, a pair of first rolling rolls 201, 201 and a pair of second rolling rolls 202, 202 are disposed in upstream to downstream order. Each of the pair of first rolling rolls 201, 201 and the pair of second rolling rolls 202, 202 are controlled to relatively come close to and away from each other. Disposed downstream of the first rolling rolls 201, 201 and the second rolling rolls 202, 202 are roll controllers 211 and 212, respectively, each for controlling the roll distance between the associated rolling rolls and the speed of the rolling rolls coming close to and away form each other. 214 and 215 denote tension controllers. In the figure, each of the pair of first rolling rolls 201, 201 and the pair of second rolling rolls 202, 202 are vertically juxtaposed upper and lower rolling rolls.

First, a description is given of a summary of the method for manufacturing a flat-type wire according to the present invention.

Figure 27:
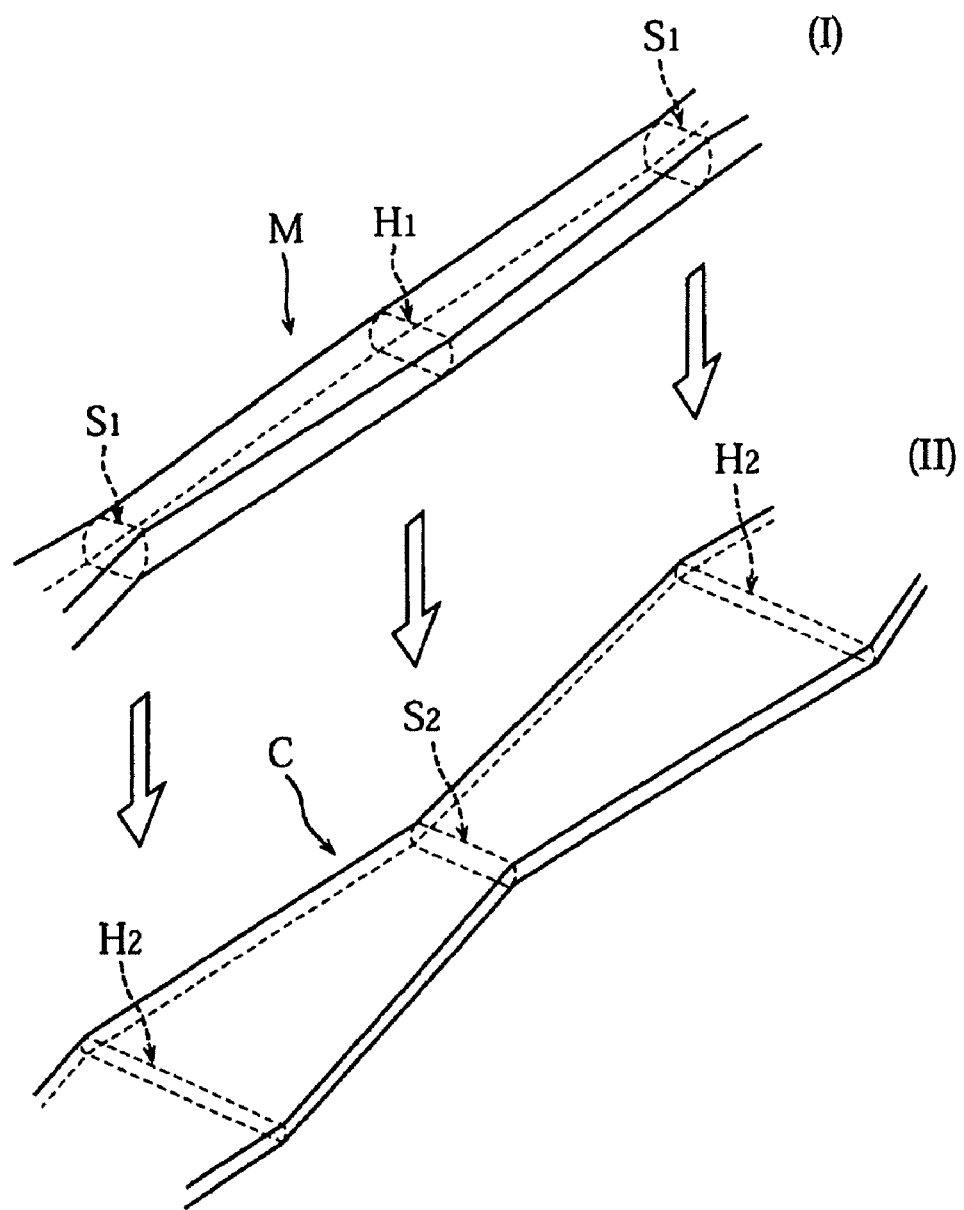
FIG. 27 is a perspective view for explanation, wherein (I) is a perspective view of an intermediate wire material and (II) is a perspective view of a flat-type wire.

Referring to FIG. 26, when a metal wire D having a constant circular cross section over the length is fed out of the feed drum 210, fed to between the first rolling rolls 201, 201 controlled to relatively come close to and away from each other, and rolled by them, an intermediate wire material M is formed that changes its thickness and width increasingly and decreasingly (over its length) as shown in (I) of FIG. 27. FIG. 27(I) shows an example of the intermediate wire material M whose thickness and width continuously (linearly) change.

Then, the intermediate wire material M is fed to the second rolling rolls 202, 202. The second rolling rolls 202, 202 are controlled to relatively come close to and away from each other so that the magnitude of its roll distance becomes inverse to the magnitude of thickness of portion of the intermediate wire material M to be fed. While being controlled in this manner, the second rolling rolls 138, 138 roll the intermediate wire material M passing through between them to form a flat-type wire (final product) C continuously changing its thickness and width (over the length) as shown in (II) of FIG. 27.

More specifically, the intermediate wire material M is rolled by the second rolling rolls 202, 202 so that thicker portions thereof becomes thinner. Thus, as shown in (I) and (II) of FIG. 27, the flat-type wire C is formed so that the magnitudes of thickness and width thereof become inverse to those of the intermediate wire material M.

In other words, the roll distance between the second rolling rolls 202, 202 is controlled so that the second rolling rolls 202, 202 roll and form the intermediate wire material M with a thickness whose magnitude is inverse to the magnitude of the final thickness of the flat-type wire C.

As shown in FIG. 27, the intermediate wire material M has preliminary narrow parts $S_1$ of large thickness and small width and preliminary wide parts $H_1$ of small thickness and large width formed alternately, while the flat-type wire C has final wide parts $H_2$ of small thickness and large width and final narrow parts $S_2$ of large thickness and small width formed alternately. Furthermore, the intermediate wire material M is rolled (by the second rolling rolls 202, 202) so that the preliminary narrow parts $S_1$ become the final wide parts $H_2$ and the preliminary wide parts $H_1$ become the final narrow parts $S_2$.

Figure 28:
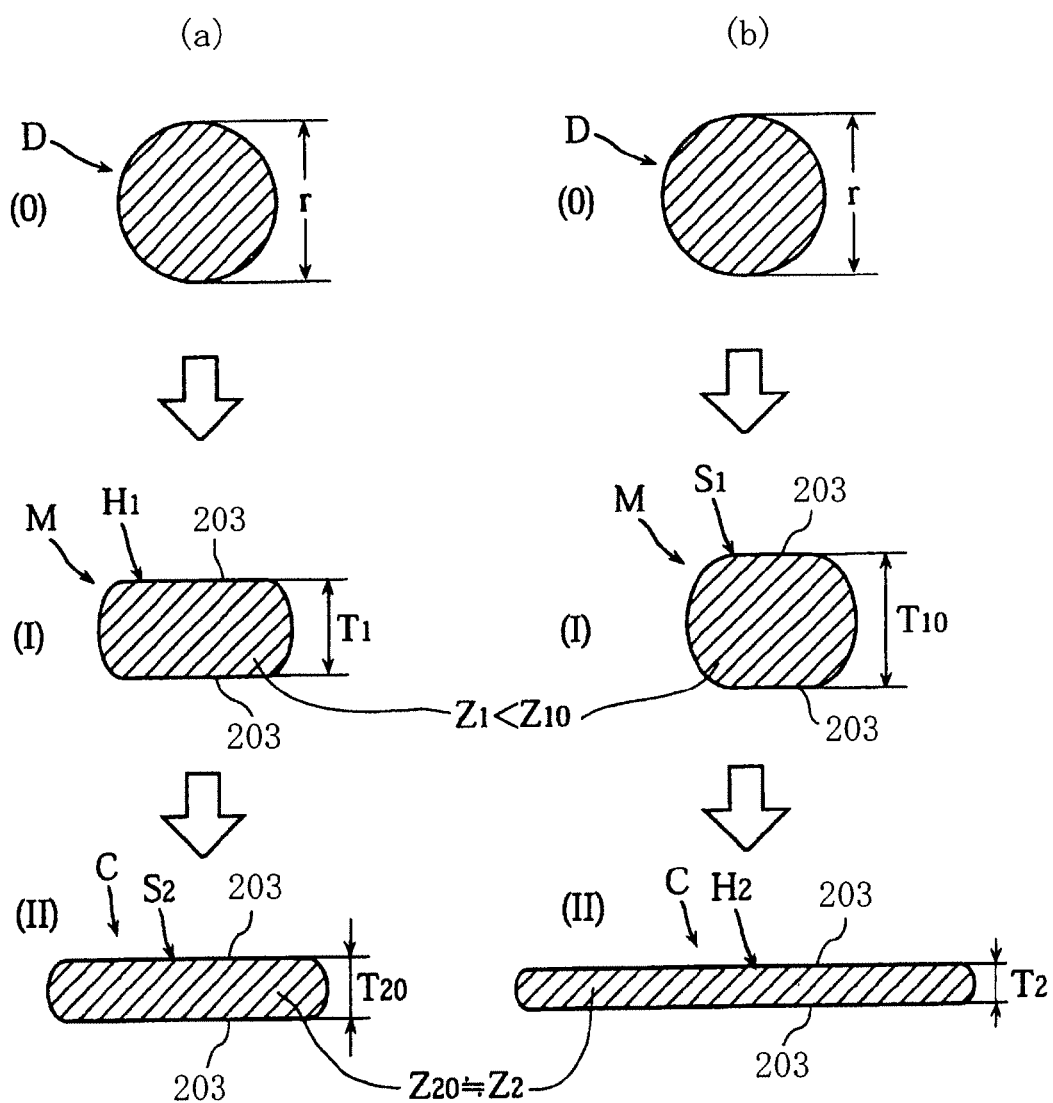
FIG. 28 is cross-sectional views of essential parts, wherein (O) in FIGS. 28(a) and 28(b) are cross-sectional views of essential parts of a metal wire, (I) in FIGS. 28(a) and 28(b) are cross-sectional views of essential parts of an intermediate wire material, and (II) in FIGS. 28(a) and 28(b) are cross-sectional views of essential parts of a flat-type wire.

FIG. 28 is cross-sectional views showing the flow of the rolling step of forming a metal wire D into an intermediate wire material M and then into a flat-type wire C, wherein 28(*a*) shows the way of change of the metal wire D to the preliminary wide parts $H_1$ and to the final narrow parts $S_2$ and 28(*b*) shows the way of change of the metal wire D to the preliminary narrow parts $S_1$ and to the final wide parts $H_2$. In FIGS. 28(*a*) and 28(*b*), (O) shows the transverse cross section of the metal wire D before being rolled, (I) shows the transverse cross section of the intermediate wire material M formed by rolling of the first rolling rolls 201, 201, and (II) shows the transverse cross section of the flat-type wire C formed by rolling of the second rolling rolls 202, 202.

Next, a detailed description is given of the method for manufacturing a flat-type wire according to the present invention and the behaviors of the first rolling rolls 201, 201 and the second rolling rolls 202, 202.

Figure 29:
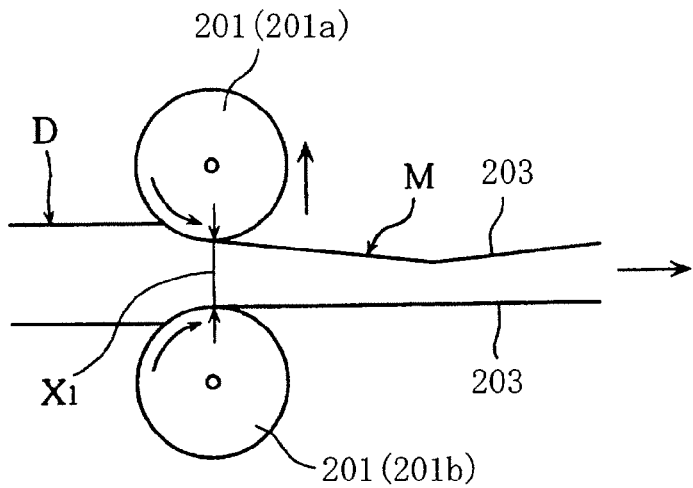
FIG. 29 is an explanatory view of the behavior of first rolling rolls.

The first rolling rolls 201, 201 are controlled by the roll controller 211 so that its upper roll 201*a* moves up and down at a predetermined speed (so that it comes close to and away from the lower roll 201*b*) (see FIG. 26). As shown in FIG. 29, the first rolling rolls 201, 201 roll the metal wire D fed between them while changing the roll distance $X_1$ between them, thereby forming it into an intermediate wire material M. The intermediate wire material M has smooth roll-pressed surfaces 203, 203 formed at its top and bottom (see FIG. 28). Referring to FIG. 29, the top roll-pressed surface 203 is formed to repeatedly slope upward and downward in the feeding direction (longitudinal direction), while the bottom roll-pressed surface 203 is flat.

Figure 30:
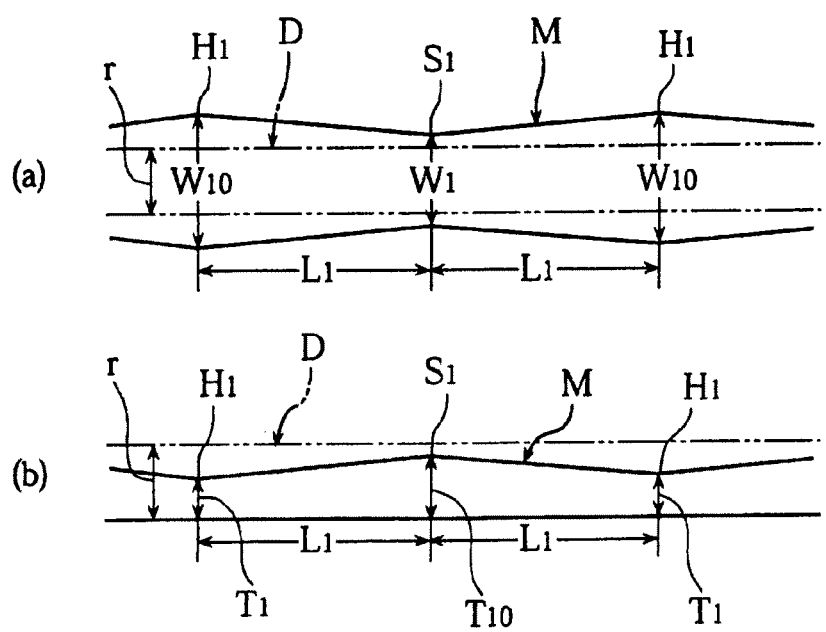
FIG. 30 is explanatory views of an intermediate wire material, wherein 30(a) is a plan explanatory view and 30(b) is a front explanatory view.

FIG. 30(*a*) is a plan explanatory view of the intermediate wire material M and FIG. 30(*b*) is a front explanatory view of the same, wherein the metal wire D having a diameter r is shown in the dash-double-dot lines for comparison.

Referring to FIG. 30(*a*), the width of the intermediate wire material M continuously increases and decreases. In other words, both the lateral edges of the intermediate wire material M are located to come close to and away from each other in a tapered shape. Furthermore, the intermediate wire material M includes: preliminary wide parts $H_1$ whose width is the maximum width $W_{10}$ of the intermediate wire material M; and preliminary narrow parts $S_1$ whose width is the minimum width $W_1$ thereof, wherein the preliminary wide parts $H_1$ and the preliminary narrow parts $S_1$ are alternately disposed. The intermediate wire material M is formed to have a constant length (pitch) $L_1$ between each pair of adjacent preliminary wide part $H_1$ and preliminary narrow part $S_1$. Referring now to FIG. 30(*b*), the intermediate wire material M has the minimum thickness $T_1$ at each preliminary wide part $H_1$ and the maximum thickness $T_{10}$ at each preliminary narrow part $S_1$.

Figure 31:
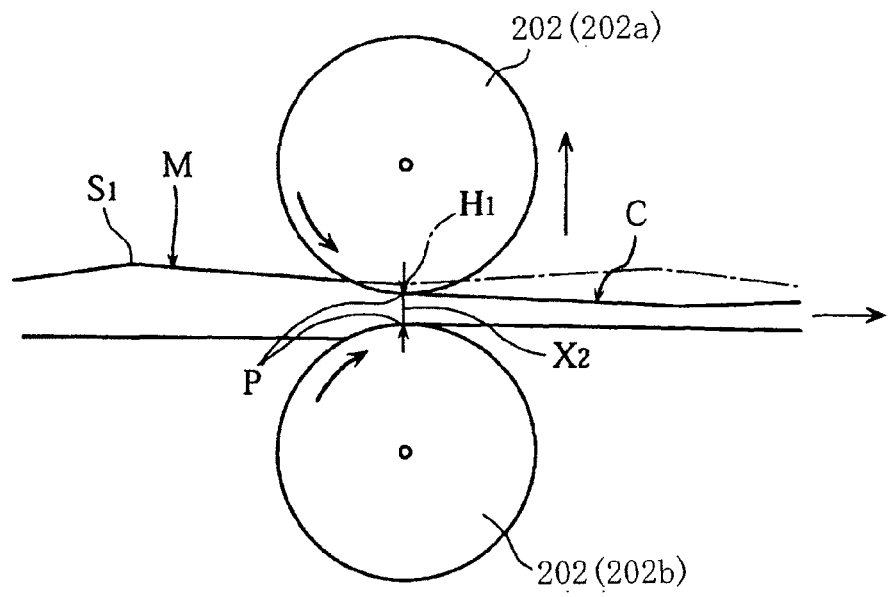
FIG. 31 is an explanatory view of the behavior of second rolling rolls.
Figure 32:
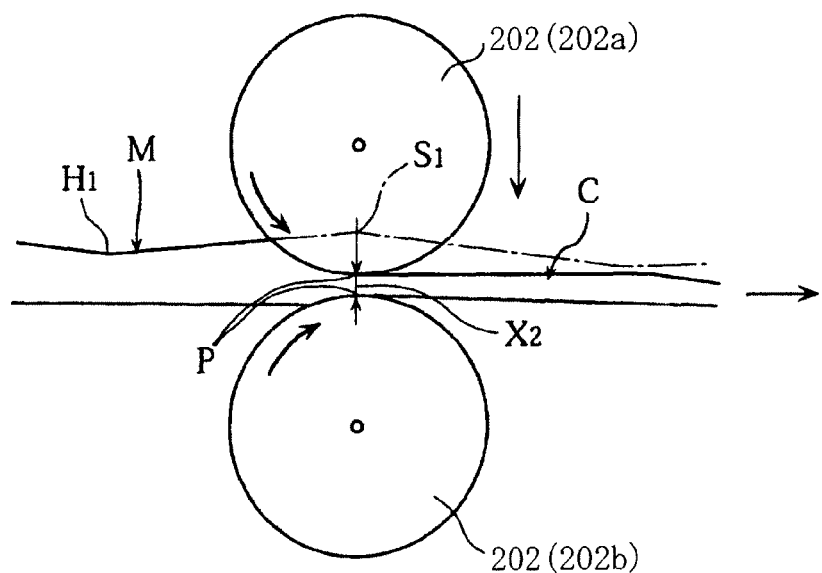
FIG. 32 is an explanatory view of the behavior of the second rolling rolls.

The intermediate wire material M produced by rolling of the first rolling rolls 201, 201 is fed to the second rolling rolls 202, 202. The second rolling rolls 202, 202 are controlled by the roll controller 212 so that its upper roll 202*a* moves up and down at a predetermined speed (so that it comes close to and away from the lower roll 202*b*) (see FIG. 26). As shown in FIGS. 31 and 32, the second rolling rolls 202, 202 roll the intermediate wire material M fed between them while changing the roll distance $X_2$ between them, thereby forming it into a flat-type wire C.

Furthermore, the second rolling rolls 202, 202 are controlled so that the magnitude of the roll distance $X_2$ becomes inverse to the magnitude of thickness of the intermediate wire material M. This is described with reference to a schematic diagram of FIG. 33.

Figure 33:
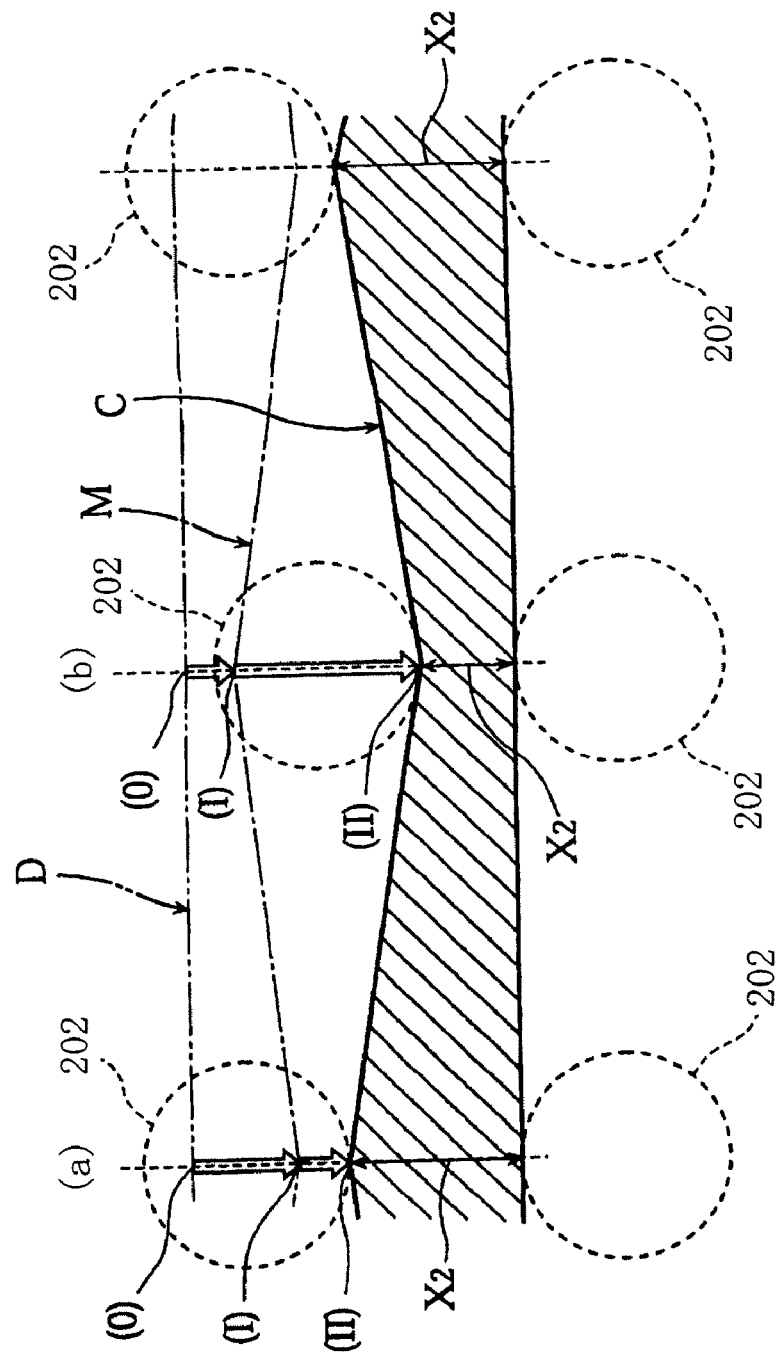
FIG. 33 is a schematic diagram for explanation.

FIG. 33 is a diagram collectively expressing rolling (deforming) processes from the metal wire D to the intermediate wire material M and then to the flat-type wire C, wherein the dash-double-dot line denotes the upper edge of the metal wire D, the dash-single-dot-line denotes the upper edge (a roll-pressed surface) of the intermediate wire material M and the flat-type wire C is expressed by the solid and hatched lines. The lower edges of the metal wire D and the intermediate wire material M are shown superposed on the lower edge of the flat-type wire C.

In FIG. 33, the change with time of the roll distance $X_2$ between the second rolling rolls 202, 202 is expressed in the direction from right to left. As seen from the figure, the second rolling rolls 202, 202 are controlled to decrease the roll distance $X_2$ as the thickness of the intermediate wire material M increases (from the right end towards the midpoint) and to then increase the roll distance $X_2$ as the thickness thereof decreases (from the midpoint to the left end).

Specifically, referring to FIG. 31, if the point at which the outer peripheries of the upper and lower rolls 202*a* and 202*b* come close to each other is assumed as a rolling point P, the upper and lower rolls 202*a* and 202*b* roll the intermediate wire material M while being controlled so that the roll distance $X_2$ reaches a maximum when one preliminary wide part $H_1$ having the minimum thickness reaches the rolling point P and that the roll distance $X_2$ then decreases as the thickness of the intermediate wire material M passing through the rolling point P increases.

Then, referring to FIG. 32, the upper and lower rolls 202*a* and 202*b* roll the intermediate wire material M while being controlled so that the roll distance $X_2$ reaches a minimum when the next preliminary narrow part $S_1$ having the maximum thickness reaches the rolling point P and that the roll distance $X_2$ then increases as the thickness of the intermediate wire material M passing through the rolling point P decreases. Thereafter, the rolling processes illustrated in FIGS. 31 and 32 are repeated.

Figure 34:
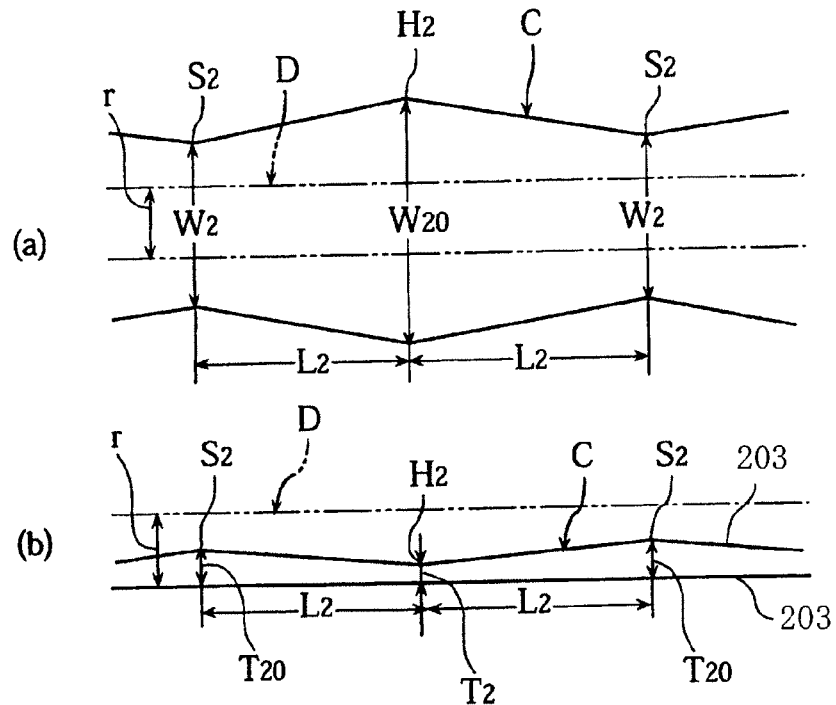
FIG. 34 is explanatory views of a flat-type wire, wherein 34(a) is a plan explanatory view and 34(b) is a front explanatory view.

The flat-type wire C produced by rolling of the second rolling rolls 202, 202 in the above manner continuously increases and decreases its width as shown in the plan explanatory view of FIG. 34(*a*). In other words, both the lateral edges of the flat-type wire C are located to come close to and away from each other in a tapered shape. The flat-type wire C includes: final narrow parts $S_2$ whose width is the minimum width $W_2$ of the flat-type wire C; and final wide parts $H_2$ whose width is the maximum width $W_{20}$ thereof, wherein the final narrow parts $S_2$ and the final wide parts $H_2$ are alternately disposed. The flat-type wire C is formed to have a constant length (pitch) $L_2$ between each pair of adjacent final narrow part $S_2$ and final wide part $H_2$.

Furthermore, as shown in FIG. 34(*b*), the thickness of the flat-type wire C continuously increases and decreases, the top roll-pressed surface 203 is formed to repeatedly slope upward and downward in the longitudinal direction, and the bottom roll-pressed surface 203 is flat. The flat-type wire C has the maximum thickness $T_{20}$ at each final narrow part $S_2$ and the minimum thickness $T_2$ at each final wide part $H_2$.

In FIGS. 34(*a*) and 34(*b*), the metal wire D having a diameter r is shown in the dash-double-dot lines for comparison.

Figure 35:
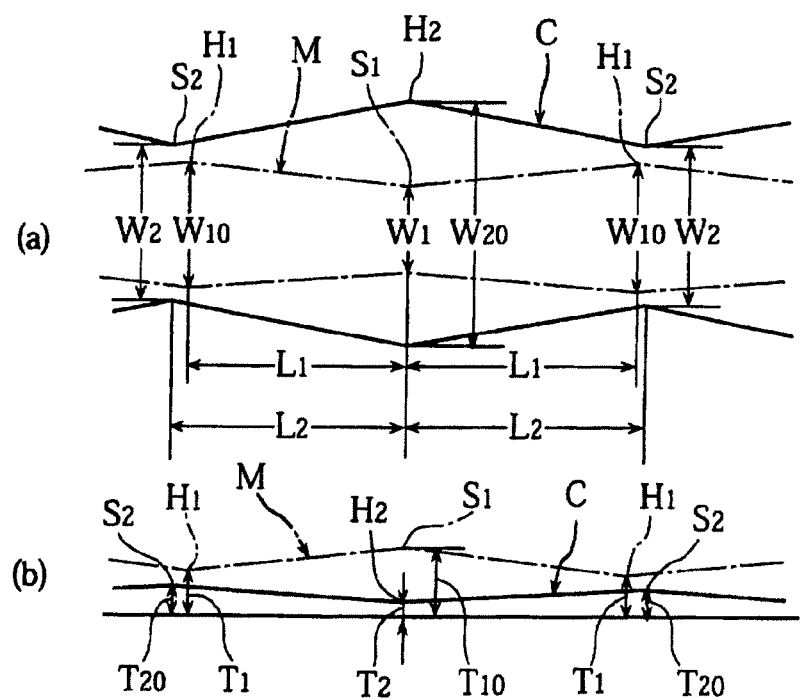
FIG. 35 is explanatory views for comparison between an intermediate wire material and a flat-type wire, wherein 35(a) is a plan explanatory view and 35(b) is a front explanatory view.

FIG. 35(*a*) is a diagram in which plan explanatory views of the intermediate wire material M and the flat-type wire C are superposed, and FIG. 35(*b*) is a diagram in which front explanatory views of them are superposed. As shown in FIG. 35(*b*), the greatest amount of compression (rolling magnification) is reached when each preliminary narrow part $S_1$ of the intermediate wire material M is rolled into a final wide part $H_2$ of the flat-type wire C. Thus, as shown in FIG. 35(*a*), the width is increased to the greatest extent from $W_1$ to $W_{20}$. On the other hand, the smallest amount of compression (rolling magnification) is reached when each preliminary wide part $H_1$ of the intermediate wire material M is rolled into a final narrow part $S_2$ of the flat-type wire C. Thus, the width is increased to the smallest extent from $W_{10}$ to $W_2$.

Furthermore, when the intermediate wire material M is rolled by the second rolling rolls 202, 202, it is extended also in the longitudinal direction. Therefore, as shown in FIG. 35(a), the length $L_2$ of the manufactured flat-type wire C is longer than the length $L_1$ of the intermediate wire material M. Note that since FIG. 33 is a schematic diagram, it shows as if the intermediate wire material M and the flat-type wire C have the same length (pitch). In addition, the lengths $L_1$ and $L_2$ of the intermediate wire material M and the flat-type wire C are actually much larger than their widths and thicknesses. However, in FIGS. 27 and 29 to 35, the intermediate wire material M and the flat-type wire C are expressed in different measures from the actual measures for easier comprehension.

The flat-type wire C thus manufactured has a substantially constant cross-sectional area over the length thereof. The principle for this is described below.

As previously described with reference to Tables 1 and 2, it is commonly known that as the rolling magnification (amount of compression) becomes larger, the cross-sectional area of the metal wire after being rolled decreases. This principle is applied to the present invention.

As seen from the compression from (O) of FIGS. 28(a) and 28(b) to (I) thereof, the metal wire D of diameter r is compressed (rolled) into preliminary wide parts $H_1$ of thickness $T_1$ and preliminary narrow parts $S_1$ of thickness $T_{10}$. As seen from these figures, since the thickness $T_1$ is smaller than the thickness $T_{10}$ or, in other words, the preliminary wide parts $H_1$ are larger in the amount of compression (rolling magnification) from the metal wire D than the preliminary narrow parts $S_1$, the cross-sectional area $Z_1$ of the preliminary wide parts $H_1$ is smaller than the cross-sectional area $Z_{10}$ of the preliminary narrow parts $S_1$.

Furthermore, in the compression from (I) of FIGS. 28(a) and 28(b) to (II) thereof, the amount of compression of the intermediate wire material M from thickness $T_{10}$ to thickness $T_2$ is greater than the amount of compression thereof from thickness $T_1$ to thickness $T_{20}$. In other words, when the cross-sectional areas in the step (I) having the relation of $Z_1 < Z_{10}$ are compressed into the respective cross-sectional areas in the step (II), the cross-sectional area $Z_{10}$ is more reduced than the cross-sectional area $Z_1$. Therefore, the intermediate wire material M can be controlled so that the cross-sectional area $Z_{20}$ of the final narrow parts $S_2$ becomes equal to (approximately equal to) the cross-sectional area $Z_2$ of the final wide parts $H_2$.

Furthermore, comparison between the final thicknesses $T_{20}$ and $T_2$ of the flat-type wire C in (II) of FIGS. 28(a) and 28(b) shows that, in spite of different cumulative amounts of compression from the metal wire D, both the cross-sectional areas $Z_{20}$ and $Z_2$ are approximately equal to each other and this is because the ratio of reduction of cross-sectional area (amount of reduction of cross-sectional area per unit amount of compression) due to compression from (I) to (II) is smaller than that due to compression from (O) to (I).

The vertical changes from (O) to (I) and then to (II) at (a) and (b) in FIG. 33 are shown in correspondence with the changes from (O) to (I) and then to (II) in FIGS. 28(a) and 28(b). As shown in FIG. 33, the amount of compression from (I) to (II) at (b) is greatest. The reduction of cross-sectional area due to compression from (O) to (II) at (b) largely depends on the compression from (I) to (II). In the present invention, the ratio of reduction of cross-sectional area due to compression of (I) to (II) is made smaller than that due to compression of (O) to (I), whereby even if the intermediate wire material M is largely compressed at (b), the reduction of cross-sectional area is reduced and, as a result, the cross-sectional area in (II) at (b) becomes approximately equal to the cross-sectional area in (II) at (a). In other words, the portions to be largely rolled are rolled by the second rolling rolls 202, 202, whereby the reduction of cross-sectional area can be reduced and the cross-sectional area of the flat-type wire C can be approximately constant over the length thereof.

The reason why the ratio of reduction of cross-sectional area due to compression from (O) to (I) is different from that due to compression from (I) to (II) is described below.

In the compression from (O) to (I) in FIG. 28, the metal wire D of circular cross section is passed through between the first rolling rolls 201, 201 to form smooth roll-pressed surfaces 203 thereon (see FIG. 29). Therefore, the resistance of the metal wire D against the passage between the first rolling rolls 201, 201 is large. On the other hand, in the compression from (I) to (II), the roll-pressed surfaces 203 have been already formed on the intermediate wire material M. Therefore, the resistance of the intermediate wire material M against the passage between the second rolling rolls 202, 202 is small (see FIGS. 31 and 32), whereby the intermediate wire material M can more easily pass through between them than when the metal wire D passes through between the first rolling rolls 201, 201.

To sum up, the metal wire D has difficulty in running (passing) through between the first rolling rolls 201, 201 and, therefore, the amount of reduction of its cross-sectional area during the passage is large. On the other hand, the intermediate wire material M can smoothly run through between the second rolling rolls 202, 202 and, therefore, the amount of reduction of its cross-sectional area during the passage is small.

In this manner, the ratio of reduction of cross-sectional area of the metal wire (intermediate wire material M) (amount of reduction of cross-sectional area thereof per unit amount of compression) due to rolling of the second rolling rolls 202, 202 is smaller than the ratio of reduction of cross-sectional area of the metal wire (metal wire D) (amount of reduction of cross-sectional area thereof per unit amount of compression) due to rolling of the first rolling rolls 201, 201.

Furthermore, generally, as the roll diameter is larger, the contact surface between the metal wire and the roll becomes smoother and the metal wire can more easily pass through between the rolls. In addition, in the present invention, as shown in FIG. 26, the roll diameter $R_2$ of the second rolling rolls 202, 202 is larger than the roll diameter $R_1$ of the first rolling rolls 201, 201. Therefore, the second rolling rolls 202, 202 more easily passes the metal wire and, thus, the ratio of reduction of cross-sectional area of the metal wire (intermediate wire material) due to their rolling becomes smaller (than that due to the rolling of the first rolling rolls 201, 201).

The ratio of reduction of cross-sectional area of the metal wire due to rolling varies depending also on the frictional force produced between the roll and the metal wire and the tension applied to the metal wire. Therefore, the ratios of reduction of cross-sectional area of the metal wire due to rolling of the first rolling rolls 201, 201 and the second rolling rolls 202, 202 may be controlled by controlling the above frictional force and/or tension.

Figure 40:
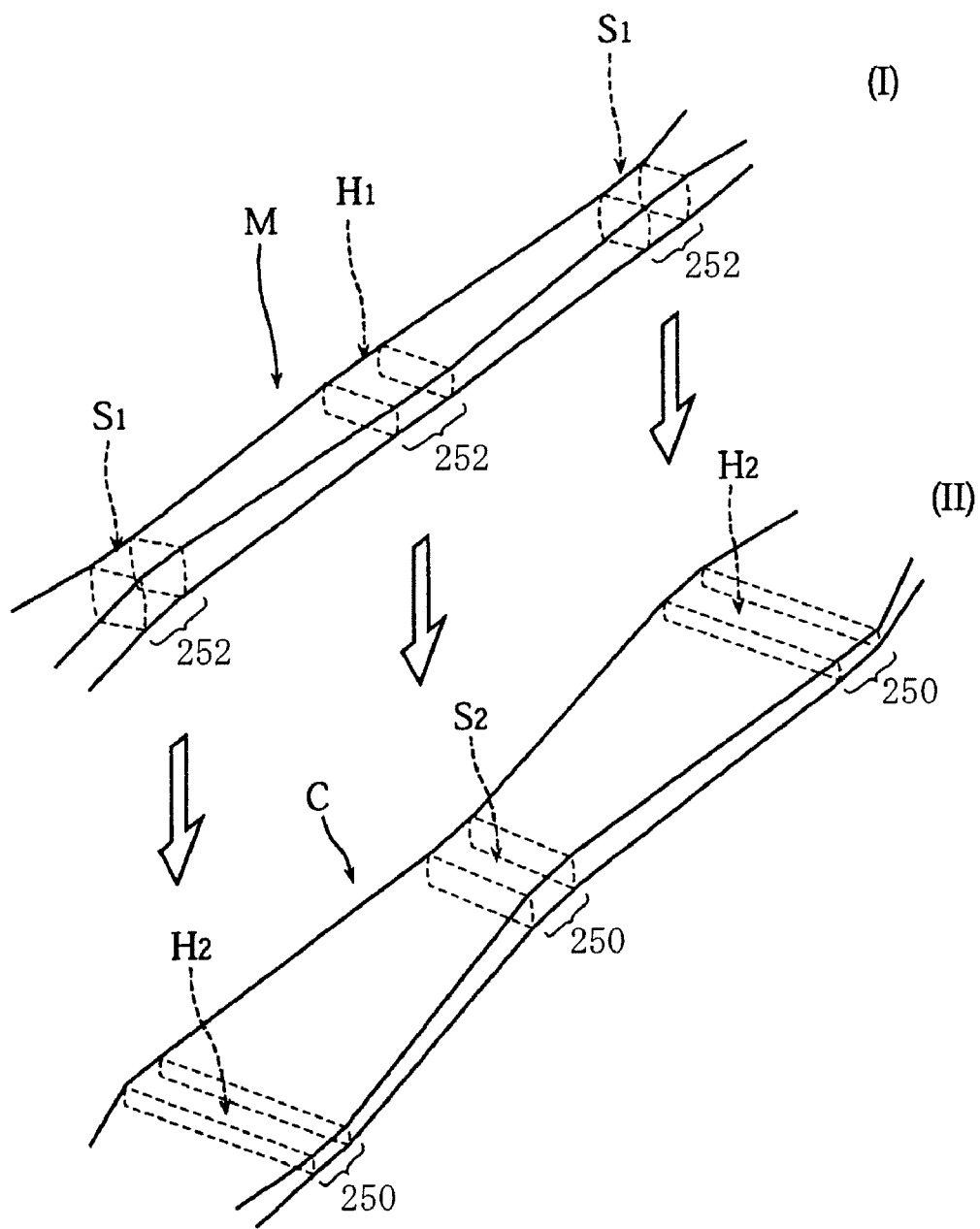

As in another embodiment shown in FIG. 40, it is also desirable that the flat-type wire C serving as a final product has transition parts 250 (of constant cross section formed over a given short length). For this purpose, the intermediate wire material M also has transition parts (parts intended for transition parts) 252 (if necessary). The transition part 250 is a part not used in a final product but necessary for the manufacture of the flat-type wire C. The transition part 250 is used, for example, as a holding region in winding a long linear material (flat-type wire) or as an extra region for length adjustment. For more detail, when, in order to cut a long flat-type wire C into given lengths and use cut pieces as final products, a flat-type wire C several times longer than the given length is manufactured and then cut into given lengths, the flat-type wire C can be cut at the transition parts 250 to adjust the length of the cut pieces at the transition parts 250 or use the transition parts 250 as holding regions of tools (jigs).

FIG. 40 can be said to be a modification of the previously stated embodiment in FIG. 27. Specifically, the final narrow parts $S_2$ and/or the final wide parts $H_2$ are formed to include regions not changing their widths and thicknesses and the regions are the transition parts 250. In this case, FIG. 40(I) shows where parts 252 intended for transition parts are previously formed in the intermediate wire material M. However, the parts 252 intended for transition parts may be dispensed with as necessary.

Figure 36:
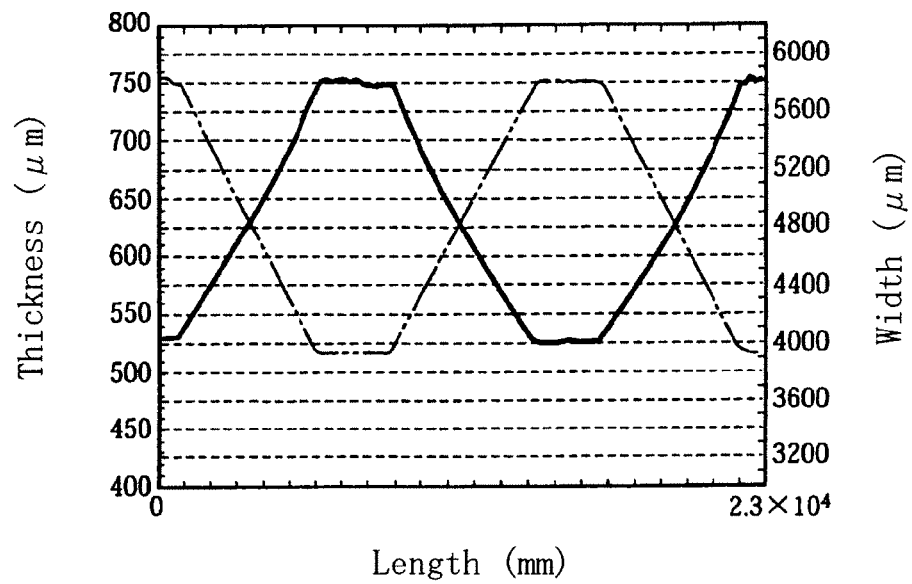
FIG. 36 is a graph.
Figure 37:
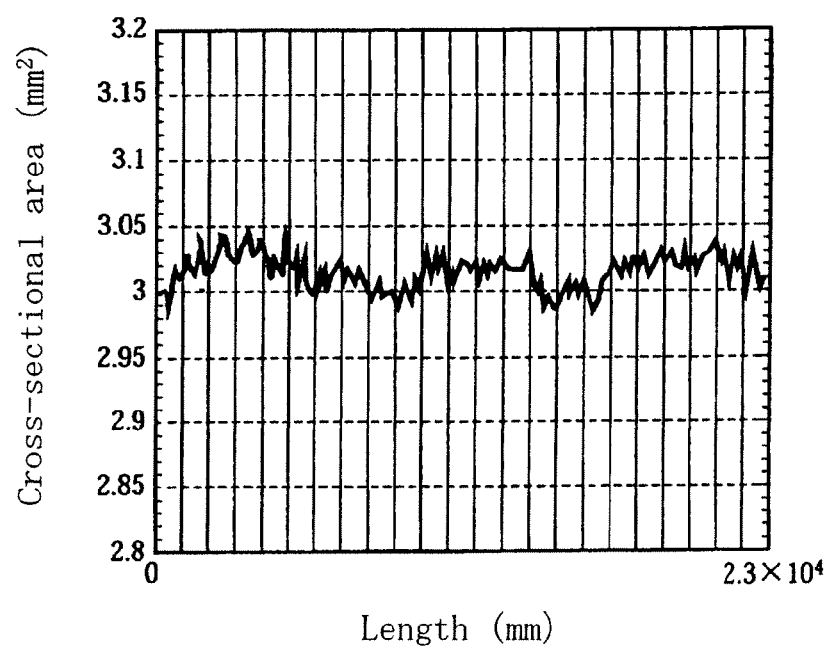
FIG. 37 is a graph.

FIGS. 36 and 37 are a graph showing the thickness and width of a flat-type wire manufactured by the manufacturing method of the present invention over the length and a graph showing the cross-sectional area of the flat-type wire over the length, respectively, and are expressed in correspondence with each other using the length of the flat-type wire as the axis of abscissa.

In FIG. 36, the solid line indicates the width, the dash-double-dot line indicates the thickness, the width and thickness alternately repeat their increase and decrease, and constant-thickness portions and constant-width portions are expressed as top flat segments and bottom flat segments, respectively, to correspond to the transition parts 250 in FIG. 40.

The flat-type wire changes its width and thickness in the longitudinal direction but, as seen from FIG. 37, its cross-sectional area takes values near to 3 mm² and is approximately constant over the length.

The following Tables 3 and 4 show data about the relations between rolling magnification and cross-sectional area of flat-type wires of different two types manufactured by the manufacturing method of the present invention. In Tables 3 and 4, the percentage in parentheses indicates the proportion of the cross-sectional area of the flat-type wire to the specified cross-sectional area thereof and the rolling magnification is a value calculated by dividing the width of the manufactured flat-type wire by the thickness thereof.

TABLE 3

| Rolling magnification | 2 mm₂ (specified cross-sectional area) |
|---|---|
| 9.28 | 2.022 mm² (101.1%) |
| 12.7 | 2.036 mm² (101.8%) |
| 16.6 | 2.029 mm² (101.5%) |

TABLE 4

| Rolling magnification | 3 mm² (specified cross-sectional area) |
|---|---|
| 5.5 | 3.016 mm² (101.5%) |
| 7.5 | 3.301 mm² (101%) |
| 10.8 | 3.026 mm² (100.9%) |

Table 3 shows data when a round wire having a constant cross-sectional area is rolled into a flat-type wire. Portions rolled at rolling magnifications of 9.28, 12.7 and 16.6 have cross-sectional areas of 2.022 mm², 2.036 mm² and 2.029 mm², respectively, which are approximately equal to the specified cross-sectional area of 2 mm².

Likewise, Table 4 shows data when a round wire is rolled into a flat-type wire. Portions rolled at rolling magnifications of 5.5, 7.5 and 10.8 have cross-sectional areas of 3.016 mm², 3.031 mm² and 3.026 mm², respectively, which are approximately equal to the specified cross-sectional area of 3 mm².

According to the conventional method for manufacturing a flat-type wire shown in Tables 1 and 2, if the rolling magnification is high, the cross-sectional area of the flat-type wire is reduced by approximately 10% with respect to the specified cross-sectional area. On the other hand, according to the method for manufacturing a flat-type wire of the present invention, even if the rolling magnification is high, the cross-sectional area of the flat-type wire is only approximately 1% different from the specified cross-sectional area.

In the above embodiment (see FIG. 28), a description is given of the metal wire D of circular cross section. However, according to the manufacturing method of the present invention, if the metal wire D has a cross section other than circular cross section, such as a rectangular cross section (including a square cross section) or another different cross section, the operations and effects as in the above embodiment can be obtained as described with reference to FIGS. 26 to 37.

FIG. 46(a) shows a front view (longitudinal cross-sectional view) of the flat-type wire C illustrated in (II) of FIG. 40, wherein the flat-type wire C has transition parts 250 (of constant thickness) and the thickness of the flat-type wire C linearly continuously changes increasingly and decreasingly. The bottom 217 is a flat surface and the top 218 includes inclined parts 219 and flat parts 220 (the flat parts 220 constitutes individual transition parts 250). In the front view shown in FIG. 46(b), the thickness of the flat-type wire C linearly continuously changes increasingly and decreasingly so that the top 218 and bottom 217 are vertically symmetric and have flat parts 220, 220 and inclined parts 219, 219. FIG. 46(b) shows that this configuration can be implemented by the above-stated manufacturing method and is also preferable.

In FIG. 46(c), the bottom 217 is a flat surface and the top 218 stepwise changes. According to the above-stated manufacturing method, this flat-type wire C can be manufactured to change the final thickness stepwise increasingly and decreasingly by controlling each pair of first and second rolling rolls (201) (201); (202) (202) to relatively and stepwise come close to and away from each other. FIG. 46(c) illustrates the case where only part of each portion of minimum thickness constitutes a transition part 250.

Next, in FIG. 46(d), the top 218 and bottom 217 are vertically symmetric and both stepwise change. According to the above-state manufacturing method, this flat-type wire C can be manufactured to change the final thickness stepwise increasingly and decreasingly as shown in the figure by controlling each pair of first and second rolling rolls (201) (201); (202) (202) to relatively and stepwise come close to and away from each other. FIG. 46(d) illustrates the case where only part of each portion of minimum thickness constitutes a transition part 250.

Figure 47:
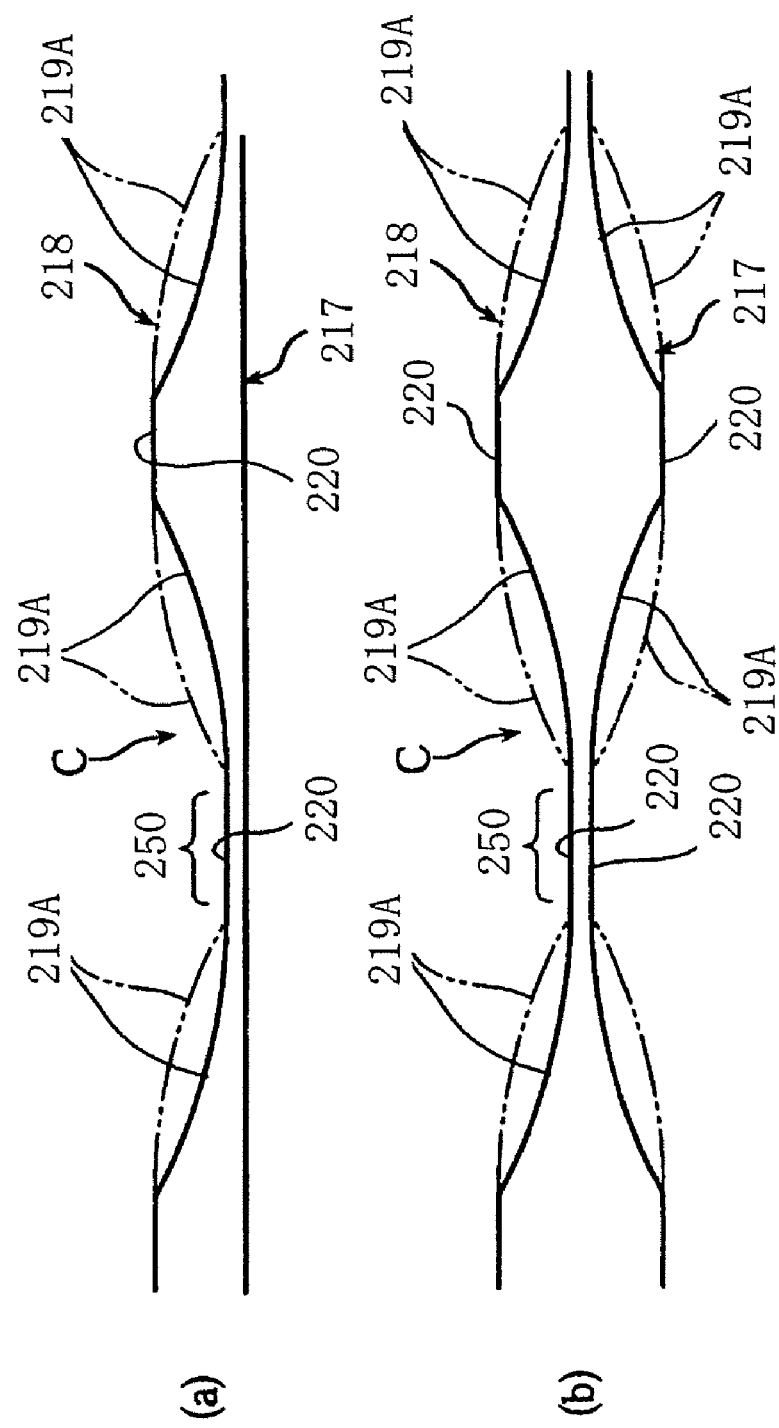
FIG. 47 is front explanatory views showing still other embodiments.

Alternatively, the thickness of the flat-type wire C may be changed over the length thereof as shown in FIG. 47(a) or 47(b). Specifically, referring to FIG. 47(a), the bottom 217 is a flat surface and the top 218 nonlinearly continuously changes up and down (increasingly and decreasingly). In other words, inclined parts 219A of the top 218 are modified in concave curved form (solid lines) or convex curved form (dash-double-dot-lines). Flat parts 220 may be additionally formed and all or some of them may constitute individual transition parts 250. On the other hand, referring to FIG. 47(*b*), the top 218 and bottom 217 are vertically symmetric and both nonlinearly continuously change up and down (increasingly and decreasingly). In other words, the top 218 and bottom 217 are formed in concave curved form shown in the solid lines or in convex curved form shown in the dash-double-dot-lines and inclined portions 219A are formed vertically symmetrically. Furthermore, flat parts 220 may be additionally formed and, if desired, all or some of them may constitute individual transition parts 250.

According to the above-state manufacturing method, the above flat-type wire can be manufactured as shown in FIGS. 47(*a*) and 47(*b*) by controlling each pair of first and second rolling rolls (201) (201); (202) (202) to relatively and stepwise come close to and away from each other.

Figure 48:
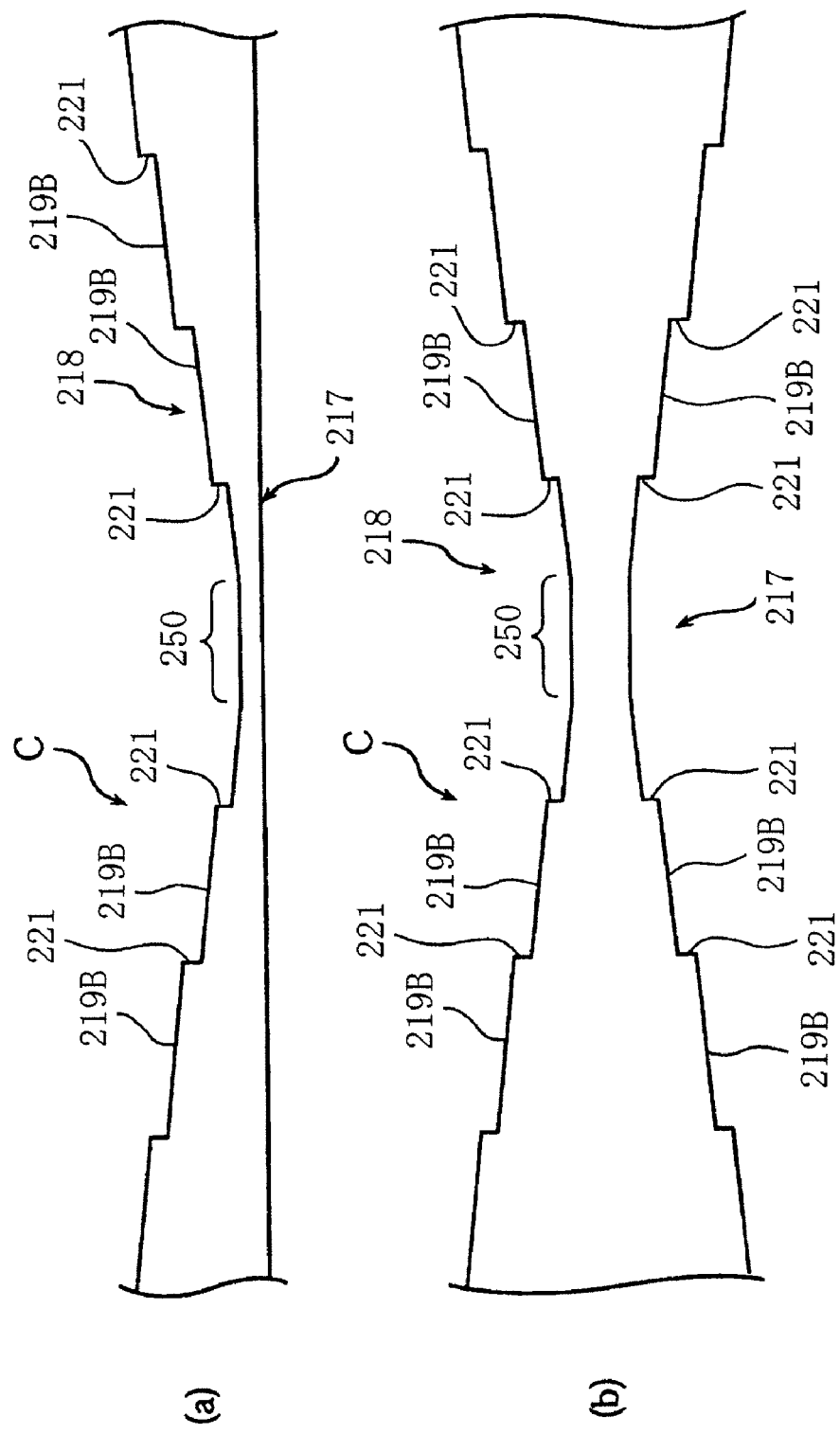
FIG. 48 is front explanatory views showing still other embodiments.

It may also be preferable to change the final thickness of the flat-type wire C increasingly and decreasingly as shown in FIG. 48(*a*) or 48(*b*). The flat-type wire C in FIG. 48(*a*) has a configuration composed of a combination of the configurations shown in FIGS. 46(*a*) and 46(*c*); the final thickness is stepwise changed increasingly and decreasingly. FIG. 48(*a*) shows a combination of the configurations shown in FIGS. 46(*a*) and 46(*c*) in which the bottom 217 is a flat surface, the top 218 stepwise changes to form steps 221 and the top of each step 221 is an inclined part 219B.

Figure 46:
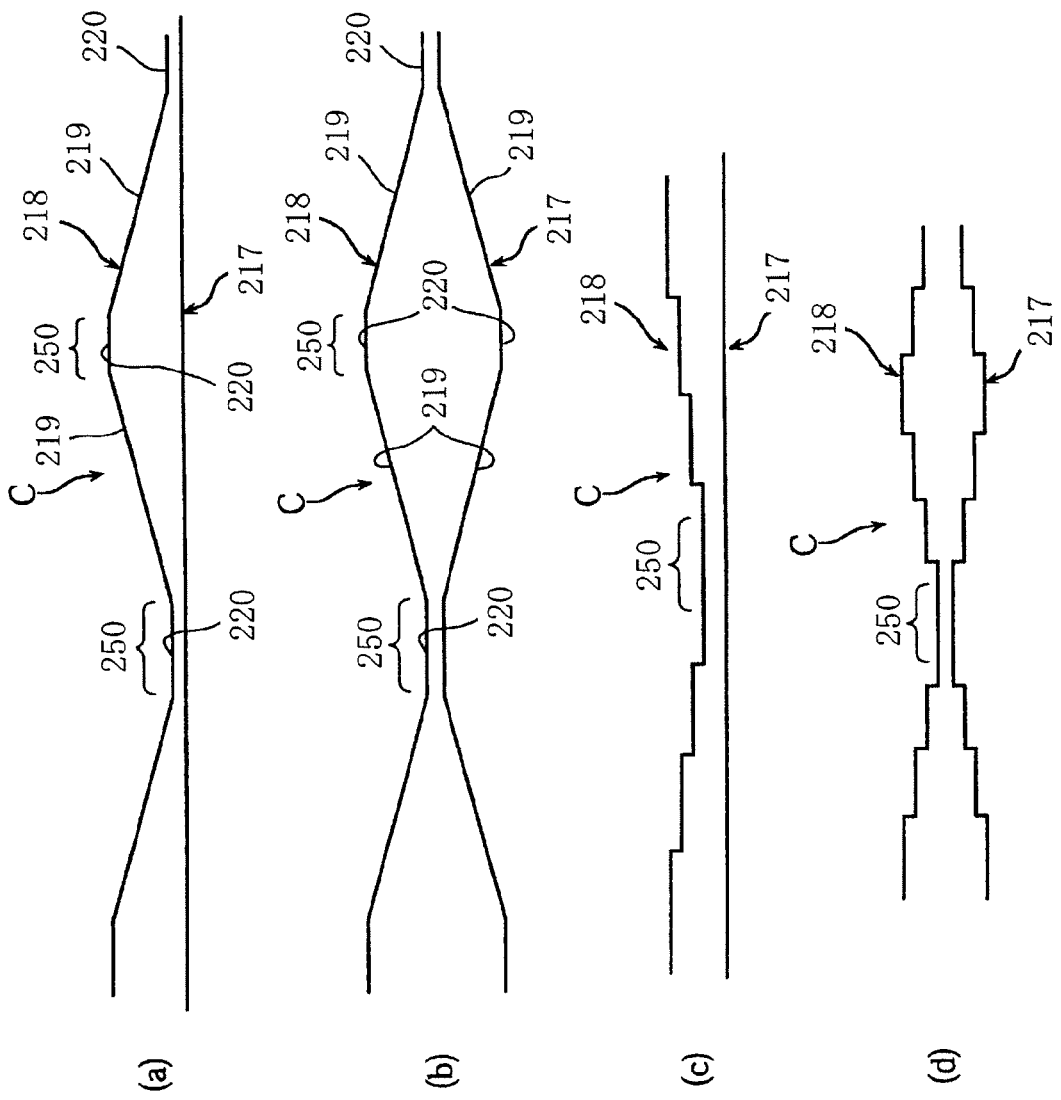
FIG. 46 is front explanatory views showing other embodiments.

The flat-type wire C in FIG. 48(*b*) has a configuration composed of a combination of the configurations shown in FIGS. 46(*b*) and 46(*d*); the final thickness is stepwise changed increasingly and decreasingly in the longitudinal direction. FIG. 48(*b*) shows a combination of the configurations shown in FIGS. 46(*b*) and 46(*d*) in which the top 218 and bottom 217 are vertically symmetrically changed, both of them stepwise change to form steps 221 and the top of each step 221 is an inclined part 219B.

According to the above-stated manufacturing method, the above flat-type wires can be manufactured to have the final thicknesses as shown in FIGS. 48(*a*) and 48(*b*) by controlling each pair of first and second rolling rolls (201) (201); (202) (202) to relatively and stepwise come close to and away from each other.

Although corresponding plan views to FIGS. 46 to 48 are not given, like the above-stated cases of FIGS. 27 to 35, each portion of large thickness has a small width, each portion of small thickness has a large width and each flat-type wire has an approximately constant cross-sectional area. In other words, the flat-type wire C is formed by rolling so that the product of its final thickness and its width is constant.

The manufacturing method of the present invention can be freely changed in configuration. For example, in FIG. 26, the formed flat-type wire C is not taken up on the take-up drum 213 but may be carried sequentially to an (unshown) electrodeposition bath, an (unshown) dryer and an (unshown) baking oven disposed downstream thereof to coat (electrodeposit) an insulating material uniformly on the outer surface of the flat-type wire C.

Each of the pair of first rolling rolls 201, 201 and the pair of second rolling rolls 202, 202 may be a pair of laterally arranged rolling rolls or each pair of rolling rolls may be controlled so that both of them come close to and away from each other.

Alternatively, it may be configured so that only one pair of rolling rolls are disposed, the pair of rolling rolls first produce an intermediate wire material M, the intermediate wire material M is once taken up and then fed to the same pair of rolling rolls, the pair of rolling rolls then produces a flat-type wire C. In this case, a single rolling roll assembly (a single pair of rolling rolls) serves as both the first rolling rolls 201, 201 and the second rolling rolls 202, 202.

Three or more rolling roll assemblies may be disposed. In such a case, the most downstream rolling rolls serve as the second rolling rolls 202, 202 and the second most downstream rolling rolls serve as the first rolling rolls 201, 201. Furthermore, the pairs of rolling rolls may be configured so that pairs of rolling rolls located more downstream have larger roll diameters.

The flat-type wire C produced as in FIG. 34 may be cut into pitches (lengths $L_2$) and wound on a stator core or, depending on the manner of winding it, may be used by changing the cut position, for example, in every two pitches or every three pitches. Although in FIG. 34 the transition parts are dispensed with as described previously, the provision of the transition parts 250 as in FIGS. 40(II) and 46 to 48 makes it easy to adjust the cut length.

Figure 41:
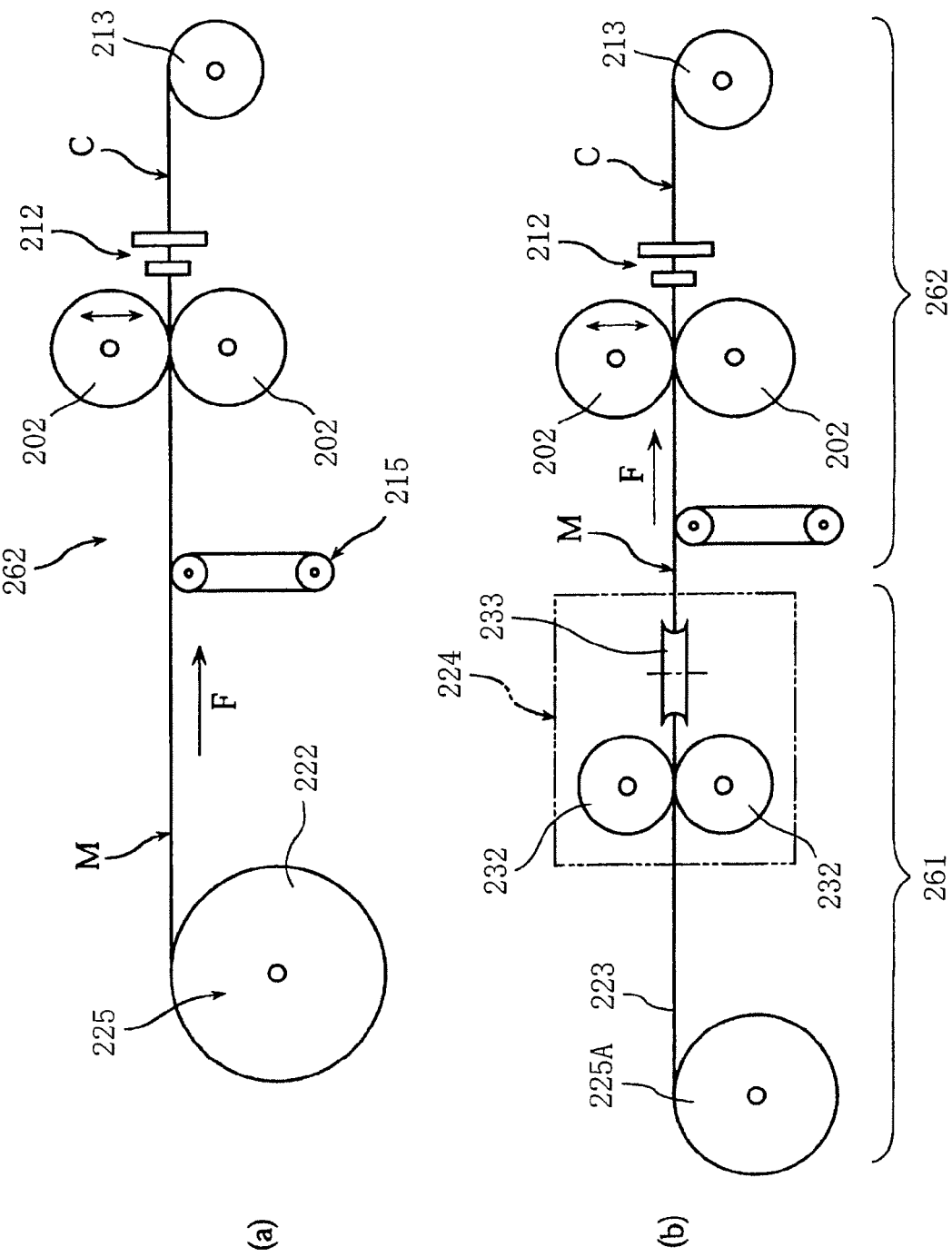
FIG. 41 is general schematic diagrams of a manufacturing method and a manufacturing system showing another embodiment of the present invention.

Next, FIGS. 41(*a*), 42 and 43 show another embodiment. Specifically, for example, as shown in FIG. 42(I), an intermediate wire material M of circular cross section continuously changing its cross-sectional area alternately increasingly and decreasingly is produced as the intermediate wire material M changing its cross-sectional area Z increasingly and decreasingly in the longitudinal direction. Assuming that this is referred to as a first step. In FIG. 41(*a*), the intermediate wire material M obtained in the first step is once taken up in the shape of a roll (into a roll 222). Then, the intermediate wire material M in a roll shape (formed of the roll 222) is fed out and subjected to a second step of rolling it with the rolling rolls 202, 202, thereby producing a flat-type wire C.

Figure 42:
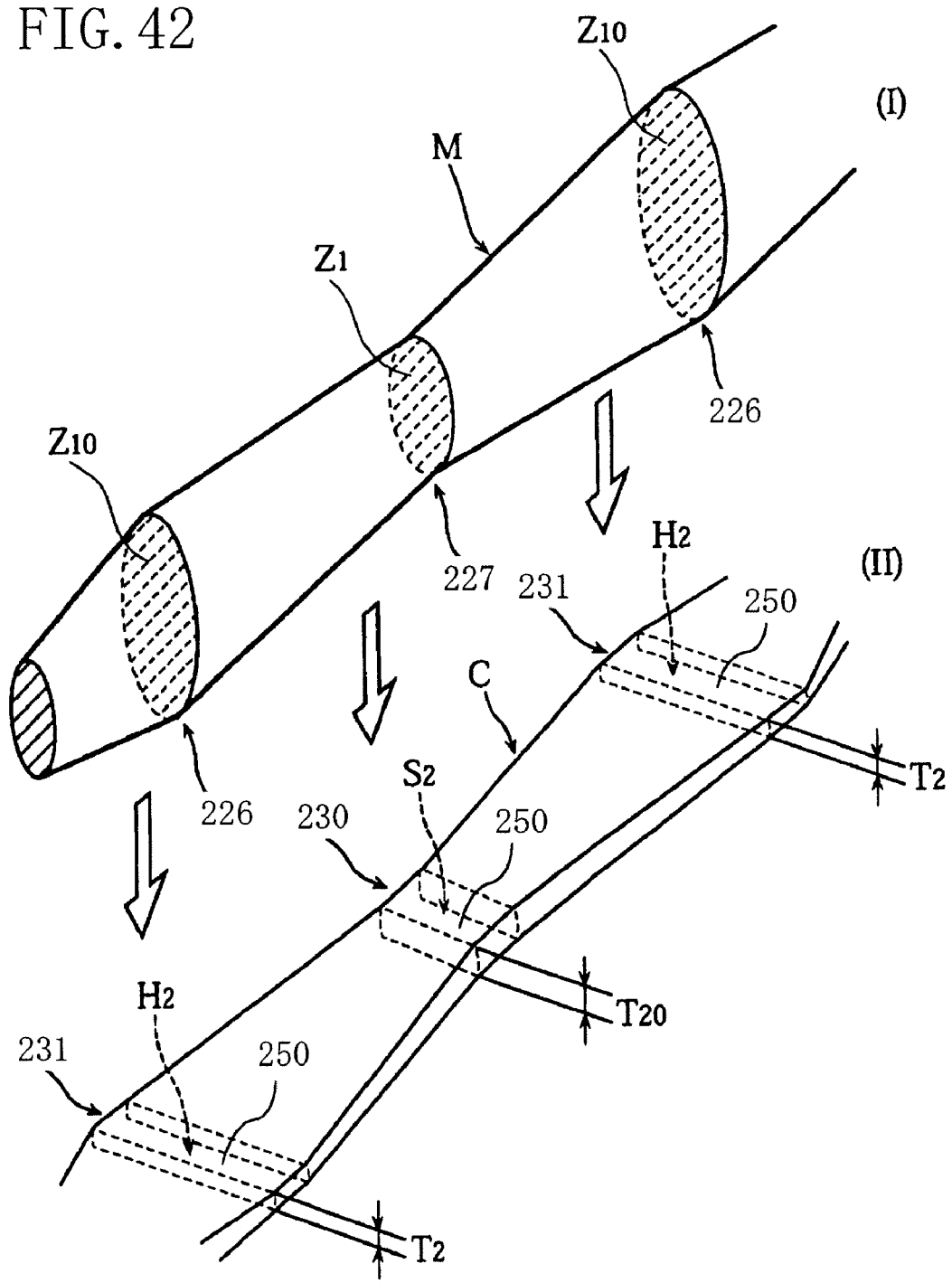
FIG. 42 is a perspective view for explanation of another embodiment.
Figure 43:
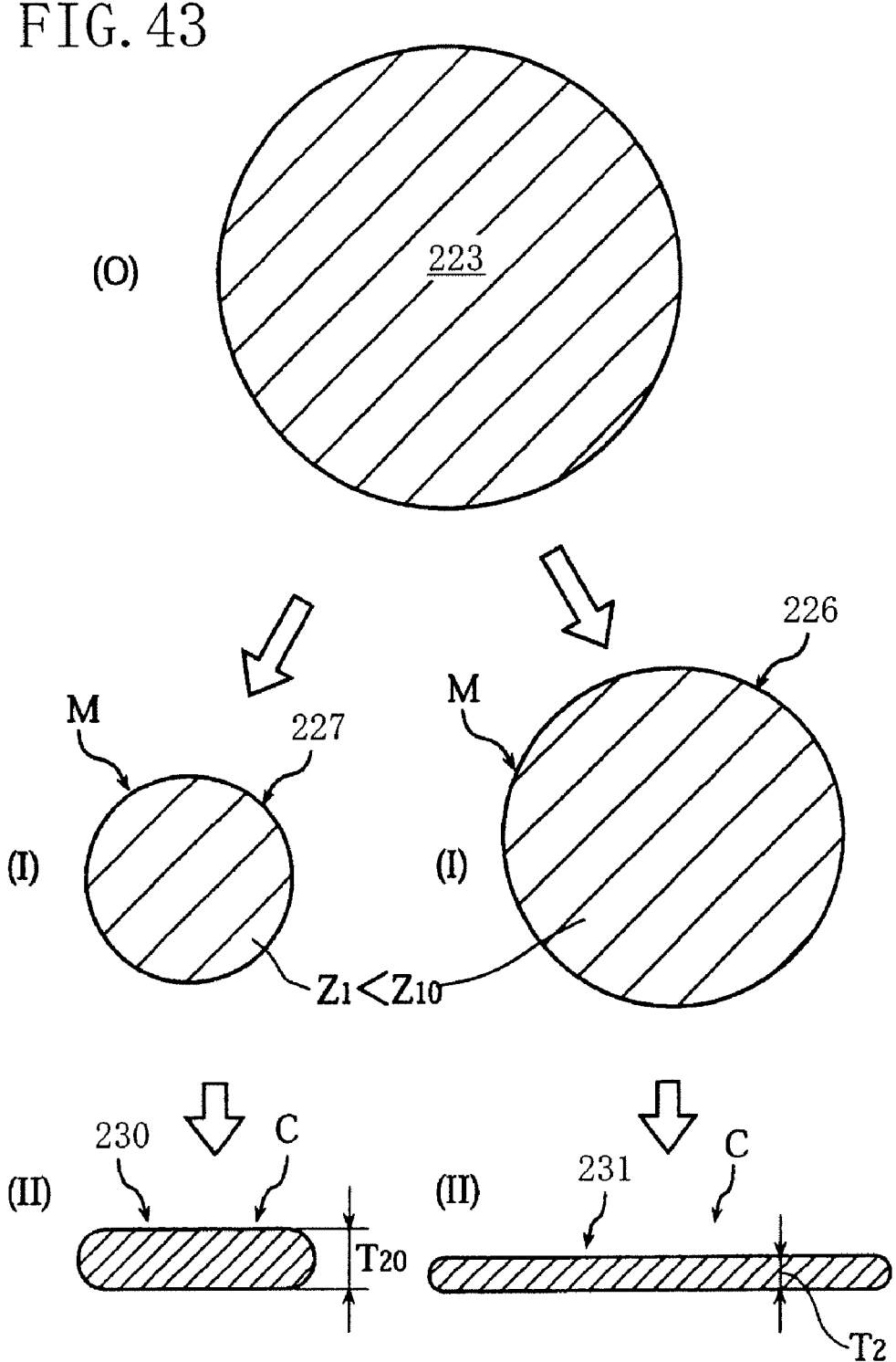
FIG. 43 is a cross-sectional view of essential parts of the above embodiment for explanation in order of steps.

Giving a further description of the first step, the round material 223 of large diameter (large cross-sectional area) shown in (O) of FIG. 43 is processed by roll forming (see the later-described roll forming device 224 in FIG. 41(*b*)) or mechanism cutting (grinding) to form an intermediate wire material M whose cross-sectional area changes alternately increasingly and decreasingly as shown in (I) of FIG. 42.

Next, a description is given of the second step. In FIG. 41, 225 denotes a feed drum around which the intermediate wire material M is wound in the shape of a roll (into a roll 222) and a take-up drum for taking up the produced flat-type wire C is shown at the right end of the figure. The intermediate wire material M is fed in the direction of arrow F. The rolling rolls 202, 202 have the same configuration and performs in the same manner as the second rolling rolls of the previously-stated embodiment (FIG. 26). Specifically, the rolling rolls 202, 202 are controlled to relatively come close to and away from each other and additionally provided with a roll controller 212. The roll controller 212 controls the distance between the rolling rolls 202, 202 and the speed at which the rolls come close to and away from each other. The rolling rolls 202, 202 are controlled so that the magnitude of its roll distance becomes inverse to the magnitude of cross-sectional area Z of portion of the intermediate wire material M to be fed.

In other words, when the intermediate wire material M is fed between the rolling rolls 202, 202, the rolling rolls 202, 202 roll the intermediate wire material M while being controlled to come close to and away from each other so that portions 226 of the intermediate wire material M of large cross-sectional area $Z_{10}$ corresponds to portions 231 of the flat-type wire C of small final thickness $T_2$ and portions 227 of the intermediate wire material M of small cross-sectional area $Z_1$ corresponds to portions 230 of the flat-type wire C of large final thickness $T_{20}$, and the rolled intermediate wire material M is then taken up by the take-up drum 213.

Since in FIG. 41(a) the intermediate wire material M is once taken up on the drum 225 and then fed out, it can be said that the first and second steps are carried out discontinuously.

On the other hand, FIG. 41(b) shows an embodiment in which a first step 261 of producing an intermediate wire material M whose cross-sectional area Z changes increasingly and decreasingly in the longitudinal direction and a second step 262 of rolling the intermediate wire material M with the rolling rolls 202, 202 are continuously carried out. Specifically, in FIG. 41(b), a (round) material 223 shown in FIG. 43 is fed out of a drum 225A around which the material 223 is wound, then processed by forming rollers 232, 232; 233, 233 from different radial directions with respect to the cross section of the material 223 to reduce its diameter and concurrently fed while changing the plastic forming rate (degree of plastic formation) so that the cross-sectional area Z changes alternately increasingly and decreasingly as illustrated in (I) of FIG. 42, and subsequently processed into a flat-type wire C by the rolling rolls 202, 202 (in the previously-stated manner).

Figure 49:
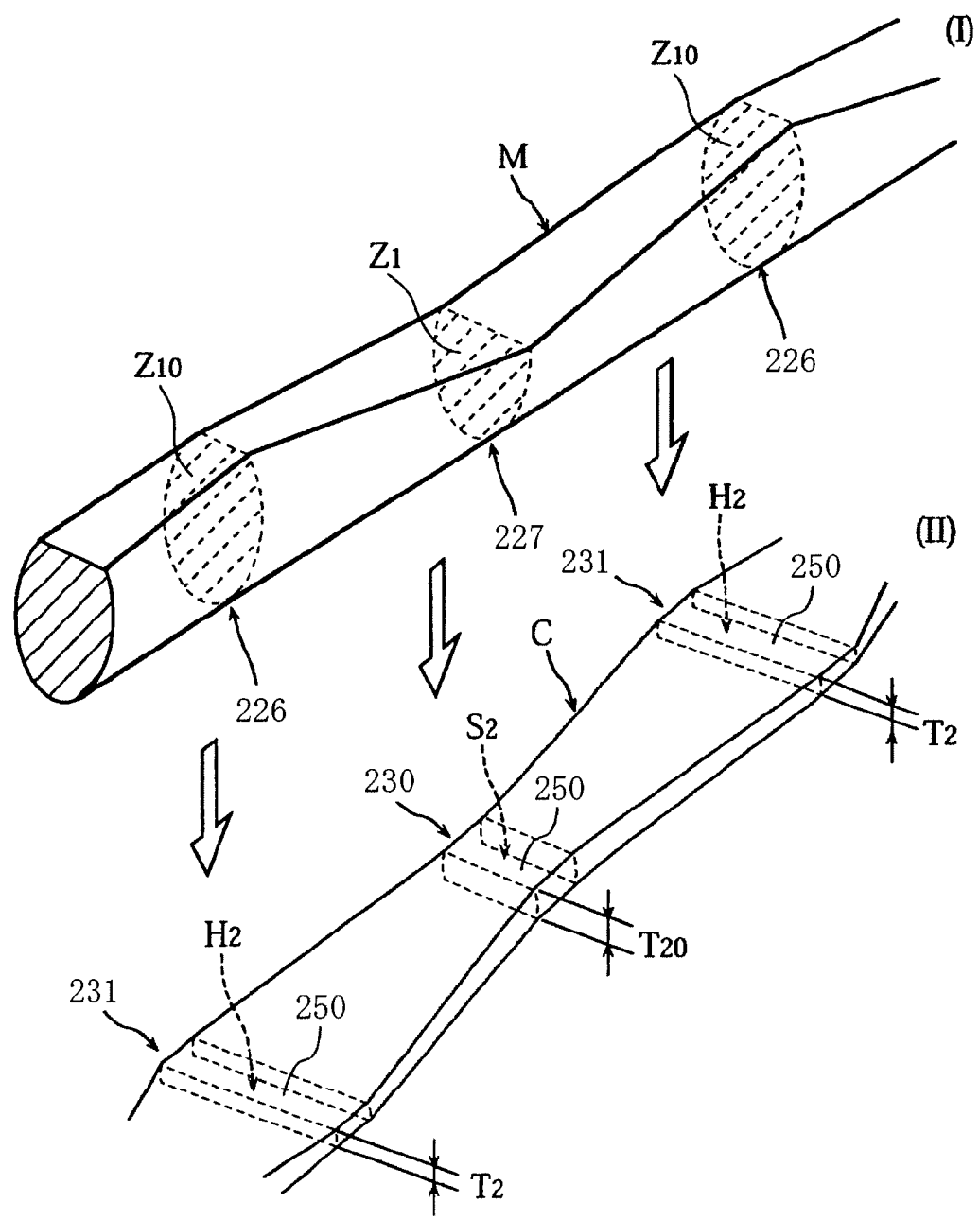
FIG. 49 is a perspective view for explanation of still another embodiment.
Figure 50:
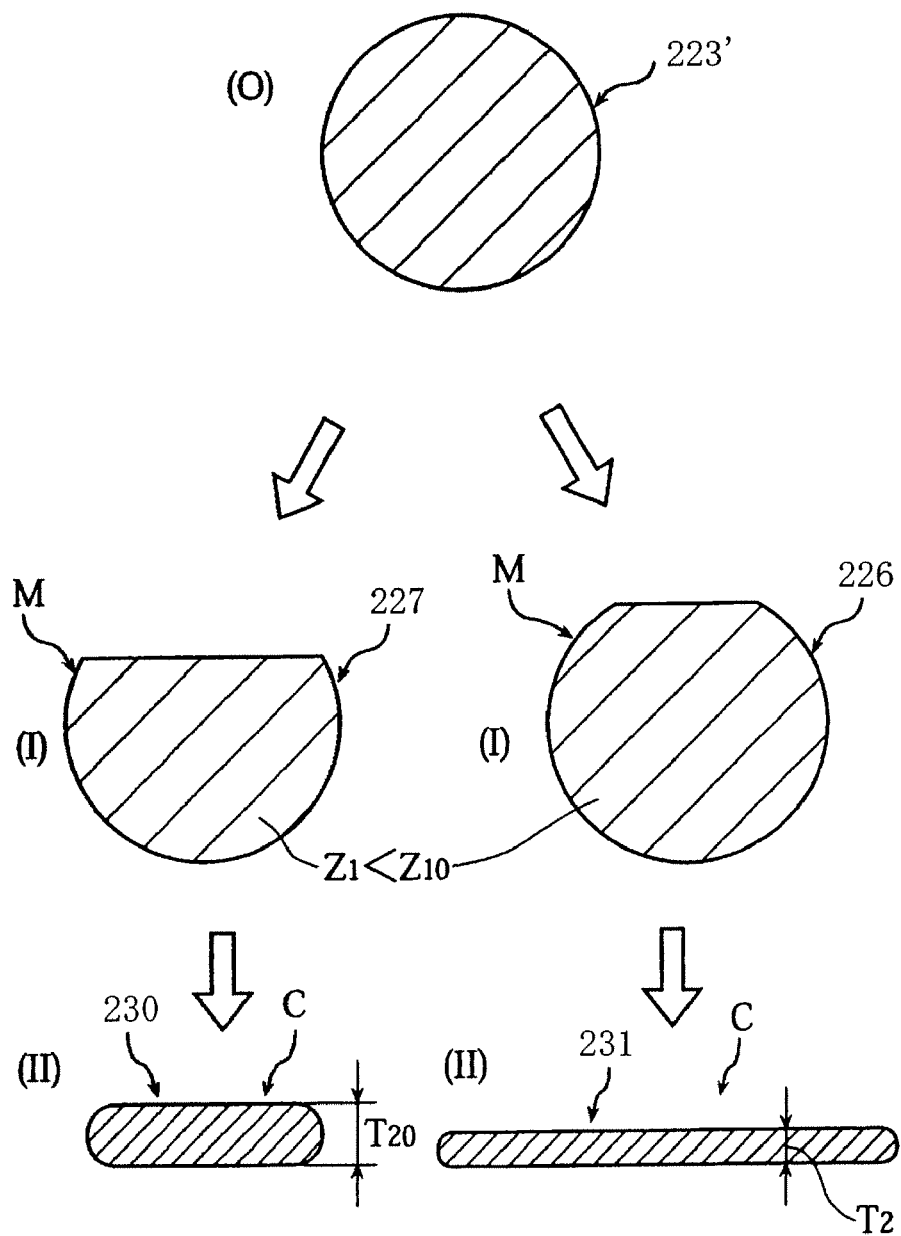
FIG. 50 is a cross-sectional view of essential parts of the above embodiment for explanation in order of steps.

Next, FIGS. 49 and 50 show still another embodiment. Specifically, as shown in (I) of FIG. 49, an intermediate wire material M having a cross section in which a cord is cut (ground) away from a circle by mechanical cutting (grinding) and which continuously changes alternately increasingly and decreasingly is produced as the intermediate wire material M changing its cross-sectional area Z increasingly and decreasingly in the longitudinal direction. Assuming that this is referred to as a first step. As shown in FIG. 41(a), the intermediate wire material M obtained in the first step is once taken up in the shape of a roll (into a roll 222). Then, the intermediate wire material M in a roll shape (formed of the roll 222) is fed out and subjected to a second step of rolling it with the rolling rolls 202, 202, thereby producing a flat-type wire C.

Giving a further description of the first step, a round material 223' shown in (O) of FIG. 50 is processed by mechanism cutting (grinding) to form an intermediate wire material M whose cross-sectional area changes alternately increasingly and decreasingly as shown in (I) of FIG. 49. Thereafter, in the second step shown in FIG. 41(a), such an intermediate wire material M is fed out of the feed drum around which it is wound in the shape of a roll (into a roll 222), the rolling rolls 202, 202 roll the intermediate wire material M in the same manner as described above while being controlled so that, as shown in (I) to (II) of FIG. 50, the distance of its roll distance becomes inverse to the magnitude of cross-sectional area Z of portion of the intermediate wire material M to be fed, and the rolled intermediate wire material M is then taken up on the take-up drum 213.

In FIG. 41(a), the first and second steps are carried out discontinuously.

Alternatively, it is also desirable that, instead of the roll forming device 224 in FIG. 41(b), a machining device for continuously changing the transverse cross section of the wire in the longitudinal direction from (O) to (I) of FIG. 50 by machining (cutting or grinding) is disposed. Thus, the first step 261 of producing an intermediate wire material M whose cross-sectional area Z changes increasingly and decreasingly in the longitudinal direction and the second step 262 of rolling the intermediate wire material M with the rolling rolls 202, 202 as shown in (I) to (II) of FIG. 50 can be continuously carried out.

As described so far, each of the embodiment of the manufacturing method of the present invention shown in FIGS. 41 to 43 and the embodiment thereof shown in FIGS. 31, 49 and 50 is a method of producing an intermediate wire material M whose cross-sectional area Z changes increasingly and decreasingly in the longitudinal direction, then feeding the intermediate wire material M to between the rolling rolls 202, 202 and rolling it while controlling the rolling rolls 202, 202 to come close to and away from each other so that the portions 226 of the intermediate wire material M having a large cross-sectional area $Z_{10}$ and the portions 227 thereof having a small cross-sectional area $Z_1$ correspond to the portions 231 of the flat-type wire C having a small final thickness $T_2$ and the portions 230 thereof having a large final thickness $T_{20}$, respectively. The previously described manufacturing method according to the embodiment shown in FIGS. 26 to 28 is also configured, (in other words), in the same manner. Therefore, in the case shown in FIGS. 26 to 28, the final product (flat-type wire C) has an approximately constant cross-sectional area according to the principle explained with reference to FIGS. 31 to 33.

FIGS. 42(II) and 49(II) illustrate the cases where transition parts 250 are formed.

Figure 44:
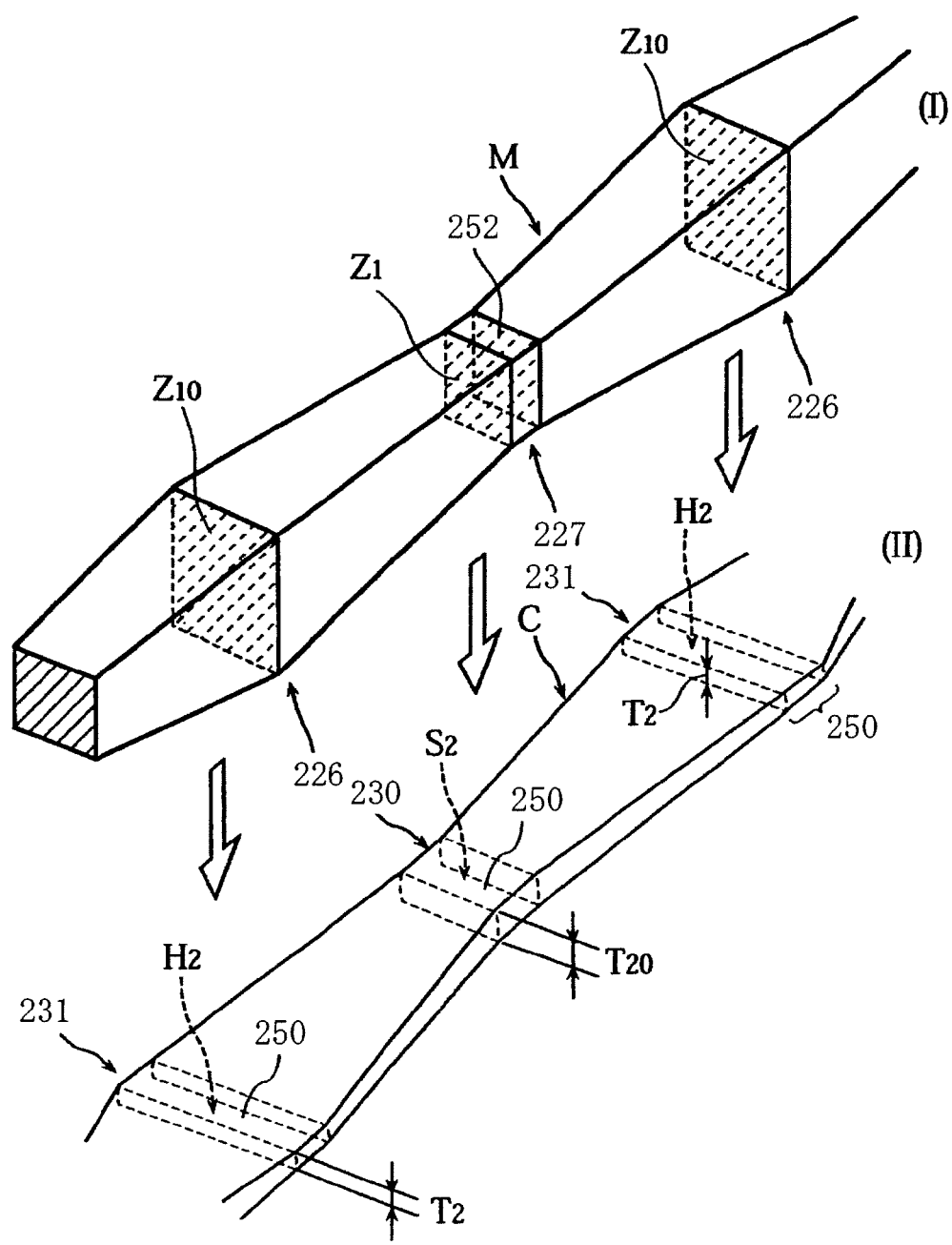
FIG. 44 is a perspective view for explanation of still another embodiment.
Figure 45:
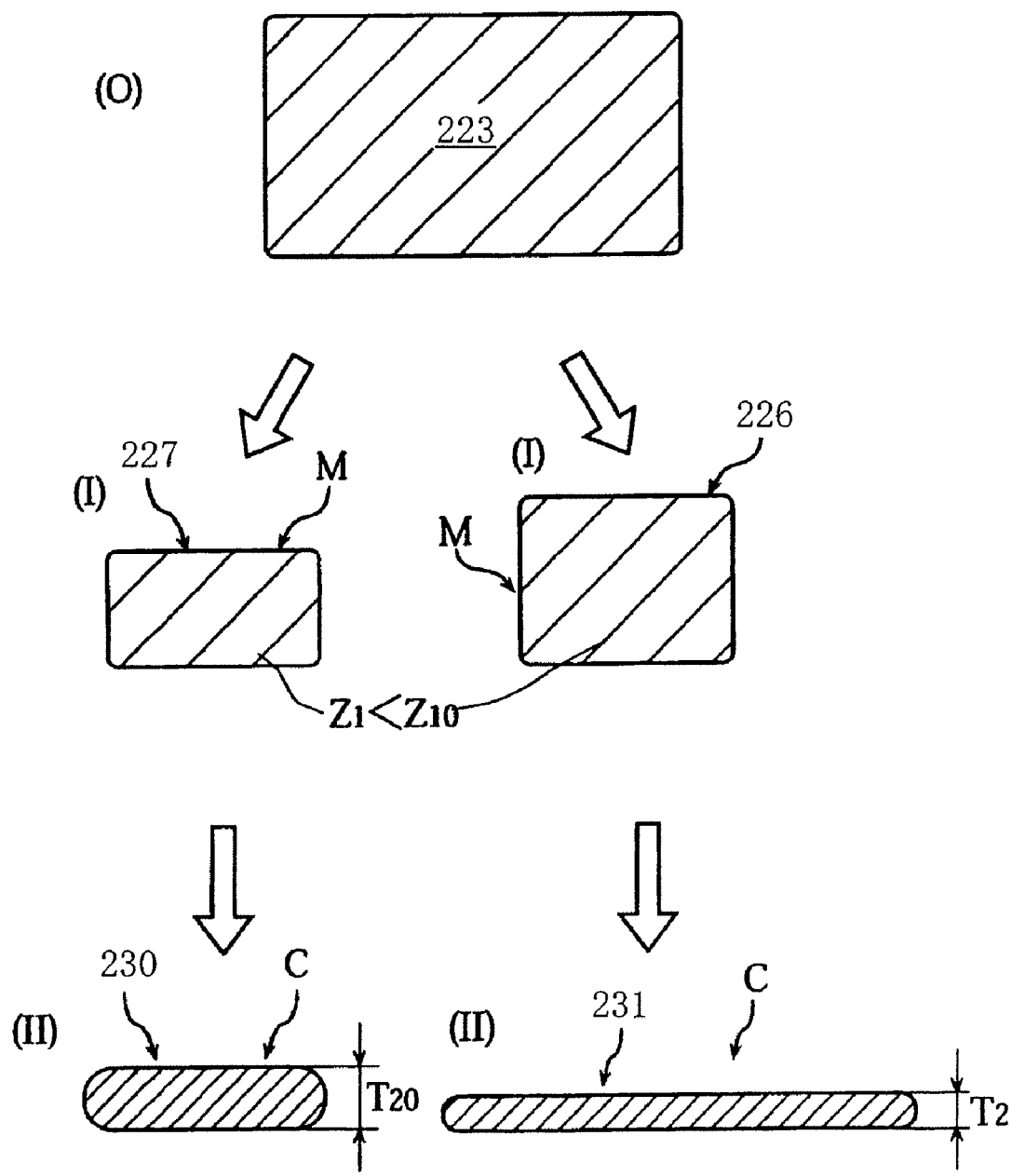
FIG. 45 is a cross-sectional view of essential parts of the above embodiment for explanation in order of steps.

Next, FIGS. 44 and 45 show still another embodiment and are corresponding views of FIGS. 42 and 43, respectively. Specifically, as shown in (I) of FIG. 44 and (O) and (I) of FIG. 45, this method is composed of a first step of producing, from a material 223 of rectangular cross section (including square cross section), an intermediate wire material M of rectangular cross section (including square cross section) whose cross-sectional area Z changes increasingly and decreasingly in the longitudinal direction and a second step of then producing a flat-type wire C from the intermediate wire material M. This method is the same as that shown in FIGS. 41, 42 and 43 except for differences in the transverse cross-sectional shapes of the intermediate wire material M and the flat-type wire C and, therefore, its detailed description is not given. Furthermore, FIGS. 44 and 45 are configured in the same manner as FIGS. 42 and 43 and, therefore, its detailed description is not given. The same reference numerals in FIGS. 44 and 45 as those in FIGS. 42 and 43 are the same parts (where FIG. 44(I) illustrates the case where parts 252 intended for transition parts are formed).

In FIG. 42(II), 44(II) or 49(I), the shape (shape in front view) of the flat-type wire C showing the thickness has, as an example, linearly increasingly and decreasingly inclined parts 219 as shown in FIGS. 46(a) and 46(b). However, also in the method shown in FIGS. 41 to 45 or the method shown in FIGS. 49 and 50, the shape in front view of the produced flat-type wire C can be designed freely as in FIGS. 46(c), 46(d), 47(a), 47(b), 48(a) and 48(b). In these cases, the intermediate wire material M may change linearly and taperedly as shown in FIGS. 42(I), 44(I) and 49(I), may change stepwise (to form steps), may change in a concave curve or a convex curve, or may have a combination of stepwise change and tapered change.

As already described, in the above first step, roll forming or mechanism cutting (grinding) is used to produce an intermediate wire material M from a material 223. However, other methods may be used. For example, the other methods include drawing process in which the drawing speed is changed or plastic forming using a swaging machine or pressing. The type of the first rolling rolls 201 and the second rolling rolls 202 is freely selected depending upon the size. For example, the rolls may be of drive type or non-drive type.

As described so far, the method for manufacturing a flat-type wire of the present invention is a method for producing an intermediate wire material M whose cross-sectional area Z changes increasingly and decreasingly in the longitudinal direction, then feeding the intermediate wire material M to between the rolling rolls 202, 202 and rolling it while controlling the rolling rolls 202, 202 to come close to and away from each other so that the portions 226 of the intermediate wire material M having a large cross-sectional area $Z_{10}$ and the portions 227 thereof having a small cross-sectional area $Z_1$ correspond to the portions 231 of the flat-type wire C having a small final thickness $T_2$ and the portions 230 thereof having a large final thickness $T_{20}$, respectively. Therefore, the intermediate wire material M can be easily produced such as by roll forming or mechanical cutting (grinding) and the flat-type wire C of desired thickness and width can be easily obtained. Furthermore, the cross-sectional area of the flat-type wire can be easily made uniform in the longitudinal direction. Therefore, the electric resistance of the entire length of the flat-type wire is uniformed, thereby providing a high-quality flat-type wire suitable for a magnet wire or the like.

Furthermore, since the first step 261 of producing an intermediate wire material M whose cross-sectional area Z changes increasingly and decreasingly in the longitudinal direction and the second step 262 of rolling the intermediate wire material M with the rolling rolls 202, 202 are continuously carried out, flat-type wires C can be continuously manufactured with high efficiency, which eliminates the need for a space for storing intermediate wire materials M.

On the other hand, in the method in which the intermediate wire material M is once taken up and then fed out to proceed to the second step 262 so that the first step 261 of producing an intermediate wire material M whose cross-sectional area Z changes increasingly and decreasingly in the longitudinal direction and the second step 262 of rolling the intermediate wire material M with the rolling rolls 202, 202 are discontinuously carried out, the production equipment for the first step of producing an intermediate wire material M and the production equipment for the second step of producing a flat-type wire C can be made optimum and the production capacity of the equipment for each of the first and second steps can be optimized, thereby increasing the production efficiency as a whole.

Furthermore, according to the method for manufacturing a flat-type wire of the present invention, in manufacturing a flat-type wire whose final thickness and final width continuously change by feeding a metal wire D of circular cross section sequentially to the pair of first rolling rolls 201, 201 and the pair of second rolling rolls 202, 202, each pair of rolling rolls controlled to relatively come close to and away from each other, the pair of first rolling rolls 201, 201 roll the intermediate wire material M so that the relation of magnitude of thickness between portions of the intermediate wire material M becomes inverse to the relation of magnitude of final thickness between corresponding portions of the flat-type wire, while being controlled to come close to and away from each other. Thus, a flat-type wire can be manufactured which changes the width and thickness but has an approximately constant cross-sectional area over the length.

Since the first rolling rolls 201, 201 produces an intermediate wire material M by rolling a metal wire D of circular cross section to form a smooth surface, the metal wire D has difficulty in running (passing) through between the first rolling rolls 201, 201 and, therefore, the amount of reduction of its cross-sectional area during the passage is large. On the other hand, since the second rolling rolls 202, 202 produces a flat-type wire by rolling the intermediate wire material M having a smooth surface already formed, the intermediate wire material M can smoothly run through between the second rolling rolls 202, 202 and, therefore, the amount of reduction of its cross-sectional area during the passage is small. Since in this manner the portions to be largely rolled is rolled by the second rolling rolls 202, 202, the reduction of cross-sectional area can be reduced and a flat-type wire C having an approximately constant cross section over the length can be manufactured.

The conventional manufacturing method has a disadvantage that since the flat-type wire has a nonuniform cross-sectional area, its current-carrying capability as a whole is limited to the current-carrying capability of its portions of minimum cross-sectional area. In contrast, according to the manufacturing method of the present invention, the electric resistance of the entire length of the flat-type wire can be uniformed, which enables continuous manufacture of a high-performance flat-type wire (magnet wire).

Furthermore, with a simple modification of the existing equipment, the flat-type wire can be inexpensively manufactured by the method of the present invention.

Furthermore, a flat-type wire whose final thickness and final width continuously change is formed by feeding a metal wire D of circular cross section to between the first rolling rolls 201, 201 controlled to relatively come close to and away from each other, thereby forming an intermediate wire material M whose thickness and width continuously change, and then feeding the intermediate wire material M to between the second rolling rolls 202, 202 while controlling the second rolling rolls 202, 202 to relatively come close to and away from each other so that the relation of magnitude of thickness between portions of the intermediate wire material M becomes inverse to the relation of magnitude of the roll distance $X_2$. Thus, a flat-type wire can be manufactured which changes the width and thickness but has an approximately constant cross-sectional area over the length.

Since the first rolling rolls 201, 201 produces an intermediate wire material M by rolling a metal wire D of circular cross section to form a smooth surface, the metal wire D has difficulty in running (passing) through between the first rolling rolls 201, 201 and, therefore, the amount of reduction of its cross-sectional area during the passage is large. On the other hand, since the second rolling rolls 202, 202 produces a flat-type wire by rolling the intermediate wire material M having a smooth surface already formed, the intermediate wire material M can smoothly run through between the second rolling rolls 202, 202 and, therefore, the amount of reduction of its cross-sectional area during the passage is small. Since in this manner the portions to be largely rolled is rolled by the second rolling rolls 202, 202, the reduction of cross-sectional area can be reduced and a flat-type wire C having an approximately constant cross section over the length can be manufactured.

The conventional manufacturing method has a disadvantage that since the flat-type wire has a nonuniform cross-sectional area, its current-carrying capability as a whole is limited to the current-carrying capability of its portions of minimum cross-sectional area. In contrast, according to the manufacturing method of the present invention, the electric resistance of the entire length of the flat-type wire can be uniformed, which enables continuous manufacture of a high-performance flat-type wire (magnet wire).

Furthermore, with a simple modification of the existing equipment, the flat-type wire can be inexpensively manufactured by the method of the present invention.

In addition, since the roll diameter $R_2$ of the second rolling rolls 202, 202 is larger than the roll diameter $R_1$ of the first rolling rolls 201, 201, the ratio of reduction of cross-sectional area of the metal wire (intermediate wire material M) due to their rolling can be smaller than the ratio of reduction of cross-sectional area of the metal wire D due to the rolling of the first rolling rolls 201, 201.

In other words, as the roll diameter is larger, the contact surface between the metal wire and the roll becomes smoother and the metal wire can more easily pass through between the rolls. Therefore, the second rolling rolls 202, 202 of larger diameter is more likely to pass the metal wire (intermediate wire material M) therebetween than the first rolling rolls 201, 201 of smaller diameter and can reduce the reduction of cross-sectional area during the passage (rolling).

Next, a description is given of still another embodiment of the present invention for the method for manufacturing a flat-type wire.

Figure 51:
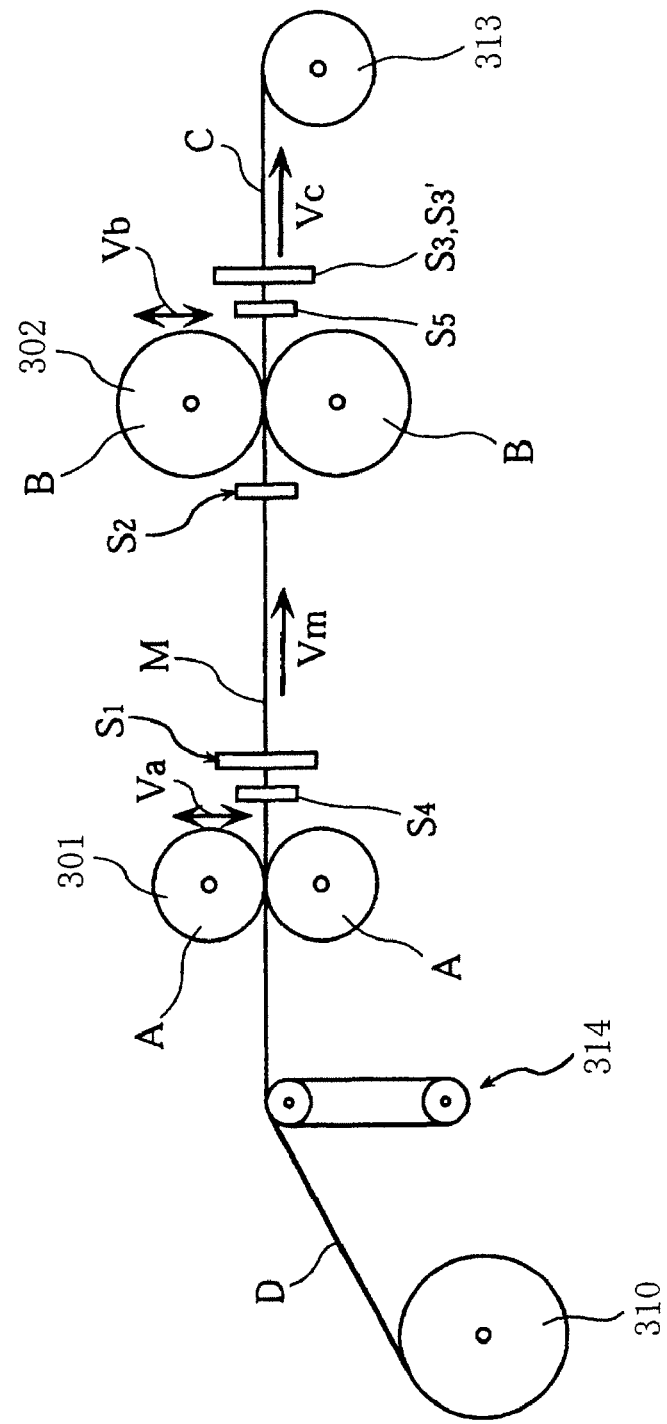
FIG. 51 is a schematic explanatory view of an embodiment of the present invention.
Figure 52:
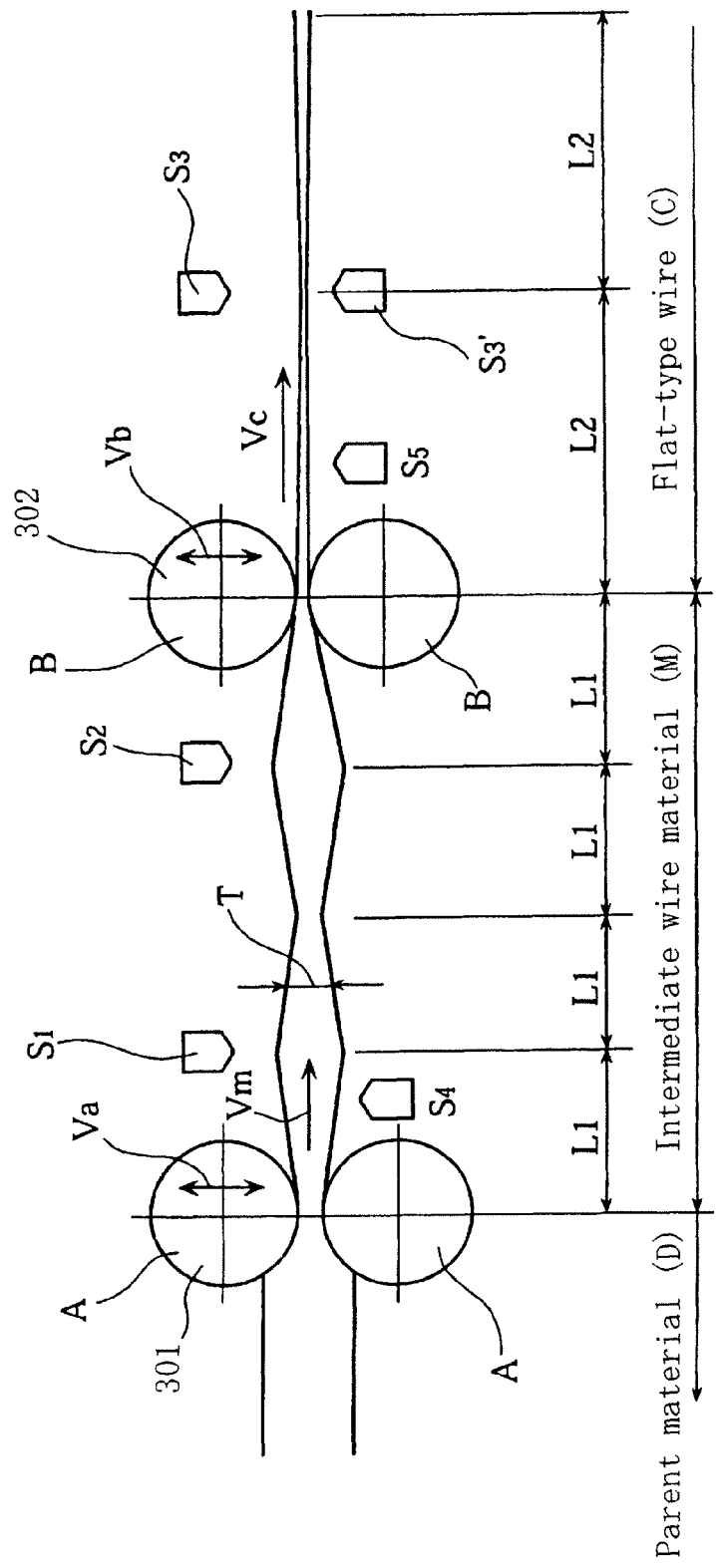
FIG. 52 is an explanatory view showing the configuration of an essential part of the above embodiment.

FIG. 51 is a general diagram illustrating a method for manufacturing a flat-type wire according to the present invention and FIG. 52 is a diagram illustrating an essential part of the above method. In FIG. 51, 310 at the left end denotes a feed drum around which a metal wire D of circular cross section serving as a parent material, such as copper, is wound, and 313 at the right end denotes a take-up drum for taking up a flat-type wire (product) C manufactured. The metal wire D and the flat-type wire C are fed from the left to the right in the figures. On the way from the feed drum 310 to the take-up drum 313, a pair of first rolling rolls A, A and a pair of second rolling rolls B, B are disposed in upstream to downstream order. Each of the pair of first rolling rolls A, A and the pair of second rolling rolls B, B are controlled to relatively come close to and away from each other, the arrows Va and Vb denotes the respective distance change speeds of the pair of first rolling rolls A, A and the pair of second rolling rolls B, B. In this embodiment, only the upper rolls 301 and 302 of the vertical pair of first rolling rolls A, A and the vertical pair of second rolling rolls B, B are configured to move up and down. The arrows Va and Vb are referred to also as the traveling speeds of (the upper rolls 301 and 302) of the first and second rolling rolls A and B. 314 denotes a tension controller.

Figure 53:
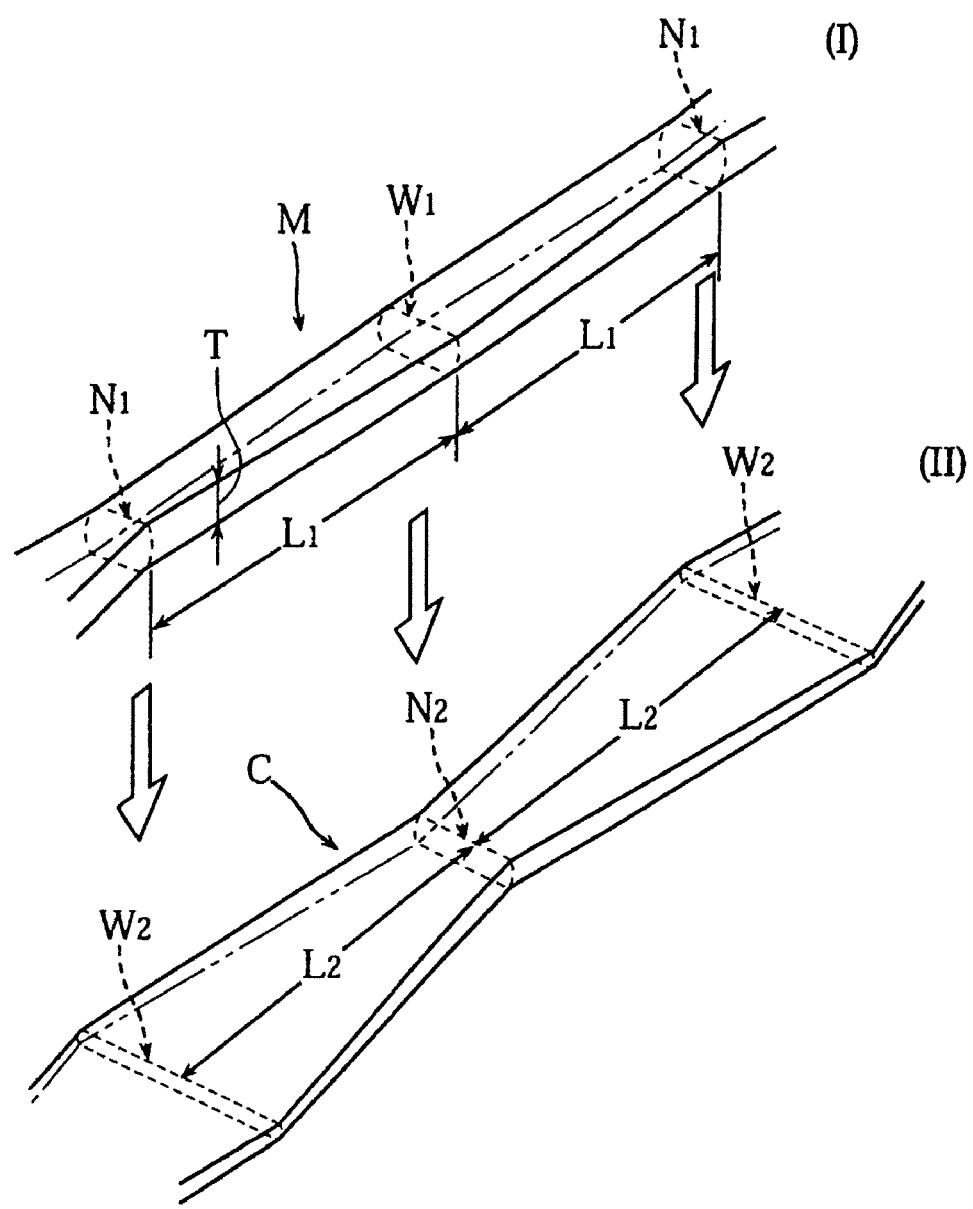
FIG. 53 is a perspective view for explanation, wherein (I) is a perspective view of an intermediate wire material and (II) is a perspective view of a flat-type wire.

Referring to FIG. 51, when a metal wire D having a constant circular cross section over the length is fed out of the feed drum 310, fed to between the first rolling rolls A, A controlled to relatively come close to and away from each other, and rolled by them, an intermediate wire material M is formed that periodically and continuously changes its thickness and width increasingly and decreasingly (over its length) as shown in (I) of FIG. 53. FIGS. 52 and 53 show that the thickness T of the intermediate wire material M changes from small to large thicknesses and then from large to small thicknesses at a predetermined pitch $L_1$.

Subsequently, the intermediate wire material M is fed to the second rolling rolls B, B. The second rolling rolls B, B are controlled to relatively come close to and away from each other so that the magnitude of its roll distance becomes inverse to the magnitude of thickness T of portion of the intermediate wire material M to be fed. In other words, the second rolling rolls B, B are controlled so that according to whether the thickness T of the intermediate wire material M increases or decreases, the distance between the second rolling rolls B, B contrariwise decreases or increases. By rolling the intermediate wire material M with the second rolling rolls B, B in this manner, a flat-type wire C is manufactured that periodically and continuously changes its final thickness and width (over the length) as shown in (II) of FIG. 53.

In other words, as shown in (I) and (II) of FIG. 53, the intermediate wire material M is rolled by the second rolling rolls B, B so that portions thereof having a larger thickness T becomes thinner. In still other words, through the control on the distance between the first rolling rolls A, A, the intermediate wire material M is formed, by rolling, with a thickness whose magnitude is inverse to the magnitude of the final thickness of the flat-type wire C.

As shown in FIG. 53, the intermediate wire material M has preliminary narrow parts $N_1$ of large thickness T and small width and preliminary wide parts $W_1$ of small thickness T and large width formed alternately and periodically at a predetermined pitch $L_1$, while the flat-type wire C has final wide parts $W_2$ of small thickness and large width and final narrow parts $N_2$ of large thickness and small width formed alternately and periodically at a predetermined pitch $L_2$.

As shown in FIG. 52, the predetermined pitch $L_2$ of the flat-type wire C after passage through between the second rolling rolls B, B is (much) larger than the predetermined pitch $L_1$ (of the intermediate wire material M) before the passage. However, in FIG. 53 (and the later-described FIG. 56), both the pitches $L_1$ and $L_2$ are (falsely) expressed to be the same dimension for convenience of explanation of the correspondence between the narrow parts and the wide parts.

Figure 54:
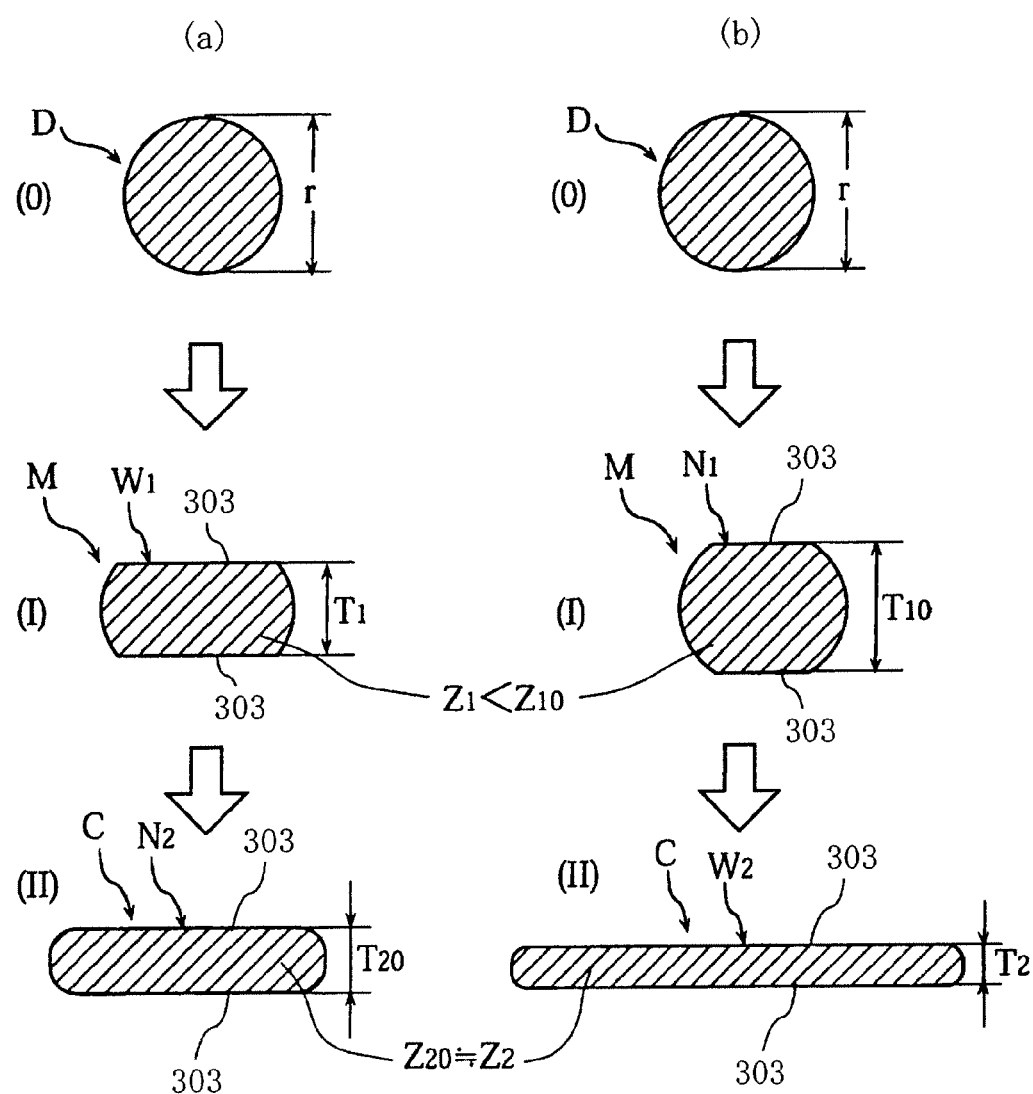
FIG. 54 is a cross-sectional view of essential parts.

FIG. 54 is cross-sectional views showing the flow of the rolling step of forming a metal wire D into an intermediate wire material M and then into a flat-type wire C, wherein 54(a) shows the way of change of the metal wire D to the preliminary wide parts $W_1$ and to the final narrow parts $N_2$ and 54(b) shows the way of change of the metal wire D to the preliminary narrow parts $N_1$ and to the final wide parts $W_2$. In FIGS. 54(a) and 54(b), (O) shows the transverse cross section of the metal wire D before being rolled, (I) shows the transverse cross section of the intermediate wire material M formed by rolling of the first rolling rolls A, A, and (II) shows the transverse cross section of the flat-type wire C formed by rolling of the second rolling rolls B, B.

Furthermore, as shown in FIGS. 51 and 52, thickness measuring instruments $S_1$, $S_2$, $S_3$ and $S_{3'}$ and speed measuring instruments $S_4$ and $S_5$ are disposed. The locations and operations of these instruments will be described later.

Figure 55:
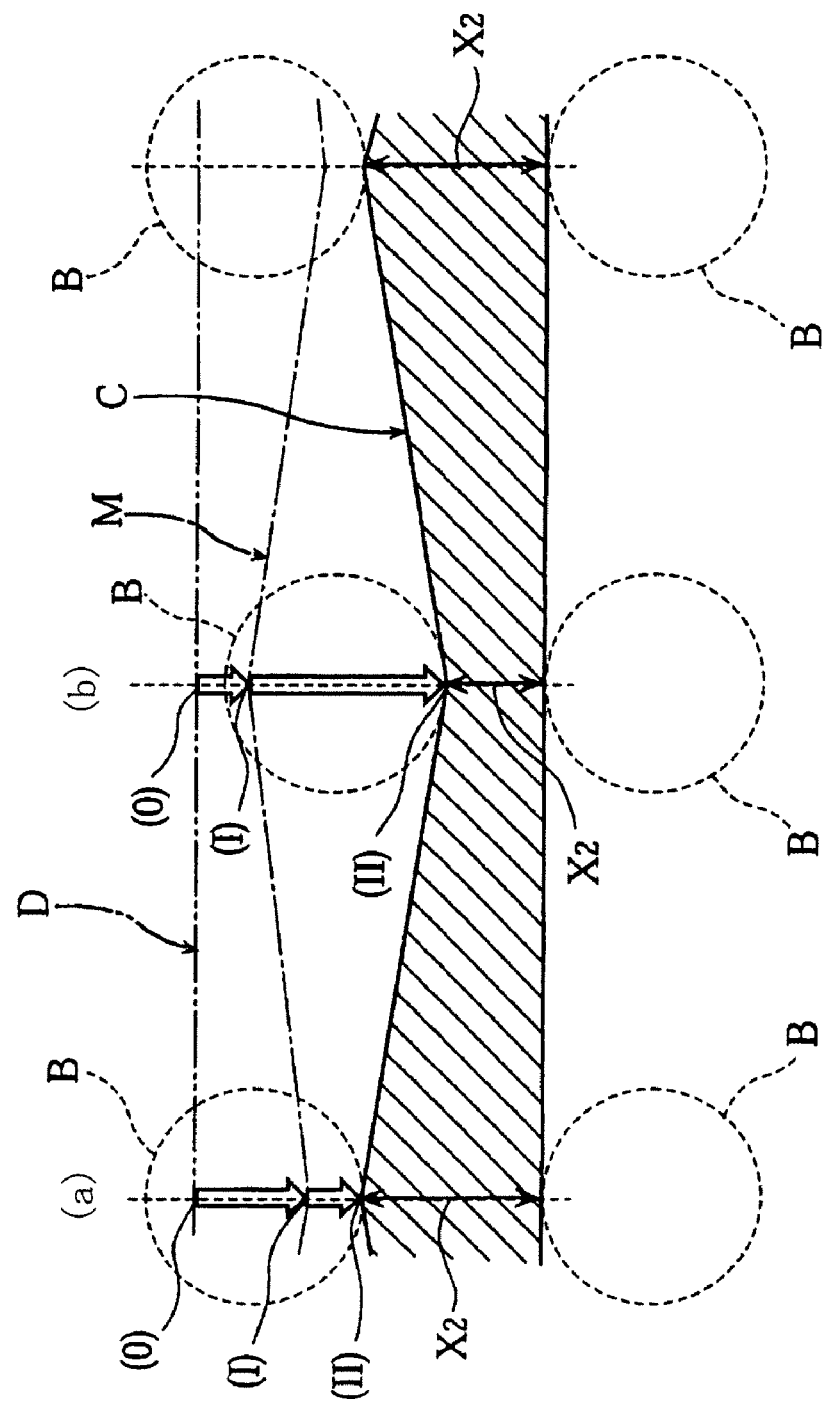
FIG. 55 is a schematic diagram for explaining plastic deformation due to rolling.

FIG. 55 is a diagram collectively expressing rolling (deforming) processes from the metal wire D to the intermediate wire material M and then to the flat-type wire C, wherein the dash-double-dot line denotes the upper edge of the metal wire D, the dash-single-dot-line denotes the upper edge of the intermediate wire material M (a surface thereof pressed by the upper roll 302) and the flat-type wire C is expressed by the solid and hatched lines. The lower edges of the metal wire D and the intermediate wire material M are shown superposed on the lower edge of the flat-type wire C.

In FIG. 55, the change with time of the roll distance $X_2$ between the second rolling rolls B, B is expressed in the direction from right to left. As seen from the figure, the second rolling rolls B, B are controlled to decrease the roll distance $X_2$ as the thickness of the intermediate wire material M increases (from the right end towards the midpoint) and to then increase the roll distance $X_2$ as the thickness thereof decreases (from the midpoint to the left end).

Figure 56:
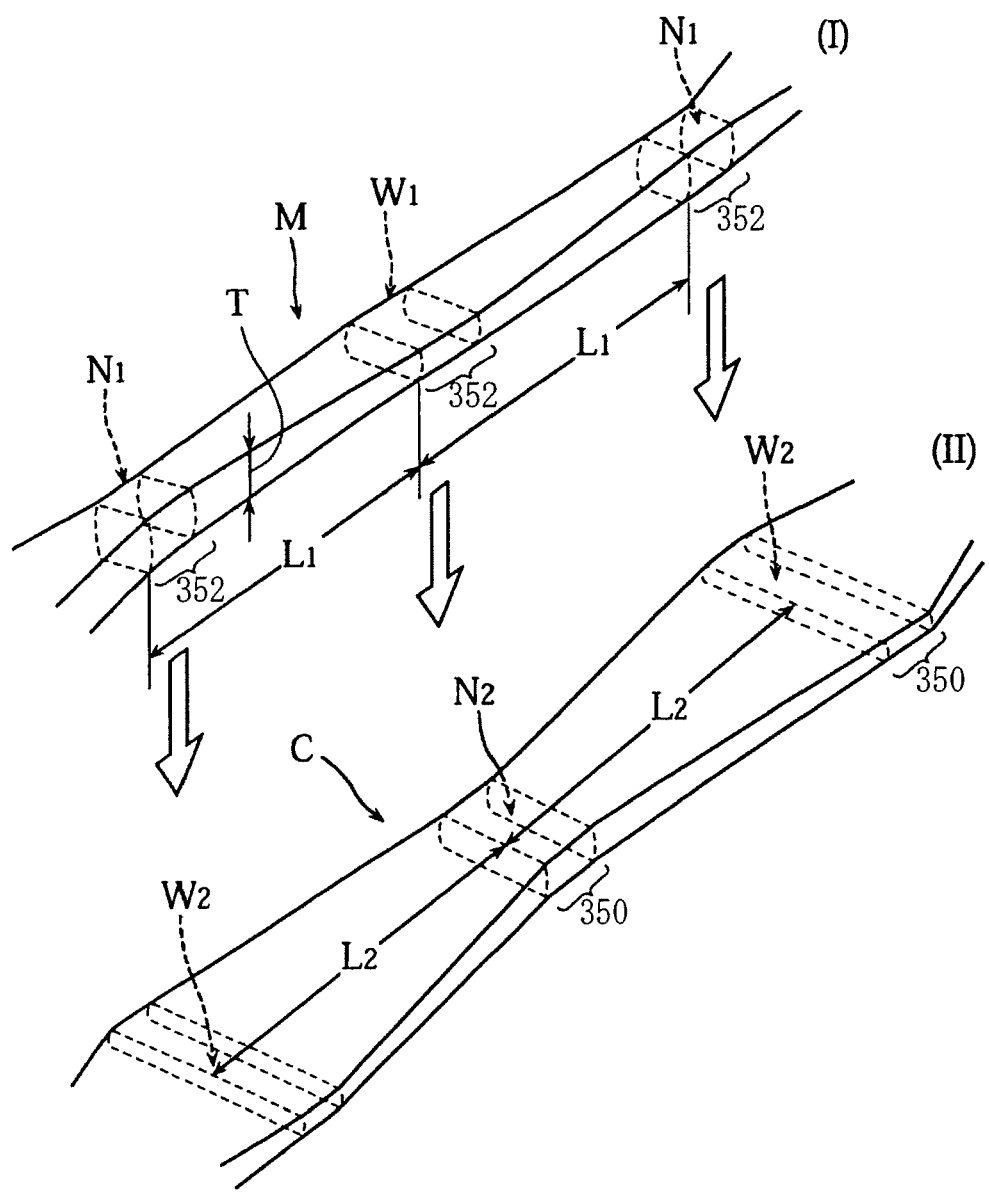
FIG. 56 is a perspective view for explanation showing another embodiment.

Next, FIG. 56 shows another embodiment (alternative to the embodiment shown in FIG. 53), wherein the flat-type wire C serving as a final product has "transition parts 350" each formed in a constant cross-sectional shape over a short length. Furthermore, the intermediate wire material M also has transition parts (parts intended for transition parts) 352 (if necessary). In this case, the pitch $L_1$ of the intermediate wire material M and the pitch $L_2$ of the flat-type wire C are longer than those shown in FIG. 53 by the lengths of the transition parts 352 and 350, respectively. The transition part 350 is a part not used in a final product but necessary for the manufacture of the flat-type wire C. The transition part 350 is used, for example, as a holding region in winding a long linear material (flat-type wire) or as an extra region for length adjustment. For more detail, when, in order to cut a long flat-type wire C into given lengths and use cut pieces as final produces a flat-type wire C several times longer than the given length is manufactured and then cut into given lengths, the flat-type wire C can be cut at the transition parts 350 to adjust the length of the cut pieces at the transition parts 350 or use the transition parts 350 as holding regions of tools (jigs).

Figure 57:
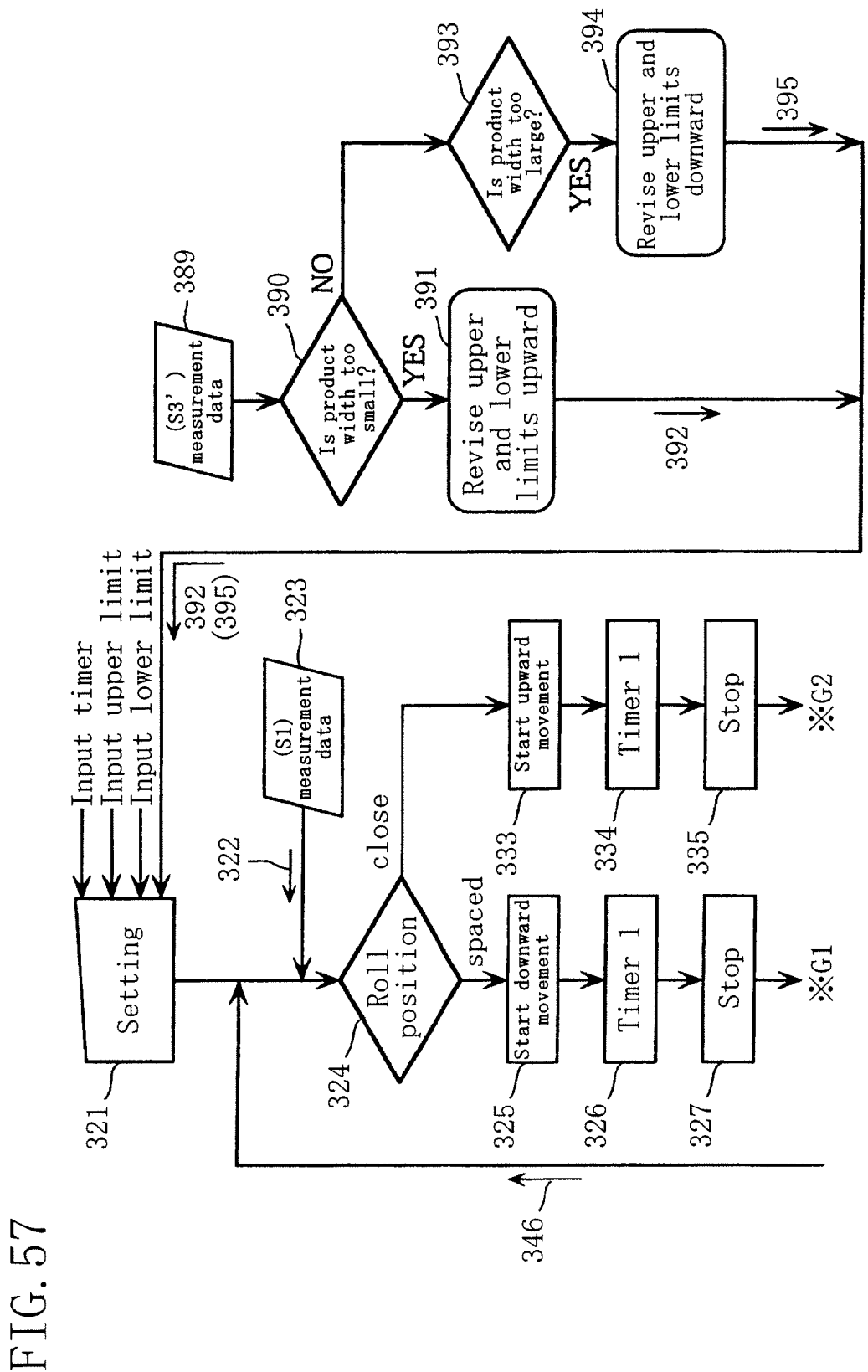
FIG. 57 is a flow chart of control on the first rolling roll.
Figure 58:
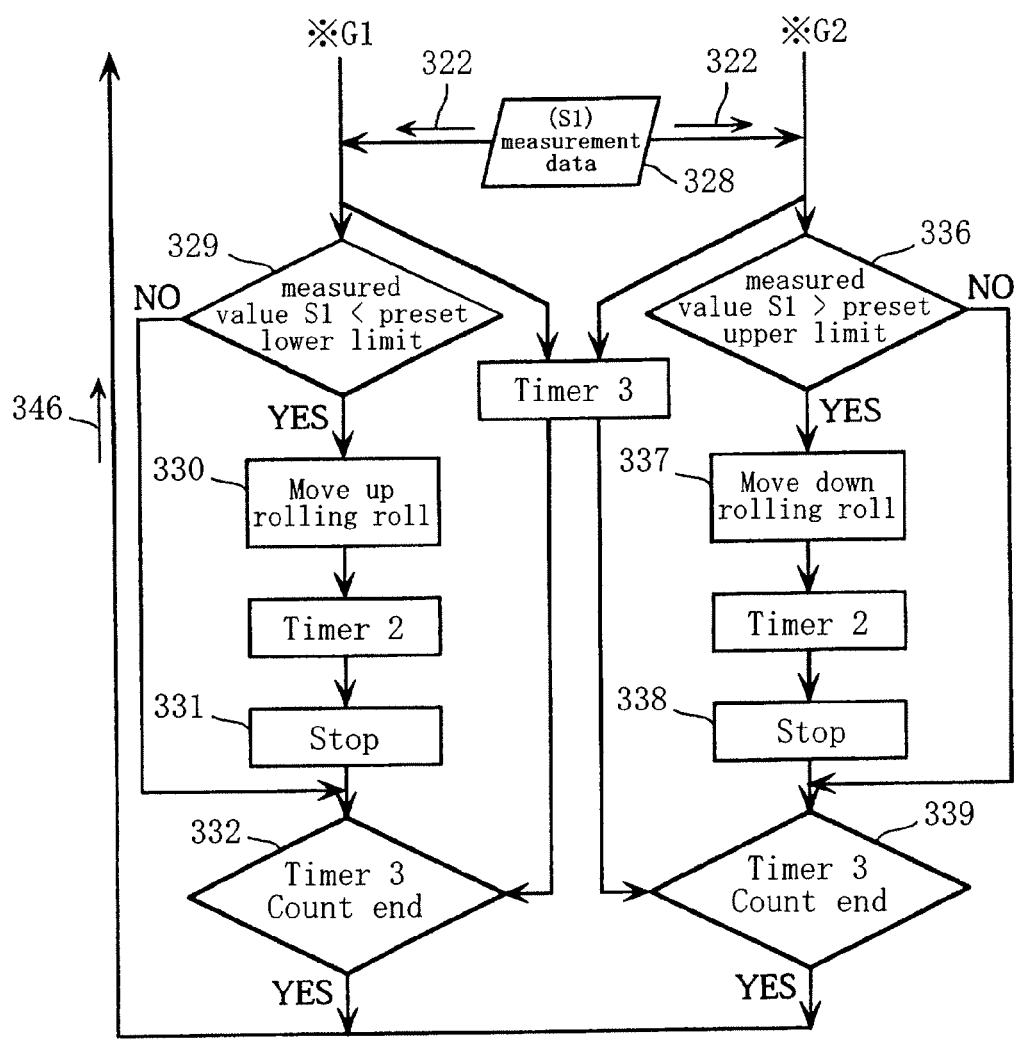
FIG. 58 is another flow chart of the control on the first rolling roll.
Figure 59:
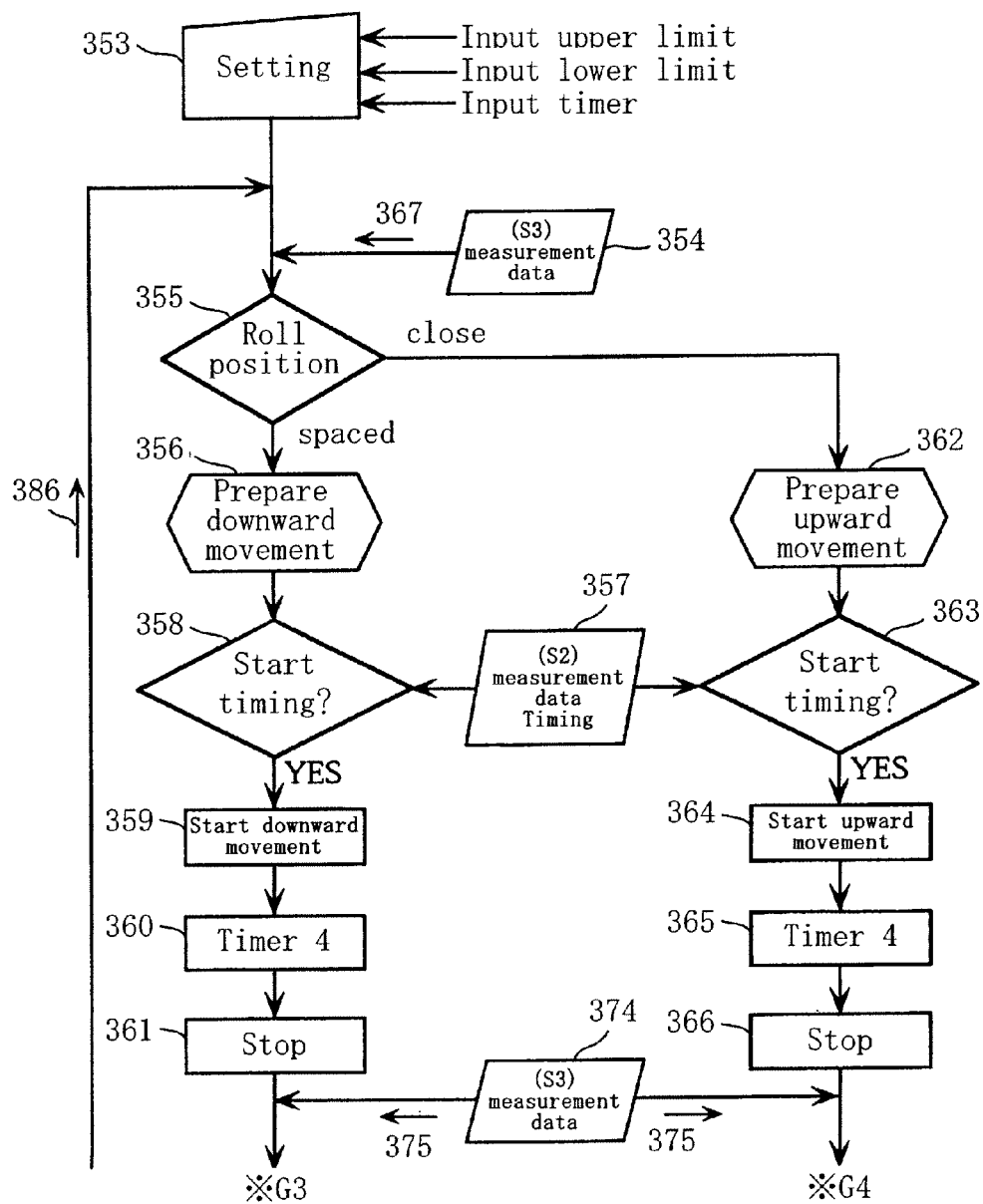
FIG. 59 is a flow chart of control on the second rolling roll.
Figure 60:
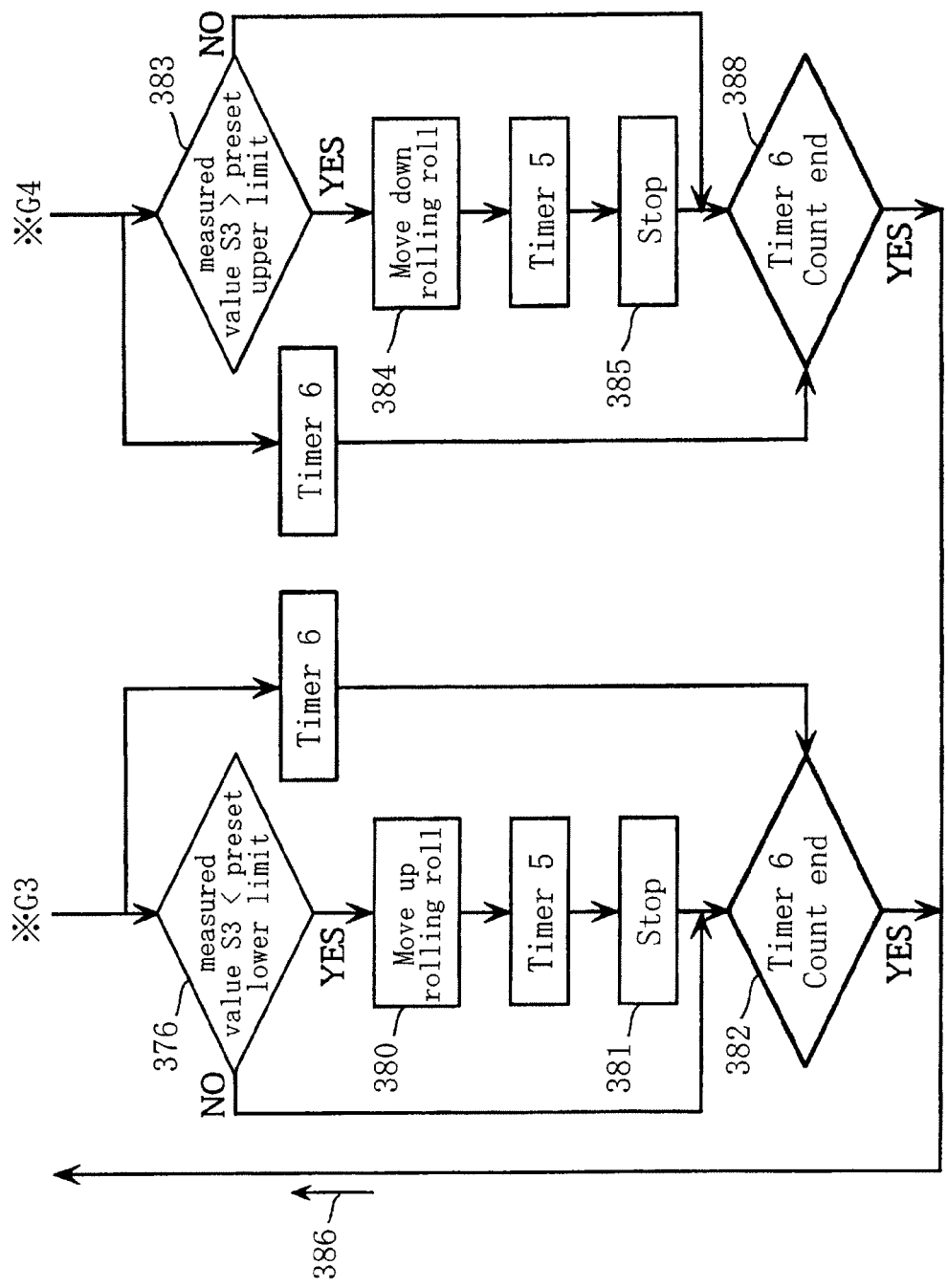
FIG. 60 is another flow chart of the control on the second rolling roll.
Figure 61:
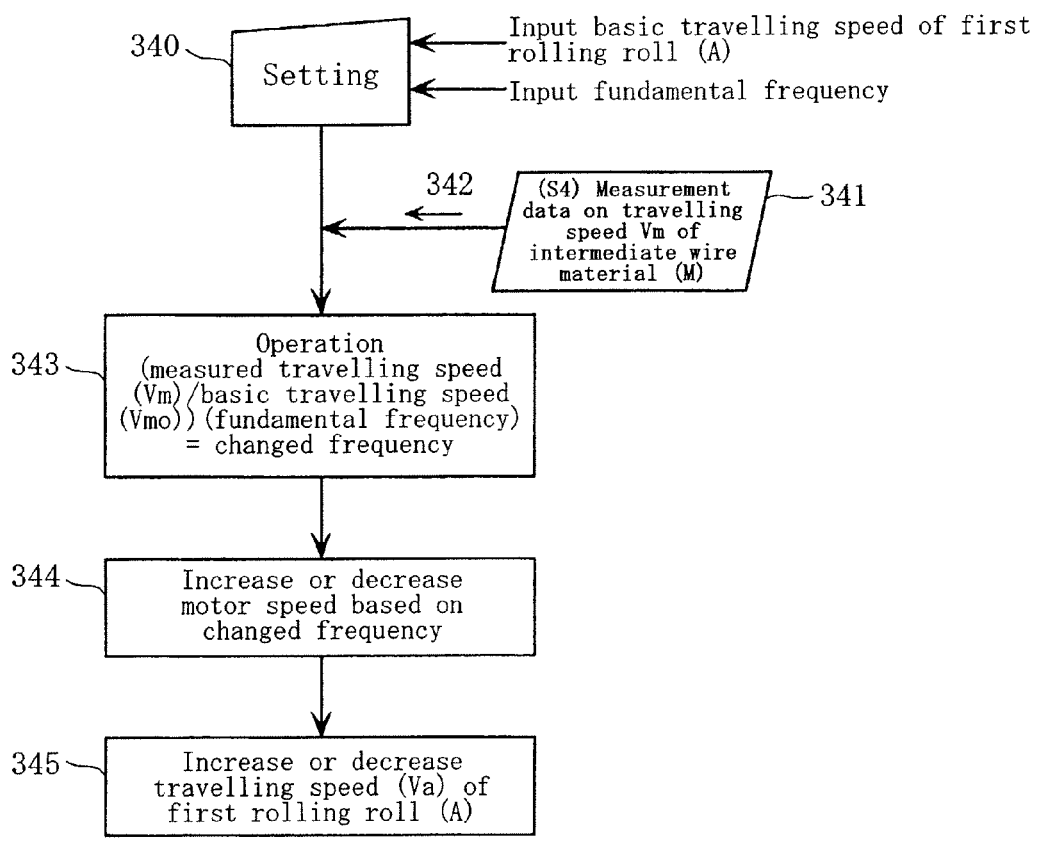
FIG. 61 is a flow chart.
Figure 62:
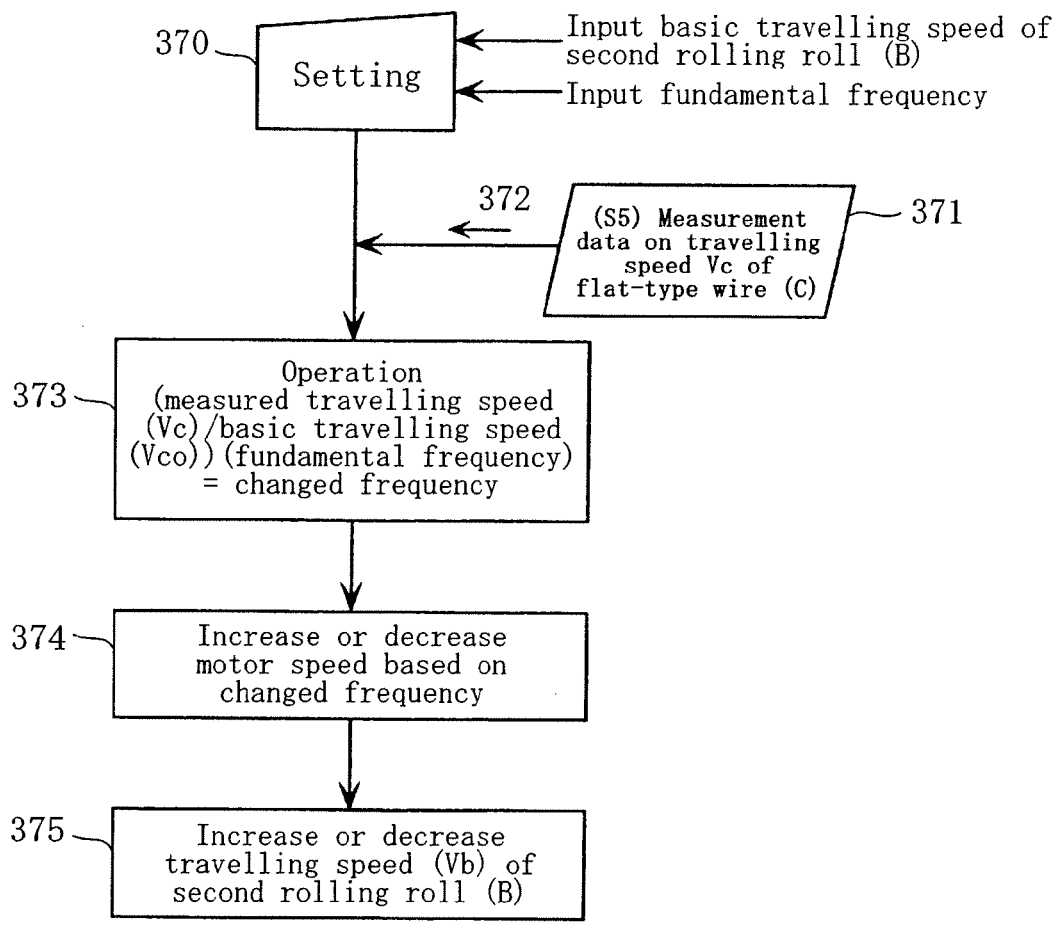
FIG. 62 is a flow chart.

Next, FIGS. 57 and 58 show a flow chart for the control mainly on the first rolling roll A, wherein G1 and G2 in FIG. 57 is connected to G1 and G2 in FIG. 58, respectively. FIGS. 59 and 60 show a flow chart for the control mainly on the second rolling roll B, wherein G3 and G4 in FIG. 59 is connected to G3 and G4 in FIG. 60, respectively. In FIGS. 58 and 60 and the following description, as needed, the measured value of the first thickness measuring instrument $S_1$ is represented by $S_1$ and the measured value of the third thickness measuring instrument $S_3$ is represented by $S_3$. FIG. 61 is a flow chart showing the control on the traveling speed Va of the first rolling roll A in FIGS. 51 and 52, and FIG. 62 is a flow chart showing the control on the traveling speed Vb of the second rolling roll B in FIGS. 51 and 52.

The present invention is characterized by controlling the rolls so that the flat-type wire C continuously changing the size in the longitudinal direction has a uniform transverse cross-sectional area. A description is given below of the control method with reference to the flow charts of FIGS. 57 to 62 and FIGS. 51 and 52.

In controlling the first rolling rolls A, first, the upper and lower limits of thickness T of the intermediate wire material M and a preset time of the timer are input (see "Setting" Step 321 in FIG. 57). Specifically, the first rolling roll A is controlled to move between a preset value 1 (to come close to the other roll) and a preset value 2 (to come away from the other roll) periodically. This way of control is implemented by decreasing and increasing the roll distance between the first rolling rolls A, A by inputting the value of the timer, the position of the upper roll 301 and measurement data 322 of the thickness measuring instrument $S_1$ for the intermediate wire material M (Step 323). Thus, the thickness T of the intermediate wire material M is controlled alternately and periodically from a large thickness to a small thickness, then to the large thickness, and then to the small thickness.

The intermediate wire material thickness measuring instrument $S_1$ (referred to also as a first thickness measuring instrument) is located just downstream of the first rolling rolls A. To always keep a constant (lengthwise) pitch $L_1$ at which changes of the thickness T are repeated, the travelling speed Va of the first rolling roll A (upper roll 301) is linked with the travelling speed (feeding speed) of the intermediate wire material M. Specifically, as shown in FIGS. 61, 51 and 52, the travelling speed Vm of the intermediate wire material M being fed out of the first rolling rolls A, A is measured by the speed measuring instrument $S_4$ and, based on the measured data, the distance change speed (travelling speed) Va at which the first roll distance between the first rolling rolls A, A increases and decreases is controlled to increase or decrease. More specifically, as shown in FIG. 61, in "Setting" Step 340, the basic travelling speed Va of the first rolling roll A (upper roll 301) is input and the fundamental frequency of the motor (not shown) for travelling the first rolling roll A is input. In Step 341, the measurement data 342 on the travelling speed Vm of the intermediate wire material M is input by the travelling speed measuring instrument $S_4$. In the next Step 343, the changed frequency is operated. In the next Step 344, based on the operation result in Step 343, the travelling speed Va of the above-stated motor is increased or decreased (i.e., proportionated). Thus, the travelling speed Va of the first rolling roll A (upper roll 301) is (proportionally) increased or decreased (Step 345).

Referring back to FIG. 57, such as by inputting measurement data 322 of the thickness measuring instrument $S_1$ (as described previously), it is determined in the next Step 324 whether the upper roll 301 is located away from or close to the other roll (the distance between the first rolling rolls A, A is large or small). In a position where the rolls are spaced away from each other (the upper roll 301 is located above away from the other roll), the program proceeds to Step 325 and starts the downward movement of the upper roll 301 (the operation to move the first rolling rolls A, A close to each other). When the preset time set in Step 326 has passed, the program proceeds to the next Step 327 and stops the downward movement of the upper roll 301 (the operation to move the rolls close to each other).

Then, as shown in FIG. 58, the measurement data of the first thickness measuring instrument $S_1$ is input 322 (to the left) in Step 328 and comparison is then made between the measured value $S_1$ input (322) and the preset lower limit in the next Step 329. If the measured value $S_1$<the preset lower limit, the first roll 301 is moved up to increase the distance between the first rolling rolls A (Step 330). When a preset time (Timer 2) has passed, the program proceeds to "Stop" Step 331 to stop the movement of the first roll 301. In the next Step 332, it is determined whether a preset time for a timer started after the input 322 in Step 328 (Timer 3) has passed. When the preset time has passed, the program returns to just before Step 323 (see the arrow 346).

On the other hand, if in Step 324 it is determined that the upper roll 310 is located close to the other roll (the distance between the first rolling rolls A, A is small), the program proceeds to Step 333 and starts the upward movement of the upper roll 301. When the preset time (Timer 1) set in Step 334 has passed, the program stops the upward movement (Step 335).

Next, the measurement data of the first thickness measuring instrument $S_1$ is input 322 (to the right) in Step 328 shown in FIG. 58 and comparison is then made between the measured value $S_1$ input (322) and the preset upper limit in the next Step 336. If the measured value $S_1$>the preset upper limit, the first roll 301 is moved down to decrease the distance between the first rolling rolls A (Step 337). When a preset time (Timer 2) has passed, the program proceeds to "Stop" Step 338 to stop the movement of the first roll 301. In the next Step 339, it is determined whether a preset time for a timer started after the input 322 in Step 328 (Timer 3) has passed. When the preset time has passed, the program returns to just before Step 323 (see the arrow 346).

FIGS. 57 and 58 show that, as described above, the timing of start of upward and downward movements of the upper roll 301 can be recognized such as from data of the first thickness measuring instrument $S_1$, the position of the upper roll 301 and the roll distance to determine whether to move the upper roll 301 up or down.

The thickness of the intermediate wire material M varies, such as owing to thermal expansion of the first rolling rolls A, A (upper roll 301) and change in frictional force thereof. In such a case, as described above, a feedback control is made by inputting the measurement result of the first thickness measuring instrument $S_1$ (measurement data input 322) to fine-adjust the stop position of the first rolling rolls A, A (upper roll 301) (Steps 328 to 332 or Steps 328 to 339).

The installation site of the first thickness measuring instrument $S_1$ is preferably close to the exit of the first rolling rolls A, A. Otherwise, for example, as shown in FIG. 52, the first thickness measuring instrument S1 is preferably disposed at a point away from the first rolling rolls A, A by an integral multiple of the predetermined pitch $L_1$. If this installation site is appropriate, the first rolling rolls A, A can be controlled with precise timing by inputting the distance from the first rolling rolls A, A to the installation site and operating it. Furthermore, the above control is applied not only to the control on the rolling rolls but also to roll forming or the like.

Next, as shown in the flow chart of FIGS. 59 and 60, the second rolling roll B is controlled. First, the upper and lower limits of thickness of the flat-type wire (product) C and a preset time of the timer are input (see "Setting" Step 353 in FIG. 59). Specifically, the second rolling roll B is controlled to move between a preset value 1 (to come close to the other roll) and a preset value 2 (to come away from the other roll) at a predetermined pitch $L_2$ in correspondence to the thickness T of the intermediate wire material M. For this control, a second thickness measuring instrument $S_2$ is disposed upstream of the second rolling rolls B (at a position before the rolling) to detect a point when the intermediate wire material M changing the thickness T (cross-sectional shape) periodically (as described previously) enters between the second rolling rolls B. The installation site of this intermediate wire material thickness measuring instrument (second thickness measuring instrument) $S_2$ is just before a point where the intermediate wire material M is rolled by the second rolling rolls B or at a point away from the first rolling rolls A, A by an integral multiple of the (above-stated) predetermined pitch $L_1$. Alternatively, if the distance from the second rolling rolls B to the second thickness measuring instrument $S_2$ can be determined, the second rolling roll B can be timing controlled (by arithmetic operation). Then, in Steps 357 to 358, based on the measurement data of the second thickness measuring instrument $S_2$, it is determined whether the start timing of upward movement of the upper roller 302 has come. Alternatively, in Steps 357 to 363, it is determined whether the start timing of upward movement of the upper roller 302 has come. Specifically, the second thickness measuring instrument $S_2$ before the feeding of the intermediate wire material M to between the second rolling rolls B, B detects the upper and lower limits of thickness of the intermediate wire material M and instructs either operation of the start of increase of the distance between the second rolling rolls B, B (start of upward movement of the second rolling roll B) and the start of decrease of the distance between them (start of downward movement of the second rolling roll B).

As shown in FIGS. 51 and 52, a third (flat-type wire) thickness measuring instrument $S_3$ is disposed downstream of the second rolling rolls B. In Step 354 shown in FIG. 59, the measurement data on the thickness of the flat-type wire C is transmitted (367). Then, the position of the upper roll 302 of the second rolling rolls B, B (the magnitude of the distance between them) is determined. Then, the downward movement is prepared in the next Step 356 or the upward movement is prepared in Step 362.

Specifically, if in Step 355 a thin portion of the intermediate wire material M (a portion thereof whose thickness T is small) is located just under the second rolling rolls B, B, the second rolling rolls B, B are in a rising position (away from each other). Therefore, the program proceeds to Step 356 and then to Step 358 (see FIGS. 55 and 56). On the other hand, in the opposite case, the second rolling rolls B, B are in a falling position (close to each other). Therefore, the program proceeds to Step 362 and then to Step 363.

The control on the distance between the second rolling rolls B, B (upward and downward movements of the upper roll 302) is carried out according to an operation instruction from the second thickness measuring instrument $S_2$ (Steps 357, 358 and 359 or Steps 357, 363 and 364). On the other hand, the control on the distance of the second rolling rolls B, B in the feeding direction is carried out at a preset position. The control is implemented by decreasing or increasing the distance between the second rolling rolls B, B based such as on the timer, the position of the upper roll 302 and the measured thickness of the intermediate wire material M. Thus, the thickness of the flat-type wire C as a product is controlled alternately and periodically from a large thickness to a small thickness, then to the large thickness, and then to the small thickness.

Since the (lengthwise) pitch $L_2$ of the flat-type wire C at which changes of the thickness are repeated must be kept always constant, the distance change speed (travelling speed) Vb of the second rolling roll B (upper roll 302) is linked with the travelling speed Vc of the flat-type wire C. Specifically, as shown in FIGS. 62, 51 and 52, the travelling speed Vc of the flat-type wire C being fed out of the second rolling rolls B, B is measured by the speed measuring instrument $S_5$ and, based on the measured data, the distance change speed (travelling speed) Vb at which the second roll distance between the second rolling rolls B, B increases and decreases is controlled to increase or decrease.

More specifically, as shown in FIG. 62, in "Setting" Step 370, the basic travelling speed Vb of the second rolling roll B (upper roll 302) is input and the fundamental frequency of the motor (not shown) for travelling the second rolling roll B is input. In Step 371, the measurement data on the travelling speed Vc of the flat-type wire C is input (372) by the travelling speed measuring instrument $S_5$. In the next Step 373, the changed frequency is operated. In the next Step 374, based on the operation result in Step 373, the travelling speed Vb of the above-stated motor is increased or decreased (i.e., proportionated). Thus, the travelling speed Vb of the second rolling roll B (upper roll 302) is (proportionally) increased or decreased (Step 375).

When the traveling speed Vc is constant, the second rolling rolls B, B are configured so that the traveling speed Vb can be adjusted such as by an inverter, thereby controlling the flat-type wire C to keep a predetermined pitch $L_2$.

Referring back to FIG. 59, such as by inputting measurement data (a signal 367) of the thickness measuring instrument $S_3$ (as described previously), it is determined in the next Step 355 whether the upper roll 302 is located away from or close to the other roll (the distance between the second rolling rolls B, B is large or small). In a position where the rolls are spaced away from each other (the upper roll 302 is located above away from the other roll), the program proceeds to Step 356 and is ready for the downward movement. Then, when a signal is input from the thickness measuring instrument $S_2$ for the intermediate wire material M, the program proceeds from Step 358 to Step 359 and starts the downward movement of the upper roll 302. When the preset time set in Step 360 has passed, the program proceeds to the next Step 361 and stops the downward movement of the upper roll 302 (the operation to move it close to the other roll).

Then, the measurement data of the third thickness measuring instrument $S_3$ is input 375 (to the left) in Step 374 and comparison is then made between the measured value $S_3$ input (375) and the preset lower limit in the next Step 376 shown in FIG. 60. If the measured value $S_3$<the preset lower limit, the second roll 302 is moved up to increase the distance between the second rolling rolls B (Step 380). When a preset time (Timer 5) has passed, the program proceeds to "Stop" Step 381 to stop the movement of the second roll 302. In the next Step 382, it is determined whether a preset time for a timer started after the input 375 in Step 374 (Timer 6) has passed. When the preset time has passed, the program returns to just before Step 354 (see the arrow 386).

On the other hand, if in Step 355 it is determined that the upper roll 302 is located close to the other roll, the upper roll 302 is ready for upward movement in Step 362. Then, when a signal is input from the thickness measuring instrument $S_2$ for the intermediate wire material M, the program proceeds from Step 363 to Step 364 and starts the upward movement of the upper roll 302. When the preset time set in Step 365 has passed, the program proceeds to the next Step 366 and stops the upward movement (the operation to move the upper roll 302 away from the other roll).

Next, the measurement data of the third thickness measuring instrument $S_3$ is input 375 (to the right) in Step 374 and comparison is then made between the measured value $S_3$ input (375) and the preset upper limit in the next Step 383 shown in FIG. 60. If the measured value $S_3$>the preset upper limit, the second roll 302 is moved down to decrease the distance between the second rolling rolls B (Step 384). When a preset time (Timer 5) has passed, the program proceeds to "Stop" Step 385 to stop the movement of the second roll 302. In the next Step 388, it is determined whether a preset time for Timer 6 started after the input 375 to the right in Step 374 has passed. When the preset time has passed, the program returns to just before Step 354 (see the arrow 386).

In this manner, the timing of start of upward and downward movements of the upper roll 302 is recognized such as from data of the third thickness measuring instrument $S_3$, the position of the upper roll 302 and the roll distance to determine whether to move the upper roll 302 up or down.

The thickness of the flat-type wire C varies, such as owing to thermal expansion of the second rolling rolls B, B (upper roll 302) and change in frictional force thereof. In this case, as described above, a feedback control is made by inputting the measurement result of the third thickness measuring instrument $S_3$ (measurement data input 375) to fine-adjust the stop position of the second rolling rolls B, B (upper roll 302) (Steps 374, 376 and 380 to 382 or Steps 374, 383 to 385 and 388).

The installation site of the third thickness measuring instrument $S_3$ (in FIG. 52) is preferably close to the exit of the second rolling rolls B, B. Otherwise, the third thickness measuring instrument $S_3$ is preferably disposed at a point away from the second rolling rolls B, B by an integral multiple of the predetermined pitch $L_2$. If the third thickness measuring instrument $S_3$ is disposed at an appropriate site, the second rolling rolls B, B can be controlled with precise timing by recognizing the distance from the second rolling rolls B, B to the installation side.

In the case where the transition parts 350 are provided as shown in FIG. 56, the stop times of the rollers A, A, B and B at the upper and lower limits in the above-stated control are set to be appropriately longer.

Next, as shown in FIGS. 51 and 52, it is also preferable that a width measuring instrument $S_{3'}$ for measuring the final width of the flat-type wire C is disposed, for example, at the same point as the third thickness measuring instrument $S_3$ and the final width is adjusted by feeding the measurement data of the width measuring instrument $S_{3'}$ back to the first rolling rolls A, A. Specifically, referring to FIGS. 51, 52 and 57, the final width of the flat-type wire C fed out of the second rolling rolls B, B is measured by the measuring instrument $S_{3'}$ (see Step 389) and, then, in Step 390, it is determined whether the final width of the flat-type wire (product) C (also referred to simply as the product width) is too small. If the product width is too small, the program proceeds to the next Step 391 and a signal 392 for revising the preset upper and lower limits upward is sent to the first rolling rolls A, A for feedback control.

On the contrary, if it is determined in Step 390 that the product width is not too small, it is determined in the next Step 393 whether the product width (the final width of the flat-type wire) is too large. If the product width is too large, a signal 395 for revising the preset upper and lower limits downward is set to the first rolling rolls A, A for feedback control.

In other words, a metal wire D is fed between the first rolling rolls A, A controlled to relatively come close to and away from each other, thereby forming an intermediate wire material M. Subsequently, while the second rolling rolls B, B is controlled to relatively come close to and away from each other so that the second roll distance inversely decreases and increases in correspondence to the increase and decrease of thickness of the intermediate wire material M, the intermediate wire material M is fed between the second rolling rolls B, B, thereby producing a flat-type wire C whose final thickness and width periodically and continuously change in the longitudinal direction. Furthermore, prior to the feeding of the intermediate wire material M to between the second rolling rolls B, B, the intermediate wire material thickness measuring instrument $S_2$ detects the upper and lower limits of thickness of the intermediate wire material M and instructs either operation of the start of increase of the second roll distance and the start of decrease thereof.

In this manner, the final width of the flat-type wire C can be controlled with high precision by controlling the two-stage rolling of the first rolling rolls A, A and second rolling rolls B, B based on the thickness of the wire material, finally measuring the width of the wire material and feeding the measurement data back to the first rolling rolls A, A to increase or decrease the transverse cross-sectional area of the wire material.

The present invention can be freely modified in configurations other than the above embodiment. For example, instead of location detection using the second thickness measuring instrument $S_2$, the distance between the pairs of rolling rolls A, A and B, B may be kept always constant. Thus, the timing control can be implemented. An example of such a modification is a method in which the first rolling rolls A, A are configured to be non-drive rolls and the wire material is drawn out of between the first rolling rolls A, A by the second rolling rolls B, B. According to this method, the control can be more easily implemented.

The present invention includes the manufacturing method in which the control as described above is carried out. According to the manufacturing method, a flat-type wire C can be continuously manufactured as a product that has a uniform cross-sectional area over the length and has a uniform electric resistance and a good quality as a magnet wire for a motor.

In the manufacturing method of the present invention in which the above control is carried out, as seen from the compression from (O) of FIGS. 54(*a*) and 54(*b*) to (I) thereof, the metal wire D of diameter r is compressed (rolled) into preliminary wide parts $W_1$ of thickness $T_1$ and preliminary narrow parts $N_1$ of thickness $T_{10}$. As seen from these figures, since the thickness $T_1$ is smaller than the thickness $T_{10}$ or, in other words, the preliminary wide parts $W_1$ are larger in the amount of compression (rolling magnification) from the metal wire D than the preliminary narrow parts $N_1$, the cross-sectional area $Z_1$ of the preliminary wide parts $W_1$ is smaller than the cross-sectional area $Z_{10}$ of the preliminary narrow parts $N_1$.

Furthermore, in the compression from (I) of FIGS. 54(*a*) and 54(*b*) to (II) thereof, the amount of compression of the intermediate wire material M from thickness $T_{10}$ to thickness $T_2$ is greater than the amount of compression thereof from thickness $T_1$ to thickness $T_{20}$. In other words, when the cross-sectional areas in the step (I) having the relation of $Z_1<Z_{10}$ are compressed into the respective cross-sectional areas in the step (II), the cross-sectional area $Z_{10}$ is more reduced than the cross-sectional area $Z_1$. Therefore, the intermediate wire material M can be controlled so that the cross-sectional area $Z_{20}$ of the final narrow parts $N_2$ becomes equal to (approximately equal to) the cross-sectional area $Z_2$ of the final wide parts $W_2$.

Furthermore, comparison between the final thicknesses $T_{20}$ and $T_2$ of the flat-type wire C in (II) of FIGS. 54(*a*) and 54(*b*) shows that, in spite of different cumulative amounts of compression from the metal wire D, both the cross-sectional areas $Z_{20}$ and $Z_2$ are approximately equal to each other and this is because the ratio of reduction of cross-sectional area (amount of reduction of cross-sectional area per unit amount of compression) due to compression from (I) to (II) is smaller than that due to compression from (O) to (I).

The vertical changes from (O) to (I) and then to (II) at (a) and (b) in FIG. 55 are shown in correspondence with the changes from (O) to (I) and then to (II) in FIGS. 54(*a*) and 54(*b*). As shown in FIG. 55, the amount of compression from (I) to (II) at (b) is greatest. The reduction of cross-sectional area due to compression from (O) to (II) at (b) largely depends on the compression from (I) to (II). In the present invention, the ratio of reduction of cross-sectional area due to compression of (I) to (II) is made smaller than that due to compression of (O) to (I), whereby even if the intermediate wire material M is largely compressed at (b), the reduction of cross-sectional area is reduced and, as a result, the cross-sectional area in (II) at (b) becomes approximately equal to the cross-sectional area in (II) at (a). In other words, the portions to be largely rolled are rolled by the second rolling rolls B, B, whereby the reduction of cross-sectional area can be reduced and the cross-sectional area of the flat-type wire C can be approximately constant over the length thereof.

The reason why the ratio of reduction of cross-sectional area due to compression from (O) to (I) is different from that due to compression from (I) to (II) is described below.

In the case of compression from (O) to (I) in FIG. 54, the metal wire D of circular cross section is passed through between the first rolling rolls A, A to form smooth roll-pressed surfaces 303 thereon. Therefore, the resistance of the metal wire D against the passage between the first rolling rolls A, A is large. On the other hand, in the compression from (I) to (II), the roll-pressed surfaces 303 have been already formed on the intermediate wire material M. Therefore, the resistance of the intermediate wire material M against the passage between the second rolling rolls B, B is small, whereby the intermediate wire material M can more easily pass through between them than when the metal wire D passes through between the first rolling rolls A, A.

To sum up, the metal wire D has difficulty in running (passing) through between the first rolling rolls A, A and, therefore, the amount of reduction of its cross-sectional area during the passage is large. On the other hand, the intermediate wire material M can smoothly run through between the second rolling rolls B, B and, therefore, the amount of reduction of its cross-sectional area during passage is small.

In this manner, the ratio of reduction of cross-sectional area of the metal wire (intermediate wire material M) (amount of reduction of cross-sectional area thereof per unit amount of compression) due to rolling of the second rolling rolls B, B is smaller than the ratio of reduction of cross-sectional area of the metal wire (metal wire D) (amount of reduction of cross-sectional area thereof per unit amount of compression) due to rolling of the first rolling rolls A, A.

According to the above manufacturing method of the present invention, the cross-sectional area of the product (flat-type wire C) can be uniformed in the longitudinal direction using the above principle well.

As described so far, the present invention is a method in which a metal wire D is fed between the first rolling rolls A, A controlled to relatively come close to and away from each other, thereby forming an intermediate wire material M, the intermediate wire material M is subsequently fed between the second rolling rolls B, B while the second rolling rolls B, B is controlled to relatively come close to and away from each other so that the second roll distance inversely decreases and increases in correspondence to the increase and decrease of thickness of the intermediate wire material M, thereby producing a flat-type wire C whose final thickness and width periodically and continuously change in the longitudinal direction, and the intermediate wire material thickness measuring instrument $S_2$ before the feeding of the intermediate wire material M to between the second rolling rolls B, B detects the upper and lower limits of thickness of the intermediate wire material M and instructs either operation of the start of increase of the second roll distance and the start of decrease thereof. Therefore, a flat-type wire having an approximately constant cross-sectional area over the length can be continuously and efficiently manufactured. Thus, the flat-type wire can be used, for example, as a magnet wire to contribute to provision of a high-performance motor. Particularly, a flat-type wire periodically changing its thickness and width can be continuously and easily manufactured with high precision.

Furthermore, the travelling speed Vm of the intermediate wire material M being fed out of the first rolling rolls A, A is measured and, based on this, the distance change speed Va at which the first roll distance between the first rolling rolls A, A increases and decreases is controlled to increase or decrease. Therefore, even if the feeding (travelling) speed in the longitudinal direction varies, a flat-type wire C changing the cross-sectional shape at a constant, precise pitch $L_2$ can be obtained.

Furthermore, the travelling speed Vc of the flat-type wire C being fed out of the second rolling rolls B, B is measured and, based on this, the distance change speed Vb at which the second roll distance between the second rolling rolls B, B increases and decreases is controlled to increase or decrease. Therefore, even if the feeding (travelling) speed in the longitudinal direction varies, a flat-type wire C changing the cross-sectional shape at a constant, precise pitch $L_2$ can be obtained.

In this embodiment, the final width of the flat-type wire C being fed out of the second rolling rolls B, B is measured and, based on this, feedback control is carried out so that if the final width of the flat-type wire C is smaller than a target final width, the first roll distance between the first rolling rolls A, A is corrected to increase and that, on the contrary, if the final width is larger than the target final width, the first roll distance between the first rolling rolls A, A is corrected to decrease. In this manner, the wire thickness is controlled in the first and second stages, the wire width is measured in the final stage to increase or decrease the distance between the first rolling rolls A, A, thereby increasing or decreasing the cross-sectional area of the intermediate wire material in the first stage. Thus, the cross-sectional shape of the final product (flat-type wire C) can be easily controlled with high precision.

Next, a description is given of still another embodiment of the present invention for the method and system for manufacturing a flat-type wire.

Manufacturing systems are known for feeding a conducting wire of circular cross section to between a pair of rolling rolls to manufacture a flat-type wire of rectangular cross section (see, for example, Published Japanese Patent Application No. 2004-122165). Such a manufacturing system has a problem that the rolling rolls are heated by processing heat generated in rolling (plastically deforming) the conducting wire or frictional heat produced between the rolling rolls and the conducting wire to thermally expand, or the surfaces of the rolling rolls wear, whereby the roll distance varies and, in turn, the thickness and width of the produced flat-type wire becomes nonuniform. In addition, also owing to change in coefficient of friction on the rolling roll surface, the thickness and width of the flat-type wire becomes nonuniform. Conventional measures taken to cope with this include cooling of the rolling rolls and adjustment of the roll distance by feeding back the data on thickness and width of the produced flat-type wire.

Figure 67:
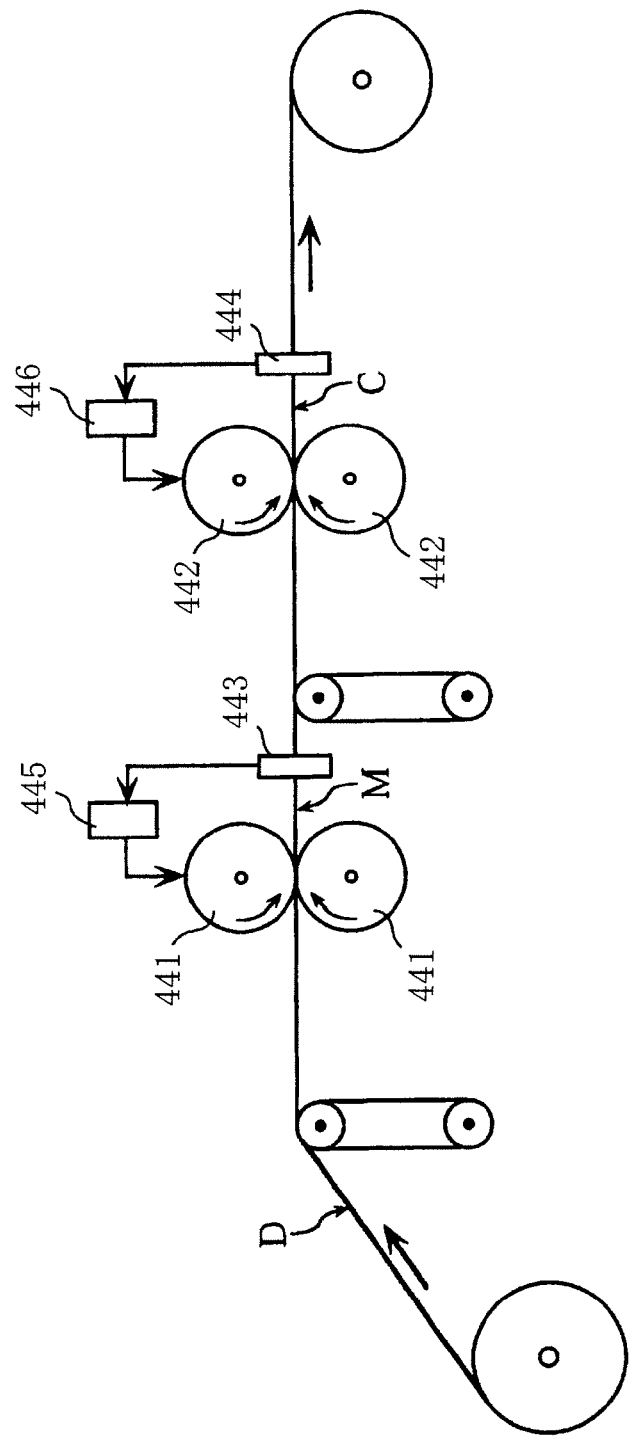
FIG. 67 is a general front view showing a conventional flat-type wire manufacturing system.

In largely rolling a conducting wire to manufacture a flat-type wire (having a large rolling magnification), two or more pairs of rolling rolls are provided, for example, as shown in FIG. 67, a conducting wire D of circular cross section is fed to between the first rolling rolls 441, 441 and rolled by them to produce an intermediate wire material M, and the intermediate wire material M is fed to between the second rolling rolls 442, 442 and rolled by them to produce a flat-type wire C.

Like the above conventional system, also in this case, the first rolling rolls 441, 441 and the second rolling rolls 442, 442 are thermally expanded, which makes the thicknesses and widths of the intermediate wire material M and the flat-type wire C nonuniform. To eliminate this problem, conventionally, the width of the intermediate wire material M measured by a width measuring instrument 443 is fed through a roll distance control means 445 back to the first rolling rolls 441, 441 to adjust the roll distance and the width of the flat-type wire C measured by a width measuring instrument 444 is fed through a roll distance control means 446 back to the second rolling rolls 442, 442 to adjust the roll distance.

However, in the flat-type wire manufacturing system (method) shown in FIG. 67, when the roll distance between the first rolling rolls 441, 441 is changed, the cross-sectional area of the intermediate wire material M changes, which has an effect on the thickness and width of the flat-type wire C produced by the second rolling rolls 442, 442. Therefore, the flat-type wire C cannot be manufactured with high precision.

The flat-type wire manufacturing method and system of the present invention is also directed to a method and system in which a conducting wire of circular cross section is rolled by two or more roll assemblies to manufacture a flat-type wire of rectangular cross section.

Figure 63:
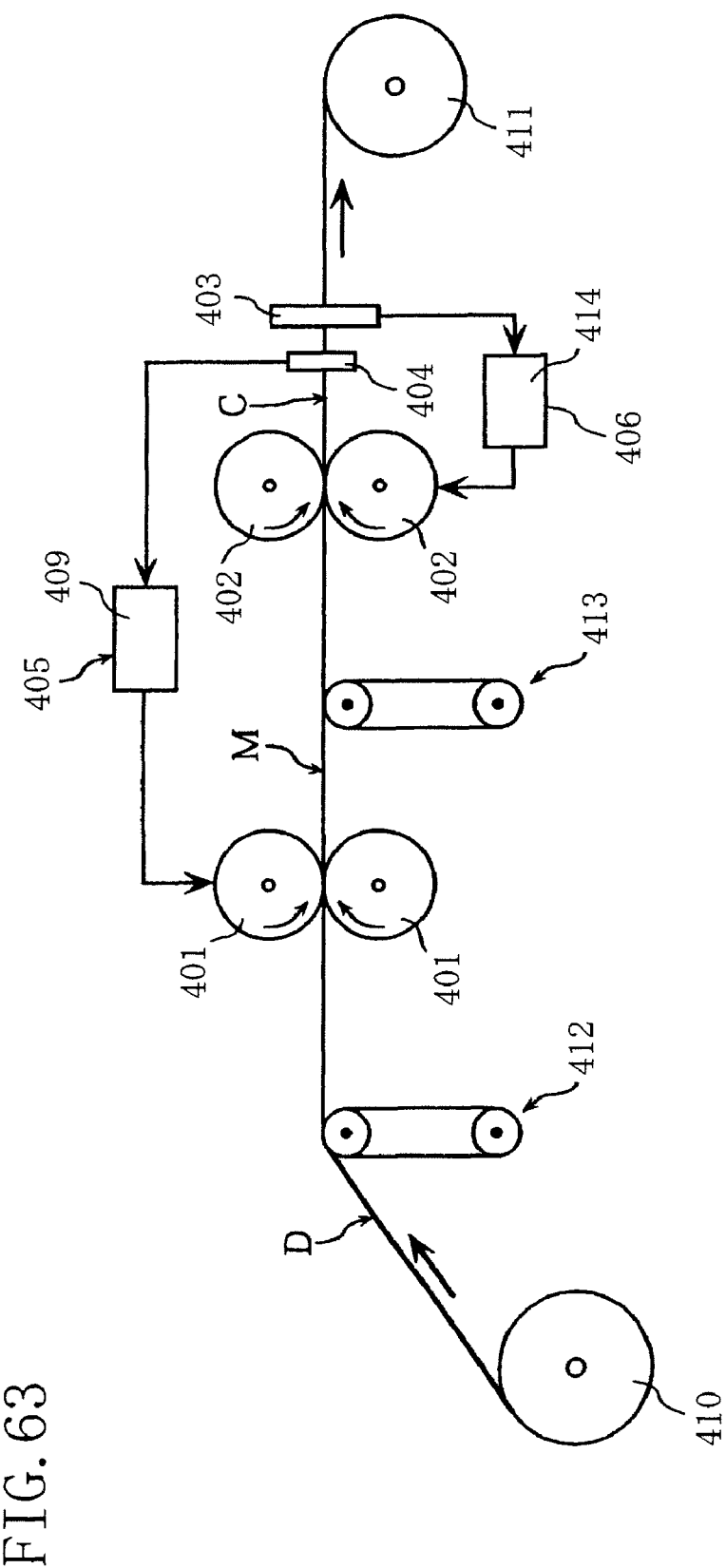
FIG. 63 is a general front view showing an embodiment of a flat-type wire manufacturing system according to the present invention.
Figure 64:
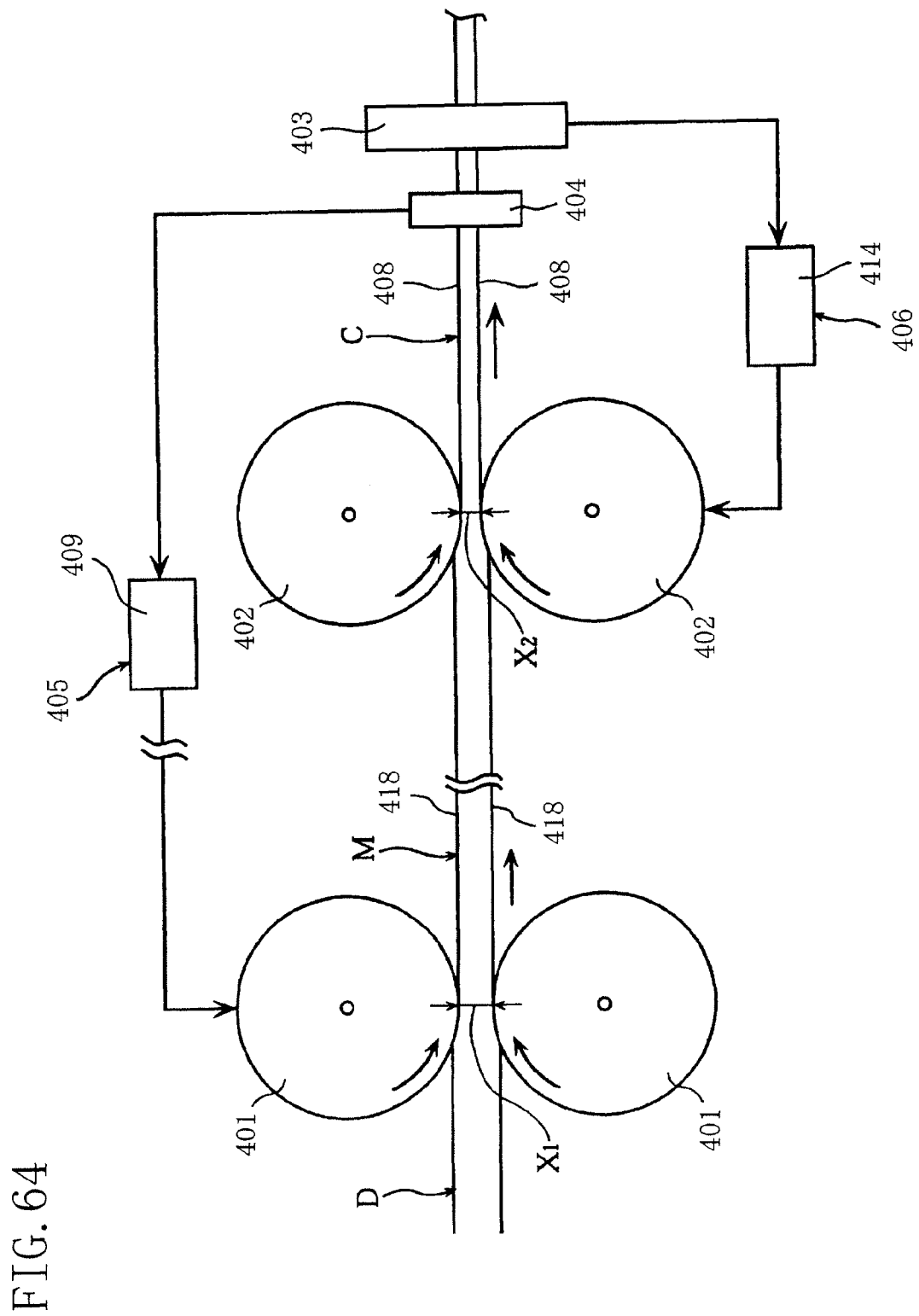
FIG. 64 is a front view of an essential part of the above embodiment.

FIG. 63 is a general front view showing an embodiment of the flat-type wire manufacturing system of the present invention, and FIG. 64 is a front view of an essential part of FIG. 63.

In FIG. 63, 410 at the left end denotes a feed drum around which a conducting wire D of circular cross section (a round wire) is wound, and 411 at the right end denotes a take-up drum on which a manufactured flat-type wire C is taken up. On the way from the feed drum 410 to the take-up drum 411, a pair of upstream rolls 401, 401 for rolling the conducting wire D (as it is) to produce an intermediate wire material M and a pair of final rolls 402, 402 for rolling the intermediate wire material M to produce a flat-type wire C are disposed in upstream to downstream order. In this case, two roll assemblies (the upstream rolls 401, 401 and the final rolls 402, 402) are provided. Each of the pair of upstream rolls 401, 401 and the pair of final rolls 402, 402 are vertically juxtaposed upper and lower rolls.

Furthermore, 403 denotes a thickness measuring instrument for measuring the final thickness of the flat-type wire C downstream of the final rolls 402, 402, and 404 denotes a width measuring instrument for measuring the final width of the flat-type wire C downstream of the final rolls 402, 402. 412 and 413 denote tension controllers.

Now, a description is given of the final thickness and final width of the flat-type wire C.

Figure 65:
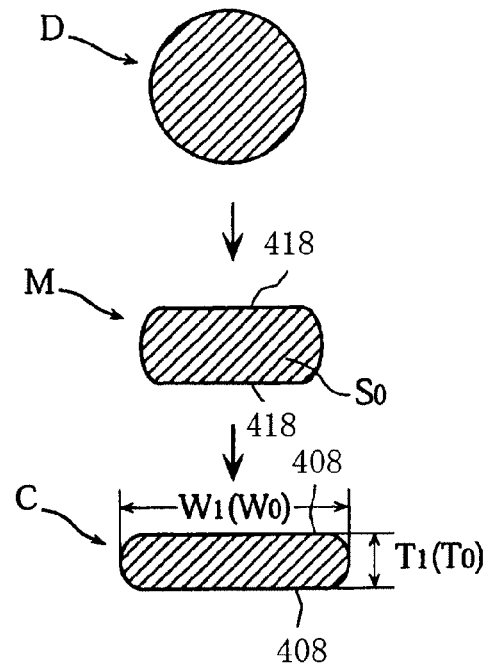
FIG. 65 is a cross-sectional view of a conducting wire, an intermediate wire material and a flat-type wire.

FIG. 65 is cross-sectional views of a conducting wire D, an intermediate wire material M and a flat-type wire C, showing that they are rolled in top to bottom order. As shown in FIG. 65, the flat-type wire C has roll-pressed surfaces 408, 408 formed at its top and bottom. The dimension of the transverse cross section of the flat-type wire C orthogonal to the roll-pressed surface 408 is the final thickness $T_1$ and the dimension thereof parallel to the roll-pressed surface 408 is the final width $W_1$. The final thickness $T_1$ and the final width $W_1$ may not exactly match with the target thickness $T_0$ and target width $W_0$, respectively, of the flat-type wire C but may vary. In other words, the final thickness $T_1$ and the final width $W_1$ are measured values of the flat-type wire C measured by the thickness measuring instrument 403 and the width measuring instrument 404, respectively.

In FIG. 64, 405 denotes a first roll control means (circuit) for comparing the final width $W_1$ obtained from the width measuring instrument 404 with the (previously input) target width $W_0$ and adjust (control) the roll distance $X_1$ between the upstream rolls 401, 401 so that the width of the flat-type wire C becomes (approximates) the target width $W_0$. In other words, the first roll control means 405 is a means for adjusting (controlling) the roll distance $X_1$ between the upstream rolls 401, 401 so that the cross-sectional area of the intermediate wire material M becomes (approximates) an optimum cross-sectional area $S_0$ "providing a flat-type wire C having a target width $W_0$".

Furthermore, the first roll control means 405 includes a comparison section 409 for comparing the final width $W_1$ with the target width $W_0$ to determine whether the final width $W_1$ is larger or smaller than the target width $W_0$. In addition, the first roll control means 405 is configured to feed the determination result of the comparison section 409 back to an actuator, such as an (unshown) cylinder for bringing the upstream rolls 401, 401 close to or away from each other, and control the actuator.

Furthermore, 406 denotes a second roll control means (circuit) for comparing the final thickness $T_1$ obtained from the thickness measuring instrument 403 with the (previously input) target thickness $T_0$ and adjust (control) the roll distance $X_2$ between the final rolls 402, 402 so that the thickness of the flat-type wire C becomes (approximates) the target thickness $T_0$. The second roll control means 406 includes a comparison section 414 for comparing the final thickness $T_1$ with the target thickness $T_0$ and determining whether the final thickness $T_1$ is larger or smaller than the target thickness $T_0$ and is configured to feed the comparison and determination result of the comparison section 414 back to an actuator, such as an (unshown) cylinder for bringing the final rolls 402, 402 close to or away from each other, and control the actuator.

Figure 66:
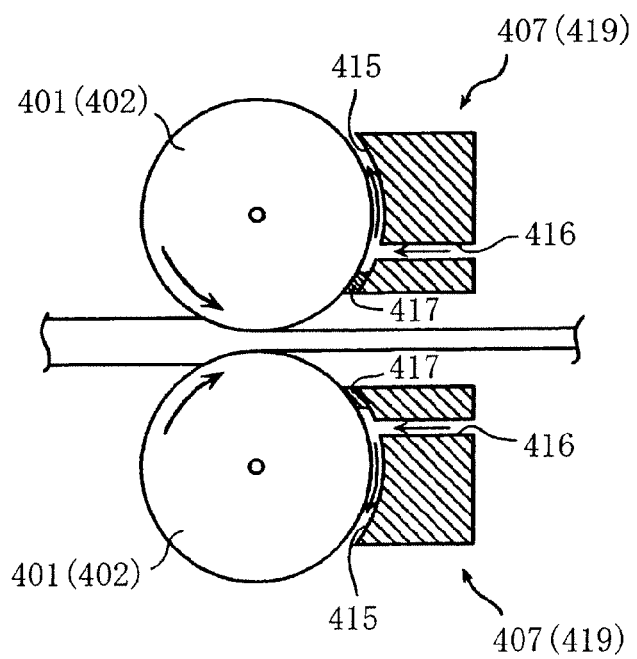
FIG. 66 is a front view showing an essential part of another embodiment.

FIG. 66 is a front view of an essential part of another embodiment of the flat-type wire manufacturing system of the present invention, wherein 407 denotes an example of a device for cooling the surface of an associated one of the upstream rolls 401, 401. As shown in the figure, coolers 407, 407 for cooling their respective upstream rolls 401, 401 are provided. The cooler 407 may be of known type. In FIG. 66, the cooler 407 has a concave curved surface 415 capable of coming close to the outer periphery of the associated upstream roll 401 (the roll outer periphery) and a liquid coolant feed channel 416 for feeding coolant (water) to a clearance between the roll outer periphery and the concave curved surface 415. Furthermore, 417 denotes a seal. The cooler 407 is configured to feed the coolant to the clearance between the roll outer periphery and the concave curved surface 415 to cool the associated upstream roll 401 in rotation.

Like the upstream rolls 401, 401, coolers 407, 407 are attached also to the final rolls 402, 402.

Each of the rolls 401, 402 may be provided also with an (unshown) heater 419. The cooler 407 and the heater 419 may be those that directly or indirectly cool or heat the surface of the associated roll 401, 402 or those in which a heat transfer medium (endothermal medium or exothermal medium) is put in the roll 401, 402 to cool or heat the whole of the roll 401, 402.

Although not shown, where the flat-type wire manufacturing system of the present invention includes three or more roll assemblies, the most downstream roll assembly serves as the final rolls 402, 402 and the roll assembly located one more upstream of the final rolls 402, 402 serves as the upstream rolls 401, 401. Furthermore, a thickness measuring instrument 403 and a width measuring instrument 404 are disposed downstream of the most downstream roll assembly to measure the final thickness $T_1$ and the final width $W_1$ of the flat-type wire. Thus, the roll distance between the most downstream rolls and the roll distance between the second most downstream rolls is adjusted in the above manner.

To reduce the time lag between the feedback of data measured by the thickness measuring instrument 403 to the final rolls 402, 402 and the feedback of data measured by the width measuring instrument 404 to the upstream rolls 401, 401, the thickness measuring instrument 403 and the width measuring instrument 404 are preferably disposed downstream of and near to the final rolls 402, 402. In addition, also to reduce the time lag in feeding the data back to the above rolls, the upstream rolls 401, 401 are preferably disposed close to the final rolls 402, 402.

The thickness measuring instrument 403 and the width measuring instrument 404 may be contact type sensors or non-contact type sensors and it does not matter which measuring instrument is disposed more upstream.

The pair of upstream rolls 401, 401 and the pair of final rolls 402, 402 may be pairs of laterally arranged rolls.

A description is given of a flat-type wire manufacturing method of the present invention with reference to FIGS. 63 to 65.

Referring to FIG. 63, first, a conducting wire (copper wire) D having a constant circular cross section over the length is fed out of the feed drum 410 and fed to between the pair of upstream rolls 401, 401 and then between the pair of final rolls 402, 402 in this order, each pair of rolls rotating with a predetermined roll distance left therebetween. The conducting wire D is rolled by the upstream rolls 401, 401, thereby producing an intermediate wire material M of approximately rectangular cross section that has smooth roll-pressed surfaces 418, 418 formed at its top and bottom (see FIG. 65). The intermediate wire material M is further rolled to be thinner by the final rolls 402, 402, thereby producing a flat-type wire C of approximately rectangular cross section adjusted to the target thickness $T_0$ and the target width $W_0$ (see FIG. 65).

Downstream of the final rolls 402, 402, the thickness measuring instrument 403 and the width measuring instrument 404 measure the final thickness $T_1$ and final width $W_1$ of the flat-type wire C (just after being manufactured) at minute time intervals (for example, 1620 times per second).

When, in the above manner, rolling is continuously carried out to produce a flat-type wire C from a conducting wire D through an intermediate wire material M, each roll 401, 402 is heated and thermally expanded, such as by processing heat produced in plastically deforming the conducting wire D and the intermediate wire material M and frictional heat produced between each roll 401, 402 and each of the conducting wire D and the intermediate wire material M. The thermal expansion of each roll 401, 402 increases the roll diameter or, in other words, decreases the roll distance $X_1, X_2$. Thus, the thickness and width of the manufactured flat-type wire C vary. Specifically, the final thickness $T_1$ and final width $W_1$ measured by the thickness measuring instrument 403 and the width measuring instrument 404 have different values from the target thickness $T_0$ and the target width $W_0$.

Data on the final thickness $T_1$ measured by the thickness measuring instrument 403 is fed to the comparison section 414 of the second roll control means 406. The comparison section 414 determines whether the final thickness $T_1$ is larger or smaller than the previously input target thickness $T_0$.

The final thickness $T_1$ is determined by the roll distance $X_2$. Therefore, since in this case the roll distance $X_2$ is decreased by thermal expansion, the final thickness $T_1$ is determined to be smaller than the target thickness $T_0$.

The second roll control means 406 feeds the determination result of the comparison section 414 back to (an actuator of) the final rolls 402, 402 to adjust the roll distance $X_2$ between the final rolls 402, 402 so that the thickness of the flat-type wire C becomes (approximates) the target thickness $T_0$.

Specifically, since the final thickness $T_1$ is determined to be smaller than the target thickness $T_0$, the final rolls 402, 402 are controlled to increase the roll distance $X_2$.

Since the roll distance $X_2$ changed at a single feedback is minute (for example, 0.06 μm), the roll distance $X_2$ is little by little changed at each feedback until the thickness of the flat-type wire C becomes (approximates) the target thickness $T_0$.

The second roll control means 406 does not adjust the roll distance $X_2$ between the final rolls 402, 402 for a period of time (several seconds) from the previous adjustment of the roll distance $X_2$ to the next measurement of the thickness measuring instrument 403. In other words, the second roll control means 406 is configured to keep the adjusted roll distance $X_2$ as it is for several seconds, thereby allowing the thickness measuring instrument 403 to measure the thickness of the flat-type wire C again with the thickness (not changed) stabilized and feed back the measurement result. Furthermore, the second roll control means 406 is configured, if the final thickness $T_1$ measured again by the thickness measuring instrument 403 does not reach the target thickness $T_0$, to feed the measured data back to the final rolls 402, 402 to control the roll distance $X_2$ to increase.

Data on the final width $W_1$ measured by the width measuring instrument 404 is fed to the comparison section 409 of the first roll control means 405. The comparison section 409 determines whether the final width $W_1$ is larger or smaller than the previously input target width $W_0$.

Then, the first roll control means 405 feeds the determination result of the comparison section 409 back to (an actuator of) the upstream rolls 401, 401 to adjust the roll distance $X_1$ between the upstream rolls 401, 401 so that the width of the flat-type wire C becomes (approximates) the target width $W_0$.

Here, a description is given of the case where, owing to thermal expansion of each roll 401, 402 or adjustment of the roll distance carried out by the second roll control means 406, the comparison section 409 has determined that the final width $W_1$ is smaller than the target width $W_0$.

Since the final width $W_1$ is determined to be smaller than the target width $W_0$, the cross-sectional area of the intermediate wire material M being fed to the final rolls 402, 402 is increased to increase the width of the flat-type wire C to be manufactured. In other words, the cross-sectional area of the intermediate wire material M is increased to become (approximate) an optimum cross-sectional area $S_0$ "providing a flat-type wire C having a target width $W_0$".

To make the cross-sectional area of the intermediate wire material M to be manufactured an optimum cross-sectional area $S_0$ (or increase it to an optimum cross-sectional area $S_0$), the first roll control means 405 controls the upstream rolls 401, 401 to increase the roll distance $X_1$.

A conducting wire D is rolled by the upstream rolls 401, 401 the roll distance $X_1$ between which is adjusted in the above manner, thereby producing an intermediate wire material M of optimum cross-sectional area $S_0$. The intermediate wire material M is fed to the final rolls 401, 402 the roll distance $X_2$ between which is adjusted in the above manner and rolled by them, thereby producing a flat-type wire C having the target thickness T0 and the target width $W_0$.

When one of the roll distance between the upstream rolls 401, 401 and the roll distance between the final rolls 402, 402 is adjusted, the other roll distance is not adjusted. In other words, the roll distances for the two pairs of rolls are not concurrently adjusted.

The time interval of feedback of the first roll control means 405 and the roll distance $X_1$ changed at a single feedback thereof are the same as those of the second roll control means 406.

A description is not given of the case where the final thickness $T_1$ is larger than the target thickness $T_0$ and the case where the final width $W_1$ is larger than the target width $W_0$, because the cases correspond to the opposite action (control manner) to the previous description.

Between the case where the upstream rolls 401, 401 carry out a heavy rolling and the final rolls 402, 402 carry out a light rolling and the case where the upstream rolls 401, 401 carry out a light rolling and the final rolls 401, 402 carry out a heavy rolling, whether the width of the flat-type wire C changed by adjustment of the roll distance $X_1$ between the upstream rolls 401, 401 increases or decreases may be reverse. The roll distance $X_1$ between the upstream rolls 401, 401 can be adjusted appropriately according to each case.

As described so far, according to the method for manufacturing a flat-type wire of the present invention, in manufacturing a flat-type wire C having a target thickness $T_0$ and a target width $W_0$ by feeding a conducting wire D of circular cross section sequentially to two or more roll assemblies, the final thickness $T_1$ of the flat-type wire C is measured downstream of the most downstream final rolls 402, 402 to compare the measured final thickness $T_1$ with the target thickness $T_0$ and adjust the roll distance $X_2$ between the final rolls 402, 402, the final width $W_1$ of the flat-type wire C is measured downstream of the final rolls 402, 402 to compare the measured final width $W_1$ with the target width $W_0$, adjust the roll distance $X_1$ between the upstream rolls 401, 401 one more upstream of the final rolls 402, 402 and thereby produce an intermediate wire material M having an optimum cross-sectional area $S_0$ at the upstream rolls 401, 401, and the intermediate wire material M is fed to the final rolls 402, 402 to produce a flat-type wire C having the target thickness $T_0$ and target width $W_0$. Thus, the roll distances $X_1$ and $X_2$ can be adjusted by feeding the final width $W_1$ and final thickness $T_1$ of the flat-type wire C serving as a product back to the upstream rolls 401, 401 and the final rolls 402, 402, which increases the size precision and provides a flat-type wire C uniform over the length.

Specifically, the final thickness $T_1$ is fed back to the final rolls 402, 402 determining the thickness of the flat-type wire C to adjust the roll distance $X_2$ between them, whereby the thickness of the flat-type wire C can be modified into the target thickness $T_0$. Furthermore, the final width $W_1$ is fed back to the upstream rolls 401, 401 to adjust the roll distance $X_1$ between them and thereby adjust the cross-sectional area of the intermediate wire material M being fed to the final rolls 402, 402 (to an optimum cross-sectional area $S_0$), whereby the width of the flat-type wire C can be modified into the target width $W_0$. In this manner, even if the roll distance $X_1$ or $X_2$ varies or the coefficient of friction on the surface of each roll 401, 402 changes owing to thermal expansion of the roll 401, 402 or wear of the surface of the roll 401, 402, a high-precision flat-type wire C can be manufactured.

Furthermore, each of the pair of upstream rolls 401, 401 and the pair of final rolls 402, 402 roll the wire while being cooled or heated. Therefore, when the rolls roll while being cooled, thermal expansion of the rolls 401, 402 due to heat produced in rolling can be reduced. When the rolls roll while being heated, this positive heating of the rolls 401, 402 makes it hard for the rolls to cause thermal expansion, such as due to frictional heat in the later rolling. Thus, a flat-type wire C can be manufactured with a further enhanced size precision.

The flat-type wire manufacturing system of the present invention includes a pair of upstream rolls 401, 401 for rolling a conducting wire D of circular cross section as it is or rolling it after passage of other rolls to produce an intermediate wire material M and a pair of final rolls 402, 402 for rolling the intermediate wire material M to produce a flat-type wire C, these pairs of rolls being sequentially disposed in this order, and further includes: a thickness measuring instrument 403 for measuring the final thickness $T_1$ of the flat-type wire C downstream of the final rolls 402, 402; a width measuring instrument 404 for measuring the final width $W_1$ of the flat-type wire C downstream of the final rolls 402, 402; a first roll control means 405 for comparing the final width $W_1$ obtained from the width measuring instrument 404 with the target width $W_0$ of the flat-type wire C and adjusting the roll distance $X_1$ between the upstream rolls 401, 401 so that the intermediate wire material M reaches an optimum cross-sectional area $S_0$ providing a flat-type wire C having the target width $W_0$; and a second roll control means 406 for comparing the final thickness $T_1$ obtained from the thickness measuring instrument 403 with the target thickness $T_0$ of the flat-type wire C and adjusting the roll distance $X_2$ between the final rolls 402, 402 so that the flat-type wire C reaches the target thickness $T_0$. Therefore, the roll distances $X_1$ and $X_2$ can be adjusted by feeding the final width $W_1$ and final thickness $T_1$ of the flat-type wire C serving as a product back to the upstream rolls 401, 401 and the final rolls 402, 402, respectively, which increases the size precision and provides a flat-type wire C uniform over the length.

Specifically, the final thickness $T_1$ is fed back to the final rolls 402, 402 determining the thickness of the flat-type wire C to adjust the roll distance $X_2$ between them, whereby the thickness of the flat-type wire C can be modified into the target thickness $T_0$. Furthermore, the final width $W_1$ is fed back to the upstream rolls 401, 401 to adjust the roll distance $X_1$ between them and thereby adjust the cross-sectional area of the intermediate wire material M being fed to the final rolls 402, 402 (to an optimum cross-sectional area $S_0$), whereby the width of the flat-type wire C can be modified into the target width $W_0$. In this manner, even if the roll distance $X_1$ or $X_2$ varies or the coefficient of friction on the surface of each roll 401, 402 changes owing to thermal expansion of the roll 401, 402 or wear of the surface of the roll 401, 402, a high-precision flat-type wire C can be manufactured.

Furthermore, each of the upstream rolls 401, 401 and the final rolls 402, 402 is provided with a cooler 407 and/or a heater 419. When each of the rolls is provided with a cooler 407, thermal expansion of the rolls 401, 402 due to heat produced in rolling can be reduced. When each of the rolls is provided with a heater 419, the positive heating of the rolls 401, 402 makes it hard for the rolls to cause thermal expansion, such as due to frictional heat in the later rolling. Thus, a flat-type wire C can be manufactured with a further enhanced size precision.

Next, a description is given of another embodiment of the electric insulated wire.

The cross-sectional shape of the electric insulated wire described in the above-stated Patent Document 1 and Published Japanese Patent Application No. 2003-317547 is rectangular (including square). The electric wire is covered with an insulating layer over the entire peripheral surface and its corners have a non-chamfered, angulate shape (if minute rounded parts unintentionally, naturally formed in the manufacturing process are ignored in the present invention).

Figure 81:
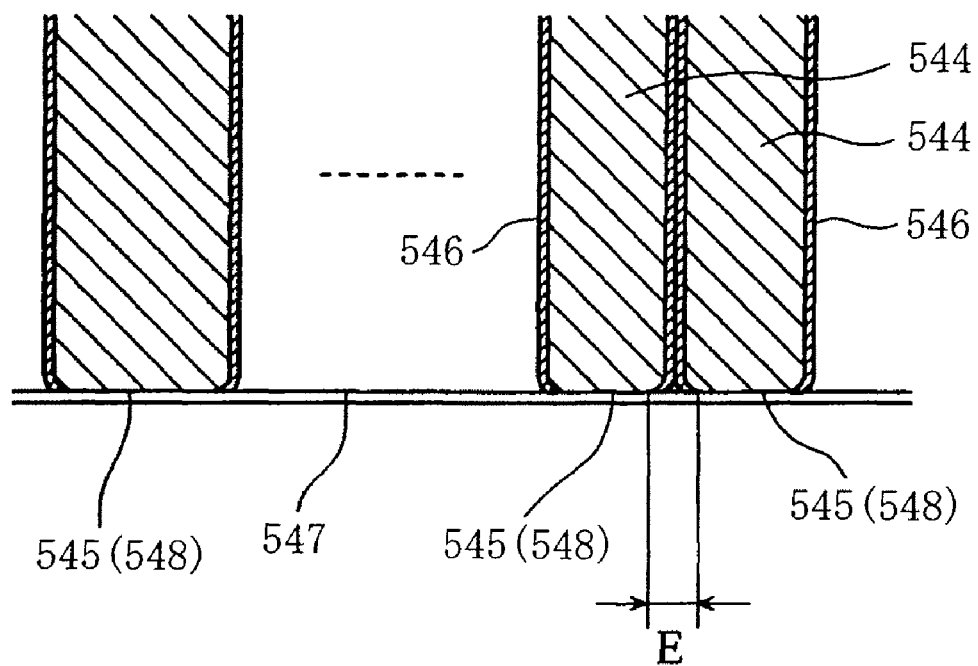
FIG. 81 is an enlarged cross-sectional view showing an essential part of a conventional technique.

However, recently, electric insulated wires are in stronger demand for compaction when used such as for a magnet, a high-voltage transformer or a non-contact IC card antenna coil and, if wound in a coil or wound in multiple tiers, they are in particularly strong demand for compaction. Conventionally, for example, as shown in FIG. 81, when the insulating layer 546 is cut away at one short side 545 of the flat-type wire 544 and the flat-type wire 544 is wound in tiers on the insulating film 547, this invites a problem that the insulation property between adjacent conductor exposed parts 548, 548 at adjacent short sides 545, 545 becomes insufficient.

Specifically, when the wire is wound such as in a coil, the spaced distance E between the conductor exposed parts 548, 548 called edge parts at the short sides 545 becomes extremely small. Depending on the state of the coil winding (owing such as to misalignment of coil or the tightness thereof), the conductor exposed parts 548, 548 may be insulated from each other only by air. Generally, the dielectric strength of air is 30 kV/cm or 30V/μm. On the other hand, when acrylic resin, for example, is used as an insulating layer 546 (insulating material), it has an insulation property of 500V or more per 10 μm. Therefore, if the electric insulated wire causes a coil misalignment or poor tightness when wound in a coil as shown in FIG. 81, an extremely small spaced distance E might invite production of insulation failure through air having a small dielectric strength.

Figure 68:
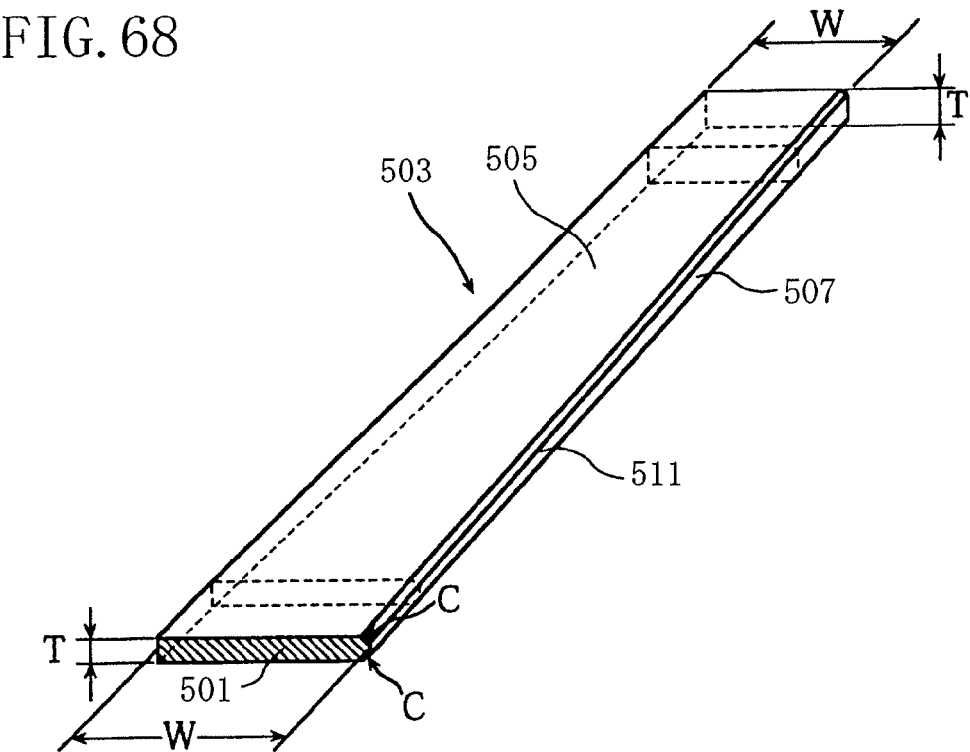
FIG. 68 is a partially perspective view of an embodiment of the present invention.
Figure 69:
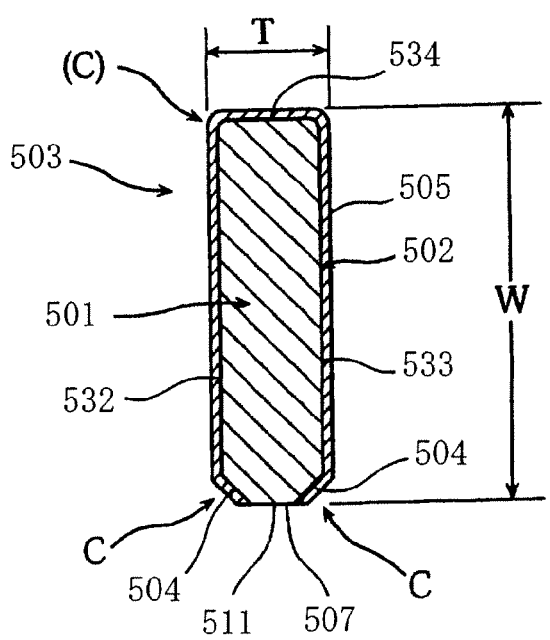
FIG. 69 is an enlarged cross-sectional view of the above embodiment.

FIGS. 68 and 69 shows, as an example of an electric insulated wire 503, a flat-type wire which has a rectangular cross section and whose width W changes increasingly or decreasingly over the length. The term "approximately rectangular shapes" in the present invention includes an oblong shape, a square, a minus-sign shape, a shape each side of which is slightly convex or concave, and a shape in which its corners are cut away in the below-described manner.

Furthermore, the flat-type wire is formed so that the thickness T of portions having a larger width W is smaller and the thickness T of portions having a smaller width W is larger, thereby keeping the transverse cross-sectional area uniform over the length. Although not shown in FIG. 68, the shape of the flat-type wire changes so that its width gradually increases towards the upper right and gradually decreases towards the lower left.

The electric insulated wire 503 is composed of a conductor 501 of approximately rectangular cross section and an insulating layer 505 exposing one side 511 of the conductor 501 and covering the other sides 532, 533 and 534.

In the transverse cross section of the conductor 501, the one side 511 can be referred to as a conductor exposed part 507 in which no insulating layer 505 exists. The corners C of the electric insulated wire corresponding to both ends of the one side 511 constituting the conductor exposed part 507 are cut away to form chamfered parts (roll-off parts) 504. The insulating layer 505 covers the chamfered parts 504.

Specifically, in FIGS. 68 and 69, the conducting wire 501 is a flat-type wire and its one side 511 (conductor exposed part 507) corresponds to a short side of the rectangular cross section. The insulating layer 505 on the chamfered parts 504 is formed to continuously cover them together with the other sides 532, 533 and 534.

Figure 70:
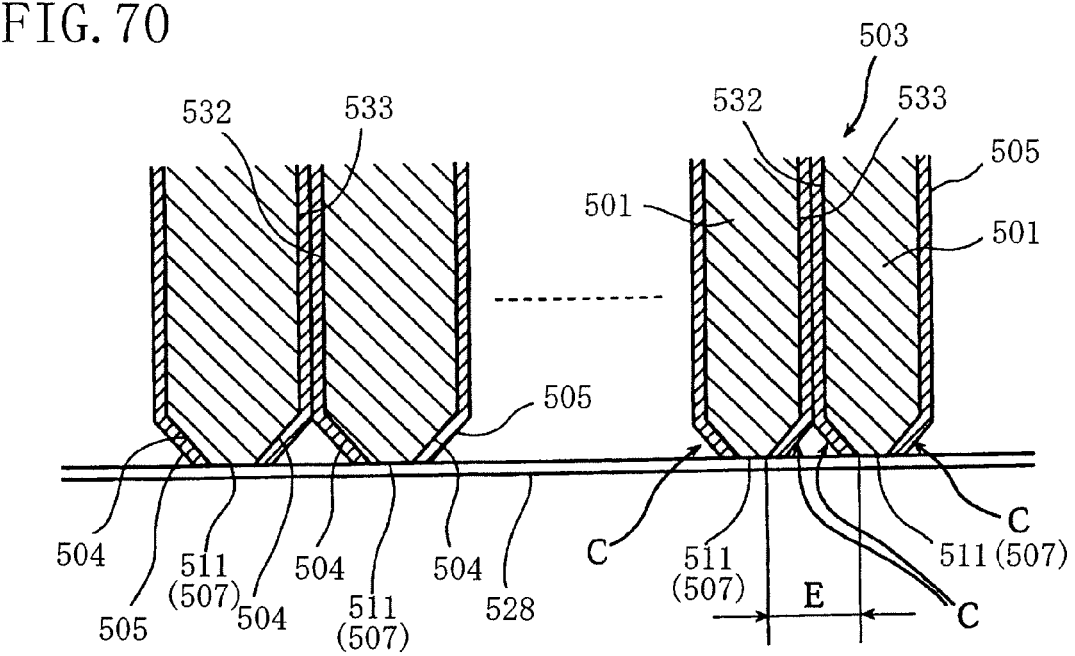
FIG. 70 is a cross-sectional view showing a state of use of the above embodiment.

FIG. 70 shows an example of a state of such an electric insulated wire 503 wound in a coil (a coil-wound state thereof). For example, if the electric insulated wire 503 is would in tiers so that the conductor exposed part 507 makes contact on the insulating film 528 and the long side 532 of one of the adjacent conductors 501 faces the long side 533 of the other conductor 501, the distance between the adjacent conductor exposed parts 507, 507, i.e., the above-stated spaced distance E can be sufficiently increased (see FIG. 81 showing the conventional example).

The embodiment shown in FIG. 68 to 70 shows the case where the chamfered parts (roll-off parts) 504 are formed in the conductor 501 while having inclined surfaces (for example, with an angle of inclination of 40° to 50°). In another embodiment of the present invention, the four corners may be formed into chamfered parts (roll-off parts) 504. In this case, both of the short sides 511 and 534 may have conductor exposed parts 507 formed therein. However, if, as shown in FIG. 69, only one short side has a conductor exposed part 507 formed therein, this provides an advantage that either one of both the short side 511 and 534 can be selected as a short side having no insulating layer 505 in the later-described manufacturing method.

For example, a manufacturing method (a manufacturing system) for forming chamfered parts 504 in a conductor 501 is briefly described with reference to FIG. 73. The conductor 501 is formed, in a previous plastic forming process, into a flat-type wire changing the width W and thickness T in the longitudinal direction. Then, as shown in FIGS. 73(a) and 73(b), a pair of V-grooved rolling rolls 535, 535 are (preferably) continuously pressed again the flat-type wire from the width direction, thereby forming chamfered parts 504 forming inclined surfaces at four corners C of the flat-type wire.

Figure 73:
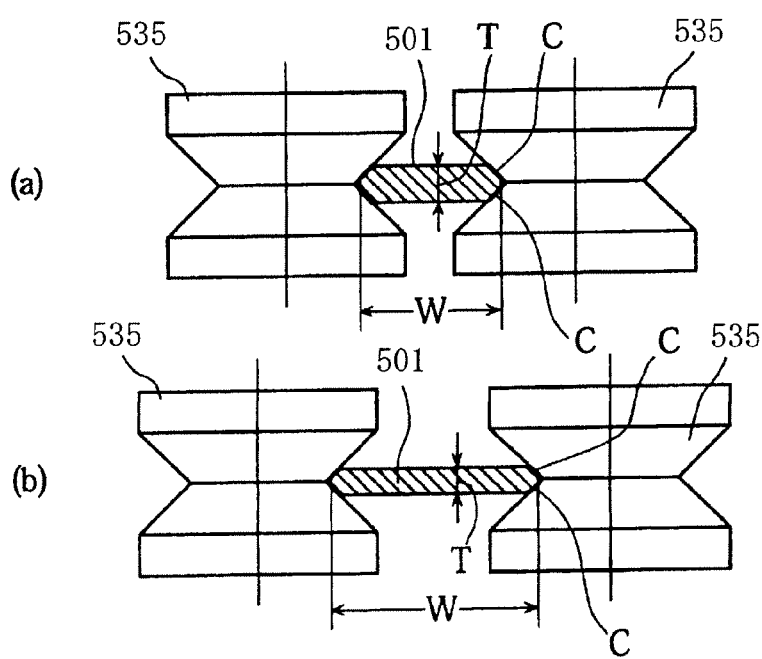
FIG. 73 is explanatory views showing an essential part of an example of a manufacturing system.

FIG. 73 shows a manufacturing method (manufacturing system) for forming chamfered parts 504 at all of four corners C. However, if one of both the rolls 535, 535 is a flat roll having no V-groove, such a conducting wire 501 as shown in FIGS. 68 to 70 can be manufactured.

Figure 71:
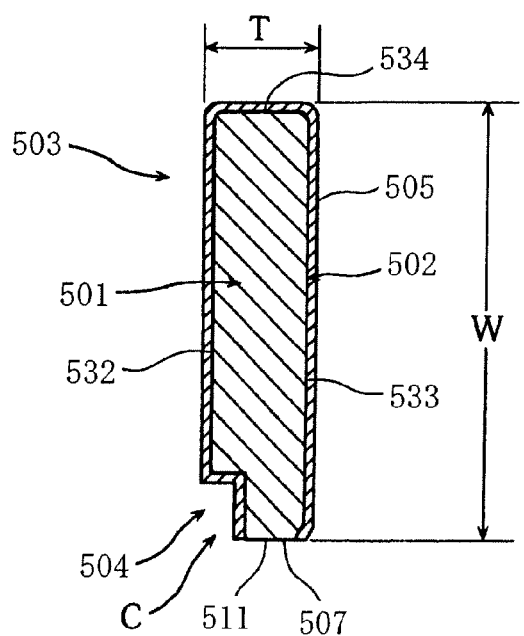
FIG. 71 is an enlarged cross-sectional view of another embodiment.

If the shape of the roll 535 in FIG. 73 is changed, the chamfered part 504 can have the later-described shape as shown in FIG. 71 or a stair-like shape. In FIG. 73, both the rolls 535, 535 are always pressed towards coming close to each other and configured to follow changes of the width W. If the conductor is annealed prior to the above plastic deformation, it can be plastically deformed with a small pressing force. If the chamfered parts (roll-off parts) 504 are inclined chamfered parts as shown in FIGS. 68 to 70 and 73, this is advantageous in that the dimensional error of the cross-sectional shape is small and, therefore, a high-precision product can be easily obtained.

Figure 74:
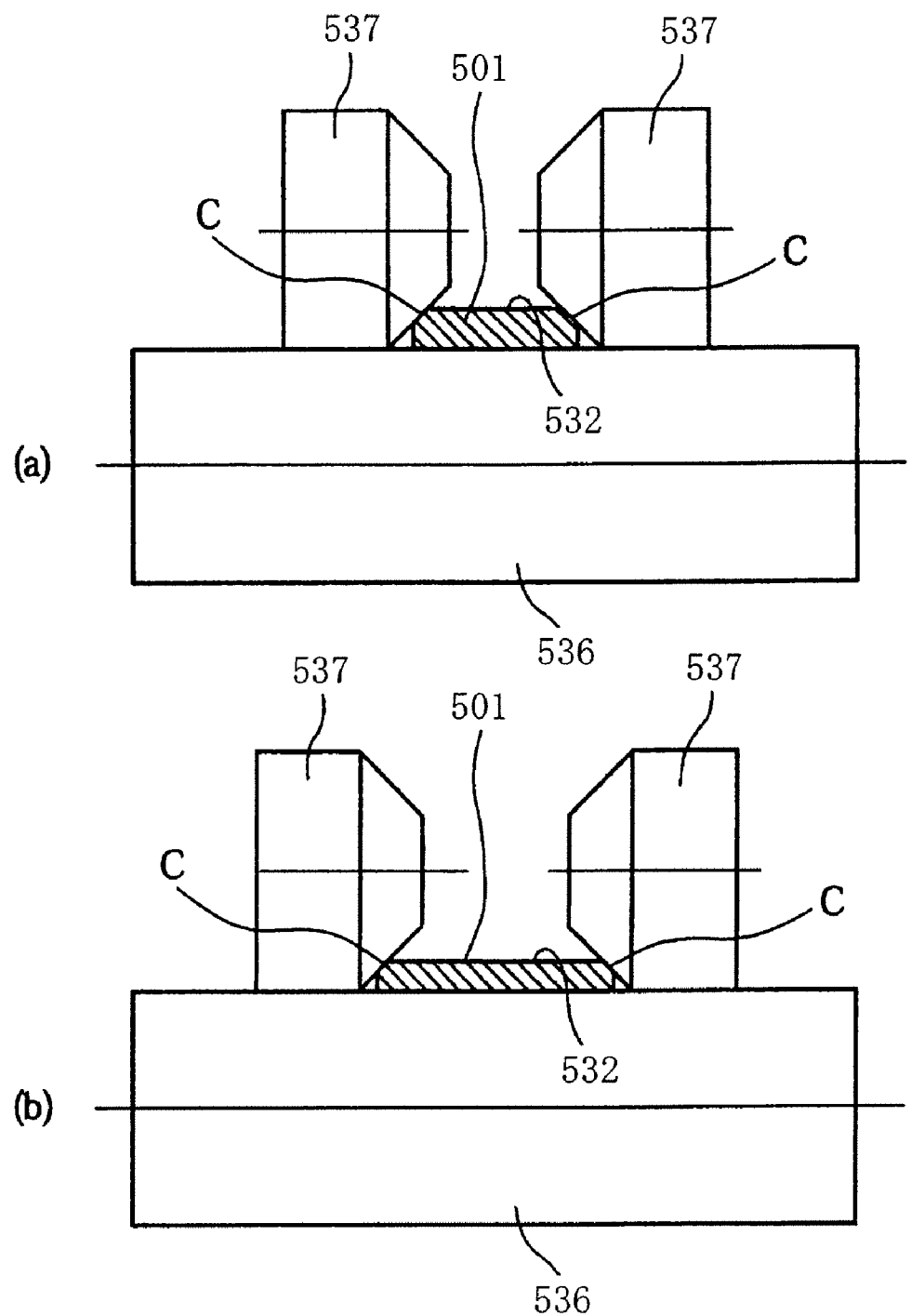
FIG. 74 is explanatory views showing an essential part of another example of the manufacturing system.

Next, FIG. 74 shows another embodiment of the manufacturing method, which is a method for processing a conductor 501 by a combination of three rolls 536, 537 and 537 to form chamfered parts 504, 504 at the corners C, C at both ends of one of the long sides 532. In other words, in comparison with FIG. 69, a conductor 501 produced by this manufacturing method (manufacturing system) has chamfered parts 504, 504 formed at the corners C, C at the top and bottom ends of one long side 532. Thereafter, the insulating layer 505 is formed to cover all the sides except for desired one of both the short sides 511 and 534 (both the sort sides 511 and 534 may be formed into conductor exposed parts 507 and 507).

In FIG. 73 or 74, the rolls 535, 536 and 537 preferably drive into rotation (to transmit a rotatively driving force). However, when the degree of processing is small, they may be of driven type (non-drive type).

Furthermore, the processing step of chamfered parts (roll-off parts) 504 shown in FIGS. 73 and 74 is preferably in tandem with a flat-type wire manufacturing step of changing the width W and the thickness T in the longitudinal direction (which is the preceding step), or in other words the two steps are preferably sequential processing steps.

Figure 72:
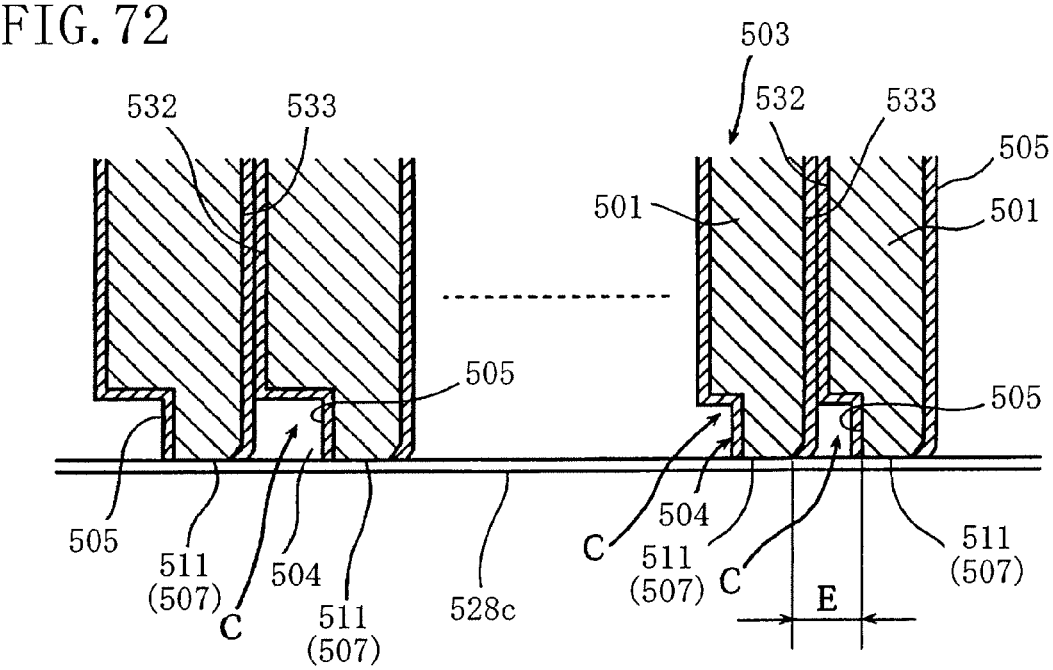
FIG. 72 is a cross-sectional view showing a state of use of the above embodiment.

Next, a description is given of another embodiment of the electric insulated wire shown in FIGS. 71 and 72. The electric insulated wire has an approximately rectangular cross section and only one side 511 corresponding to one short side has a conductor exposed part 507 formed therein without being covered with an insulating layer 505. Although these points are the same as in the embodiment shown in FIGS. 68 to 70, this embodiment is different from that the chamfered part 504 is cut away to have a small rectangular cross section and formed only at one end of one side 511. The other configurations are the same as in FIGS. 68 to 70 and, therefore, a detailed description thereof is not given (the same reference numerals denotes parts having the same configurations).

In FIG. 71, chamfered parts (roll-off parts) 504 may be formed one at each of the corners C, C at both ends of one side 511 or may be formed one at each of all of four corners C . . . . Alternatively, chamfered parts (roll-off parts) 504 may be formed one at each of the corners C, C at both ends of a long side 532 (not shown). Although FIGS. 71 and 72 show the case where the chamfered parts (roll-off parts) 504 has a small rectangular shape, they may be changed in design, for example, into the shape of a quarter circle.

Each of the embodiments shown in FIGS. 68 to 72 can be said to be formed so that one side (short side) 511 is smaller. Furthermore, when the electric insulated wire is coil-wound in tiers, a sufficient large conductor spaced distance E between adjacent turns of the wire can be obtained, which provides enhanced insulation property.

Although it is also preferable that a long electric insulated wire 503 has a conductor exposed part 507 formed over the entire length as shown in FIGS. 68 to 72, the conductor exposed part 507 may not be formed within a predetermined range of the entire length of the electric insulated wire 503. Alternatively, the electric insulated wire 503 may preferably have conductor exposed parts 507 arranged partially in the longitudinal direction depending on the state of use and its usage.

Furthermore, instead of the chamfered parts 504 formed over the entire length of the conductor exposed part 507 as previously described with reference to FIGS. 68 to 72, the chamfered parts 504 may be formed only within a predetermined range of the entire length of the conductor exposed part 507. This is advantageous in that the number of processing steps can be reduced according to the state of use and the usage.

The electric insulated wire 503 according to the present invention is further described below in more detail.

The insulating layer 505 is formed to cover the outer surface 502 of the conductor 501 by electrodeposition and baking. The conductor exposed part 507 is formed by not forming an electrodeposition layer on part of the conductor prior to the baking process for forming the insulating layer 505. Alternatively, the conductor exposed part 507 is formed by partially removing an electrodeposition layer formed on the conductor prior to the baking process.

Figure 75:
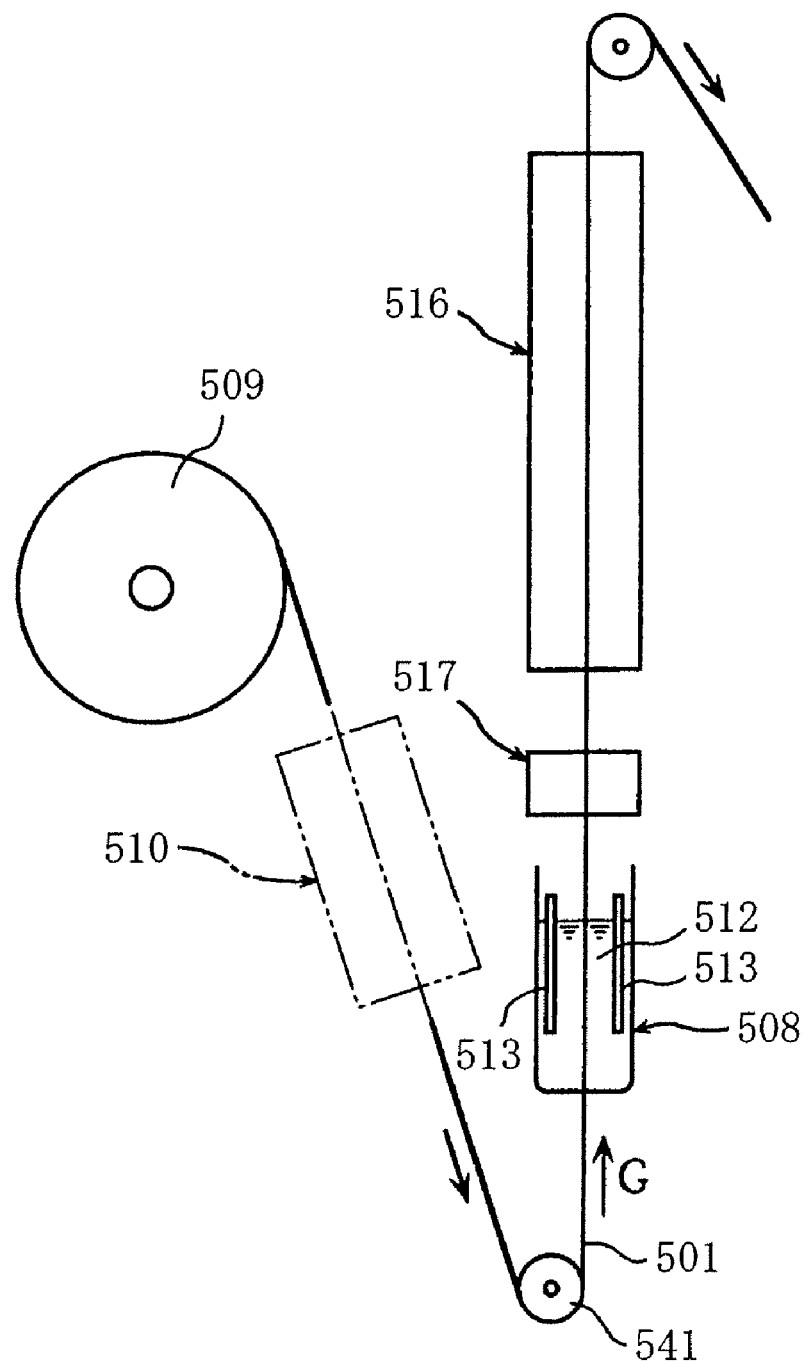
FIG. 75 is an explanatory view showing an example of a manufacturing method.

FIG. 75 schematically shows the whole of the manufacturing method, wherein 508 denotes an electrodeposition bath. Specifically, a conductor is fed out of a feed roller 509, run through a processing device 510 (not given in detail but shown in the dash-double-dot-line) including a rolling machine for rolling a conductor of circular cross section into a flat-type wire, a chamfer (roll-off part) forming device, such as rolls 535, 536 and 537 as described with reference to FIGS. 72 and 73 and a washing bath, and continuously passed through the electrodeposition bath 508 storing an electrodeposition liquid 512 from the bottom wall thereof upward by running the conductor 501 via a direction change roller 541 from below to above as shown in the arrow G, whereby (the later-described) fine resin particles in the electrodeposition liquid 512 are deposited on the outer surface of the conductor 501 to form an electrodeposition layer. This is called an electrodeposition layer depositing process.

Figure 76:
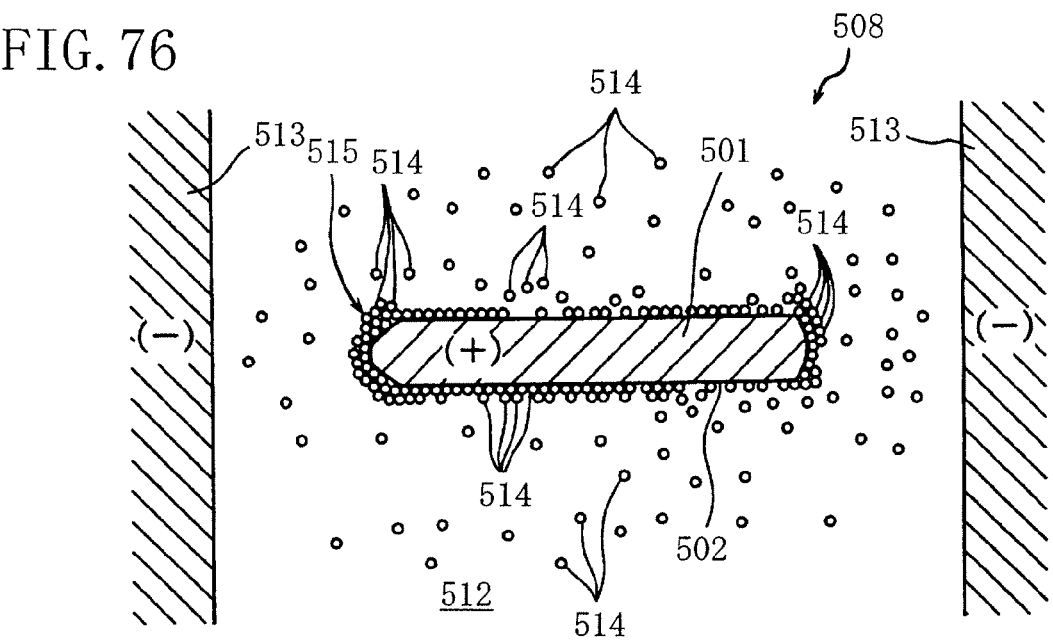
FIG. 76 is a schematic explanatory view of the principle of electrodeposition.

FIG. 76 is a schematic plan view for illustrating the summary of the electrodeposition layer depositing process. With reference to this figure together with FIG. 75, minus electrodes 513 are put in the electrodeposition bath 508 and the flat-type wire (conductor 501) running and passing through in the direction of the arrow G is brought into contact with an (unshown) power supply to become a plus electrode. Suitable as the electrodeposition liquid 512 is epoxy dispersion (emulsion) electrodeposition varnish or polyimide or polyamide-imide electrodeposition varnish. The schematically shown small circles are resin fine particles 514, such as epoxy resin particles. The resin fine particles 514 in migration are charged with negative electricity and efficiently attached one after another to the outer surface 502 of the conductor 501 serving as a positive electrode to form an electrodeposition layer 515.

Furthermore, as shown in FIG. 75, a baking oven 516 is provided in order to carry out the baking process for continuously baking the electrodeposition layer 515 deposited on the outer surface of the conductor 501. When the conductor 501 passes through the baking oven 516, an insulating layer 505 is formed to cover the outer surface 502 of the conductor 501. Thereafter, the conductor 501 is taken up on an unshown take-up roller.

A conductor exposed part forming device 517 is provided between the electrodeposition bath 508 and the baking oven 516. Specifically, between the electrodeposition layer depositing process and the baking process, the conductor exposed part forming device 517 blows out an uncured electrodeposition layer 515 deposited on the outer surface 502 of the conductor 501 as shown in FIG. 77(a), by an injected fluid H as shown in FIG. 77(b) to partially remove the electrodeposition layer 515 (see the arrows J in FIG. 77(b)).

Air is preferably used as the injected fluid H but other gases, liquids, such as water, or vapor can also be used.

Figure 77:
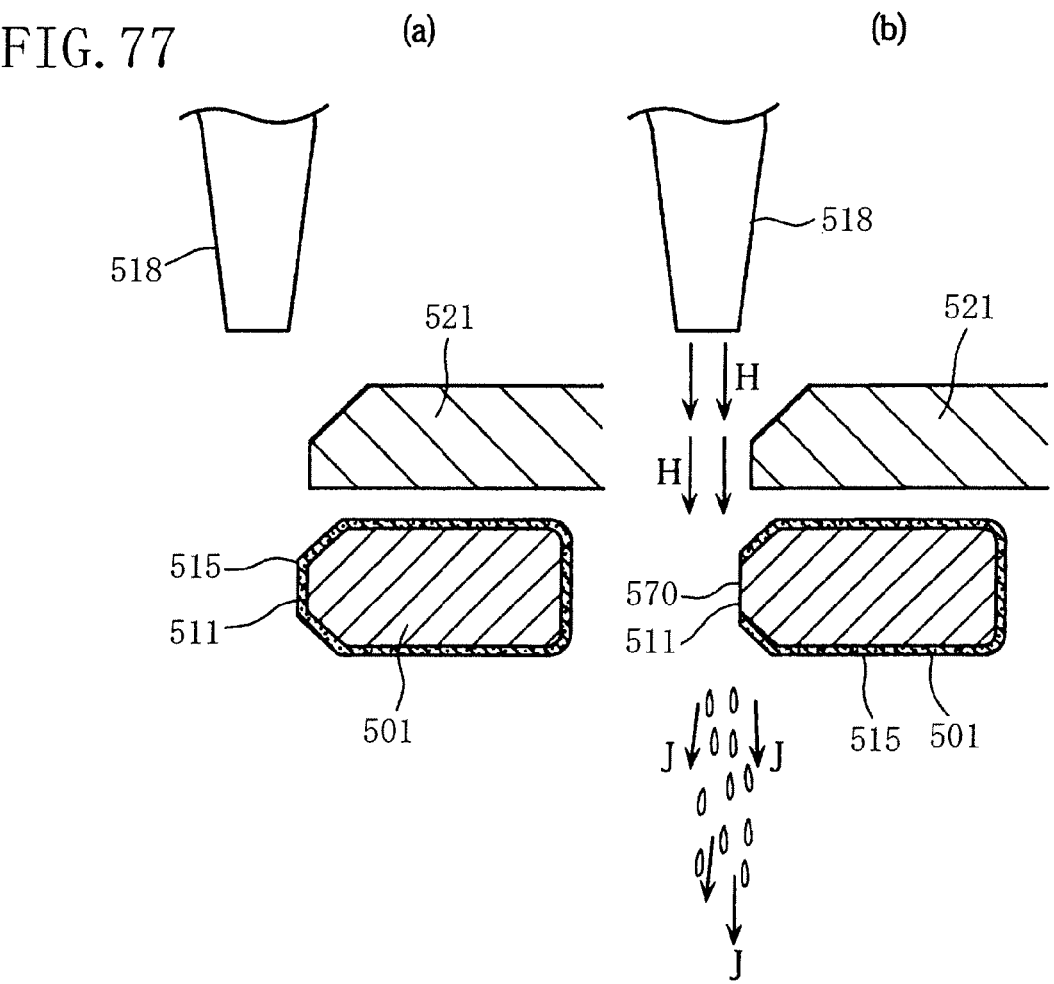
FIG. 77 is enlarged views of an essential part for explaining the behavior.

More specifically, as shown in FIG. 77(a), the uncured (unbaked) electrodeposition layer 515 deposited on one side (a short side) 511 of the conductor 501 is partially blow out by injected fluid H from a nozzle 518 as shown in FIG. 77(b) to remove the electrodeposition layer 515 only from the short side 511 (see the arrows J). The removed part 570 is subjected to the later baking process to form a conductor exposed part 507 as shown in FIGS. 69 and 71. As shown in FIG. 77, it is also preferable that a fluid masking member 521 is disposed to prevent the injected fluid H from blowing out the electrodeposition layer 515 from the sides other than the short side 511.

Figure 78:
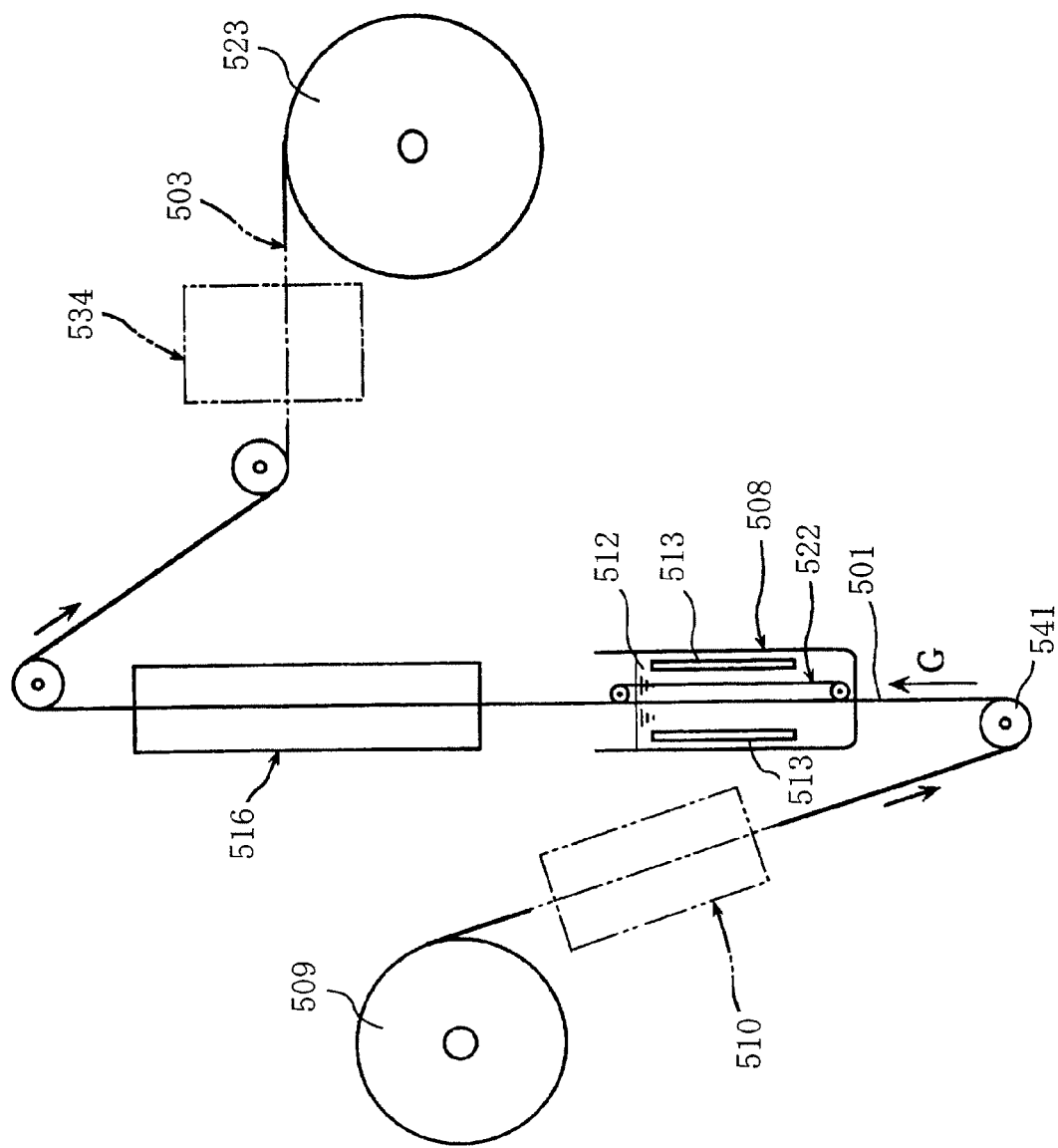
FIG. 78 is an explanatory view showing another example of the manufacturing method.
Figure 79:
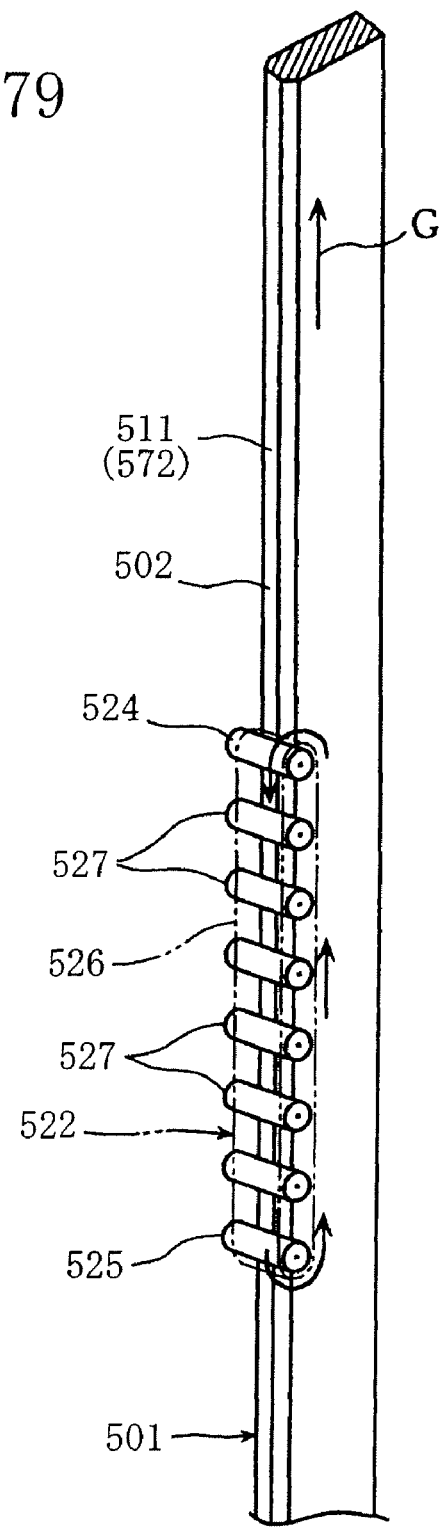
FIG. 79 is a perspective view for specific explanation of the manufacturing method.

Next, FIGS. 78 and 79 show another embodiment. As seen from comparison with the above-stated FIG. 75, instead of the conductor exposed part forming device 517 shown in FIG. 75, a movable masking member 522 is disposed in the electrodeposition bath 508.

Referring to FIG. 78, a conductor is fed out of a feed roller 509, run through a processing device 510 including a rolling machine for rolling a conductor of circular cross section into a flat-type wire, a chamfer forming device, such as rolls 535, 536 and 537 as shown in FIGS. 73 and 74, and a washing bath, and passed through the electrodeposition bath 508 containing an electrodeposition liquid 512 via a direction change roller 541 from below to above (as shown in the arrow G) to deposit fine resin particles 514 in the electrodeposition liquid 512 on the outer surface of the conductor 501 (as shown in FIG. 76). During the electrodeposition, in the case shown in FIG. 79, the movable masking member 522 blocks the approach of resin fine particles 514 to one side 511 (of the conductor 501) of rectangular cross section, whereby only the one side 511 is formed into an electrodeposition layer non-formed part 572. In the later baking process, the electrodeposition layer non-formed part 572 is formed into a conductor exposed part 507. Thus, the electrodeposition layer non-formed part and the corresponding conductor exposed part 507 are provided in part of the conductor.

Referring back to FIG. 78, the electrodeposition layer-deposited conductor 501 continuously fed while running upward from the electrodeposition bath 508 is fed into the baking oven 516, baked in the baking oven 516 (subjected to the baking process) to form an insulating layer 505 covering the conductor 501, and then taken up on the take-up roller 523. In this manner, by partial non-formation of the electrodeposition layer 515 prior to baking for forming the insulating layer 505, the conductor exposed part 507 is formed (through the later baking process). Specifically, referring to FIG. 79, a plurality of rollers 527, . . . are disposed in parallel to each other at a given vertical pitch between a pair of upper and lower rollers 524 and 525 and a belt is wrapped around these rollers (as shown in the dash-double-dot-lines) to constitute a masking member 522. The belt serving as the masking member 522 is pressed against (made contact with) one side (a short side) 511 of the conductor 501 of rectangular cross section. In FIG. 79, the conductor 501 is schematically shown with a constant cross section. When the conductor 501 changes the width W increasingly or decreasingly as shown in FIG. 68, it is preferable that the plurality of rollers 524, 525, 527, . . . can follow changes in the width W of the conductor 501 such as by freely moving back and forth in the horizontal direction to press the conductor 501 with an elastic member. In this case, since the plurality of rollers shown in FIG. 79 have a so-called caterpillar structure, they can easily follow changes in the width W of the conductor 501. The belt 526 used is one made of insulating material, such as synthetic resin or rubber.

Figure 80:
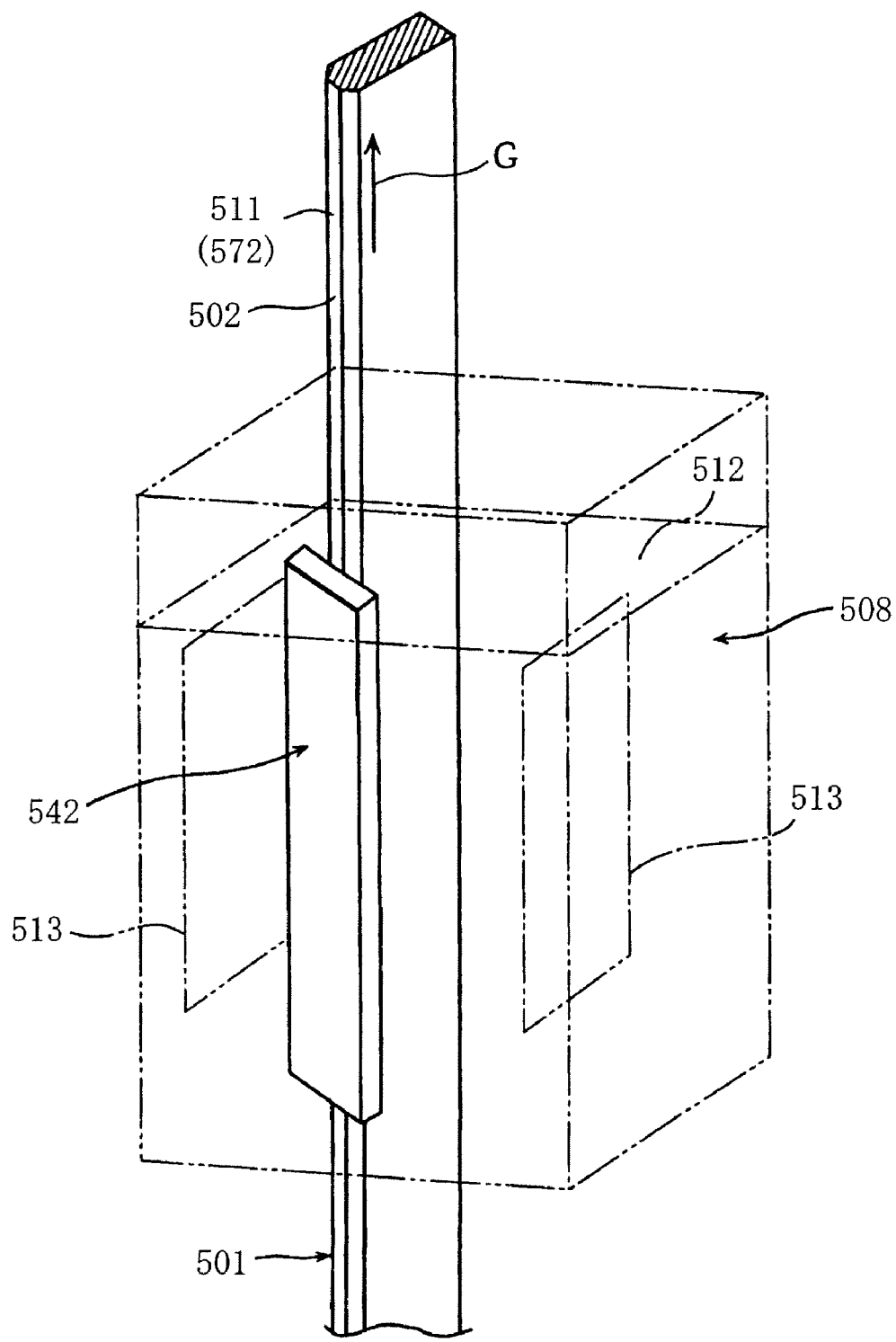
FIG. 80 is a perspective view for specific explanation of another manufacturing method.

Next, FIG. 80 shows still another embodiment. Instead of the movable masking member 522 shown in FIGS. 78 and 79, a sliding masking member 542 is disposed in the electrodeposition bath 508.

Specifically, this is a method in which during the electrodeposition layer depositing process a conductor 501 is partially masked by the sliding masking member 542 in sliding contact with the outer surface 502 of the conductor 501 passing through the inside of the electrodeposition bath 508 so as not to form the electrodeposition layer 515 on part of the outer surface 502 of the conductor 501 and a conductor exposed part 507 is formed in the later baking process using the baking oven 516 shown in FIG. 78. The sliding masking member 542 is made of insulating material, such as synthetic resin or rubber. In FIG. 80, a single sliding masking member 542 is used. However, it is also preferable that such a single sliding masking member is divided into plural pieces and each divided piece is freely movable back and forth to elastically press the running conductor 501, whereby each divided piece can follow increasing and decreasing changes of the width W of the conductor 501 illustrated in FIG. 68 (over the length) to surely exhibit a masking action (not shown). In FIG. 80, it is preferable that the sliding masking member 542 is supported in the electrodeposition bath 508 by an (unshown) holding member and pressed against the conductor 501 by an elastic member to come into contact with the conductor 501 with elasticity.

According to the manufacturing methods described with reference to FIGS. 75 to 80, production of fine dusts due to mechanically cutting can be eliminated unlike the conventional art, which is advantageous in that production of failure during manufacturing process of electric and electronic instruments and precision instruments can be prevented.

As described so for, this aspect of the invention is configured so that at least one side 511 of the conductor 501 of approximately rectangular cross section is exposed, the other sides are covered with an insulating layer 505, the corner C of the transverse cross section corresponding to at least one end of the one side 511 of the conductor 501 is cut away to form a chamfered part 504, and the chamfered part 504 is covered with the insulating layer 505. Therefore, when the conductor 501 is wound in tiers laterally and vertically, the instrument can become compact and the conductor spaced distance E can be ensured to maintain a good insulation property. This sufficiently meets the demands for compaction, enhanced performance and enhanced efficiency of electric and electronic instruments.

Furthermore, the conductor 501 is a flat-type wire and the one side 511 is a short side of the approximately rectangular cross section. Therefore, even in the winding manner shown in FIGS. 70 and 72 in which the conductor spaced distance E is likely to be very small, the conductor 501 can ensure the insulation property and contribute to compaction and enhanced performance of the electric and electronic instruments.

Furthermore, the insulating layer 505 is formed by electrodeposition and baking and the conductor exposed part 507 at the one side 511 is formed by partial non-formation or partial removal of the electrodeposition layer 515 prior to baking for forming the insulating layer 505. Therefore, the conductor 501 can be easily manufactured, which is suitable for mass production. In addition, the conductor 501 is prevented from dust production due to mechanical cutting, which is suitable for precision instruments and electronic instruments.

Next, a description is given of still another embodiment of the electric insulated wire and the method for manufacturing the same.

When an electric insulated wire is used as a magnet wire, a high-voltage transformer coil or a non-contact IC card antenna coil, it needs a terminal. In processing the terminal, a method of mechanically cutting away part of the insulating layer is still used.

Figure 82:
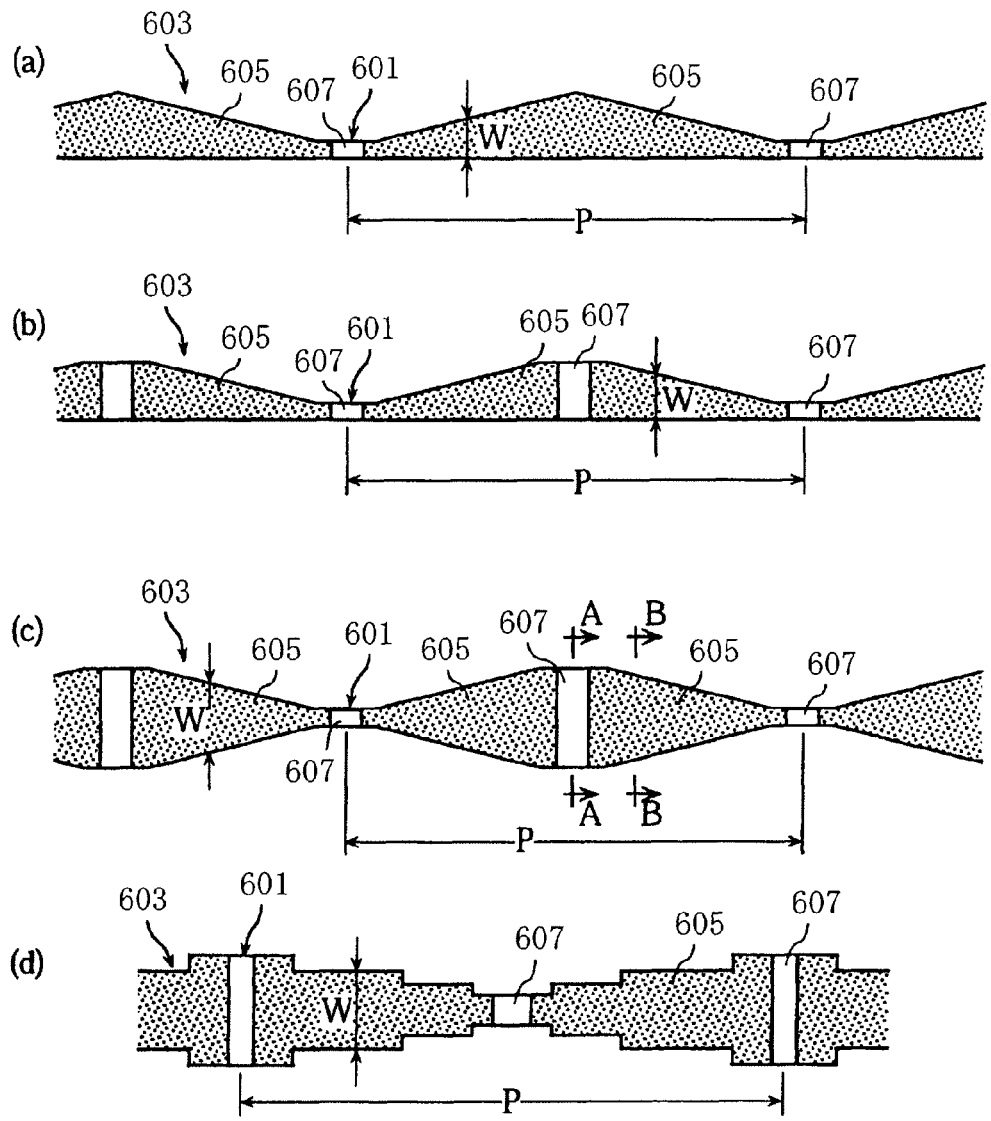
FIG. 82 is plan views showing various embodiments of an electric insulated wire according to the present invention.
Figure 83:
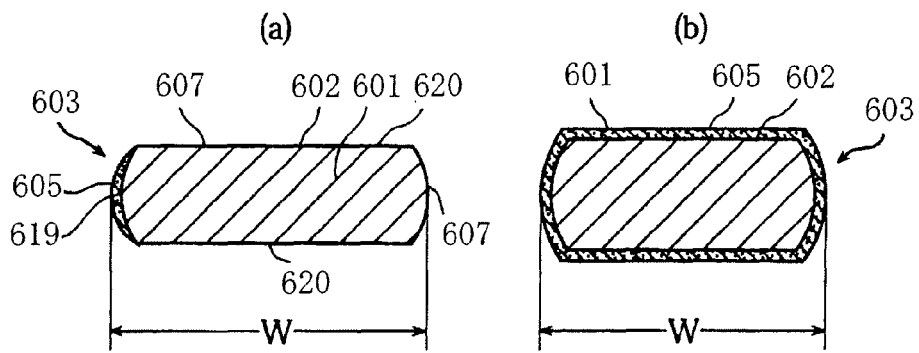
FIG. 83 is enlarged cross-sectional views of essential parts.

FIGS. 82 and 83 show various examples of an electric insulated wire 603 which have a flat-type transverse cross section (in other words, rectangular or minus-sign cross section) and whose width W changes increasingly and decreasingly over the length. Although not shown, the thickness of the electric insulated wire is smaller at portions of larger width W and larger at portions of smaller width W.

In FIGS. 82(a) to 82(d), dotted portions show portions in which the insulating layer 605 covers the conductor 601 and non-dotted portions show conductor exposed parts 607.

FIG. 83 (a) shows a cross section taken along the line A-A of FIG. 82(c) and FIG. 83(b) shows a cross section taken along the line B-B of FIG. 82(c). As seen from the figures, conductor exposed parts 607 at which the conductor 601 is exposed are arranged (formed) at a given pitch in the longitudinal direction and across the conductor 601 in the width direction in plan view.

In this electric insulated wire 603, an insulating layer 605 is covered on the outer surface 602 of the conductor 601 by electrodeposition and baking. The conductor exposed parts 607 are formed by not forming the electrodeposition layer on part of the outer surface 602 prior to the baking process or by partially removing the electrodeposition layer prior to the baking process.

Figure 85:
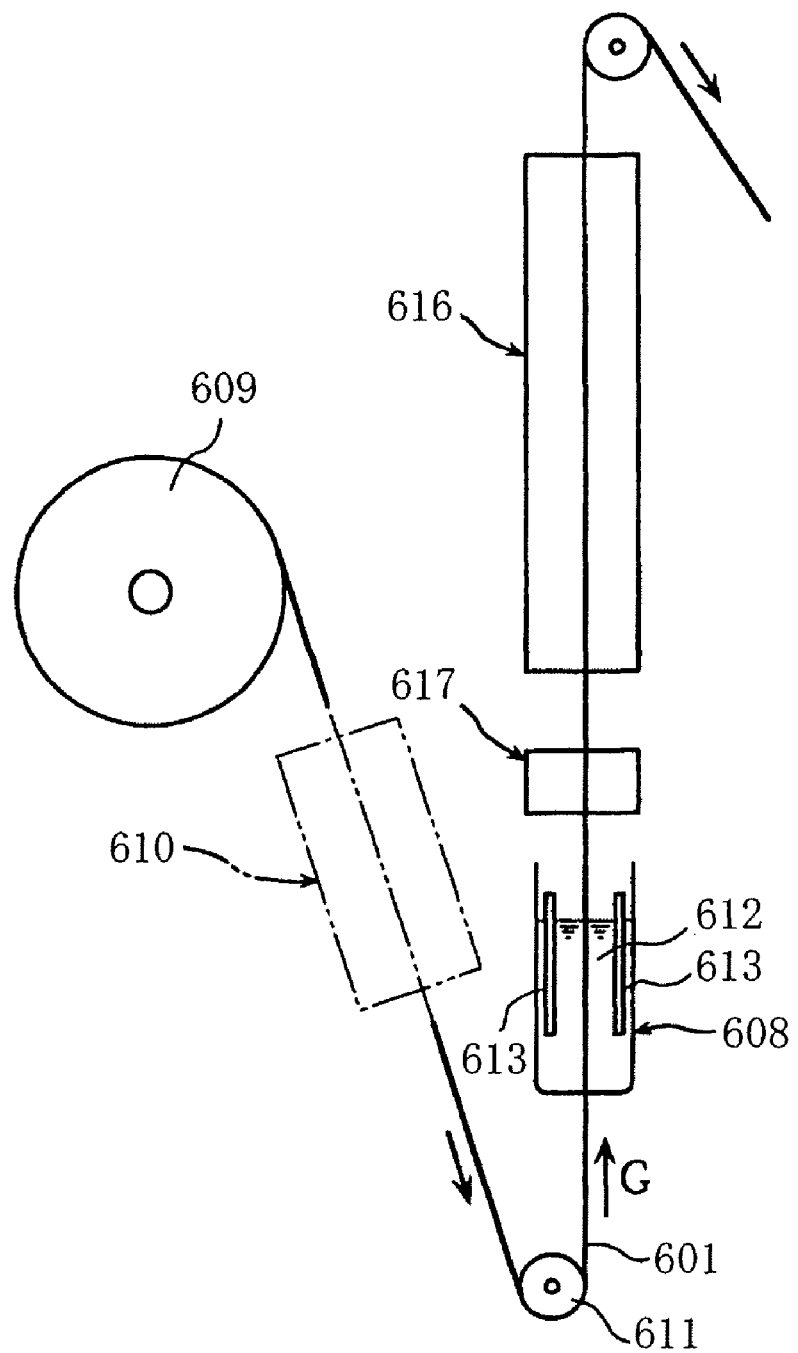
FIG. 85 is a schematic explanatory view for explaining a manufacturing method according to the present invention.

FIG. 85 schematically shows the whole of the manufacturing method, wherein 608 denotes an electrodeposition bath. Specifically, a conductor is fed out of a feed roller 609, run through a processing device 610 (not given in detail but shown in the dash-double-dot-line) including a rolling machine for rolling a conductor of circular cross section into a flat-type wire and a washing bath, and continuously passed through the electrodeposition bath 608 storing an electrodeposition liquid 612 from the bottom wall thereof upward by running the conductor 601 via a direction change roller 611 from below to above as shown in the arrow G, whereby (the later-described) fine resin particles in the electrodeposition liquid 612 are deposited on the outer surface of the conductor 601 to form an electrodeposition layer. This is called an electrodeposition layer depositing process.

Figure 86:
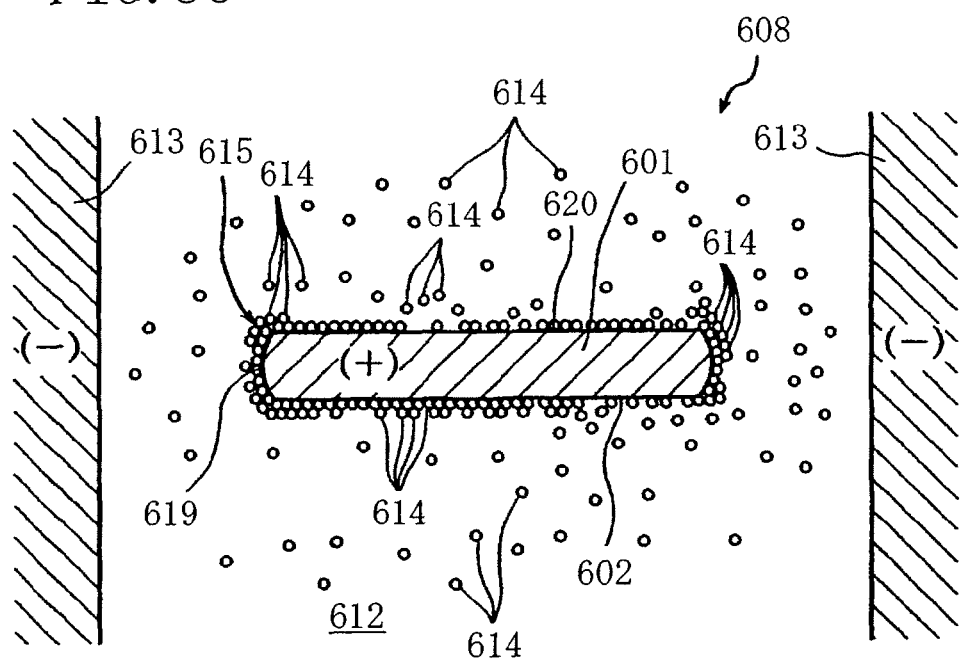
FIG. 86 is a schematic explanatory view of the principle of electrodeposition.

FIG. 86 is a schematic plan view for illustrating the summary of the electrodeposition layer depositing process. With reference to this figure together with FIG. 85, minus electrodes 613 are put in the electrodeposition bath 608 and the flat-type wire (conductor 601) running and passing through in the direction of the arrow G is brought into contact with an (unshown) power supply to become a plus electrode. Suitable as the electrodeposition liquid 612 is epoxy dispersion (emulsion) electrodeposition varnish or polyimide or polyamide-imide electrodeposition varnish. The schematically shown small circles are resin fine particles 614, such as epoxy resin particles. The resin fine particles 614 in migration are charged with negative electricity and efficiently attached one after another to the outer surface 602 of the conductor 601 serving as a positive electrode to form an electrodeposition layer 615.

Furthermore, as shown in FIG. 85, a baking oven 616 is provided in order to carry out the baking process for continuously baking the electrodeposition layer 615 deposited on the outer surface of the conductor 601. When the conductor 601 passes through the baking oven 616, an insulating layer 605 is formed to cover the outer surface 602 (see FIG. 83(b)) of the conductor 601. Thereafter, the conductor 601 is taken up on an unshown take-up roller.

A conductor exposed part forming device 617 is provided between the electrodeposition bath 608 and the baking oven 616. Specifically, between the electrodeposition layer depositing process and the baking process, the conductor exposed part forming device 617 blows out an uncured electrodeposition layer 615 deposited on the outer surface 602 of the conductor 601 as shown in FIG. 87(a), by an injected fluid H as shown in FIG. 87(b) to partially remove the electrodeposition layer 615 (see the arrows J in FIG. 87(b)). The parts 670 of the outer surface 602 of the conductor 601 from which the electrodeposition layer 615 is removed are subjected to the later baking process to form conductor exposed parts 607 as shown in FIGS. 82(a) and 82(d).

Air is preferably used as the injected fluid H but other gases, liquids, such as water, or vapor can also be used.

Figure 87:
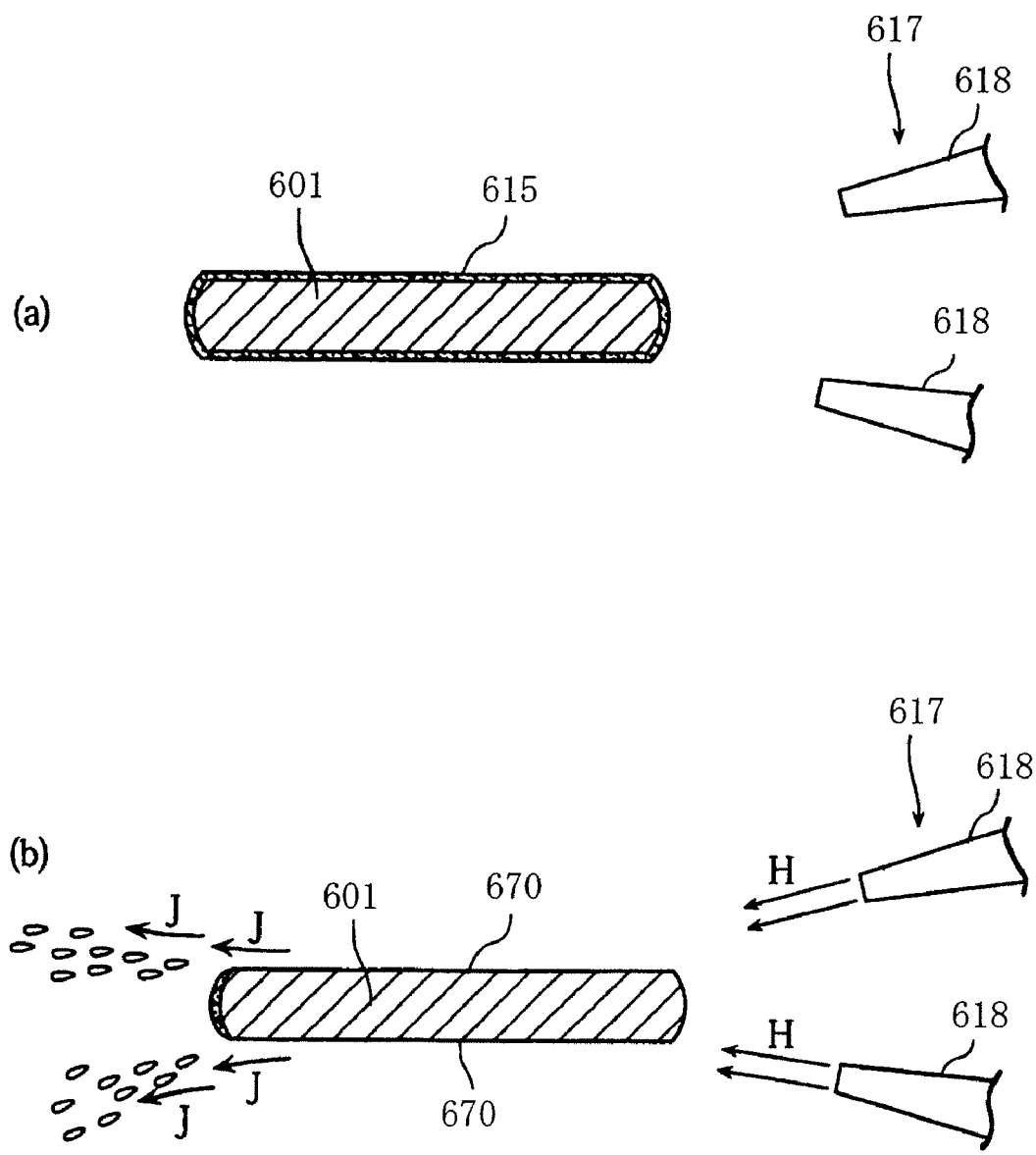
FIG. 87 is enlarged views of an essential part for explaining the behavior.

In FIG. 87, two nozzles 618, 618 are directed to the top and bottom, respectively, of the flat-type conductor 601 and an unshown position detector is used to inject fluid H over a very minute time, whereby the uncured (unbaked) electrodeposition layer 615 is blown out as shown in FIGS. 87(a) and 87(b). The arrangement of the nozzles 618, 618 in FIG. 87 is suitable for the formation of removed parts 670 (conductor exposed parts 607) in the width direction of the flat-type conductor 601 as shown in FIGS. 82 and 83. When the width W of the conductor 601 changes increasingly and decreasingly as shown in FIGS. 82(a) to 82(d), the position detector may detect the width W or a proximity sensor may detect the positions of the ridges and valleys. Alternatively, a measurement device for measuring the length of the conductor 601 being continuously fed may be used as the position detector. Furthermore, in FIG. 87, it is also preferable that a reciprocating mechanism for laterally extending and retracting the nozzle 618 is additionally provided to address position changes of the ridges and valleys at each lateral edge due to changes of the width W of the conductor 601 (not shown).

In FIG. 87, it is also preferable to provide only one of the nozzles 618, 618 and form the removed parts 670 (conductor exposed parts 607) only in one surface of the conductor 601.

Figure 84:
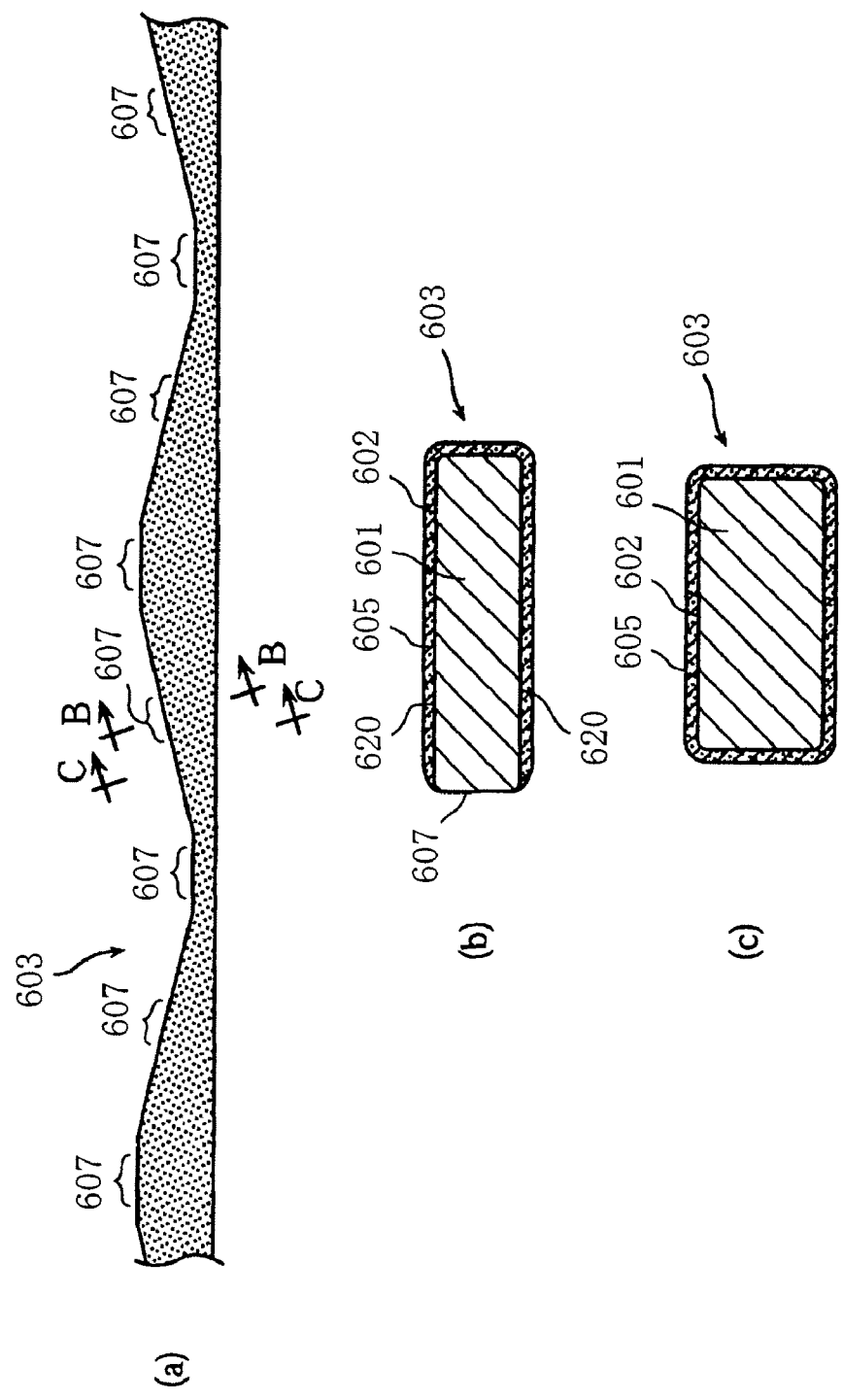
FIG. 84 is views showing another embodiment of the electric insulated wire, wherein 84(a) is a plan view, 84(b) is an enlarged cross-sectional view taken along the line B-B of FIGS. 84(a) and 84(c) is an enlarged cross-sectional view taken along the line C-C of FIG. 84(a)
Figure 88:
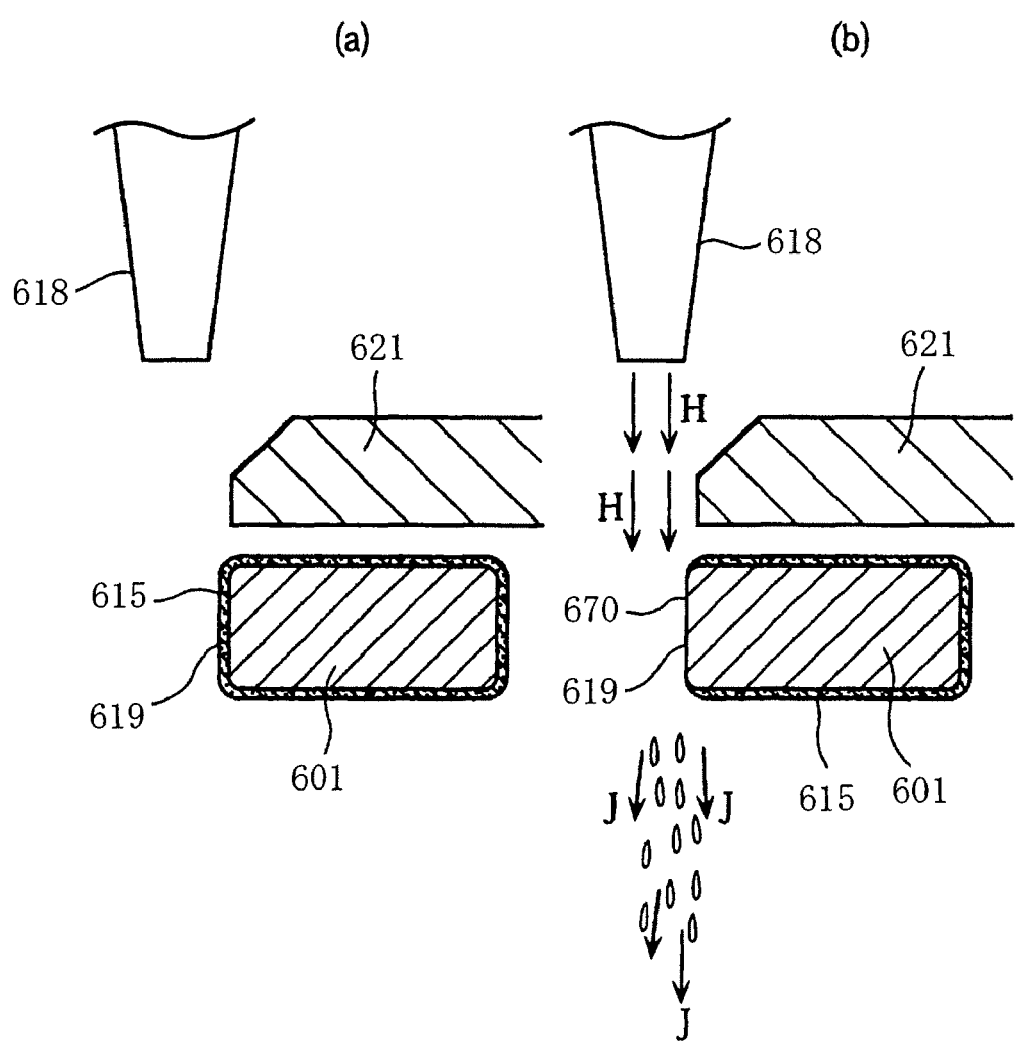
FIGS. 88(a) and 88(b) are side schematic views of manufacturing steps illustrating how an electrodeposited layer on a side of the conductor is blown off by an injected fluid.

Next, FIG. 88 shows still another embodiment (as an alternative to that shown in FIG. 87). As shown in FIG. 88(a), an uncured (unbaked) electrodeposition layer 615 deposited on a short side 619 of rectangular cross section is partially blown out by injected fluid H from a nozzle 618 as shown in FIG. 88(b) to remove the electrodeposition layer 616 only from part of the short side 619 (see the arrows J). The removed parts 670 are subjected to the later baking process to form conductor exposed parts 607, for example, as shown in FIG. 84. FIGS. 84(b) and 84(c) show cross sections taken along the line B-B and the line C-C, respectively, of FIG. 84(a). While the conductor exposed parts 607 are formed in the long sides 620 of rectangular cross section in FIGS. 82 and 83, the conductor exposed parts 607 are formed in a short side 619 in FIG. 84. As shown in FIG. 88, it is also preferable that a fluid masking member 621 is disposed to prevent the injected fluid H from blowing out the electrodeposition layer 615 from the sides other than the short side 611.

Figure 89:
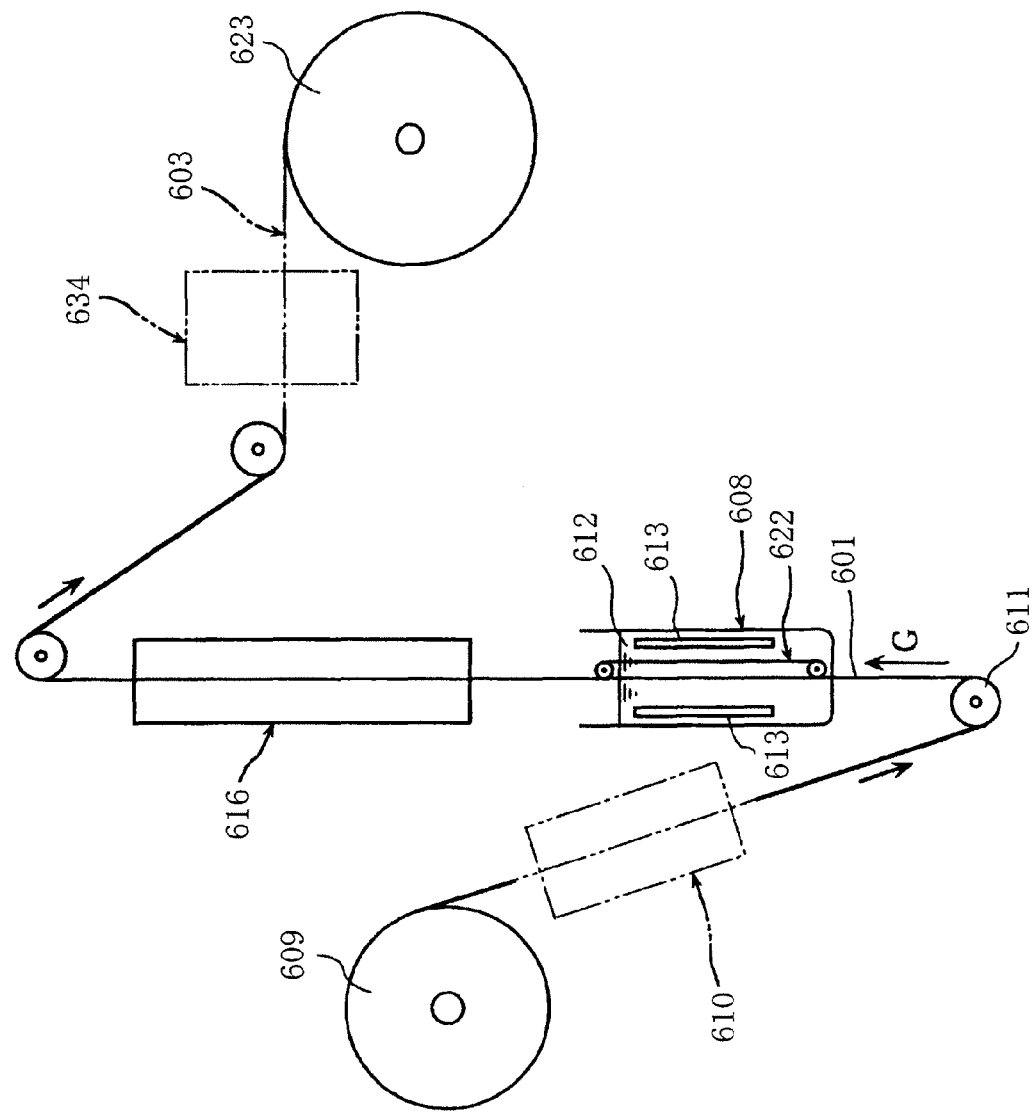
FIG. 89 is a schematic explanatory view for explaining another embodiment of the manufacturing method according to the present invention.
Figure 90:
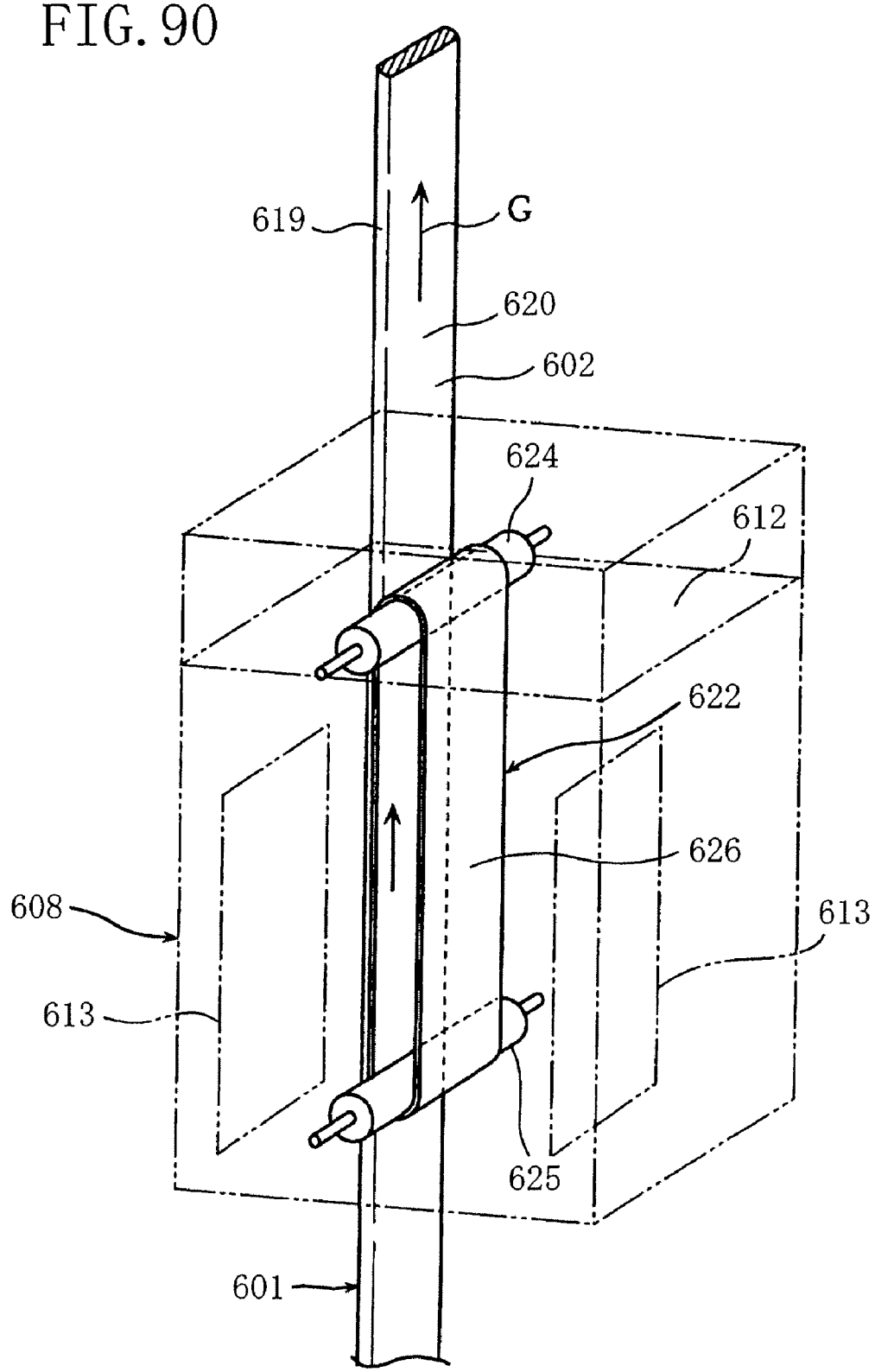
FIG. 90 is an explanatory perspective view of an essential part of the above embodiment.

Next, FIGS. 89 and 90 show another embodiment. As seen from comparison with the above-stated FIG. 85, instead of the conductor exposed part forming device 617 shown in FIG. 85, a movable masking member 622 is disposed in the electrodeposition bath 608.

Figure 94:
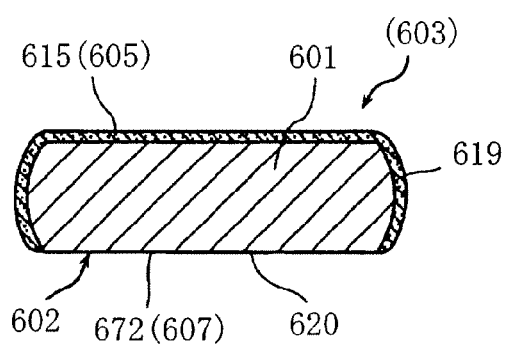
FIG. 94 is a cross-sectional view showing another embodiment of the electric insulated wire according to the present invention.

Referring to FIG. 89, a conductor is fed out of a feed roller 609, run through a processing device 610 including a rolling machine for rolling a conductor of circular cross section into a flat-type wire and a washing bath, and passed through the electrodeposition bath 608 containing an electrodeposition liquid 612 via a direction change roller 611 from below to above (as shown in the arrow G) to deposit fine resin particles 614 in the electrodeposition liquid 612 on the outer surface of the conductor 601 (as shown in FIG. 86). During the electrodeposition, in the case shown in FIG. 90, the movable masking member 622 blocks the approach of resin fine particles 614 to one of the long sides 620, 620 (of the conductor 601) of rectangular cross section, whereby only the one long side 620 is formed into an electrodeposition layer non-formed part 672. In the later baking process, the electrodeposition layer non-formed part 672 is formed into a conductor exposed part 607. Although the electrodeposition layer non-formed part 672 and the corresponding conductor exposed part 607 are provided in part of the conductor 601, the ratio of them in the outer surface 602 of the conductor 601 is large as compared with the ratio of the removed parts 670 and the corresponding conductor exposed parts 607 in the outer surface 602 of the conductor 601 in the above-stated embodiment shown in FIGS. 82 to 88. Specifically, as shown in FIGS. 90 and 94, an electrodeposition layer non-formed part 672 (conductor exposed part 607) is formed at one of the long sides 620, 620 of rectangular cross section over the entire length.

Referring back to FIG. 89, the electrodeposition layer deposited conductor 601 continuously fed while running upward from the electrodeposition bath 608 is fed into the baking oven 616, baked in the baking oven 616 (subjected to the baking process) to form an insulating layer 605 covering the conductor 601, and then taken up on the take-up roller 623.

Thus, in the embodiment shown in FIGS. 90 and 94, the configuration of the electric insulated wire 603 can be said as follows: By partial non-formation of the electrodeposition layer 615 prior to baking for forming the insulating layer 605, the conductor exposed part 607 is formed (through the later baking process).

To additionally explain FIG. 90, a belt 626 is wound around (at least) one pair of upper and lower rollers 624 and 625 freely rotatable about a horizontal axis to press a conductor 601 running from below to above, whereby the belt 626 itself runs in the same direction as the running direction G of the conductor 601 together with the pressing on (contact with) the conductor 601. In this manner, the belt 626 comes into contact with one long side 620 of the conductor 601 to place a masking action thereon. If a single or plurality of pressing rollers are additionally disposed between the pair of upper and lower rollers 624 and 625 to bring the belt 626 into tighter contact with the conductor 601, this is preferable because the masking action can be surely exhibited (see FIG. 91). At least one of the pair of upper and lower rollers 624 and 625 may be a drive roller for driving into rotation. If the width W of the conductor 601 changes increasingly and decreasingly, for example, as shown in FIGS. 82(a) to 82(d), the width of the belt 626 is selected at a sufficiently large value corresponding to the portions of the conductor 601 having a maximum width W. If the conductor 601 changes also the thickness increasingly and decreasingly (but schematically shown in a constant cross section in FIG. 90), the rollers 624 and 625 are preferably configured to freely move back and forth in the horizontal direction to press the conductor 601 such as with an elastic material, which makes it easier for the rollers to follow changes in the thickness of the conductor 601.

The manufacturing method shown in FIGS. 89, 90 and 94 can be summarized as follows. The manufacturing method is a method in which, during the electrodeposition layer depositing process, part of a conductor 601 (only one of the long sides 620, 620) is masked by a movable masking member 622 moving in the same direction as the passing direction G of the conductor 601 while coming into contact with the outer surface 602 of the conductor 601 in the electrodeposition bath 608 so as not to form the electrodeposition layer 615 on part of the outer surface 602 of the conductor 601 and a conductor exposed part 607 is formed in the later baking process. In this manner, this method is a method of first forming an electrodeposition layer non-formed part 672 and forming it into a conductor exposed part 607 in the subsequent process (baking process).

Figure 91:
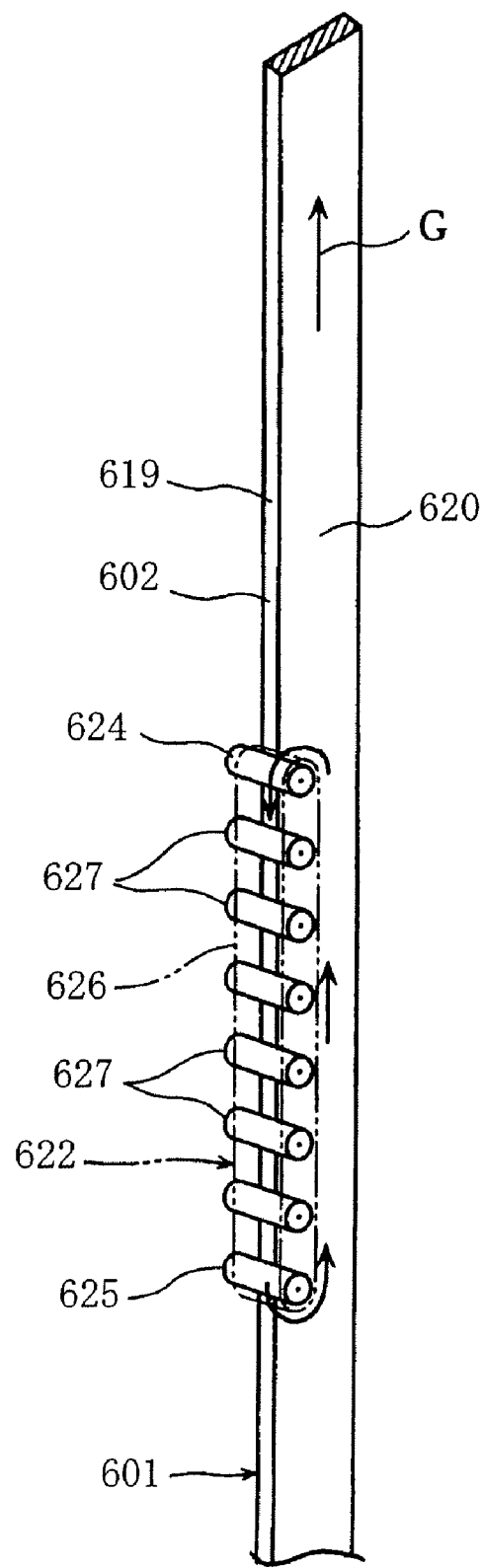
FIG. 91 is an explanatory perspective view showing an essential part of another embodiment.
Figure 96:
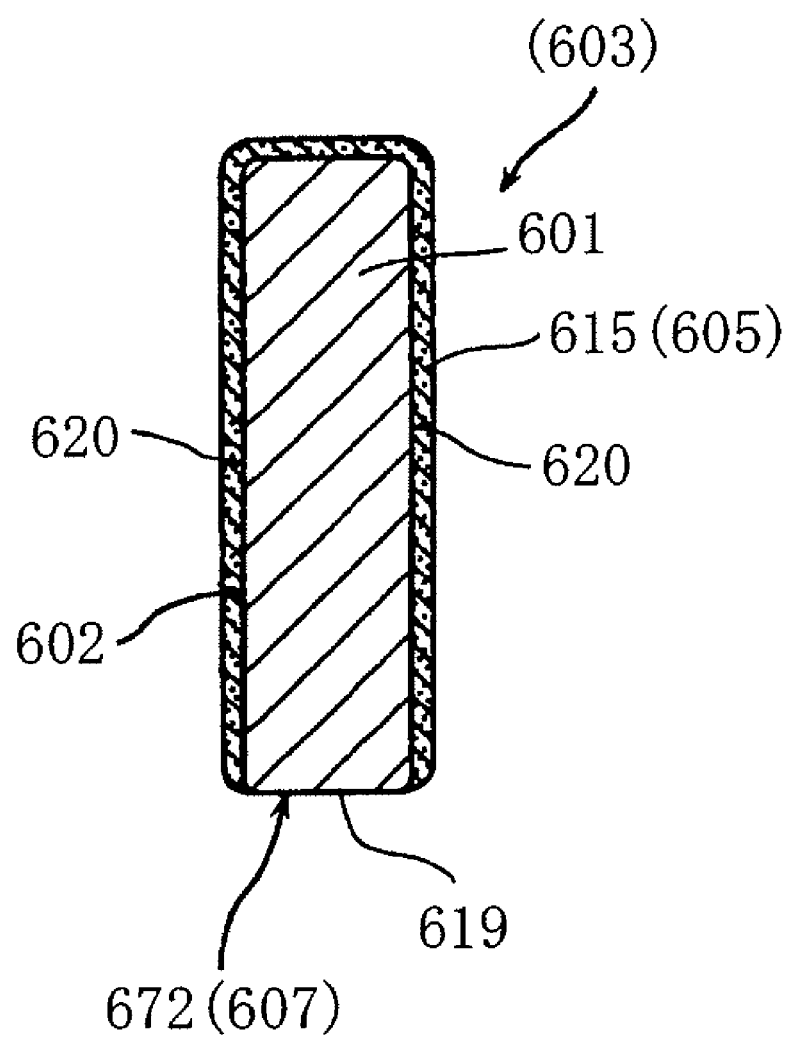
FIG. 96 is a cross-sectional view showing still another embodiment of the electric insulated wire according to the present invention.

Next, in still another embodiment shown in FIG. 91 (in which the electrodeposition bath 608 shown in the dash-double-dot-lines in FIG. 90 is not given in FIG. 91), a plurality of rollers 627, . . . are arranged in parallel to each other at a given vertical pitch between the pair of upper and lower rollers 624 and 625 and a belt is wrapped around these rollers (as shown in the dash-double-dot-lines) to constitute a masking member 626. The belt serving as the masking member 622 is pressed against (made contact with) at least one of the short sides 619, 619 of the conductor 601 of rectangular cross section (unlike the case in FIG. 90). The transverse cross-sectional view of an partly finished product or a final product obtained by the manufacturing method shown in FIG. 91 is illustrated in FIG. 96. The same reference numerals in FIGS. 96 and 94 are the same parts. While in the embodiment shown in FIG. 94 the electrodeposition layer non-formed part 672 and its corresponding conductor exposed part 607 formed in the later baking process exist in the long side 620, the same exist in the short side 619 in this embodiment, which is different from the above embodiment.

In FIG. 91, the same reference numerals as in FIG. 90 are the same parts and, therefore, a description thereof is not given. In FIG. 91, the conductor 601 is schematically shown with a constant cross section. When the conductor 601 changes the width W increasingly or decreasingly as shown in FIGS. 82(a) to 82(d), it is preferable that the plurality of rollers 624, 625, 627, . . . can follow changes in the width W of the conductor 601 such as by freely moving back and forth in the horizontal direction to press the conductor 601 with an elastic member. In this case, since the plurality of rollers shown in FIG. 91 have a so-called caterpillar structure, they can easily follow changes in the width W of the conductor 601. The belt 626 used is one made of insulating material, such as synthetic resin or rubber.

Figure 92:
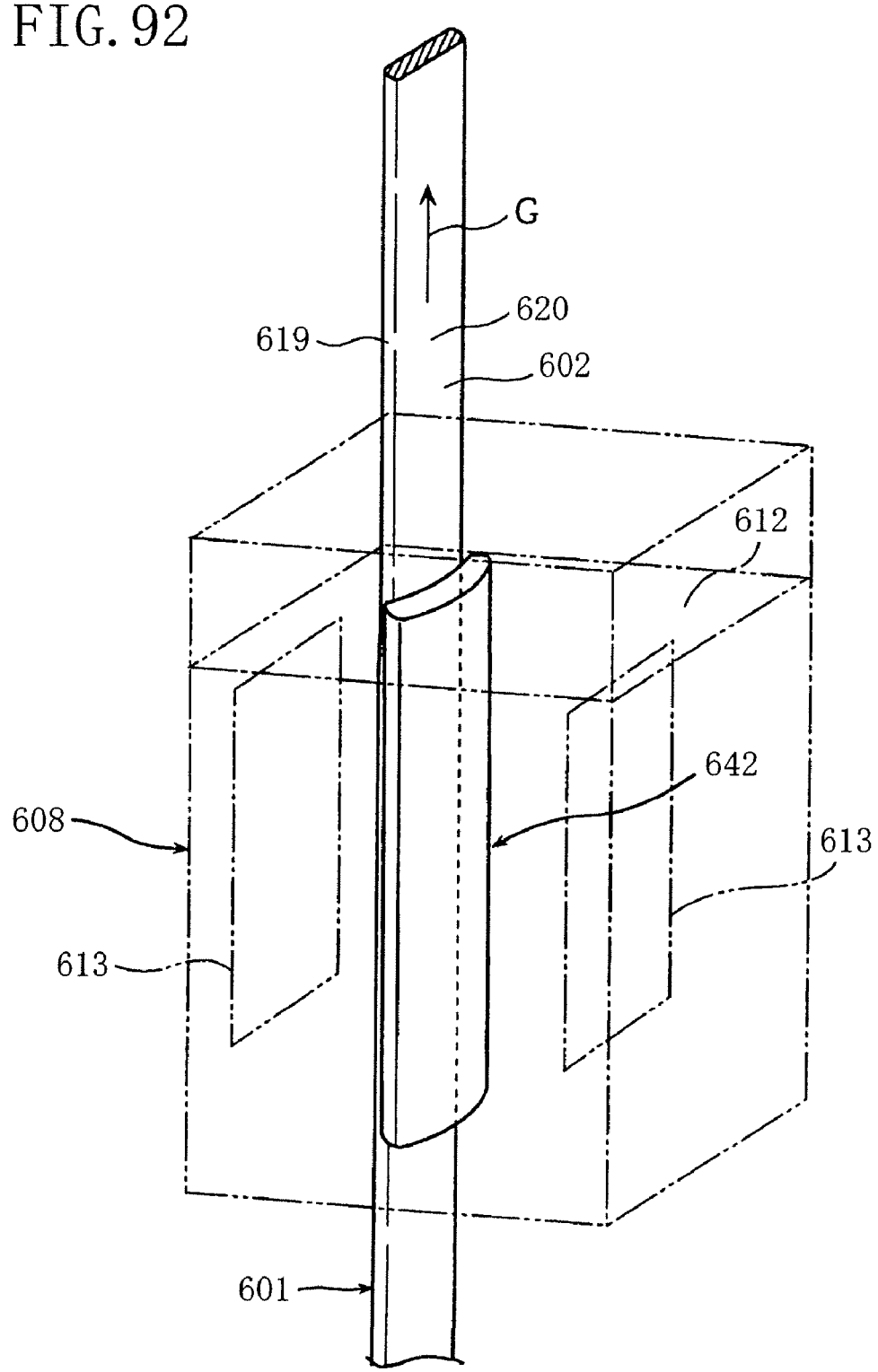
FIG. 92 is an explanatory perspective view showing an essential part of still another embodiment.
Figure 93:
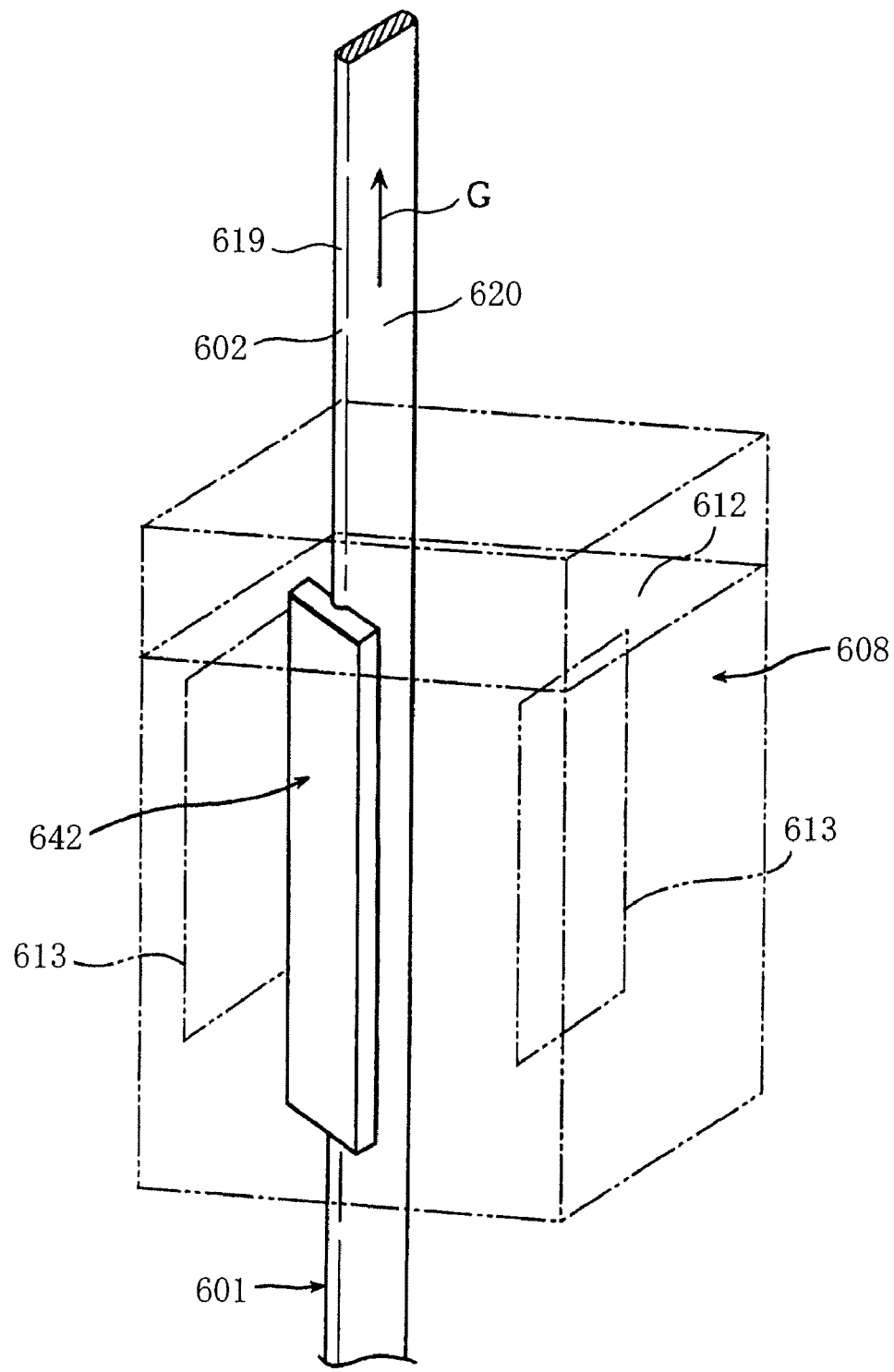
FIG. 93 is an explanatory perspective view showing an essential part of still another embodiment.

Next, FIGS. 92 and 93 show still another embodiments. Instead of the movable masking member 622 shown in FIG. 89, a sliding masking member 642 is disposed in the electrodeposition bath 608.

Specifically, this is a method in which during the electrodeposition layer depositing process, a conductor 601 is partially masked by the sliding masking member 642 in sliding contact with the outer surface 602 of the conductor 601 passing through the inside of the electrodeposition bath 608 so as not to form an electrodeposition layer 615 on part of the outer surface 602 of the conductor 601 and a conductor exposed part 607 is formed as shown in FIG. 94 or 96 in the later baking process using the baking oven 616. The electric insulated wires shown in FIGS. 94 and 96 are manufactured by the methods shown in FIGS. 92 and 93, respectively. The sliding masking member 642 is made of insulating material, such as synthetic resin or rubber. In FIG. 92 or 93, a single sliding masking member 642 is used. However, it is also preferable that such a single sliding masking member is divided into plural pieces and each divided piece is freely movable back and forth to elastically press the running conductor 601, whereby each divided piece can follow increasing and decreasing changes of the width W or thickness of the conductor 601 illustrated in FIGS. 82(a) to 82(d) (over the length) to surely exhibit a masking action (not shown). In FIG. 92 or 93, it is preferable that the sliding masking member 642 is supported in the electrodeposition bath 608 by an (unshown) holding member and pressed against the conductor 601 by an elastic member to come into contact with the conductor 601 with elasticity.

Figure 95:
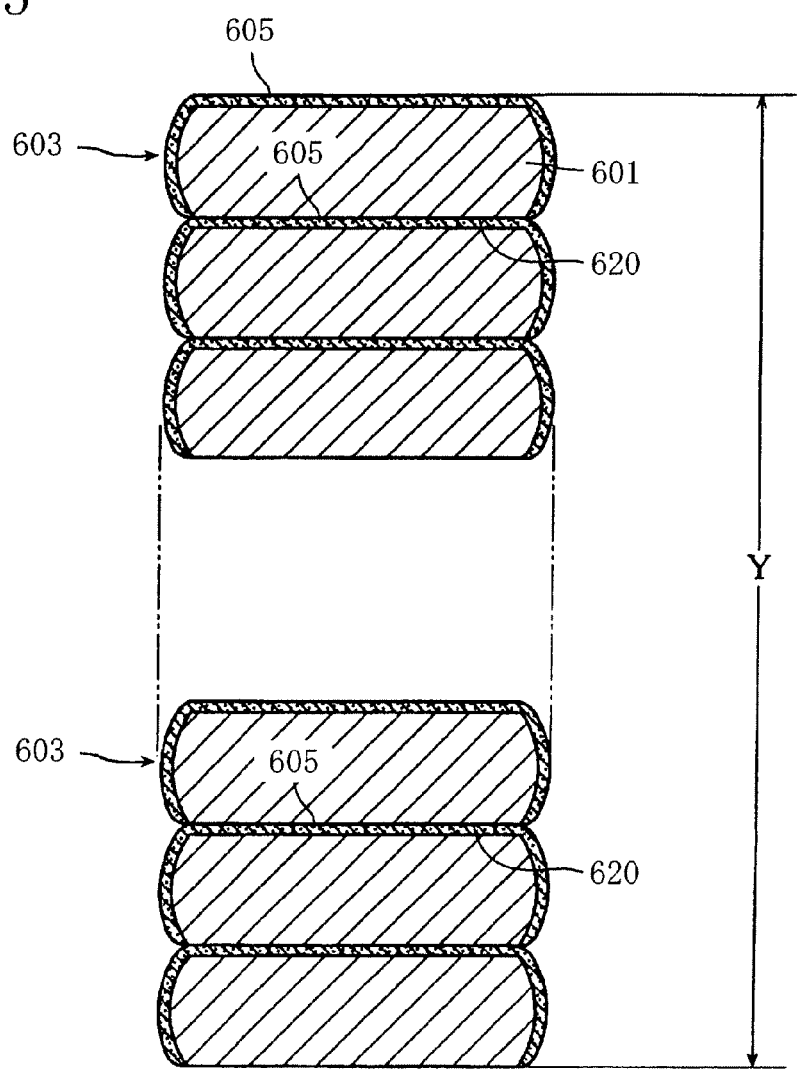
FIG. 95 is a cross-sectional view for explaining a state of use and the behavior of the above embodiment.

An electric insulated wire 603 manufactured by the manufacturing method shown in FIG. 90 or 92 and illustrated in FIG. 94 has a conductor exposed part 607 formed in one long side 620 of the rectangular cross section. When the electric insulated wire 603 is wound in tiers as shown in FIG. 95, the conductor exposed part 607 of the (overlying) conductor 601 is in contact with the insulating layer 605 of the adjacent (underlying) conductor 601, thereby ensuring insulation from each other.

This sufficiently meets the demands for compaction, enhanced performance and enhanced efficiency of electric and electronic instruments. Furthermore, as shown in FIG. 95, its height (thickness) Y of the tiers can be sufficiently reduced as compared with the conventional art, which contributes to compaction of electric and electronic instruments.

As the above demand for compaction grows recently, the thickness of the insulating layer 605 is becoming very thin. This invites a problem that a pin hole formed in the insulating layer 605 during manufacture causes insulation failure. The electric insulated wire 603 according to the present invention shown in FIGS. 94 and 95 is effective as a countermeasure against the above problem. In this technique, the thickness of the insulating layer 605 is increased (only by less than double the thickness thereof in the conventional technique). Thus, a pin hole can be less likely to be formed during manufacture and the whole thickness (height) of the electric insulated wire 603 coil-wound in tiers can be prevented from increasing.

Next, an electric insulated wire 603 manufactured by the manufacturing method shown in FIG. 91 or 93 and illustrated in FIG. 96 has a conductor exposed part 607 formed in one short side 619 of the rectangular cross section. When the electric insulated wire 603 shown in FIG. 96 is wound in vertical and lateral tiers (not shown), insulation between adjacent conductors can be ensured and the dimension of vertical tiers can be sufficiently reduced as compared with the conventional art to contribute to compaction of electric and electronic instruments.

In FIG. 82, reference character P denotes one pitch at which the electric insulated wire is cut when used as a final product. The electric insulated wire may be cut at different cutting points depending on the usage or, for example, the pitch P may be twice or more as long as the above pitch. In any case, according to the manufacturing methods shown in FIGS. 85 to 88, contact points (terminal areas) can be easily formed at any (desired) points of the electric insulated wire 603 in the longitudinal direction. It can be said that its practical range of applications is broad.

The present invention is not limited to the above embodiments and can be freely changed in configuration. The transverse cross-sectional shape of the conductor 601 may be a round shape or a hexagonal shape other than flat-type shapes (that is, a rectangular shape, a minus-sign shape and a square shape). Furthermore, the changes of the width and thickness may be, instead of changes thereof over the length as illustrated in FIGS. 82 and 84, a combination of gradual (inclined) changes and stepwise changes or other various type of changes (needless to say, the present invention can be applied to a conductor 601 having a constant cross-sectional shape).

Although only one baking oven 616 and one electrodeposition bath 608 may be provided for each manufacturing system as shown in FIG. 85, two or more baking ovens and two or more electrodeposition baths may be provided for each manufacturing system. In such a case, a conductor exposed part forming device 617 is disposed between each pair of one electrodeposition bath 608 and one baking oven 616 to prevent part of the conductor to be a conductor exposed part 607 from being covered with an insulating layer 605. Although FIG. 89 shows the case where one baking oven 616 and one electrodeposition bath 608 are provided, another baking oven 616 and another electrodeposition bath 608 may be provided at a point shown in the dash-double-dot-line 634. In this case, a movable masking member 622 or a sliding masking member 642 is provided in each electrodeposition bath 608.

A dryer may be disposed just upstream of the baking oven 616.

As described so far, the electric insulated wire 603 according to the present invention is an electric insulated wire obtained by covering a conductor 601 with an electrodeposited and baked insulating layer 605 and includes a conductor exposed part 607 formed by partial non-formation or partial removal of an electrodeposition layer 615 prior to baking for forming the insulating layer 605. This saves the trouble of mechanically cutting away part of the insulating layer 605 after baked unlike the conventional technique and thereby facilitates the formation of a terminal. Furthermore, unlike the conventional technique, the electric insulated wire manufacturing method according to the present invention never produces fine dusts that would be produced in mechanical cutting, which is very preferable because production of failure during manufacturing process of electric and electronic instruments and precision instruments can be prevented.

Furthermore, one aspect of the present invention is a method of manufacturing an electric insulated wire in which after an electrodeposition layer depositing step of depositing an electrodeposition layer 615 on the outer surface 602 of a conductor 601 while continuously passing the conductor 601 through the inside of an electrodeposition bath 608, the electrodeposition layer 615 deposited on the outer surface 602 of the conductor 601 is subjected to a baking step of continuously baking the electrodeposition layer 615 to form an insulating layer 605 on the outer surface 602 of the conductor 601 to cover it, wherein between the electrodeposition layer depositing step and the baking step, an uncured electrodeposition layer 615 deposited on the outer surface 602 of the conductor 601 is blown out by injected fluid H to partially remove the electrodeposition layer 615 and the conductor 601 is subjected to the baking step to form a conductor exposed part 607 at which the conductor 601 is exposed. Therefore, a terminal can be easily, simply and efficiently formed at a desired position of the conductor 601 in the longitudinal direction.

Furthermore, another aspect of the invention is a method of manufacturing an electric insulated wire in which after an electrodeposition layer depositing step of depositing an electrodeposition layer 615 on the outer surface 602 of a conductor 601 while continuously passing the conductor 601 through the inside of an electrodeposition bath 608, the electrodeposition layer 615 deposited on the outer surface 602 of the conductor 601 is subjected to a baking step of continuously baking the electrodeposition layer 615 to form an insulating layer 605 on the outer surface 602 of the conductor 601 to cover it, wherein during the electrodeposition layer depositing step, the conductor 601 is partially masked by a movable masking member 622 moving in the same direction as the passing direction G of the conductor 601 while coming into contact with the outer surface 602 of the conductor 601 in the electrodeposition bath 608 so as not to form the electrodeposition layer 615 on part of the outer surface 602 of the conductor 601, and a conductor exposed part 607 is formed in the later baking step. According to this method, as shown in FIGS. 94 and 96, the conductor exposed part 607 can be easily formed only on part of the cross section over the entire length, which is suitable for mass production and provides compaction of the whole dimension Y such as of a coil as shown in FIG. 95. In addition, also when the width or thickness of the conductor 601 changes increasingly and decreasingly, the movable masking member 622 can follow the shape changes, thereby providing a high-quality product.

Furthermore, another aspect of the invention is a method of manufacturing an electric insulated wire in which after an electrodeposition layer depositing step of depositing an electrodeposition layer 615 on the outer surface 602 of a conductor 601 while continuously passing the conductor 601 through the inside of an electrodeposition bath 608, the electrodeposition layer 615 deposited on the outer surface 602 of the conductor 601 is subjected to a baking step of continuously baking the electrodeposition layer 615 to form an insulating layer 605 on the outer surface 602 of the conductor 601 to cover it, wherein during the electrodeposition layer depositing step, the conductor 601 is partially masked by a sliding masking member 642 in sliding contact with the outer surface 602 of the conductor 601 passing through the inside of the electrodeposition bath 608 so as not to form the electrodeposition layer 615 on part of the outer surface 602 of the conductor 601, and a conductor exposed part 607 is formed in the later baking step. According to this method, as shown in FIGS. 94 and 96, the conductor exposed part 607 can be easily formed only on part of the cross section over the entire length, which is suitable for mass production and provides compaction of the whole dimension Y such as of a coil as shown in FIG. 95.

The invention claimed is:

1. A flat-type wire manufacturing method, comprising:
producing an intermediate wire material whose cross-sectional area changes increasingly and decreasingly in the longitudinal direction; and
feeding the intermediate wire material to between rolling rolls and rolling it while controlling the rolling rolls to come close to and away from each other so that portions of an intermediate wire material having a large cross-sectional area and portions thereof having a small cross-sectional area correspond to portions of the flat-type wire having a small final thickness and portions thereof having a large final thickness, respectively.

2. The method of claim 1, wherein
a first step of producing the intermediate wire material whose cross-sectional area changes increasingly and decreasingly in the longitudinal direction and a second step of rolling the intermediate wire material with the rolling rolls are continuously carried out.

3. The method of claim 1, wherein
the intermediate wire material is once taken up and then fed out to proceed to a second step so that a first step of producing the intermediate wire material whose cross-sectional area changes increasingly and decreasingly in the longitudinal direction and the second step of rolling the intermediate wire material with the rolling rolls are discontinuously carried out.

4. A flat-type wire manufacturing method for manufacturing a flat-type wire whose final thickness and final width continuously change in the longitudinal direction, the method comprising feeding a metal wire of circular cross section sequentially to a pair of first rolling rolls and a pair of second rolling rolls, each pair of rolling rolls controlled to relatively come close to and away from each other,
wherein the pair of first rolling rolls roll the intermediate wire material so that the relation of magnitude of thickness between portions of the intermediate wire material becomes inverse to the relation of magnitude of final thickness between corresponding portions of the flat-type wire, while being controlled to come close to and away from each other.

5. A flat-type wire manufacturing method for manufacturing a flat-type wire whose final thickness and final width continuously change in the longitudinal direction, the method comprising:
feeding a metal wire of circular cross section to between a pair of first rolling rolls controlled to relatively come close to and away from each other, thereby forming an intermediate wire material whose thickness and width continuously change; and
feeding the intermediate wire material to between a pair of second rolling rolls while controlling the second rolling rolls to relatively come close to and away from each other so that the relation of magnitude of thickness between portions of the intermediate wire material becomes inverse to the relation of magnitude of a roll distance.

6. The method of claim 4, wherein
a roll diameter of the pair of the second rolling rolls is larger than a roll diameter of the pair of the first rolling rolls.

7. The method of claim 5, wherein
a roll diameter of the pair of the second rolling rolls is larger than a roll diameter of the pair of the first rolling rolls.

8. The method of claim 1, wherein
the pair of the rolling rolls roll the intermediate wire material so that a product of the final thickness and the final width of the flat-type wire is constant.

9. The method of claim 4, wherein
the pair of the rolling rolls roll the intermediate wire material so that a product of the final thickness and the final width of the flat-type wire is constant.

10. The method of claim 5, wherein
the pair of the rolling rolls roll the intermediate wire material so that a product of the final thickness and the final width of the flat-type wire is constant.

* * * * *